(12) United States Patent
Silverbrook et al.

(10) Patent No.: US 7,331,660 B2
(45) Date of Patent: *Feb. 19, 2008

(54) CRADLE UNIT HAVING A COVER ASSEMBLY WITH INK REFILL PORT

(75) Inventors: Kia Silverbrook, Balmain (AU); Akira Nakazawa, Balmain (AU); Christopher Hibbard, Balmain (AU); Paul Ian MacKey, Balmain (AU); Norman Micheal Berry, Balmain (AU); Garry Raymond Jackson, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 339 days.

This patent is subject to a terminal disclaimer.

(21) Appl. No.: 11/014,739

(22) Filed: Dec. 20, 2004

(65) Prior Publication Data

US 2005/0157020 A1    Jul. 21, 2005

Related U.S. Application Data

(63) Continuation-in-part of application No. 10/760,254, filed on Jan. 21, 2004.

(51) Int. Cl.
*B41J 2/175* (2006.01)
(52) U.S. Cl. .................. 347/85; 347/84; 347/86; 347/7
(58) Field of Classification Search .......... 347/84, 347/85
See application file for complete search history.

(56) References Cited

U.S. PATENT DOCUMENTS

| | | | |
|---|---|---|---|
| 4,329,698 A | 5/1982 | Smith | |
| 4,985,710 A | 1/1991 | Drake | |
| 5,160,945 A | 11/1992 | Drake | |
| 5,221,397 A | 6/1993 | Nystrom | |
| 5,585,825 A | 12/1996 | Kneezel et al. | |
| 5,676,475 A * | 10/1997 | Dull | 400/174 |
| 6,017,117 A | 1/2000 | Mc Clelland et al. | |
| 6,270,177 B1 | 8/2001 | King et al. | |
| 6,281,912 B1 | 8/2001 | Silverbrook | |
| 6,382,769 B1 | 5/2002 | Silverbrook | |
| 6,439,908 B1 | 8/2002 | Silverbrook et al. | |
| 6,443,555 B1 | 9/2002 | Silverbrook et al. | |
| 6,447,113 B1 | 9/2002 | Silverbrook et al. | |
| 6,481,829 B1 | 11/2002 | Bailey et al. | |
| 6,485,135 B1 | 11/2002 | Foote et al. | |
| 6,488,368 B2 * | 12/2002 | Petersen et al. | 347/85 |
| 6,554,398 B2 | 4/2003 | Wyngaert et al. | |
| 6,557,976 B2 | 5/2003 | McElfresh et al. | |
| 6,585,348 B2 * | 7/2003 | Reed et al. | 347/29 |
| 6,652,082 B2 | 11/2003 | Silverbrook | |
| 6,672,706 B2 | 1/2004 | Silverbrook | |
| 6,679,584 B2 | 1/2004 | Silverbrook | |

FOREIGN PATENT DOCUMENTS

EP         590669 A1    4/1994

* cited by examiner

*Primary Examiner*—Lamson Nguyen
*Assistant Examiner*—Brian J. Goldberg

(57) ABSTRACT

A cradle unit for an inkjet printer is provided. The cradle unit has a body complementary to a removable inkjet cartridge of a type having a pagewidth printhead and a refillable ink supply, and a controller for controlling the operation of the printhead to facilitate printing. The body includes a cover assembly for enclosing the removable inkjet cartridge within the body. The cover assembly has at least one port formed therein through which a refill unit is received for refilling the ink supply of the cartridge.

11 Claims, 111 Drawing Sheets

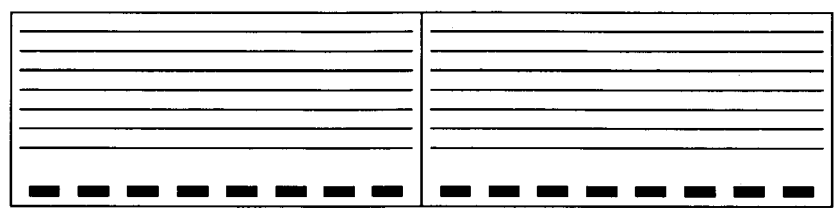
FIG. 22
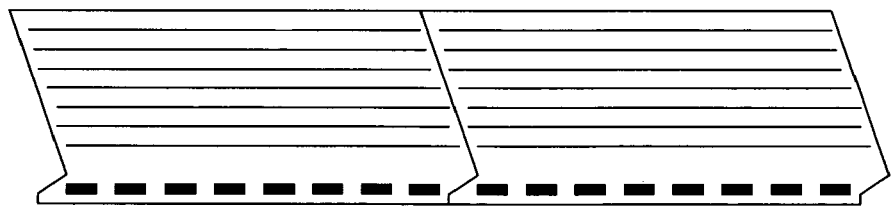
FIG. 23
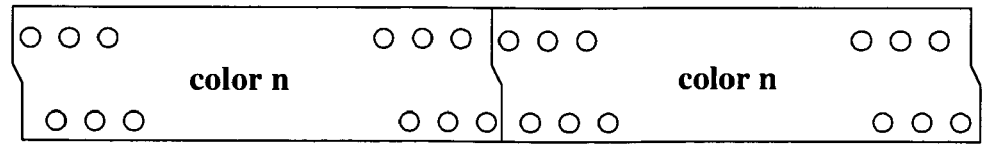
FIG. 24a
FIG. 24b

CRADLE UNIT HAVING A COVER ASSEMBLY WITH INK REFILL PORT

The present application is a Continuation-In-Part application of U.S. Ser. No. 10/760,254 filed on Jan. 21, 2004. In the interests of brevity, the disclosure of the parent application is incorporated in its entirety into the present specification by cross reference.

CO-PENDING APPLICATIONS

The following applications have been filed by the Applicant simultaneously with the present application:

| | | | | | |
|---|---|---|---|---|---|
| 7152972 | 11/014731 | 11/014764 | 11/014763 | 11/014748 | 11/014747 |
| 11/014761 | 11/014760 | 11/014757 | 11/014714 | 11/014713 | 11/014762 |
| 11/014724 | 11/014723 | 11/014756 | 11/014736 | 11/014759 | 11/014758 |
| 11/014725 | 11/014738 | 11/014737 | 11/014726 | 11/014745 | 11/014712 |
| 11/014715 | 11/014751 | 11/014735 | 11/014734 | 11/014719 | 11/014750 |
| 11/014749 | 11/014746 | 11/014769 | 11/014729 | 11/014743 | 11/014733 |
| 11/014754 | 11/014755 | 11/014765 | 11/014766 | 11/014740 | 11/014720 |
| 11/014753 | 11/014752 | 11/014744 | 11/014741 | 11/014768 | 11/014767 |
| 11/014718 | 11/014717 | 11/014716 | 11/014732 | 11/014742 | 11/014722 |
| 11/014728 | 11/014727 | 11/014730 | | | |

The disclosures of these co-pending applications are incorporated herein by reference.

CROSS REFERENCES TO RELATED APPLICATIONS

The following patents or patent applications filed by the applicant or assignee of the present invention are hereby incorporated by cross-reference.

| | | | | | |
|---|---|---|---|---|---|
| 11/003786 | 11/003616 | 11/003418 | 11/003334 | 11/003600 | 11/003404 |
| 11/003419 | 11/003700 | 11/003601 | 11/003618 | 11/003615 | 11/003337 |
| 11/003698 | 11/003420 | 6984017 | 11/003699 | 11/003463 | 11/003701 |
| 11/003683 | 11/003614 | 11/003702 | 11/003684 | 11/003619 | 11/003617 |
| 6623101 | 6406129 | 6505916 | 6457809 | 6550895 | 6457812 |
| 7152962 | 6428133 | 10/815625 | 10/815624 | 10/815628 | 10/913375 |
| 10/913373 | 10/913374 | 10/913372 | 7138391 | 7153956 | 10/913380 |
| 10/913379 | 10/913376 | 7122076 | 7148345 | 10/407212 | 10/407207 |
| 10/683064 | 10/683041 | 10/882774 | 10/884889 | 10/922890 | 10/922875 |
| 10/922885 | 10/922889 | 10/922884 | 10/922879 | 10/922887 | 10/922888 |
| 10/922874 | 10/922873 | 10/922871 | 10/922880 | 10/922881 | 10/922882 |
| 10/922883 | 10/922878 | 10/922872 | 10/922876 | 10/922886 | 10/922877 |
| 6746105 | 7156508 | 7159972 | 7083271 | 7165834 | 7080894 |
| 10/760218 | 7090336 | 7156489 | 10/760233 | 10/760246 | 7083257 |
| 10/760243 | 10/760201 | 10/760185 | 10/760253 | 10/760255 | 10/760209 |
| 7118192 | 10/760194 | 10/760238 | 7077505 | 10/760235 | 7077504 |
| 10/760189 | 10/760262 | 10/760232 | 10/760231 | 7152959 | 10/760190 |
| 10/760191 | 10/760227 | 7108353 | 7104629 | 10/728804 | 7128400 |
| 7108355 | 6991322 | 10/728790 | 7118197 | 10/728970 | 10/728784 |
| 10/728783 | 7077493 | 6962402 | 10/728803 | 7147308 | 10/728779 |
| 7118198 | 7168790 | 7172270 | 10/773199 | 6830318 | 10/773201 |
| 10/773191 | 10/773183 | 7108356 | 7118202 | 10/773186 | 7134744 |
| 10/773185 | 7134743 | 10/773197 | 10/773203 | 10/773187 | 7134745 |
| 7156484 | 7118201 | 7111926 | 10/773184 | 09/575197 | 7079712 |
| 09/575123 | 6825945 | 09/575165 | 6813039 | 6987506 | 7038797 |
| 6980318 | 6816274 | 7102772 | 09/575186 | 6681045 | 6728000 |
| 7173722 | 7088459 | 09/575181 | 7068382 | 7062651 | 6789194 |
| 6789191 | 6644642 | 6502614 | 6622999 | 6669385 | 6549935 |
| 6987573 | 6727996 | 6591884 | 6439706 | 6760119 | 09/575198 |
| 7064851 | 6826547 | 6290349 | 6428155 | 6785016 | 6831682 |
| 6741871 | 6927871 | 6980306 | 6965439 | 6840606 | 7036918 |
| 6977746 | 6970264 | 7068389 | 7093991 | 10/659026 | 10/884885 |
| 10/884883 | 10/901154 | 10/932044 | 10/962412 | 10/962510 | 10/962552 |
| 10/965733 | 10/965933 | 10/974742 | 10/986375 | 6982798 | 6870966 |
| 6822639 | 6737591 | 7055739 | 09/575129 | 6830196 | 6832717 |
| 6957768 | 7170499 | 7106888 | 7123239 | 10/727181 | 10/727162 |
| 10/727163 | 10/727245 | 7121639 | 7165824 | 7152942 | 10/727157 |
| 10/727178 | 7096137 | 10/727257 | 10/727238 | 10/727251 | 10/727159 |
| 10/727180 | 10/727179 | 10/727192 | 10/727274 | 10/727164 | 10/727161 |
| 10/727198 | 10/727158 | 10/754536 | 10/754938 | 10/727227 | 10/727160 |
| 10/934720 | 10/296522 | 6795215 | 7070098 | 7154638 | 6805419 |
| 6859289 | 6977751 | 6398332 | 6394573 | 6622923 | 6747760 |
| 6921144 | 10/884881 | 7092112 | 10/949294 | 10/854521 | 10/854522 |
| 10/854488 | 10/854487 | 10/854503 | 10/854504 | 10/854509 | 10/854510 |
| 7093989 | 10/854497 | 10/854495 | 10/854498 | 10/854511 | 10/854512 |
| 10/854525 | 10/854526 | 10/854516 | 10/854508 | 10/854507 | 10/858515 |
| 10/854506 | 10/854505 | 10/854493 | 10/854494 | 10/854489 | 10/854490 |
| 10/854492 | 10/854491 | 10/854528 | 10/854523 | 10/854527 | 10/854524 |
| 10/854520 | 10/854514 | 10/854519 | 10/854513 | 10/854499 | 10/854501 |
| 10/854500 | 10/854502 | 10/854518 | 10/854517 | 10/934628 | |

Some applications have been listed by docket numbers. These will be replaced when application numbers are known.

FIELD OF THE INVENTION

The present invention relates to a cradle for a high speed print engine, and more particularly to a cradle unit configured to receive and secure a pagewidth cartridge therein, and allow refilling of the cartridge in its secured position.

BACKGROUND OF THE INVENTION

Traditionally, most commercially available inkjet printers have a print engine which forms part of the overall structure and design of the printer. In this regard, the body of the printer unit is typically constructed to accommodate the print head and associated media delivery mechanisms, and these features are integral with the printer unit.

This is especially the case with inkjet printers that employ a printhead that traverses back and forth across the media as the media is progressed through the printer unit in small iterations. In such cases the reciprocating printhead is typically mounted to the body of the printer unit such that it can traverse the width of the printer unit between a media input roller and a media output roller, with the media input and output rollers forming part of the structure of the printer unit. With such a printer unit it may be possible to remove the printhead for replacement, however the other parts of the print engine, such as the media transport rollers, control circuitry and maintenance stations, are typically fixed within the printer unit and replacement of these parts is not possible without replacement of the entire printer unit.

As well as being rather fixed in their design construction, printer units employing reciprocating type printheads are considerably slow, particularly when performing print jobs of full colour and/or photo quality. This is due to the fact that the printhead must continually traverse the stationary media to deposit the ink on the surface of the media and it may take a number of swathes of the printhead to deposit one line of the image.

Recently, it has been possible to provide a printhead that extends the entire width of the print media so that the printhead can remain stationary as the media is transported past the printhead. Such systems greatly increase the speed at which printing can occur as the printhead no longer needs to perform a number of swathes to deposit a line of an image, but rather the printhead can deposit the ink on the media as it moves past at high speeds. Such printheads have made it possible to perform full colour 1600 dpi printing at speeds in the vicinity of 60 pages per minute, speeds previously unattainable with conventional inkjet printers.

Such a pagewidth printhead typically requires high precision and high speed paper movement and as such the entire print engine (printhead, paper handling mechanisms and control circuitry etc) must be configured accordingly to ensure high quality output.

Accordingly, there is a need to provide a print engine having a pagewidth printhead that can be readily employed within a standard body of a printer unit and is constructed in a manner that ensures that all the necessary parts of the print engine are configured in a manner that enables consistent, high speed printing.

SUMMARY OF THE INVENTION

In an first aspect the present invention provides a cradle unit for an inkjet printer comprising:

a body complementary to a removable inkjet cartridge of a type having a pagewidth printhead and a refillable ink supply; and a controller for controlling the operation of the printhead to facilitate printing;

wherein, said body includes a cover assembly for enclosing the removable inkjet cartridge within the body, said cover assembly having at least one port formed therein through which a refill unit is received for refilling the ink supply of the cartridge.

Optionally the body defines a recess to receive the removable inkjet cartridge and said cover assembly secures the removable inkjet cartridge within said recess.

Optionally the port is shaped to receive at least a portion of the refill unit.

Optionally the port includes a retaining means for engaging with the refill unit to secure the refill unit in position for refilling the ink supply of the cartridge.

Optionally the retaining means includes a clip member which engages with a recess provided in refill unit to secure the refill unit in position.

Optionally the port includes a receiver unit arranged therein for engaging with an integrated circuit provided on the refill unit when the refill unit is received by said port.

Optionally the integrated circuit is a quality assurance chip which stores information relating to the type and/or amount of printing fluid contained in said refill unit.

Optionally the reader unit transmits said information to the controller to control the refilling process.

Optionally the cover assembly includes an actuator member arranged therein which operates said refill unit to facilitate refilling of the ink supply of the cartridge.

Optionally the actuator member is a push rod which extends into said port to engage with the refill unit to release ink from the refill unit into said ink supply of the cartridge.

Optionally said push rod is activated by a solenoid actuator which is mounted to the body.

Optionally the actuator member is a gear mechanism which meshes with a corresponding gear mechanism provided on the refill unit to facilitate release of ink from the refill unit into said ink supply of the cartridge.

Optionally the gear mechanism is activated by a motor which is mounted to the body.

In a further aspect there is provide a cradle unit, the cradle unit being arranged for use with an inkjet printer unit comprising:

a media input tray for supplying print media for printing;

a print engine for printing an image on said print media; and a media output tray for collecting the printed media;

wherein the print engine comprises a removable inkjet cartridge of a type having a pagewidth printhead and an ink supply and the cradle and wherein the cradle has a body adapted to receive the removable inkjet cartridge and to control the operation of the printhead for printing.

In a further aspect there is provide a cradle unit, the cradle unit being arranged for use in a print engine for an inkjet printer comprising:

a removable inkjet cartridge of a type having a pagewidth printhead and an ink supply; and wherein the cradle has a body adapted to receive the removable inkjet cartridge and to control the operation of the printhead for printing, and the cradle is configured to be secured to the inkjet printer to receive print media from a media input tray and to deliver printed media to a media output tray.

In a further aspect there is provide a cradle unit, the cradle unit being arranged for use with a cartridge unit comprising:

a body portion having one or more ink storage compartments; and a pagewidth printhead assembly mountable to said body and configured to receive ink from the one or more compartments and to distribute the ink along the length of the printhead assembly.

In a further aspect there is provide a cradle unit, the cradle unit being arranged for use with a cartridge unit comprising:

a body portion having one or more ink storage compartments;

a pagewidth printhead assembly mountable to said body portion and configured to receive ink from the one or more compartments for printing; and a capper unit mountable to said body portion so as to extend along the length of the printhead assembly, the capper unit housing a capping element which is movable with respect to the capper unit to contact a surface of the printhead assembly.

In a further aspect there is provide a cradle unit, the cradle unit being arranged for use with a cartridge unit comprising:

a body portion housing one or more ink storage compartments;

a pagewidth printhead assembly configured to receive ink from the one or more ink storage compartments and having a plurality of nozzles arranged in use to deliver the ink onto passing print media; and an electrical connector in electrical communication with the nozzles of the printhead assembly and disposed along the length of the printhead assembly for mating with a corresponding connectors of the inkjet printer to control operation of the nozzles.

In a further aspect there is provide a cradle unit, the cradle unit being arranged for use with a cartridge unit comprising:

a body portion having a plurality of ink storage compartments; and a pagewidth printhead assembly configured to receive ink from ink storage compartments and distribute said ink to a plurality of nozzles arranged in use to deliver the ink onto passing print media;

wherein the ink storage compartments comprise an absorption material which stores the ink therein under capillary action for supply to the nozzles of the printhead assembly.

In a further aspect there is provide a cradle unit, the cradle unit being arranged for use with a pagewidth printhead assembly comprising:

a body portion for receiving ink from one or more ink sources and distributing the ink along the length of the printhead assembly;

a plurality of integrated circuits extending the length of the printhead assembly, each integrated circuit having a plurality of nozzles formed in rows thereon, each of the nozzles being arranged in use to deliver the ink onto passing print media; and an ink distribution member upon which the integrated circuits are fixed and which distributes the ink from the body portion to the nozzles of the integrated circuits;

wherein the integrated circuits are aligned in an abutting arrangement across the length of the ink distribution member.

In a further aspect there is provide a cradle unit, the cradle unit being arranged for use with a pagewidth printhead assembly comprising:

a body portion for receiving ink from one or more ink sources and distributing the ink along the length of the printhead assembly;

one or more integrated circuits extending substantially the length of the printhead assembly, the or each integrated circuit having a plurality of nozzles formed thereon, each of the nozzles being arranged in use to deliver the ink onto passing print media;

an ink distribution member upon which the or each integrated circuit are fixed and which distributes the ink from the body portion to the nozzles of the or each integrated circuit;

wherein the body portion has one or more connectors formed thereon for securing the printhead assembly to the one or more ink sources to facilitate ink flow therebetween.

In a further aspect there is provide a cradle unit, the cradle unit being arranged for use with a pagewidth printhead assembly comprising:

a body portion for receiving ink from one or more ink sources and distributing the ink along the length of the printhead assembly;

one or more integrated circuits extending substantially the length of the printhead assembly, the or each integrated circuit having a plurality of nozzles formed thereon, each of the nozzles being arranged in use to deliver the ink onto passing print media;

an ink distribution member upon which the or each integrated circuit is fixed and which distributes the ink from the body portion to the nozzles of the or each integrated circuit;

wherein an electrical connector in electrical communication with the or each integrated circuit extends along the length of the printhead assembly for mating with a corresponding electrical connector of the inkjet printer.

In a further aspect there is provide a cradle unit, the cradle unit being arranged for use with a pagewidth printhead assembly comprising:

a body portion for receiving ink from one or more ink sources and having one or more channels formed therein for distributing the ink substantially along the length of the printhead assembly;

one or more integrated circuits extending substantially the length of the printhead assembly, the or each integrated circuit having a plurality of nozzles, each of the nozzles being arranged in use to deliver the ink onto passing print media; and an ink distribution member upon which the or each integrated circuit is fixed and which distributes the ink from the body portion to each of the integrated circuits;

wherein the ink distribution member is a unitary element having a plurality of conduits formed therethrough, each of the conduits having an inlet which receives ink from one of the channels of the body portion and an outlet which delivers the ink to a predetermined number of nozzles of the one or more integrated circuits.

In a further aspect there is provide a cradle unit, the cradle unit being arranged for use with a pagewidth printhead assembly comprising:

a body portion for receiving ink from one or more ink sources and having one or more channels formed therein for distributing the ink substantially along the length of the printhead assembly;

one or more integrated circuits extending substantially the length of the printhead assembly, each integrated circuit having a plurality of nozzles, each of the nozzles being arranged in use to deliver the ink onto passing print media; and an ink distribution member upon which each integrated circuit is fixed and which distributes the ink from the body portion to each of the integrated circuits;

wherein the ink distribution member comprises a first layer which directs the ink from the one or more channels of the body portion for delivery to each integrated circuit, and a second layer attached to said first layer for receiving and securing each integrated circuit in a position to receive the ink from the first layer.

In a further aspect there is provide a cradle unit, the cradle unit being arranged for use with a pagewidth printhead adapted to be capped by a capping assembly comprising:

a body configured to extend the length of the printhead; and a capping element housed within said body and movable with respect to the body to cap at least a portion of said printhead;

wherein, the body includes a mounting element for removably mounting said capping assembly to said printhead.

In a further aspect there is provide a cradle unit, the cradle unit being arranged for use with a pagewidth printhead adapted to be capped by a capping assembly comprising:

a body configured to extend the length of the printhead; and a capping element housed within said body, said capping element having a rim portion adapted to cap at least a portion of said printhead;

wherein, the capping element is movable with respect to said body between a first and a second position, said first position being where said rim portion extends from said body, and said second position being where said rim portion is contained within said body.

In a further aspect there is provide a cradle unit, the cradle unit being arranged for use with a pagewidth printhead adapted to be capped by a capping assembly comprising:

a body configured to extend the length of the printhead; and a capping element housed within said body and movable with respect to said body between a first and a second position, said first position being where a portion of the capping element extends from said body, and said second position being where said capping element is contained within said body;

wherein, the capping element is biased into said first position.

In a further aspect there is provide a cradle unit, the cradle unit being arranged for use with a pagewidth printhead adapted to be capped by a capping assembly comprising:

a body configured to extend the length of the printhead;

a capping element housed within said body and having a rim portion adapted to cap at least a portion of the printhead;

a displacement assembly housed within the body for moving the capping element between a first position where the rim portion of the capping element extends from said body, and a second position where the rim portion of the capping element is contained within the body;

wherein, the displacement assembly is controlled by an electromagnet which determines the position.

In a further aspect there is provide a cradle unit, wherein, a plurality of terminals are located along the length of the body to contact corresponding terminals located along the length of the removable inkjet cartridge to enable electrical communication between the controller and the cartridge.

In a further aspect there is provide a cradle unit, wherein said plurality of terminals are arranged to pivotally engage with said corresponding terminals provided on said cartridge when said cartridge is received by said body.

In a further aspect there is provide a cradle unit, wherein, said body is configured to receive a refill unit for supplying refill ink to the cartridge and includes a refill actuator for dispensing ink from said refill unit into said refillable ink supply.

In a further aspect there is provide a cradle unit, wherein, said body includes a capper assembly and an electromagnet assembly mounted thereto which is controlled by said controller for operating said capper assembly of the removable inkjet cartridge.

In a further aspect there is provide a cradle unit, wherein the cartridge is arranged for use with a cover assembly comprising at least one port formed therein through which a refill unit is received for refilling the ink supply of the cartridge.

In a further aspect there is provide a cradle unit, wherein the cartridge is arranged for use with a cover assembly comprising a refill actuator for dispensing ink from an ink refill unit into said refillable ink supply.

In a further aspect there is provide a cradle unit, wherein the cartridge has a pagewidth printhead assembly in fluid communication with one or more ink storage compartment and the cartridge is adapted for priming by an ink priming system comprising:

a priming inlet provided on said printhead assembly for receiving a supply of ink for priming the cartridge unit; and an ink flow passage providing fluid connection between said printhead assembly and one of the ink storage compartments;

wherein the ink supplied to the priming inlet of the printhead assembly flows from the printhead assembly to the ink storage compartment via the ink flow passage to prime both the printhead assembly and the ink storage compartment with ink simultaneously.

In a further aspect there is provide a cradle unit, wherein the cartridge has a pagewidth printhead assembly in fluid communication with one or more ink storage compartment and the cartridge is adapted for priming by an ink priming system comprising:

a priming inlet provided on said printhead assembly for receiving a supply of ink for priming the cartridge unit;

an ink flow passage providing fluid connection between said printhead assembly and one of the ink storage compartments; and a bypass flow passage providing additional fluid connection between the ink flow passage and the ink storage compartment;

wherein the ink supplied to the priming inlet of the printhead assembly flows from the printhead assembly to the ink storage compartment via the ink flow passage and the bypass flow passage to prime both the printhead assembly and the ink storage compartment with ink simultaneously.

In a further aspect there is provide a cradle unit, the inkjet cartridge is adapted for refilling by a fluid refill cartridge associated with a printing fluid dispenser comprising:

a body storing printing fluid having an outlet through which the printing fluid is dispensed; and a selector arranged to select the amount of the printing fluid to be dispensed from the body.

In a further aspect there is provide a cradle unit, the cradle unit being arranged for use in a printing unit adapted for refilling by a fluid refill cartridge by way of a method comprising the steps of:

removably mounting a dispenser of printing fluid to the printing unit so as to align an outlet of the dispenser with an inlet of a printing fluid storage chamber of the printing unit;

determining an amount of printing fluid needed to substantially refill the printing fluid storage chamber; and selectively dispensing an amount of printing fluid from the dispenser corresponding to the determined amount.

In a further aspect there is provide a cradle unit, wherein the inkjet cartridge is adapted for refilling by a fluid refill cartridge associated with a dispensing assembly comprising:

a body for storing printing fluid having an outlet through which the printing fluid is dispensed; and a plunger arranged to selectively change the storage capacity of the body and expel the printing fluid through said outlet by selective engagement of a movable retaining member with a series of grooves arranged along a surface of the plunger, thereby dispensing a selected amount of printing fluid from the outlet.

In a further aspect there is provide a cradle unit, the cradle unit being arranged for use with a print engine adapted for refilling by a printing fluid refill unit, wherein the refilling is controlled by a system comprising:

an information storage element incorporated in the refill unit for storing information on the amount of printing fluid contained in the refill unit; and an information reader incorporated in the print engine for reading the information stored by the storage element when the refill unit is mounted to the print engine and for controlling the refilling of the print engine with the printing fluid contained in the refill unit based on the information read.

In a further aspect there is provide a cradle unit, the cradle unit being arranged for use with a print engine adapted for refilling by a printing fluid refill unit comprising an information storage element for storing information on the amount of printing fluid contained in the refill unit and for connecting with an information reader incorporated in the print engine for reading the information stored by the storage element when the refill unit is mounted to the print engine, wherein the information stored by the storage element enables the reader to control the refilling of the print engine with the printing fluid contained in the refill unit.

In a further aspect there is provide a cradle unit, the cradle unit being arranged for use in a printing unit adapted for refilling by a printing fluid refill cartridge, the refilling being controlled by a method comprising the steps of:

storing information on an amount of printing fluid contained in the refill cartridge in an information storage element incorporated therein;

mounting the refill cartridge to the printing unit;

reading the information on the amount of printing fluid with an information reader incorporated in the printing unit; and controlling the refilling of the printing unit with printing fluid contained in the refill cartridge based on the information read.

In a further aspect there is provide a cradle unit, wherein the cartridge is associated with a printing fluid storage device comprising a porous body having a plurality of individual channels arranged in an array to store printing fluid and supply the stored printing fluid to at least one printing fluid ejecting nozzle of a printhead of a printer unit, wherein a first end of each of the channels is in fluid communication with a printing fluid supply to extract printing fluid from the fluid supply for storage therein under capillary action and the stored printing fluid is supplied to the at least one nozzle under capillary action.

In a further aspect the present invention provides an inkjet printer unit comprising:

a media input tray for supplying print media for printing;

a print engine for printing an image on said print media; and a media output tray for collecting the printed media;

wherein the print engine comprises a removable inkjet cartridge of a type having a pagewidth printhead and an ink supply and a cradle having a body adapted to receive the removable inkjet cartridge and to control the operation of the printhead for printing.

In a further aspect the present invention provides a print engine for an inkjet printer comprising:

a removable inkjet cartridge of a type having a pagewidth printhead and an ink supply; and a cradle having a body adapted to receive the removable inkjet cartridge and to control the operation of the printhead for printing;

wherein the cradle is configured to be secured to the inkjet printer to receive print media from a media input tray and to deliver printed media to a media output tray.

In a further aspect the present invention provides a cartridge unit for an inkjet printer comprising:

a body portion having one or more ink storage compartments; and a pagewidth printhead assembly mountable to said body and configured to receive ink from the one or more compartments and to distribute the ink along the length of the printhead assembly.

In a further aspect the present invention provides a cartridge unit for an inkjet printer comprising:

a body portion having one or more ink storage compartments;

a pagewidth printhead assembly mountable to said body portion and configured to receive ink from the one or more compartments for printing; and a capper unit mountable to said body portion so as to extend along the length of the printhead assembly, the capper unit housing a capping element which is movable with respect to the capper unit to contact a surface of the printhead assembly.

In a further aspect the present invention provides a cartridge unit for an inkjet printer comprising:

a body portion housing one or more ink storage compartments;

a pagewidth printhead assembly configured to receive ink from the one or more ink storage compartments and having a plurality of nozzles arranged in use to deliver the ink onto passing print media; and an electrical connector in electrical communication with the nozzles of the printhead assembly and disposed along the length of the printhead assembly for mating with a corresponding connectors of the inkjet printer to control operation of the nozzles.

In a further aspect the present invention provides cartridge unit for an inkjet printer comprising:

a body portion having a plurality of ink storage compartments; and a pagewidth printhead assembly configured to receive ink from ink storage compartments and distribute said ink to a plurality of nozzles arranged in use to deliver the ink onto passing print media;

wherein the ink storage compartments comprise an absorption material which stores the ink therein under capillary action for supply to the nozzles of the printhead assembly.

In a further aspect the present invention provided a pagewidth printhead assembly for an inkjet printer comprising:

a body portion for receiving ink from one or more ink sources and distributing the ink along the length of the printhead assembly;

a plurality of integrated circuits extending the length of the printhead assembly, each integrated circuit having a plurality of nozzles formed in rows thereon, each of the nozzles being arranged in use to deliver the ink onto passing print media; and an ink distribution member upon which the integrated circuits are fixed and which distributes the ink from the body portion to the nozzles of the integrated circuits;

wherein the integrated circuits are aligned in an abutting arrangement across the length of the ink distribution member.

In an further aspect the present invention provides a pagewidth printhead assembly for an inkjet printer comprising:

a body portion for receiving ink from one or more ink sources and distributing the ink along the length of the printhead assembly;

one or more integrated circuits extending substantially the length of the printhead assembly, the or each integrated circuit having a plurality of nozzles formed thereon, each of the nozzles being arranged in use to deliver the ink onto passing print media; and an ink distribution member upon which the or each integrated circuit are fixed and which distributes the ink from the body portion to the nozzles of the or each integrated circuit;

wherein the body portion has one or more connectors formed thereon for securing the printhead assembly to the one or more ink sources to facilitate ink flow therebetween.

In a further aspect the present invention provides a pagewidth printhead assembly for an inkjet printer comprising:

a body portion for receiving ink from one or more ink sources and distributing the ink along the length of the printhead assembly;

one or more integrated circuits extending substantially the length of the printhead assembly, the or each integrated circuit having a plurality of nozzles formed thereon, each of the nozzles being arranged in use to deliver the ink onto passing print media; and an ink distribution member upon which the or each integrated circuit is fixed and which distributes the ink from the body portion to the nozzles of the or each integrated circuit;

wherein an electrical connector in electrical communication with the or each integrated circuit extends along the length of the printhead assembly for mating with a corresponding electrical connector of the inkjet printer.

In a further aspect the present invention provides a pagewidth printhead assembly for an inkjet printer comprising:

a body portion for receiving ink from one or more ink sources and having one or more channels formed therein for distributing the ink substantially along the length of the printhead assembly;

one or more integrated circuits extending substantially the length of the printhead assembly, the or each integrated circuit having a plurality of nozzles, each of the nozzles being arranged in use to deliver the ink onto passing print media; and an ink distribution member upon which the or each integrated circuit is fixed and which distributes the ink from the body portion to each of the integrated circuits;

wherein the ink distribution member is a unitary element having a plurality of conduits formed therethrough, each of the conduits having an inlet which receives ink from one of the channels of the body portion and an outlet which delivers the ink to a predetermined number of nozzles of the one or more integrated circuits.

In a further aspect the present invention provides a pagewidth printhead assembly for an inkjet printer comprising:

a body portion for receiving ink from one or more ink sources and having one or more channels formed therein for distributing the ink substantially along the length of the printhead assembly;

one or more integrated circuits extending substantially the length of the printhead assembly, each integrated circuit having a plurality of nozzles, each of the nozzles being arranged in use to deliver the ink onto passing print media; and an ink distribution member upon which each integrated circuit is fixed and which distributes the ink from the body portion to each of the integrated circuits;

wherein the ink distribution member comprises a first layer which directs the ink from the one or more channels of the body portion for delivery to each integrated circuit, and a second layer attached to said first layer for receiving and securing each integrated circuit in a position to receive the ink from the first layer.

In a further aspect the present invention provides a capping assembly for capping a pagewidth printhead of an inkjet printer comprising:

a body configured to extend the length of the printhead; and a capping element housed within said body and movable with respect to the body to cap at least a portion of said printhead;

wherein, the body includes a mounting element for removably mounting said capping assembly to said printhead.

In a further aspect the present invention provides a capping assembly for capping a pagewidth printhead of an inkjet printer comprising:

a body configured to extend the length of the printhead; and a capping element housed within said body, said capping element having a rim portion adapted to cap at least a portion of said printhead;

wherein, the capping element is movable with respect to said body between a first and a second position, said first position being where said rim portion extends from said body, and said second position being where said rim portion is contained within said body.

In a further aspect the present invention provides a capping assembly for capping a pagewidth printhead of an inkjet printer comprising:

a body configured to extend the length of the printhead; and a capping element housed within said body and movable with respect to said body between a first and a second position, said first position being where a portion of the capping element extends from said body, and said second position being where said capping element is contained within said body;

wherein, the capping element is biased into said first position.

In a further aspect the present invention provides a capping assembly for capping a pagewidth printhead of an inkjet printer comprising:

a body configured to extend the length of the printhead;

a capping element housed within said body and having a rim portion adapted to cap at least a portion of the printhead;

a displacement assembly housed within the body for moving the capping element between a first position where the rim portion of the capping element extends from said body, and a second position where the rim portion of the capping element is contained within the body;

wherein, the displacement assembly is controlled by an electromagnet which determines the position.

In a further aspect the present invention provides a cradle unit for an inkjet printer comprising:

a body complementary to a removable inkjet cartridge of a type having a pagewidth printhead and an ink supply; and a controller for controlling the operation of the printhead to facilitate printing;

wherein, a plurality of terminals are located along the length of the body to contact corresponding terminals located along the length of the removable inkjet cartridge to enable electrical communication between the controller and the cartridge.

In a further aspect the present invention provides a cradle unit for an inkjet printer comprising:

a body complementary to a removable inkjet cartridge of a type having a pagewidth printhead and an ink supply;

a controller for controlling the operation of the printhead to facilitate printing; and a plurality of terminals in electrical communication with said controller for transmitting control signals from said controller to corresponding terminals provided on said cartridge;

wherein said plurality of terminals are arranged to pivotally engage with said corresponding terminals provided on said cartridge when said cartridge is received by said body.

In a further aspect the present invention provides a cradle unit for an inkjet printer comprising:

a body complementary to a removable inkjet cartridge of a type having a pagewidth printhead and a refillable ink supply; and a controller for controlling the operation of the printhead to facilitate printing;

wherein, said body includes a cover assembly for enclosing the removable inkjet cartridge within the body, said cover assembly having at least one port formed therein through which a refill unit is received for refilling the ink supply of the cartridge.

In a further aspect the present invention provides a cradle unit for an inkjet printer comprising:

a body complementary to a removable inkjet cartridge of a type having a pagewidth printhead and a refillable ink supply; and a controller for controlling the operation of the printhead to facilitate printing;

wherein, said body is configured to receive a refill unit for supplying refill ink to the cartridge and includes a refill actuator for dispensing ink from said refill unit into said refillable ink supply.

In a further aspect the present invention provides a cradle unit for an inkjet printer comprising:

a body complementary to a removable inkjet cartridge of a type having a pagewidth printhead, an ink supply and a capper assembly; and a controller for controlling the operation of the printhead to facilitate printing;

wherein, said body includes an electromagnet assembly mounted thereto which is controlled by said controller for operating said capper assembly of the removable inkjet cartridge.

In a further aspect the present invention provides a cover assembly for a cradle unit of an inkjet printer having a body complementary to a removable inkjet cartridge of a type having a pagewidth printhead and an ink supply and a controller for controlling the operation of the printhead to facilitate printing; the cover assembly comprising:

at least one port formed therein through which a refill unit is received for refilling the ink supply of the cartridge.

In a further aspect the present invention provides a cover assembly for a cradle unit of an inkjet printer having a body complementary to a removable inkjet cartridge of a type having a pagewidth printhead and an ink supply and a controller for controlling the operation of the printhead to facilitate printing; the cover assembly comprising:

a refill actuator for dispensing ink from an ink refill unit into said refillable ink supply.

In a furtheraspect the present invention provides an ink priming system for a cartridge unit of the type having a pagewidth printhead assembly in fluid communication with one or more ink storage compartments, the system comprising:

a priming inlet provided on said printhead assembly for receiving a supply of ink for priming the cartridge unit; and an ink flow passage providing fluid connection between said printhead assembly and one of the ink storage compartments;

wherein the ink supplied to the priming inlet of the printhead assembly flows from the printhead assembly to the ink storage compartment via the ink flow passage to prime both the printhead assembly and the ink storage compartment with ink simultaneously.

In a further aspect the present invention provides an ink priming system for a cartridge unit of the type having a pagewidth printhead assembly in fluid communication with one or more ink storage compartments, the system comprising:

a priming inlet provided on said printhead assembly for receiving a supply of ink for priming the cartridge unit;

an ink flow passage providing fluid connection between said printhead assembly and one of the ink storage compartments; and a bypass flow passage providing additional fluid connection between the ink flow passage and the ink storage compartment;

wherein the ink supplied to the priming inlet of the printhead assembly flows from the printhead assembly to the ink storage compartment via the ink flow passage and the bypass flow passage to prime both the printhead assembly and the ink storage compartment with ink simultaneously.

In a further aspect the present invention provides a printing fluid dispenser for a printing fluid refill cartridge comprising:

a body storing printing fluid having an outlet through which the printing fluid is dispensed; and a selector arranged to select the amount of the printing fluid to be dispensed from the body.

In a further aspect the present invention provides a method of refilling a supply of printing fluid in a printing unit, comprising the steps of:

removably mounting a dispenser of printing fluid to the printing unit so as to align an outlet of the dispenser with an inlet of a printing fluid storage chamber of the printing unit;

determining an amount of printing fluid needed to substantially refill the printing fluid storage chamber; and selectively dispensing an amount of printing fluid from the dispenser corresponding to the determined amount.

In a further aspect the present invention provides a dispensing assembly for a printing fluid refill cartridge, the dispensing assembly comprising:

a body for storing printing fluid having an outlet through which the printing fluid is dispensed; and a plunger arranged to selectively change the storage capacity of the body and expel the printing fluid through said outlet by selective engagement of a movable retaining member with a series of grooves arranged along a surface of the plunger, thereby dispensing a selected amount of printing fluid from the outlet.

In a further aspect the present invention provides a system for controlling refilling of a print engine by a printing fluid refill unit, comprising:

an information storage element incorporated in the refill unit for storing information on the amount of printing fluid contained in the refill unit; and an information reader incorporated in the print engine for reading the information stored by the storage element when the refill unit is mounted to the print engine and for controlling the refilling of the print engine with the printing fluid contained in the refill unit based on the information read.

In a further aspect the present invention provides a printing fluid refill unit for a print engine, comprising an information storage element for storing information on the amount of printing fluid contained in the refill unit and for connecting with an information reader incorporated in the print engine for reading the information stored by the storage element when the refill unit is mounted to the print engine, wherein the information stored by the storage element enables the reader to control the refilling of the print engine with the printing fluid contained in the refill unit.

In a further aspect the present invention provides a method of controlling refilling of a printing unit by a printing fluid refill cartridge, comprising the steps of:

storing information on an amount of printing fluid contained in the refill cartridge in an information storage element incorporated therein;

mounting the refill cartridge to the printing unit;

reading the information on the amount of printing fluid with an information reader incorporated in the printing unit; and controlling the refilling of the printing unit with printing fluid contained in the refill cartridge based on the information read.

In a further aspect the present invention provides a printing fluid storage device comprising a porous body having a plurality of individual channels arranged in an array to store printing fluid and supply the stored printing fluid to at least one printing fluid ejecting nozzle of a printhead of a printer unit, wherein a first end of each of the channels is in fluid communication with a printing fluid supply to extract printing fluid from the fluid supply for storage therein under capillary action and the stored printing fluid is supplied to the at least one nozzle under capillary action.

BRIEF DESCRIPTION OF THE DRAWINGS

In the drawings:

FIG. 22 shows a simplified schematic depiction of linked integrated circuits according to one embodiment of the present invention;

FIG. 23 shows a simplified schematic depiction of two linked integrated circuits employing a right angled join;

FIGS. 24a and 24b show a schematic depiction of two linked integrated circuits employing an angled join;

FIG. 28b shows a magnified perspective view of the join between two integrated circuits employing the nozzle arrangement of FIG. 28a;

FIG. 28c shows an underside view of the integrated circuit of FIG. 28a;

FIG. 34b shows an enlarged view of FIG. 34a;

DETAILED DESCRIPTION OF EMBODIMENTS

As discussed previously, the present invention resides in a print engine 1 that can be readily incorporated into a body of a printer unit 2 to perform the printing functions of the printer unit.

Figure 1:
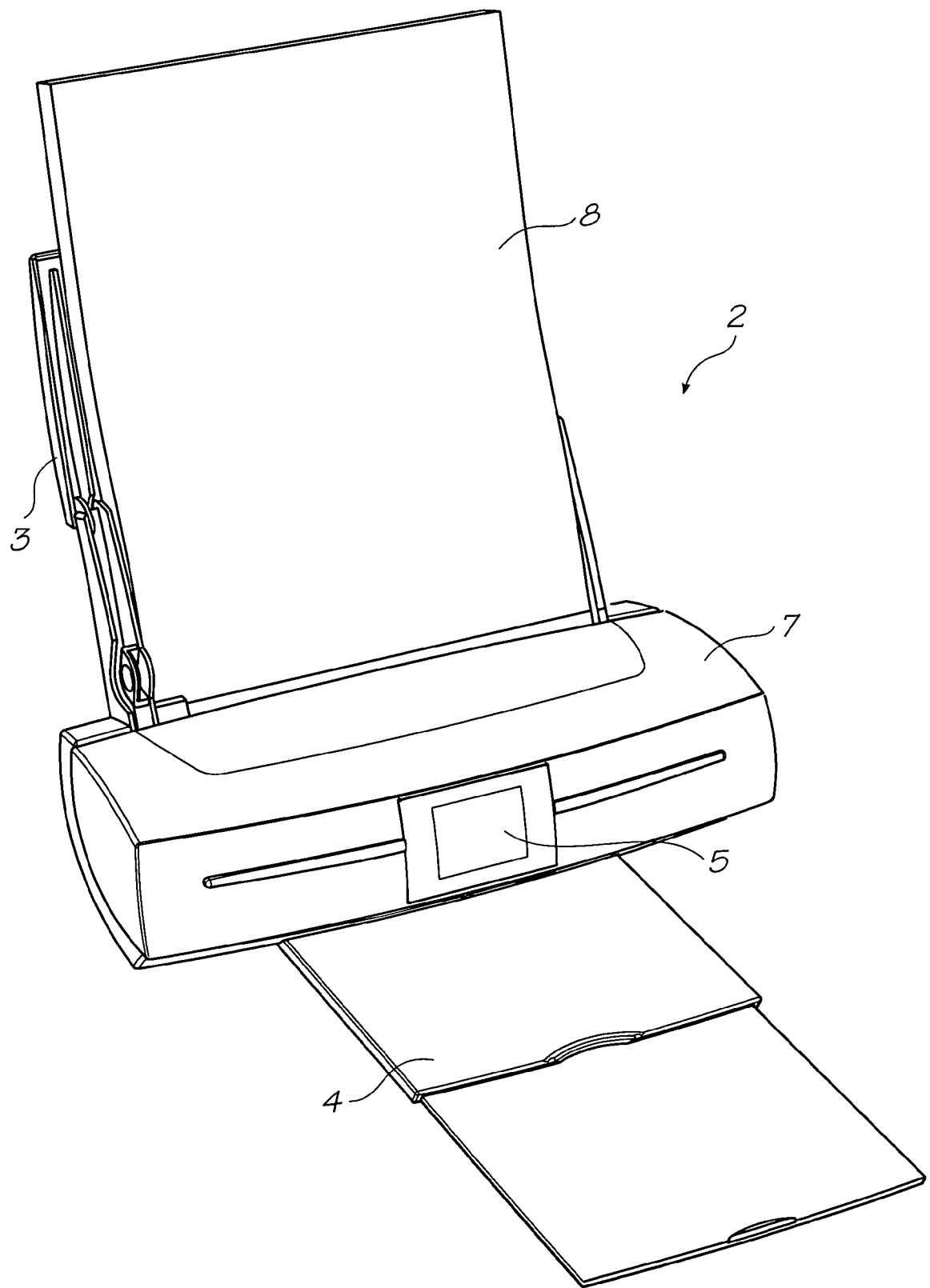
FIG. 1 shows a front perspective view of a printer unit employing a print engine according to an embodiment of the present invention.
Figure 2:
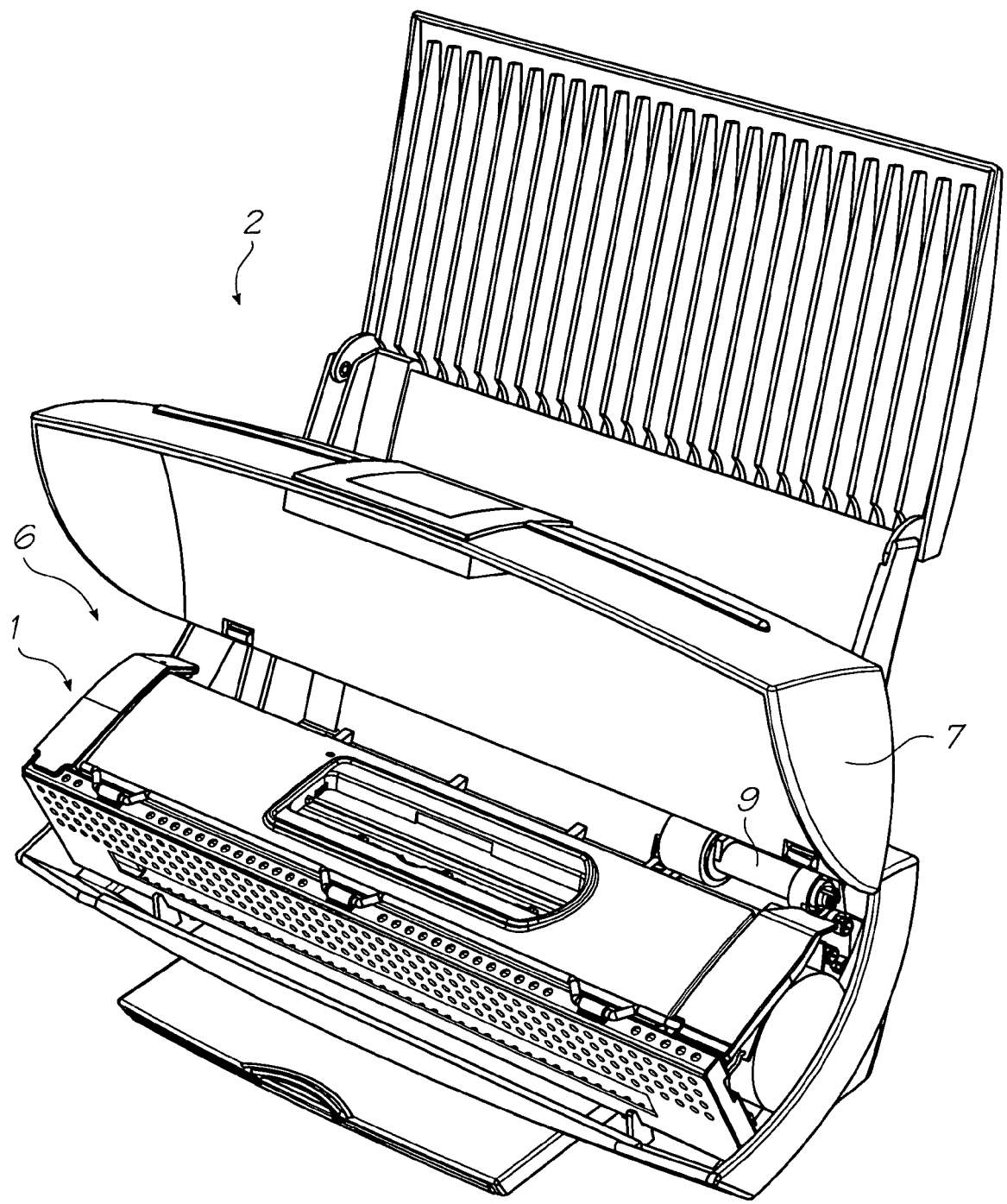
FIG. 2 shows the printer unit of FIG. 1 with the lid open exposing the print engine.

As shown in FIGS. 1 and 2, the printer unit 2, which incorporates the print engine 1, may be in any form but typically has a media supply region 3 for supporting and supplying media 8 to be printed by the print engine, and a media output or collection region 4 for collecting the printed sheets of media. The printer unit 2 may also have a user interface 5 for enabling a user to control the operation of the printer unit, and this user interface 5 may be in the form of an LCD touch screen as shown.

The printer unit 2 typically has an internal cavity 6 for receiving the print engine 1, and access to the internal cavity may be provided by a lid 7 which is hingedly attached to the body of the printer unit 2.

The print engine 1 is configured to be positioned and secured within the printer unit 2 such that media 8 located in media supply region 3 can be fed to the print engine 1 for printing and delivered to the collection region 4 for collection following printing. In this regard, the print engine 1 includes media transport means which take the sheets of media 8 from the media supply region 3 and deliver the media past the printhead assembly, where it is printed, into the media output tray 4. A picker mechanism 9 is provided with the printer unit 2 to assist in feeding individual streets of media 8 from the media supply 3 to the print engine 1.

Figure 3:
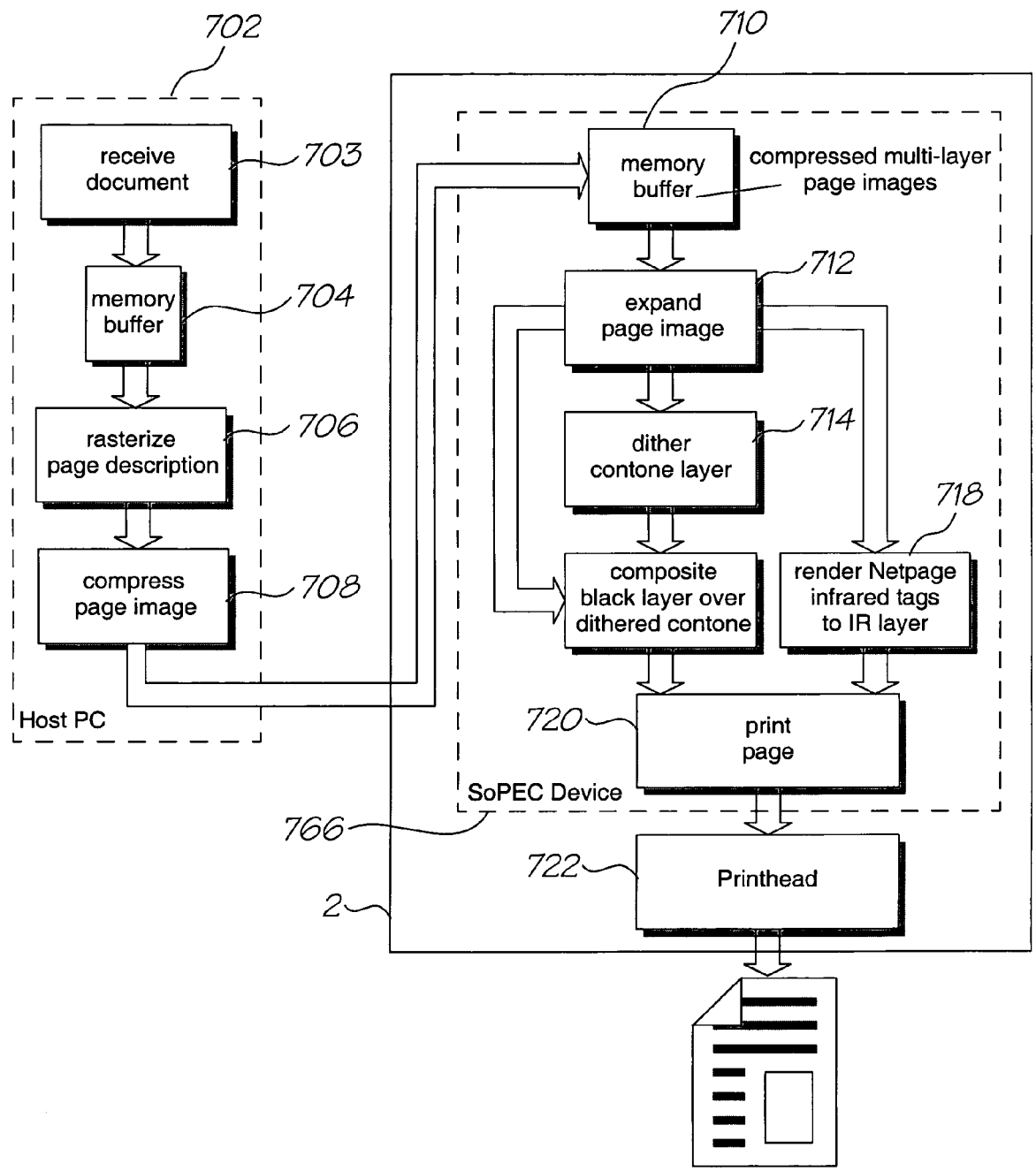
FIG. 3 shows a schematic of document data flow in a printing system according to one embodiment of the present invention.

As shown schematically in FIG. 3, in use, the printer unit 2 is arranged to print documents received from an external source, such as a computer system 702, onto a print media, such as a sheet of paper. In this regard, the printer unit 100 includes means which allow electrical connection between the printer unit 2 and the computer system 702 to receive data which has been pre-processed by the computer system 702. In one form, the external computer system 702 is programmed to perform various steps involved in printing a document, including receiving the document (step 703), buffering it (step 704) and rasterizing it (step 706), and then compressing it (step 708) for transmission to the printer unit 2.

The printer unit 2 according to one embodiment of the present invention, receives the document from the external computer system 702 in the form of a compressed, multi-layer page image, wherein control electronics provided within the print engine 1 buffers the image (step 710), and then expands the image (step 712) for further processing. The expanded contone layer is dithered (step 714) and then the black layer from the expansion step is composited over the dithered contone layer (step 716). Coded data may also be rendered (step 718) to form an additional layer, to be printed (if desired) using an infrared ink that is substantially invisible to the human eye. The black, dithered contone and infrared layers are combined (step 720) to form a page that is supplied to a printhead for printing (step 722).

In this particular arrangement, the data associated with the document to be printed is divided into a high-resolution bi-level mask layer for text and line art and a medium-resolution contone color image layer for images or background colors. Optionally, colored text can be supported by the addition of a medium-to-high-resolution contone texture layer for texturing text and line art with color data taken from an image or from flat colors. The printing architecture generalises these contone layers by representing them in abstract "image" and "texture" layers which can refer to either image data or flat color data. This division of data into layers based on content follows the base mode Mixed Raster Content (MRC) mode as would be understood by a person skilled in the art. Like the MRC base mode, the printing architecture makes compromises in some cases when data to be printed overlap. In particular, in one form all overlaps are reduced to a 3-layer representation in a process (collision resolution) embodying the compromises explicitly.

Figure 4:
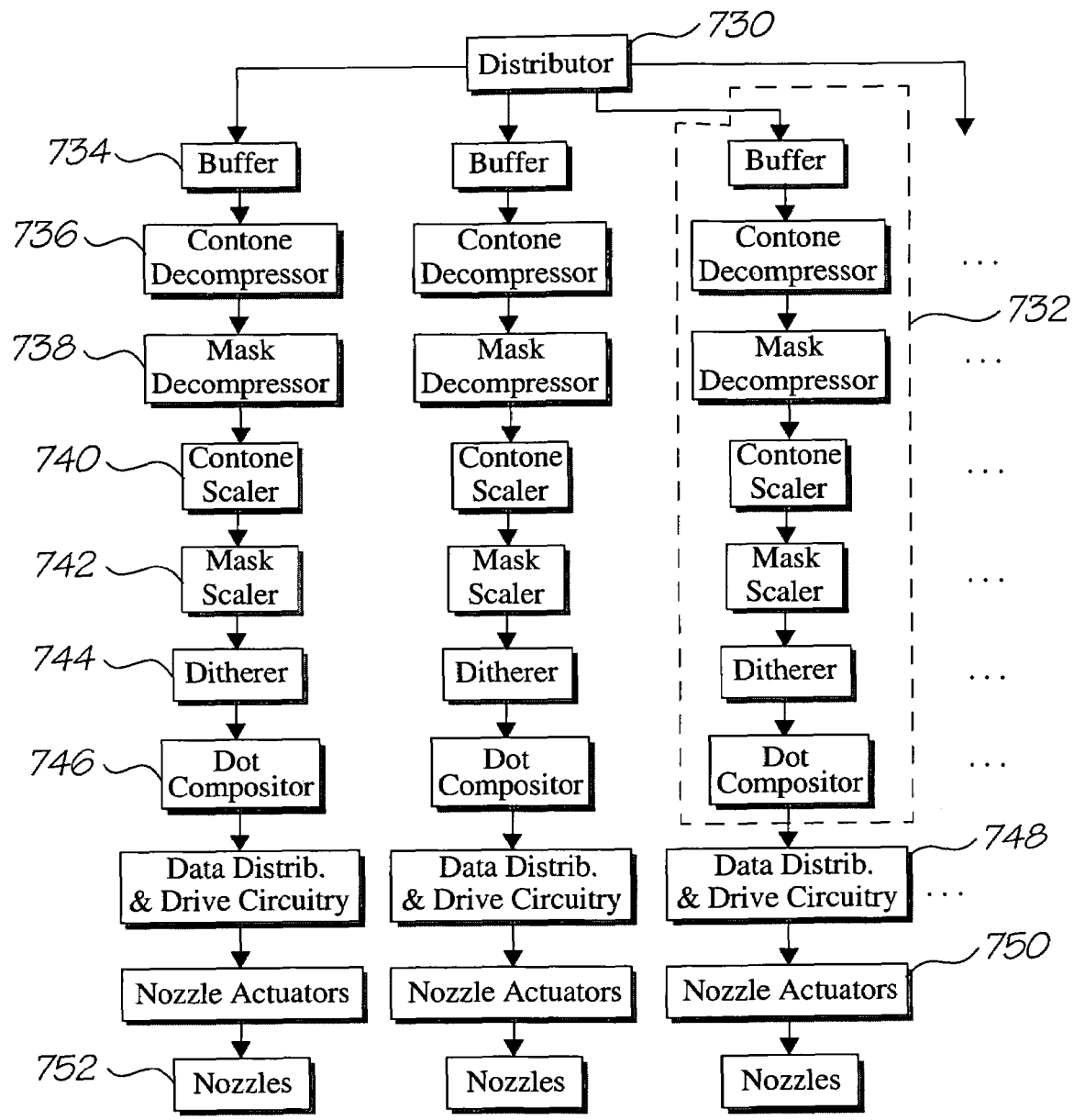
FIG. 4 shows a more detailed schematic showing an architecture used in the printing system of FIG. 3.

As mentioned previously, data is delivered to the printer unit 2 in the form of a compressed, multi-layer page image with the pre-processing of the image performed by a mainly software-based computer system 702. In turn, the print engine 1 processes this data using a mainly hardware-based system as is shown in more detail in FIG. 4.

Upon receiving the data, a distributor 730 converts the data from a proprietary representation into a hardware-specific representation and ensures that the data is sent to the correct hardware device whilst observing any constraints or requirements on data transmission to these devices. The distributor 730 distributes the converted data to an appropriate one of a plurality of pipelines 732. The pipelines are identical to each other, and in essence provide decompression, scaling and dot compositing functions to generate a set of printable dot outputs.

Each pipeline 732 includes a buffer 734 for receiving the data. A contone decompressor 736 decompresses the color contone planes, and a mask decompressor decompresses the monotone (text) layer. Contone and mask scalers 740 and 742 scale the decompressed contone and mask planes respectively, to take into account the size of the medium onto which the page is to be printed.

The scaled contone planes are then dithered by ditherer 744. In one form, a stochastic dispersed-dot dither is used. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be relatively free of objectionable low-frequency patterns when tiled across the image. As such, its size typically exceeds the minimum size required to support a particular number of intensity levels (e.g. 16×16×8 bits for 257 intensity levels).

The dithered planes are then composited in a dot compositor 746 on a dot-by-dot basis to provide dot data suitable for printing. This data is forwarded to data distribution and drive electronics 748, which in turn distributes the data to the correct nozzle actuators 750, which in turn cause ink to be ejected from the correct nozzles 752 at the correct time in a manner which will be described in more detail later in the description.

As will be appreciated, the components employed within the print engine I to process the image for printing depend greatly upon the manner in which data is presented. In this regard it may be possible for the print engine 1 to employ additional software and/or hardware components to perform more processing within the printer unit 2 thus reducing the reliance upon the computer system 702. Alternatively, the print engine 1 may employ fewer software and/or hardware components to perform less processing thus relying upon the computer system 702 to process the image to a higher degree before transmitting the data to the printer unit 2.

Figure 5:
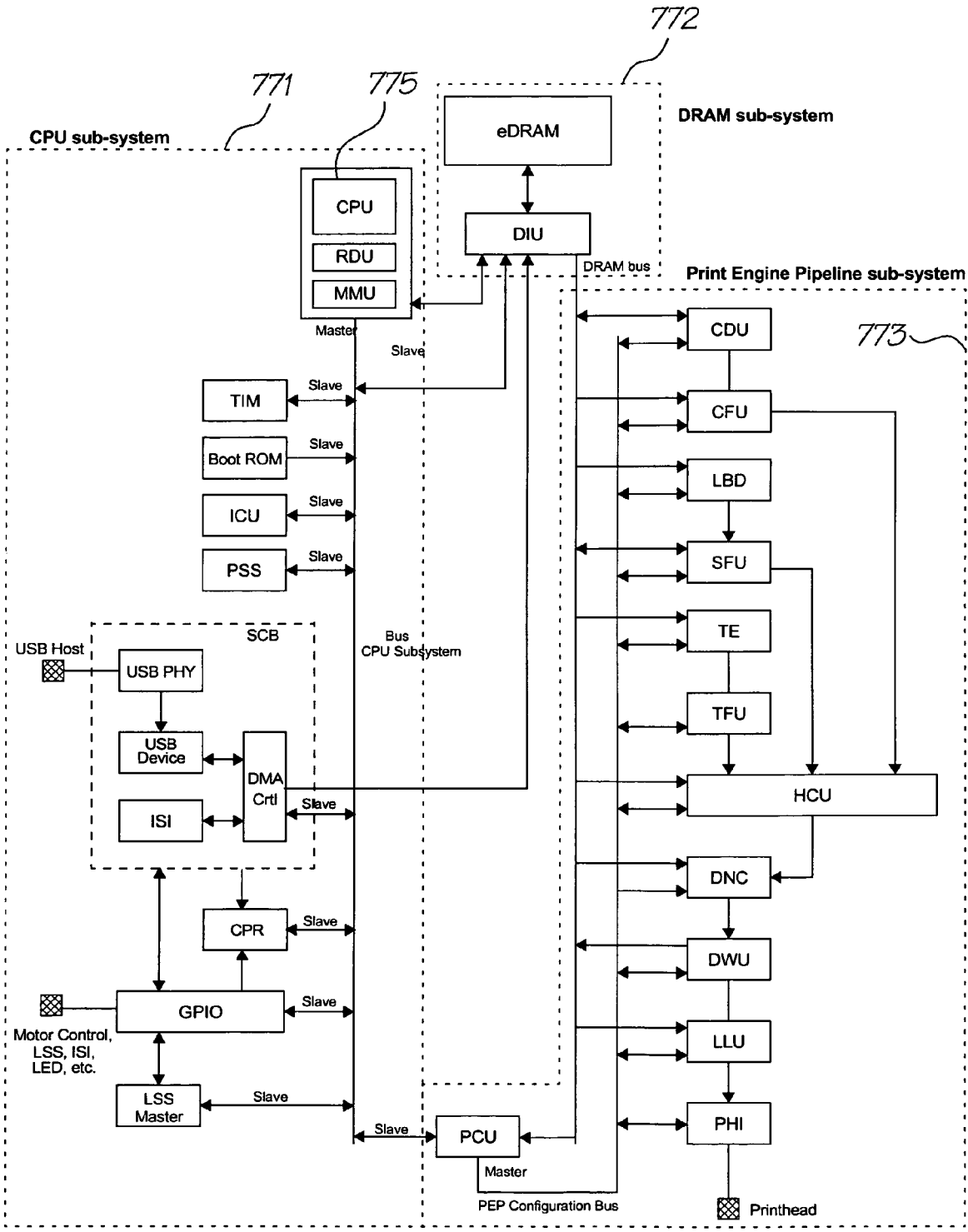
FIG. 5 shows a block diagram of an embodiment of the control electronics as used in the printing system of FIG. 3.

In all situations, the components necessary to perform the above mentioned tasks are provided within the control electronics of the print engine 1, and FIG. 5 provides a block representation of an embodiment of the electronics.

In this arrangement, the hardware pipelines 732 are embodied in a Small Office Home Office Printer Engine Chip (SoPEC). As shown, a SoPEC device consists of 3 distinct subsystems: a Central Processing Unit (CPU) subsystem 771, a Dynamic Random Access Memory (DRAM) subsystem 772 and a Print Engine Pipeline (PEP) subsystem 773.

The CPU subsystem 771 includes a CPU 775 that controls and configures all aspects of the other subsystems. It provides general support for interfacing and synchronizing all elements of the print engine 1. It also controls the low-speed communication to QA chips (which are described delow). The CPU subsystem 771 also contains various peripherals to aid the CPU, such as General Purpose Input Output (GPIO, which includes motor control), an Interrupt Controller Unit (ICU), LSS Master and general timers. The Serial Communications Block (SCB) on the CPU subsystem provides a full speed USB1.1 interface to the host as well as an Inter SoPEC Interface (ISI) to other SoPEC devices (not shown).

The DRAM subsystem 772 accepts requests from the CPU, Serial Communications Block (SCB) and blocks within the PEP subsystem. The DRAM subsystem 772, and in particular the DRAM Interface Unit (DIU), arbitrates the various requests and determines which request should win access to the DRAM. The DIU arbitrates based on configured parameters, to allow sufficient access to DRAM for all requesters. The DIU also hides the implementation specifics of the DRAM such as page size, number of banks and refresh rates.

The Print Engine Pipeline (PEP) subsystem 773 accepts compressed pages from DRAM and renders them to bi-level dots for a given print line destined for a printhead interface (PHI) that communicates directly with the printhead. The first stage of the page expansion pipeline is the Contone Decoder Unit (CDU), Lossless Bi-level Decoder (LBD) and, where required, Tag Encoder (TE). The CDU expands the JPEG-compressed contone (typically CMYK) layers, the LBD expands the compressed bi-level layer (typically K), and the TE encodes any Netpage tags for later rendering (typically in IR or K ink), in the event that the printer unit 2 has Netpage capabilities. The output from the first stage is a set of buffers: the Contone FIFO unit (CFU), the Spot FIFO Unit (SFU), and the Tag FIFO Unit (TFU). The CFU and SFU buffers are implemented in DRAM.

The second stage is the Halftone Compositor Unit (HCU), which dithers the contone layer and composites position tags and the bi-level spot layer over the resulting bi-level dithered layer.

A number of compositing options can be implemented, depending upon the printhead with which the SoPEC device is used. Up to 6 channels of bi-level data are produced from this stage, although not all channels may be present on the printhead. For example, the printhead may be CMY only, with K pushed into the CMY channels and IR ignored. Alternatively, any encoded tags may be printed in K if IR ink is not available (or for testing purposes).

In the third stage, a Dead Nozzle Compensator (DNC) compensates for dead nozzles in the printhead by color redundancy and error diffusing of dead nozzle data into surrounding dots.

The resultant bi-level 5 channel dot-data (typically CMYK, Infrared) is buffered and written to a set of line buffers stored in DRAM via a Dotline Writer Unit (DWU).

Finally, the dot-data is loaded back from DRAM, and passed to the printhead interface via a dot FIFO. The dot FIFO accepts data from a Line Loader Unit (LLU) at the system clock rate (pclk), while the PrintHead Interface (PHI) removes data from the FIFO and sends it to the printhead at a rate of ⅔ times the system clock rate.

In the preferred form, the DRAM is 2.5 Mbytes in size, of which about 2 Mbytes are available for compressed page store data. A compressed page is received in two or more bands, with a number of bands stored in memory. As a band of the page is consumed by the PEP subsystem 773 for printing, a new band can be downloaded. The new band may be for the current page or the next page.

Using banding it is possible to begin printing a page before the complete compressed page is downloaded, but care must be taken to ensure that data is always available for printing or a buffer under-run may occur.

The embedded USB 1.1 device accepts compressed page data and control commands from the host PC, and facilitates the data transfer to either the DRAM (or to another SoPEC device in multi-SoPEC systems, as described below).

Multiple SoPEC devices can be used in alternative embodiments, and can perform different functions depending upon the particular implementation. For example, in some cases a SoPEC device can be used simply for its onboard DRAM, while another SoPEC device attends to the various decompression and formatting functions described above. This can reduce the chance of buffer under-run, which can happen in the event that the printer commences printing a page prior to all the data for that page being received and the rest of the data is not received in time. Adding an extra SoPEC device for its memory buffering capabilities doubles the amount of data that can be buffered, even if none of the other capabilities of the additional chip are utilized.

Each SoPEC system can have several quality assurance (QA) devices designed to cooperate with each other to ensure the quality of the printer mechanics, the quality of the ink supply so the printhead nozzles will not be damaged during prints, and the quality of the software to ensure printheads and mechanics are not damaged.

Normally, each printing SoPEC will have an associated printer unit QA, which stores information relating to the printer unit attributes such as maximum print speed. The cartridge unit may also contain a QA chip, which stores cartridge information such as the amount of ink remaining, and may also be configured to act as a ROM (effectively as an EEPROM) that stores printhead-specific information such as dead nozzle mapping and printhead characteristics. The refill unit may also contain a QA chip, which stores refill ink information such as the type/colour of the ink and the amount of ink present for refilling. The CPU in the SoPEC device can optionally load and run program code from a QA Chip that effectively acts as a serial EEPROM. Finally, the CPU in the SoPEC device runs a logical QA chip (ie, a software QA chip).

Usually, all QA chips in the system are physically identical, with only the contents of flash memory differentiating one from the other.

Each SoPEC device has two LSS system buses that can communicate with QA devices for system authentication and ink usage accounting. A large number of QA devices can be used per bus and their position in the system is unrestricted with the exception that printer QA and ink QA devices should be on separate LSS busses.

In use, the logical QA communicates with the ink QA to determine remaining ink. The reply from the ink QA is authenticated with reference to the printer QA. The verification from the printer QA is itself authenticated by the logical QA, thereby indirectly adding an additional authentication level to the reply from the ink QA.

Data passed between the QA chips is authenticated by way of digital signatures. In the preferred embodiment, HMAC-SHA1 authentication is used for data, and RSA is used for program code, although other schemes could be used instead.

As will be appreciated, the SoPEC device therefore controls the overall operation of the print engine 1 and performs essential data processing tasks as well as synchronising and controlling the operation of the individual components of the print engine 1to facilitate print media handling, as will be discussed below.

Print Engine

Figure 6:
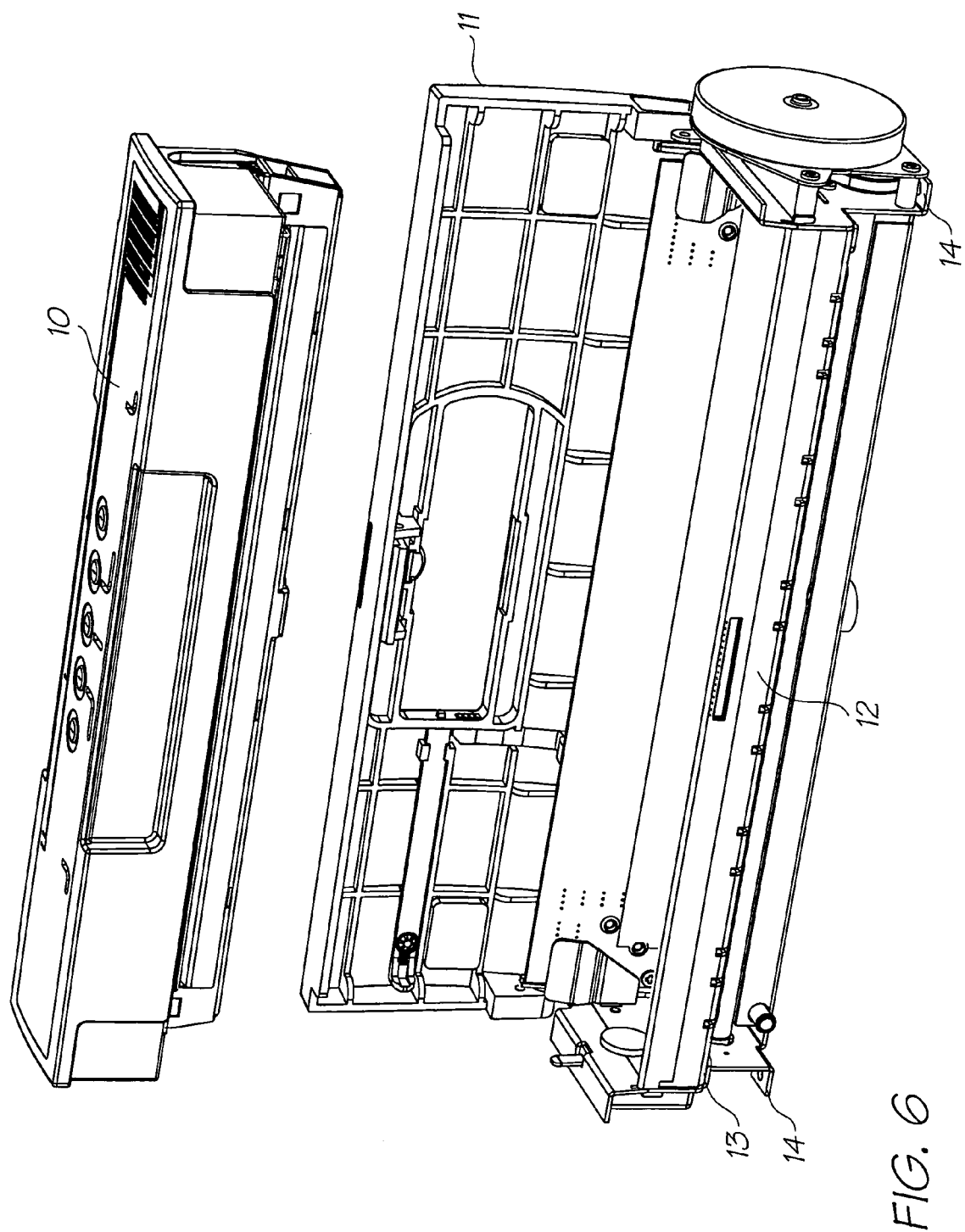
FIG. 6 shows an exploded perspective view of a print engine according to an embodiment of the present invention.
Figure 7:
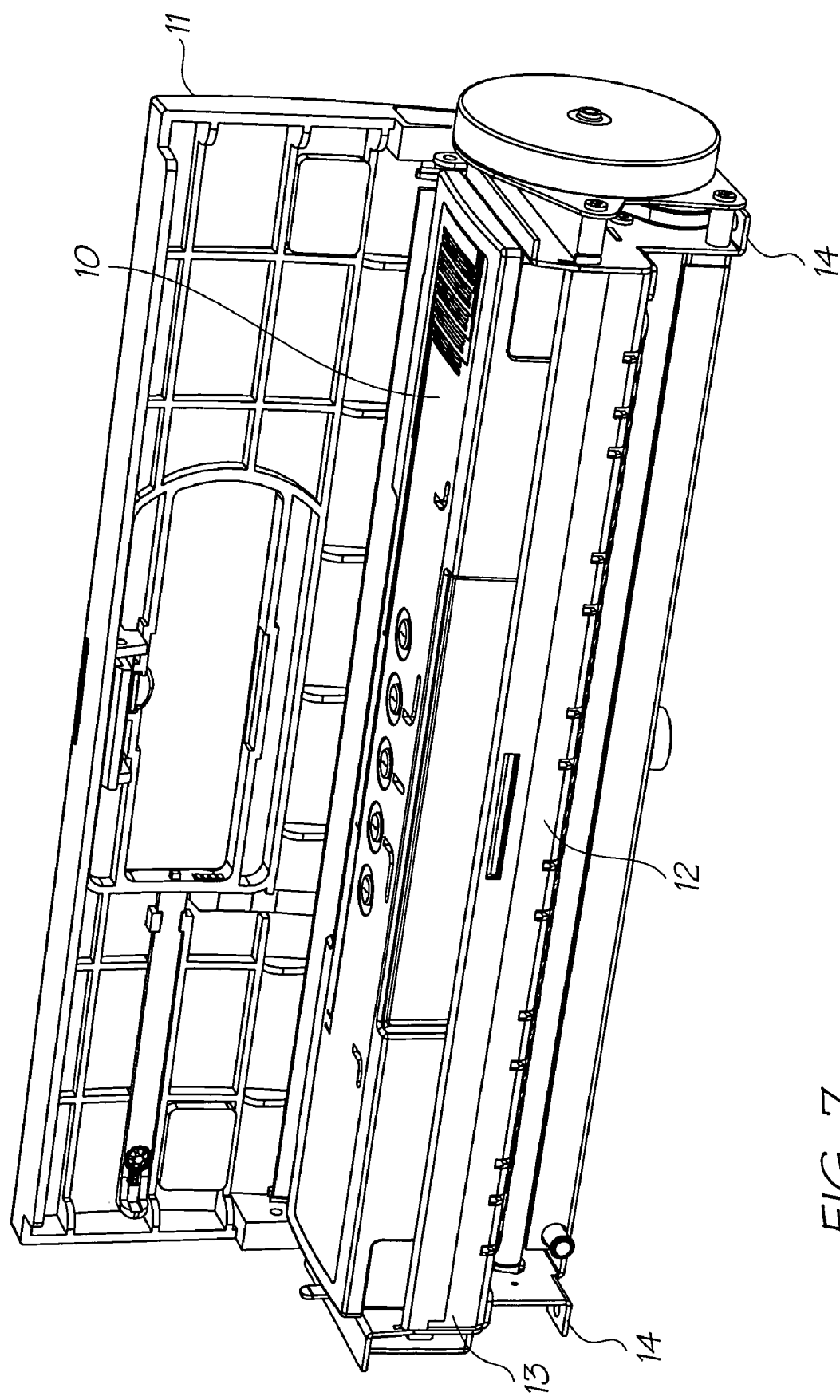
FIG. 7 shows the print engine of FIG. 6 with cartridge unit inserted in the cradle unit.
Figure 8:
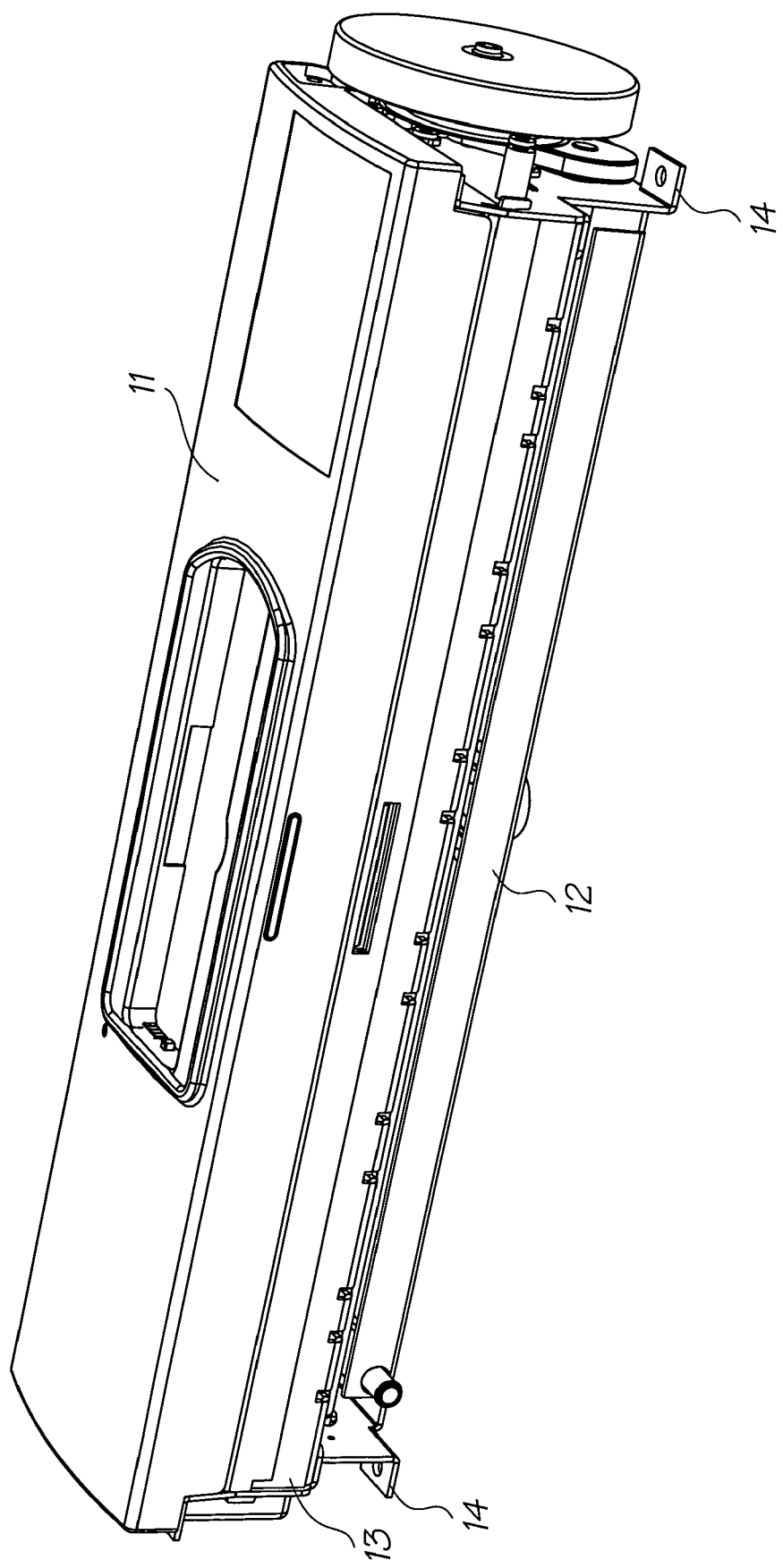
FIG. 8 shows the cradle unit of FIG. 7 with the cover assembly in the closed position.

The print engine 1 is shown in detail in FIGS. 6-8 and consists of two parts: a cartridge unit 10 and a cradle unit 12.

As shown, the cartridge unit 10 is shaped and sized to be received within the cradle unit 12 and secured in position by a cover assembly 11 mounted to the cradle unit.

The cradle unit 12 is provided with an external body 13 having anchor portions 14 which allow it to be fixed to the printer unit 2 in a desired position and orientation, as discussed above, to facilitate printing.

In its assembled form as shown in FIG. 8, with cartridge unit 10 secured within the cradle unit 12 and cover assembly 11 closed, the print engine 1 is able to control various aspects associated with printing, including transporting the media past the printhead in a controlled manner as well as the controlled ejection of ink onto the surface of the passing media. In this regard, the print engine 2 may also include electrical contacts which facilitate electrical connection with the user interface 5 of the printer unit 2 to enable control of the print engine 1.

Cartridge Unit

The cartridge unit 10 is shown in detail in FIGS. 9-12. With reference to the exploded views of FIGS. 11 and 12, the cartridge unit 10 generally consists of a main body 20, a lid assembly 21, a printhead assembly 22 and a capper assembly 23.

Each of these parts are assembled together to form an integral unit which combines ink storage together with the ink ejection means in a complete manner. Such an arrangement ensures that the ink is directly supplied to the printhead assembly 22 for printing, as required, and should there be a need to replace either or both of the ink storage or the printhead assembly, this can be readily done by replacing the entire cartridge unit 10.

Figure 9:
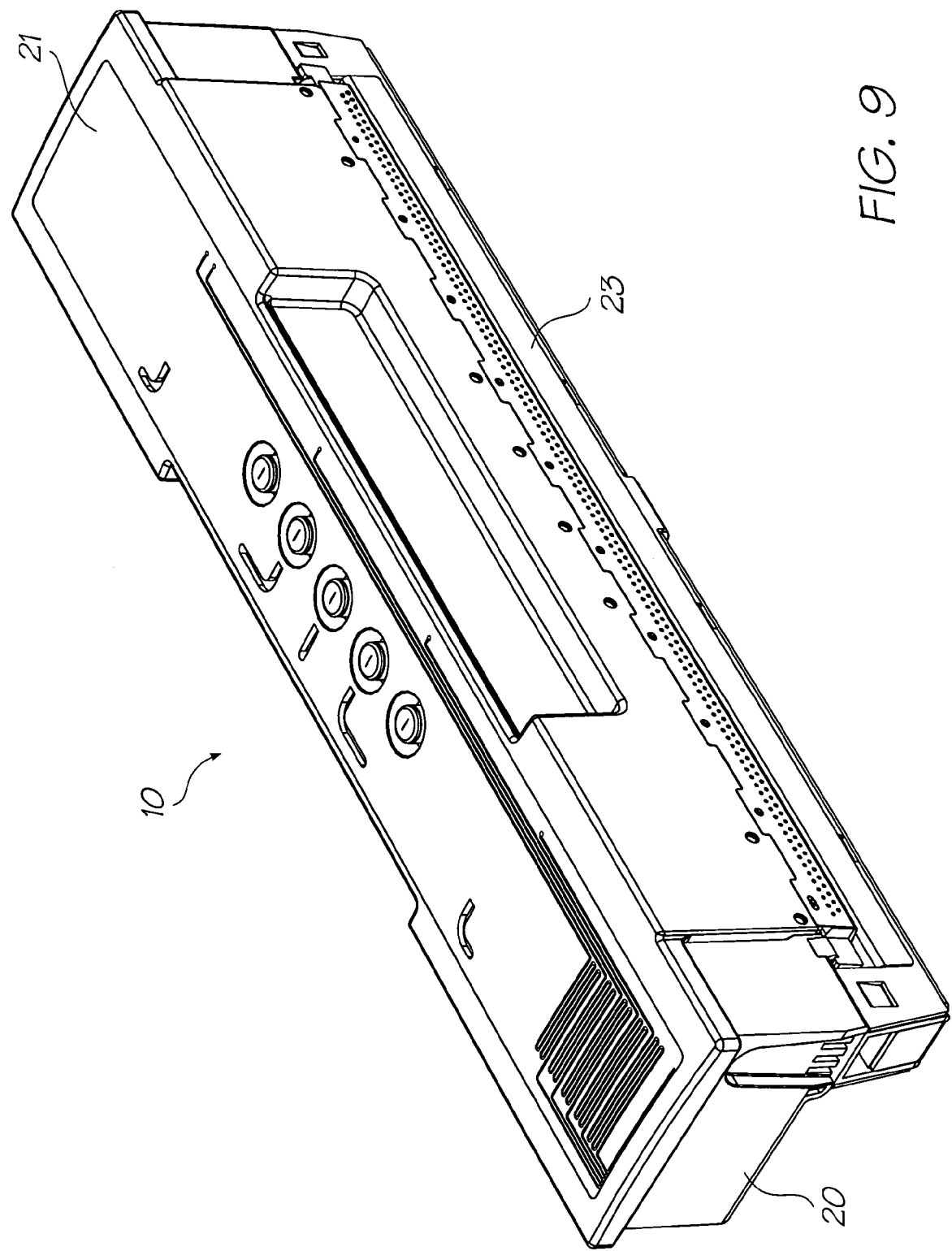
FIG. 9 shows a front perspective view of the cartridge unit of FIG. 7.
Figure 10:
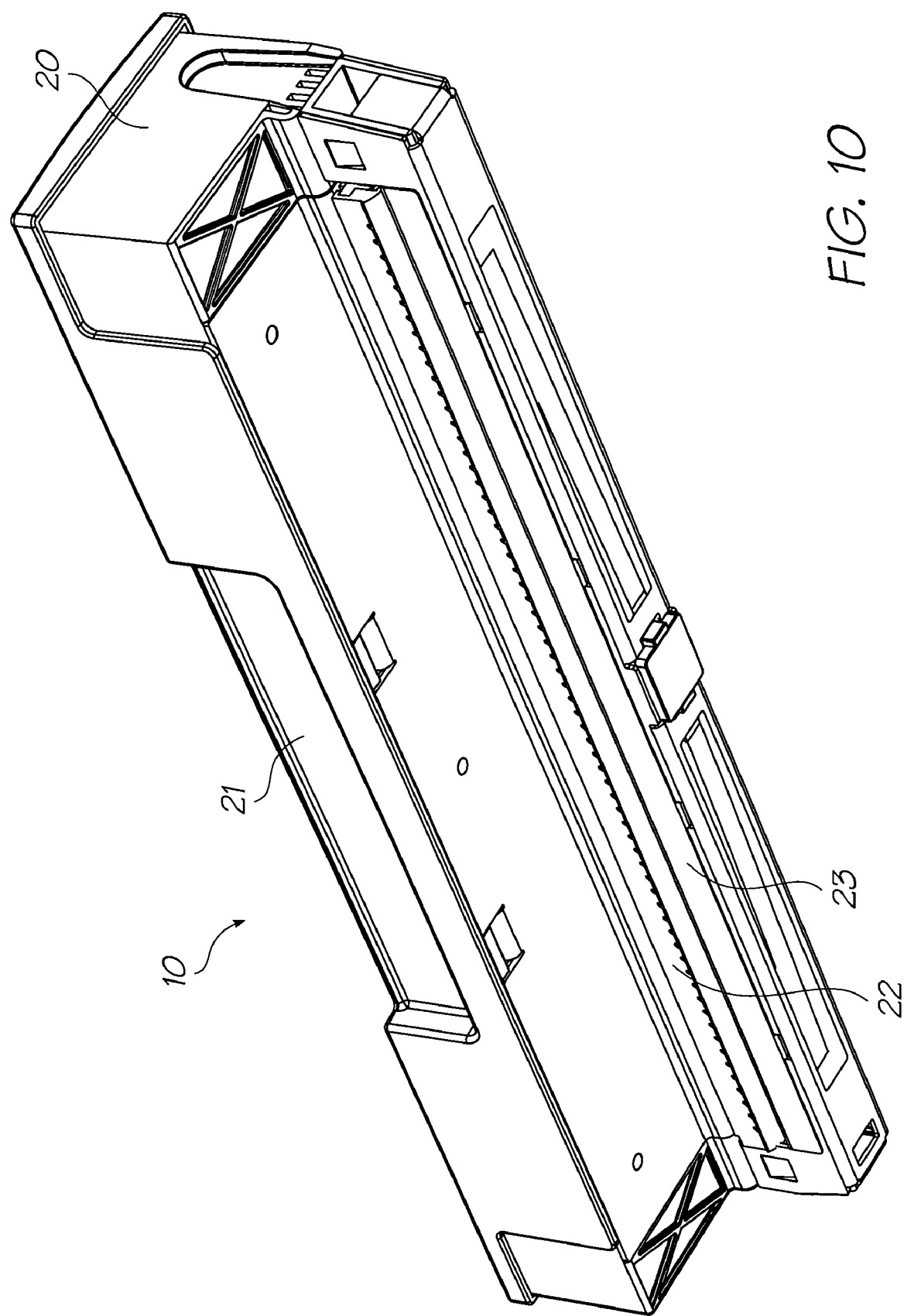
FIG. 10 shows a front perspective view of the underside of the cartridge unit of FIG. 9.

As is evident in FIGS. 9 and 10, the cartridge unit 10 has facilities for receiving a refill supply of ink to replenish the ink storage when necessary and the cartridge unit itself carries an integral capping assembly 23 for capping the printhead when not in use.

Main Body

Figure 13:
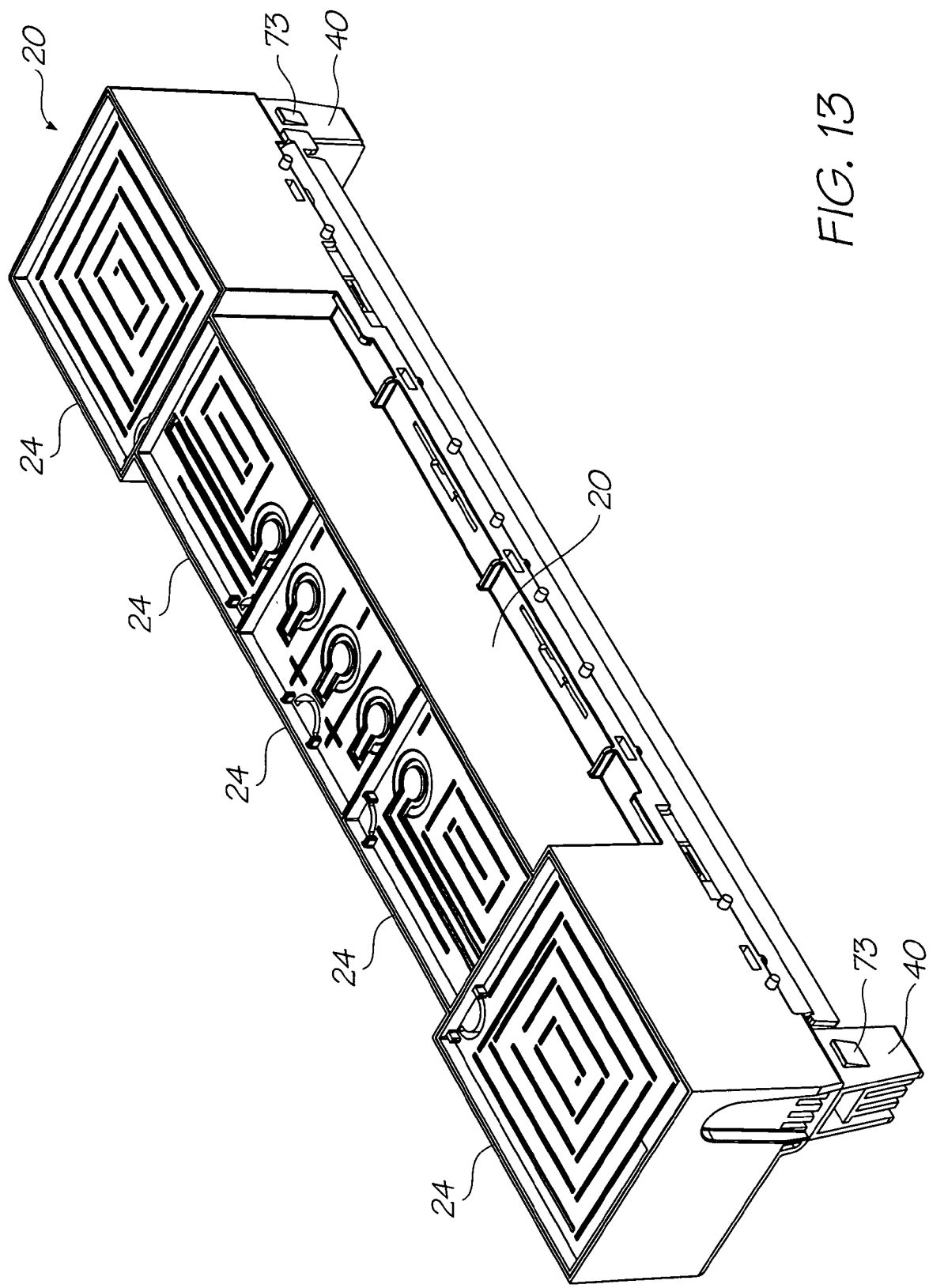
FIG. 13 shows a front perspective view of the main body of the cartridge unit of FIG. 7 with the lid assembly removed.
Figure 14:
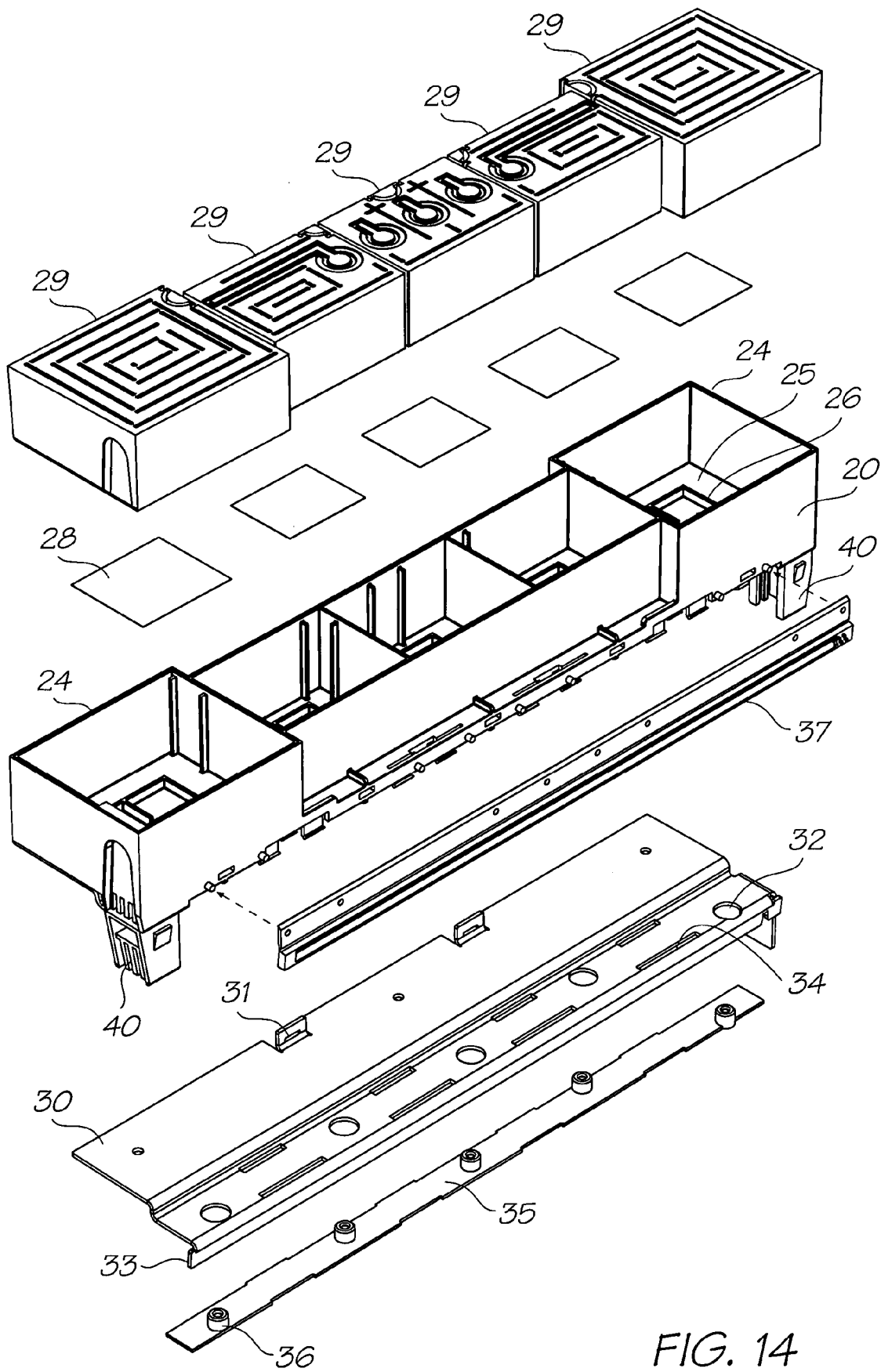
FIG. 14 shows an exploded front perspective view of the main body of FIG. 13.
Figure 15:
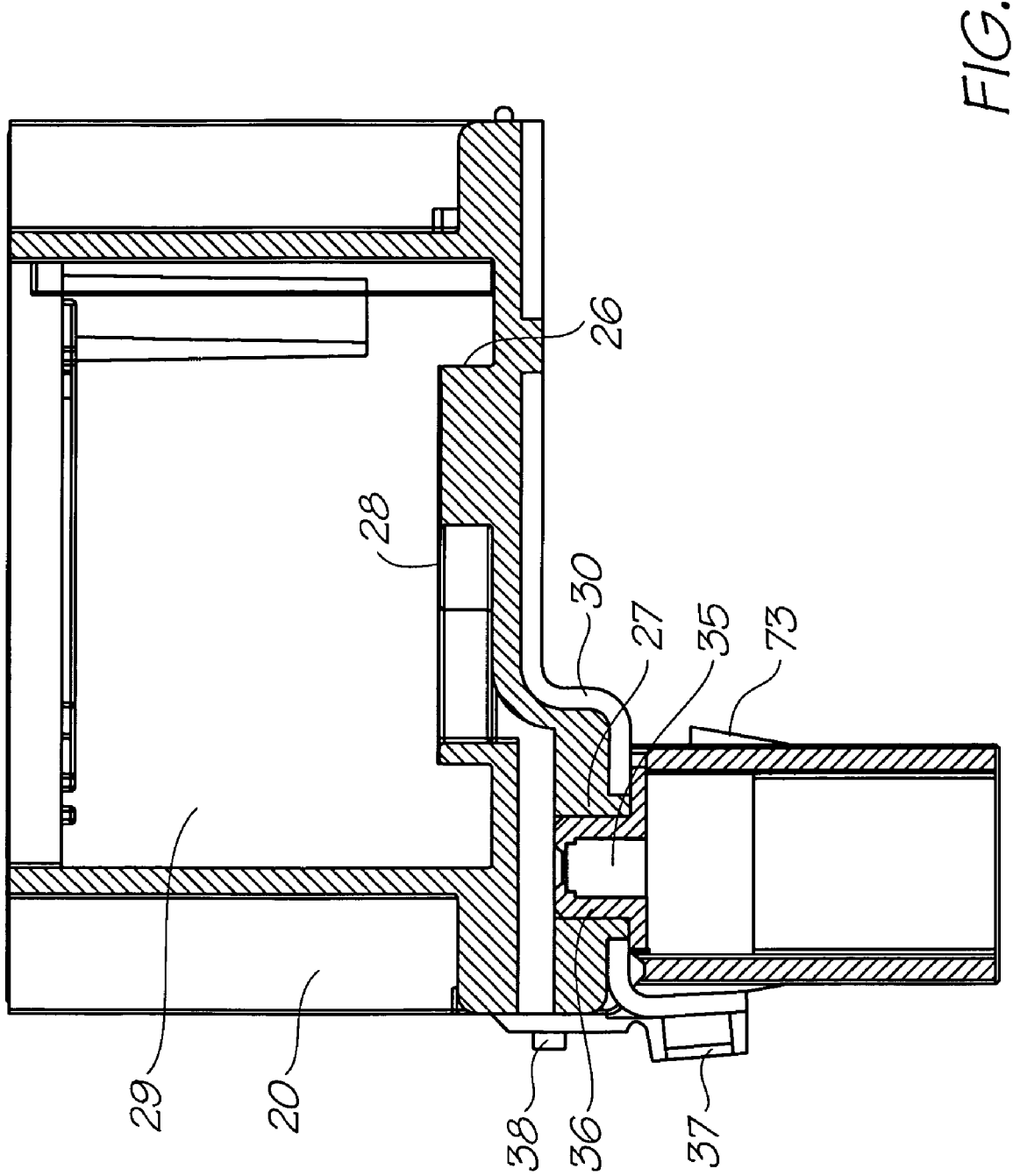
FIG. 15 shows a sectional side view of the main body of FIG. 13.

The main body 20 of the cartridge unit 10 is shown in more detail in FIGS. 13-15 and comprises a moulded plastics body which defines a plurality of ink storage compartments 24 in which the various colours and/or types of ink are stored. Each of the ink storage compartments 24 are separated from one another to prevent mixing of the different inks, as is shown more clearly in FIG. 14, and extend along the length of the main body 20.

There are five ink storage compartments 24 shown, having a square or rectangular shape, with the end compartments being larger than the other compartments. The larger end compartments are intended to store the ink more readily consumed during the printing process, such as black ink or (infrared ink in Netpage applications) whilst the smaller compartments are intended to store the cyan, magenta and yellow inks traditionally used in colour printing. The base 25 of each of the ink storage compartments 24 is provided with a raised portion 26 which surrounds an ink outlet 27, through which the ink flows for supply to the printhead assembly 22. The raised portions 26 are typically moulded into the main body 20 and act to separate the outlet 27 from the base 25 of the ink storage compartment 24 to ensure a sufficient flow rate of ink from the compartment 24.

In this regard, an air barrier/ink filter 28 made from a fine mesh material is placed over the ink outlet 27, atop of the raised portions 26, thereby leaving a space between the filter and the outlet for receiving ink. The air barrier/ink filter 28 is formed such that ink can readily pass through the mesh to the printhead assembly 22 but any air bubbles present in the ink are prevented from passing through.

Figure 11:
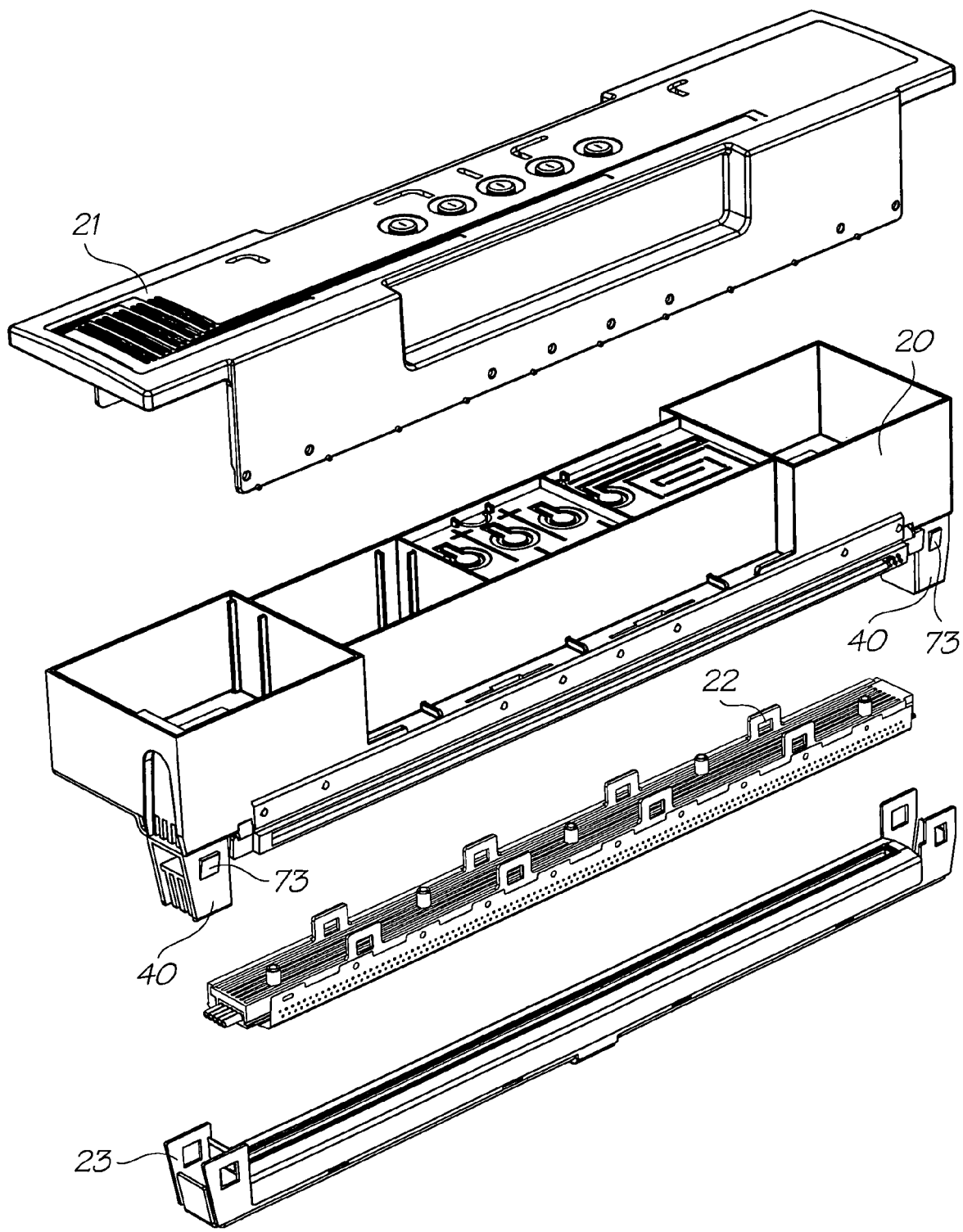
FIG. 11 shows an exploded perspective view of the cartridge unit of FIG. 7.
Figure 12:
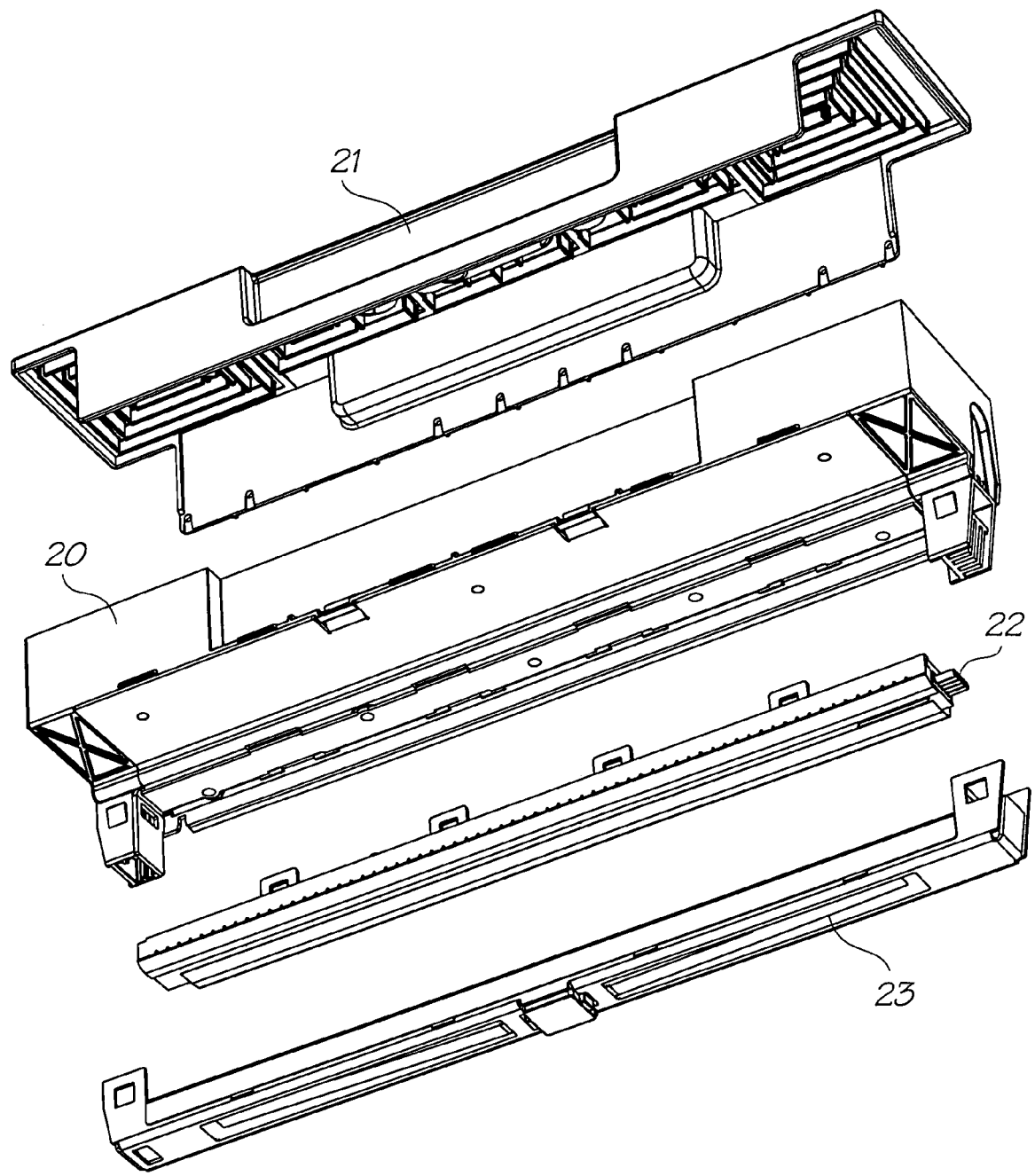
FIG. 12 shows an alternative exploded view of the cartridge unit of FIG. 7.

As shown in FIG. 11, the ink storage compartments 24 are provided with an absorbent material 29 such as a foam for storing the ink. The absorbent material 29 is shaped to conform to the shape of the ink storage compartment 24 and is fitted within the corresponding compartment to be supported on top of the air barrier/ink filter 28. In this arrangement, the lower surface of the absorbent material 29 is separated from the base 25 of the ink storage compartments via the raised portions 26. The absorbent material 29 acts to absorb ink supplied to the compartment 24 such that the ink is suspended internally within. The manner in which ink is supplied to the compartment 24 will be discussed in more detail later, however it should be appreciated that the structure of the absorbent material is such that it contains a number of open pores which receive and draw in the ink under capillary action.

The ink fills the space between the ink filter/air barrier 28 and the outlet 27 thereby forming an ink dam, which is in fluid communication with the ink in the printhead assembly 22 and the ink suspended within the absorbent material 29. Due to the nature of the absorbent material 29 and the fact that the ink is retained therein under capillary action, a back pressure is created which prevents the ink from freely flowing from the compartment 24 and out the nozzles of the printhead assembly 22.

Whilst the use of a foam or sponge material as an absorbent material 29 which stores the ink therein under capillary attraction forces is well established in the art, due to the nature of such materials, their use may cause contaminants to be introduced into the stored ink. These contaminants can then make their way to the ink delivery nozzles of the printhead assembly 22, causing blockages and therefore (possible irreparable) malfunction of the ink delivery nozzles. Whilst conventional arrangements have typically employed filters and the like in an attempt to protect the nozzles, such filters may themselves become blocked due to the presence of particulate material present in the foam or sponge material.

Figure 16:
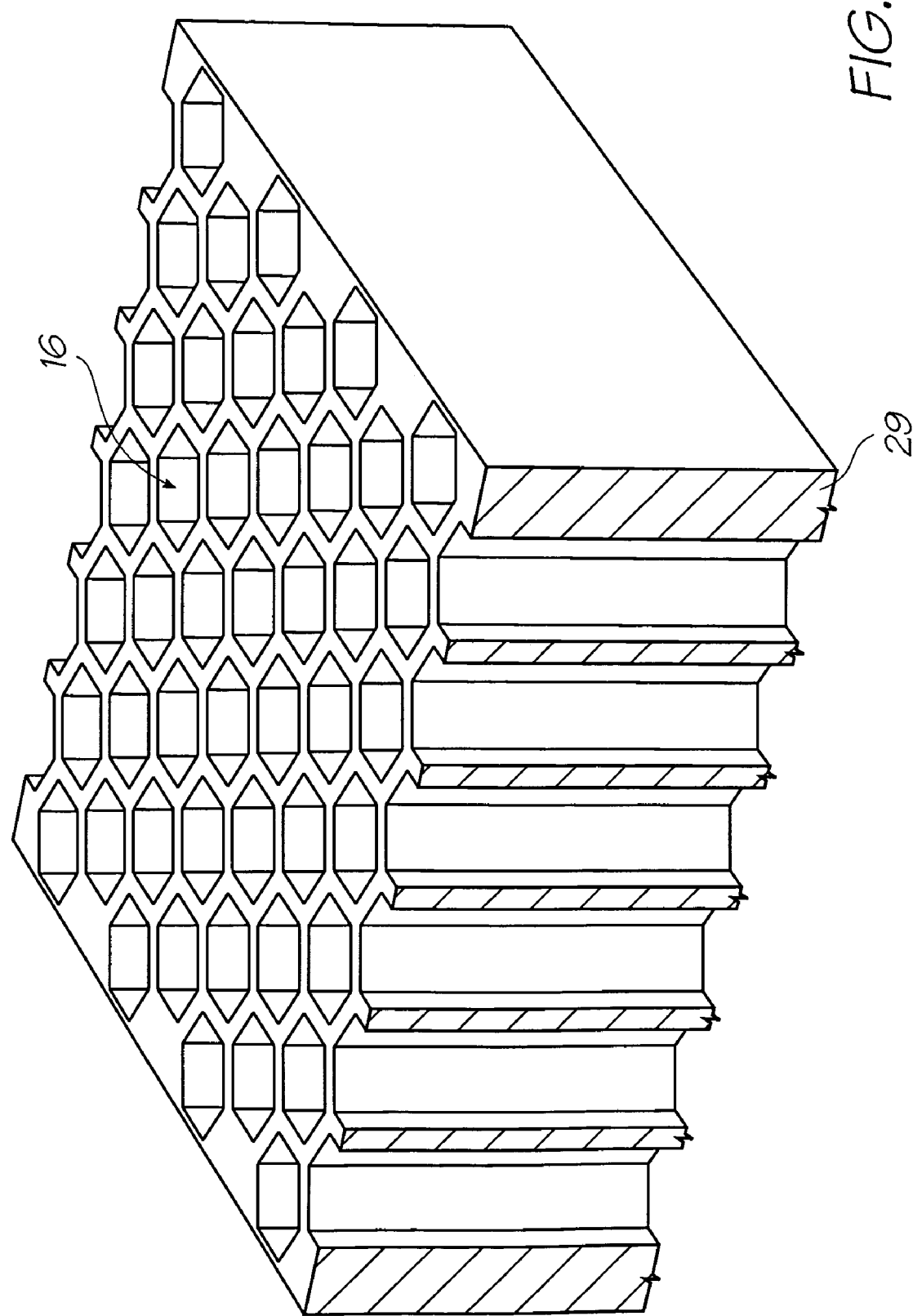
FIG. 16 shows an example of an ink storage arrangement for use in the cartridge unit of FIG. 9 according to one embodiment.

In this regard, in an alternative embodiment, the absorbent material 29 may be provided as a block or stack of layers made from a polymer material, such as polycarbonate, acrylic, polysulfone, polystyrene, fluoropolymer, cyclic olefin polymer, cyclic olefin copolymer, etc, having the channels 16 formed therein in the form of a micro-capillary array, as shown in FIG. 16, with each channel having an average diameter of about 10 microns or less.

In this arrangement, the body of the absorbent material 29, in which the micro-capillary array of the channels 16 is formed, remains stable and rigid at all times. That is, the rigid walls of the channels remain intact during exposure to the ink whereby particulate matter is not introduced into the ink, unlike the cellular or interlaced arrangement of compressible pores within the conventional foam and sponge materials which contribute to contaminant production.

Figure 17:
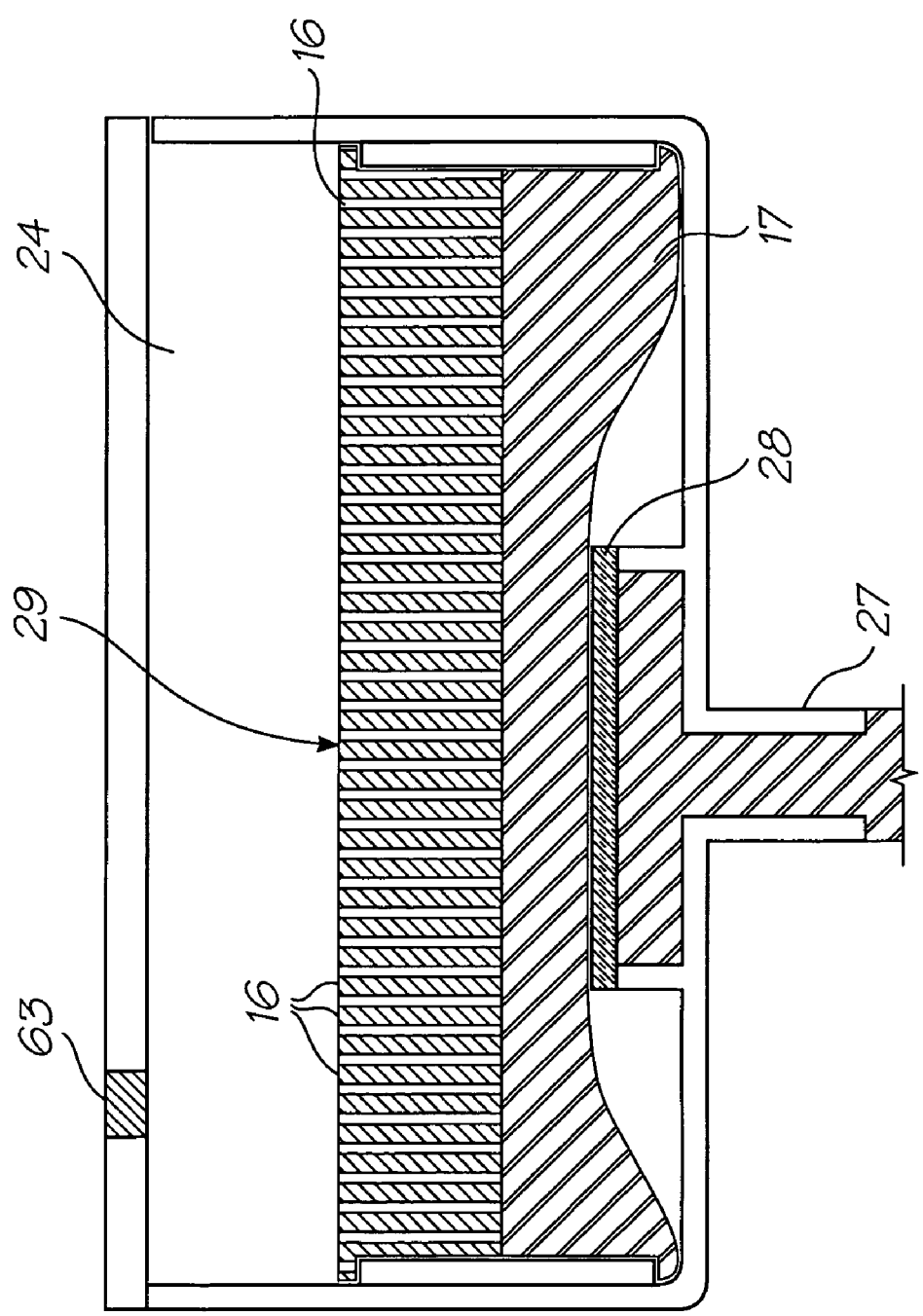
FIG. 17 shows a cross-sectional view of an ink storage compartment employing the ink storage arrangement of FIG. 16
Figure 18:
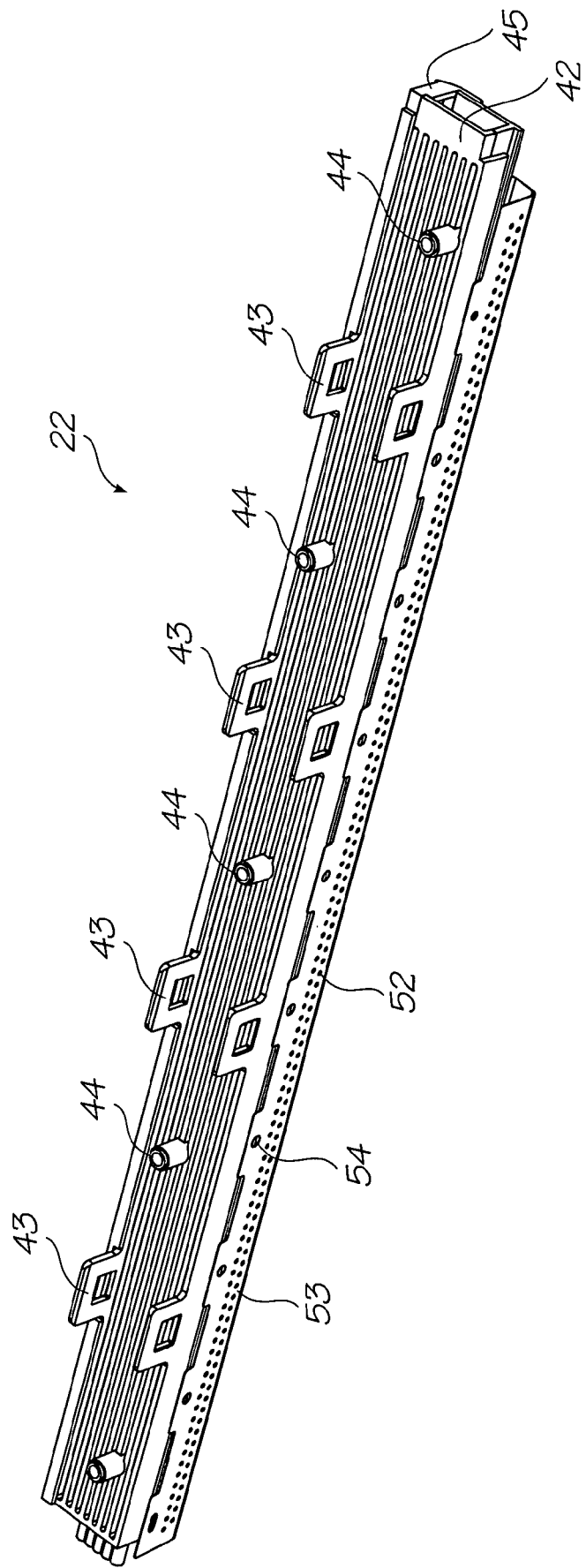
FIG. 18 shows a front perspective view of a printhead assembly suitable for use with the cartridge unit of FIG. 9.
Figure 19:
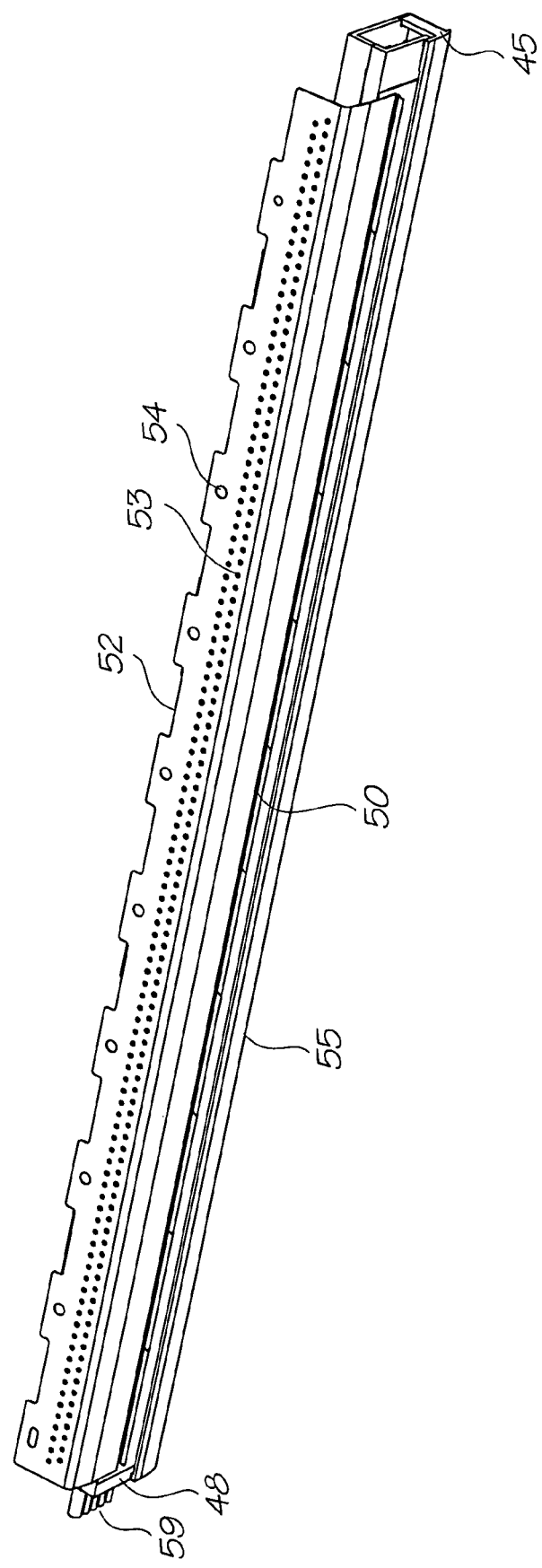
FIG. 19 shows a front perspective view of the underside of the printhead assembly of FIG. 18.

The absorbent material 29 having the channels 16 formed as a micro-capillary array therein can be arranged within the individual ink storage compartments 24 as shown in FIG. 17. An ink trapping layer 17 is provided between the ink filter/air barrier 28 and the absorbent material 29. The trapping layer 17 absorbs the supplied ink in multiple-directions, thus allowing for the ingress of the ink into the longitudinally orientated channels 16, and in this regard merely acts as a means for presenting the ink to the channels 16. The trapping layer 17 may be provided as a foam or sponge material with a thickness substantially less than that of the absorbent material 29, since the function of the trapping layer is merely to supply ink to the channels 16 of the absorbent material 29 and not to store the ink.

The ink drawn into and stored within the channels 16 is able to pass to the nozzles of the printhead assembly 22 via the ink trapping layer 17. The use of foam or sponge material in the ink trapping layer 17 may result in some particulate contamination occurring in the ink. However, this may be minimized by providing the layer with a thickness and density which is just sufficient for absorbing the necessary amount of ink for effective absorption into the channels 16. In any event, since the ink is effectively stored only in the absorbent material 29, the contaminant level that may be produced in the ink trapping layer is significantly reduced from the levels produced by the conventional structures.

A pressed metal chassis 30 is fitted to the underside of the main body via clips 31 formed in the chassis 30 which mate with corresponding clips formed in the main body 20. The pressed metal chassis 30 is shaped to conform to the underside of the main body 20 and includes a plurality of holes 32 that extend therethrough which are positioned to correspond with the ink outlets 27 of the ink storage compartments 24 such that there is a passage for ink to pass through the chassis 30. The chassis 30 provides additional stability to the cartridge unit 10 and includes an edge 33 that extends downwardly from the main body 20 which defines a contact region where the flex printed circuit board 52 of the printhead assembly 22 contacts with corresponding electrical contacts 128 in the cradle unit 12, in a manner which will be described in more detail later in the description. The chassis 30 also has a plurality of elongate recesses 34 formed along its length, through which connecting clips provided on the printhead assembly 22 pass, for connection to the main body 20, as will be described in more detail below.

A seal moulding 35 is attached to the chassis 3Q to complete and seal the ink flow path from the ink storage compartments 24 through the chassis 30. The seal moulding 35 is made from an elastomeric material and has a plurality of hollow cylindrical inserts 36 formed along its surface which extend through the holes 32 formed in the chassis 30 and into the ink outlets 27 of each of the ink storage compartments 24, as shown in FIG. 15. The distal ends of the hollow cylindrical inserts 36 abut with the main body 20 to seal the ink outlets 27 and ensure ink flow through the seal moulding 35. The seal moulding 35 is fixed to the surface of the metal chassis 30 by a lock-fit or a suitable adhesive and acts to provide a substantially planar surface upon which the printhead assembly 22 is attached. The planar surface having a plurality of outlet holes 39 provided therein through which ink can flow to the printhead assembly.

As is shown in FIGS. 14 and 15 a flex printed circuit board (PCB) backer 37 is attached to the side of the main body 20 via locating studs 38 and extends over the downwardly projecting edge 33 of the chassis 30. The flex PCB backer 37 is made from a suitable elastomeric material and provides a backing onto which the flex PCB 52 of the printhead assembly 22 is supported following attachment of the printhead assembly 22 to the main body 20. As will be discussed in more detail later in the description, the flex PCB 52 from the printhead assembly 22 is provided with a suitable recess which fits over the locating studs 38 such that the electrical dimpled contacts 53 formed on the flex PCB 52 are positioned over the flex PCB backer 37 and extend outwardly therefrom to contact suitable electrical contacts 128 provided in the cradle unit 12. This arrangement provides some degree of flexibility in this contact region such that appropriate electrical contact can be established between the cradle unit 12 and the cartridge unit 10 to allow the transmission of data and power therebetween to control the ink ejecting nozzles of the printhead assembly 22. This arrangement also ensures that the forces associated with the contact between the cartridge unit 12 and the cradle unit 10 in this region are carried by the chassis 30 and not transferred to the printhead assembly 22 which could cause damage to the delicate printhead integrated circuits.

As shown in FIGS. 13 and 14, the main body 20 also includes a pair of end supports 40 which extend from the main body 20 in a downward direction with respect to the cartridge unit 10. The end supports 40 are arranged such that the seal moulding 35 and the flex PCB backer 37 extend along the main body 20 between the two end supports 40. The purpose of the end supports 40 will be described later in the description.

Printhead Assembly

The printhead assembly 22 is shown in more detail in FIGS. 18 to 21, and is adapted to be attached to the underside of the main body 20 to receive ink from the outlet holes 39 formed in the planar surface of the seal moulding 35.

Figure 20:
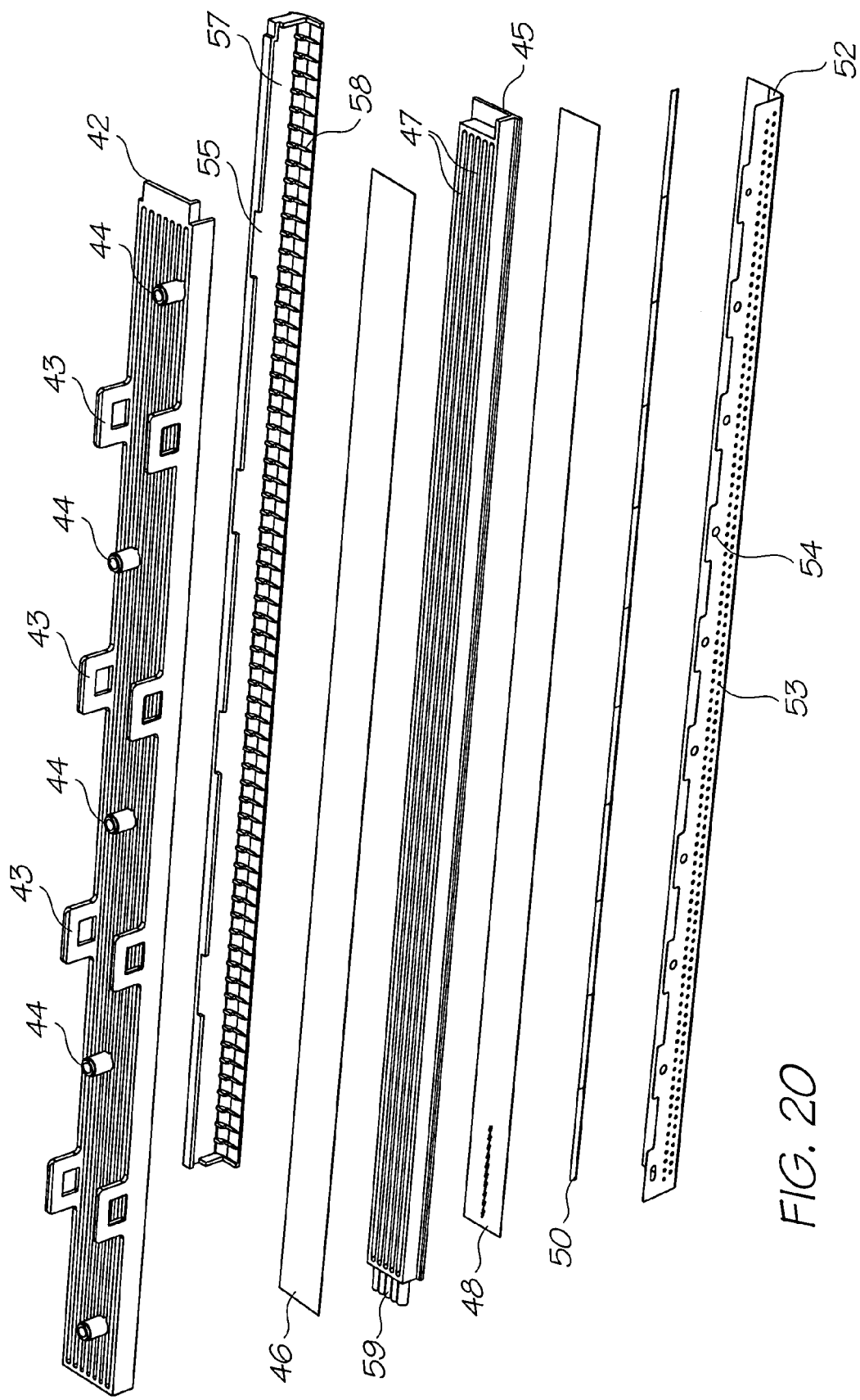
FIG. 20 shows an exploded view of the printhead assembly of FIG. 18.

As shown more clearly in FIG. 20, the printhead assembly 22 comprises an upper moulding 42, having features which facilitate connection of the printhead assembly to the main body 20 of the cartridge unit 10. These features are in the form of u-shaped clips 43 that project from the surface of the upper moulding 42. The clips 43 pass through the elongate recesses 34 provided in the chassis 30 and become captured by lugs (not shown) formed in the main body 20, thereby securing the printhead assembly 22 to the main body 20.

In order to receive ink from the ink storage compartments 24, the surface of the upper moulding 42 has a plurality of ink inlets 44 which project therefrom. The ink inlets 44 are received within the outlet holes 39 of the seal moulding 35, when the printhead assembly 22 is secured to the main body 20, and provide a path for the ink to flow to the printhead integrated circuits for printing. To ensure a sealed connection, the ink inlets 44 are shaped to fit within the outlet holes 39 of the seal moulding 35 and may also be provided with an outer coating that facilitates sealing.

The upper moulding 42 is made from a liquid crystal polymer (LCP) and is bonded to a lower moulding 45 via an adhesive film 46. The lower moulding 45 is also made from an LCP and has a plurality of channels 47 formed along its length. Each of the channels 47 are provided to receive ink from one of the ink storage compartments 24, via an ink inlet 44, and distribute the ink along the length of the printhead assembly 22 for feeding to the ink delivery nozzles 51 of the printhead assembly 22. The channels preferably have a width of 1 mm and are separated by walls having a width of 0.75 mm. In the embodiment shown, the lower moulding 45 has five channels 47 extending along its length with each of the ink channels 47 receiving ink from one of the corresponding ink inlets 44. Such an arrangement ensures that the different inks remain separated throughout the journey from the individual ink storage compartments 24 to the corresponding ink delivery nozzles of the printhead integrated circuit. In this regard, the adhesive film 46 also acts to seal the individual ink channels 47 and prevent cross channel mixing of the ink when the lower moulding 45 is assembled to the upper moulding 42.

In order to further distribute the ink from the ink channels 47 of the lower moulding 45 to the printhead integrated circuits (ICs) 50, an ink distribution member 48 is attached to the lower moulding 45 and acts as an interface between the printhead ICs 50 and the ink channels 47 of the lower moulding 45. The purpose of the ink distribution member 48 is to provide a flow path for ink to flow from the relatively wide channels 47 to the relatively small and narrow channels 98 formed on the underside of the printhead ICs 50 which feed the ink to the individual ink delivery nozzles 51.

In order to appreciate the manner in which the ink distribution member 48 functions to perform millimetric-to-micrometric fluid distribution to the nozzles of the printhead ICs 50, reference is firstly made to the manner in which the printhead ICs 50 are arranged to form the printing zone of the printhead assembly 22.

As alluded to above, the present invention is related to page-width printing and as such the printhead ICs 50 are arranged to extend horizontally across the width of the passing media to deposit ink droplets thereon to create an image. To achieve this, individual printhead ICs 50 are linked together in abutting arrangement across the surface of the ink distribution member 48 of the printhead assembly 22, as shown simply in FIG. 22. The length of an individual printhead IC 50 is around 20-22 mm and as such in order to print an A4/US letter sized page, 11-12 individual printhead ICs 50 may be linked together in abutting fashion. Other printing sizes may also be possible and as such the number of individual printhead ICs 50 required may vary depending upon the application.

Each printhead IC 50 has a plurality of individual ink delivery nozzles 51 formed therein, the structure and control of which will be described in more detail later. The nozzles 51 within an individual printhead IC 50 are grouped physically to reduce ink supply complexity and wiring complexity, and are also grouped logically to minimize power consumption and to allow a variety of printing speeds.

As mentioned previously, each printhead IC 50 is able to print five different colours (C, M, Y, K and IR) and contains 1280 ink delivery nozzles 51 per colour, with these nozzles being divided into even and odd nozzles (640 each). Even and odd nozzles for each colour are provided on different rows on the printhead IC 50 and are aligned vertically to perform true 1600 dpi printing, meaning that the nozzles 51 are arranged in 10 rows. The horizontal distance between two adjacent nozzles 51 on a single row is 31.75 microns, whilst the vertical distance between rows of nozzles is based on the firing order of the nozzles, but rows are typically separated by an exact number of dot lines, plus a fraction of a dot line corresponding to the distance the paper will move between row firing times Also, the spacing of even and odd rows of nozzles for a given colour must be such that they can share an ink channel, as will be described below.

The manner in which individual printhead ICs 50 are linked together in abutting fashion may be performed in a variety of ways. As shown in FIG. 23, the simplest way to achieve this linkage of the printhead ICs 50 is to form a rectangular join between adjacent ICs 50. However, due to the nature of this rectangular join, it may result in a gap between adjacent nozzles at the join interface which could produce a vertical stripe down the printed page of media where no ink is deposited, which may be unacceptable in some printing applications.

This may be overcome by providing a sloping join as shown in FIG. 24*a* which provides nozzle overlap at the join interface. As shown by the enlarged view of nozzle rows of a single colour at the interface in FIG. 24*b*, such an arrangement does not produce a visible join along the printing page as discussed above. In this arrangement, the ICs 50 must be perfectly aligned vertically to link in this fashion and as such this may not be always possible.

Figure 25:
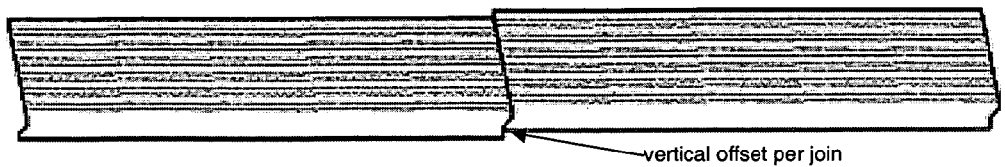
FIG. 25 shows a simplified schematic depiction of two linked integrated circuits employing a vertical offset join.
Figure 26:
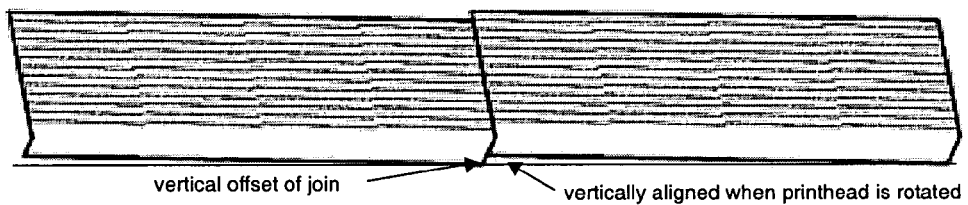
FIG. 26 shows a simplified schematic depiction of two linked integrated circuits employing a sloped placement join.

To overcome this problem, the ICs 50 may be provided with a vertical offset, as shown in FIG. 25. This offset can be seen by the vertical offset between the longitudinal edges of adjacent ICs 50, and this offset increases with each join along the length of the printhead assembly 22. For example, if the offset was equivalent to 7 lines of nozzles per join, then for 11 ICs joined in this manner, there would be a total of 10 joins and 70 additional nozzle lines. This then results in an increase in the lines of data storage required for the printhead assembly. To overcome this, each IC 50 may be placed on a mild slope to achieve a constant number of print lines regardless of the number of joins, as shown in FIG. 26. It will be appreciated that in this arrangement the rows of nozzles on the ICs 50 are aligned, but the IC is placed in a sloped orientation, such that if all the-nozzles were fired at once, the effect would be lots of sloped lines provided on the page of media, however with the nozzles being fired in the correct order relative to the paper movement, a straight line for n dots would be printed, followed by another straight line for another n dots separated by 1 line.

Figure 27A:
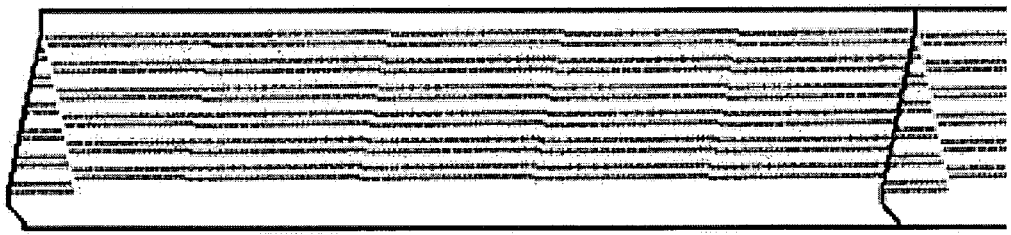
FIGS. 27a and 27b show a simplified schematic drawing of two linked integrated circuits employing a dropped triangle nozzle join.
Figure 27B:
Figure 28A:
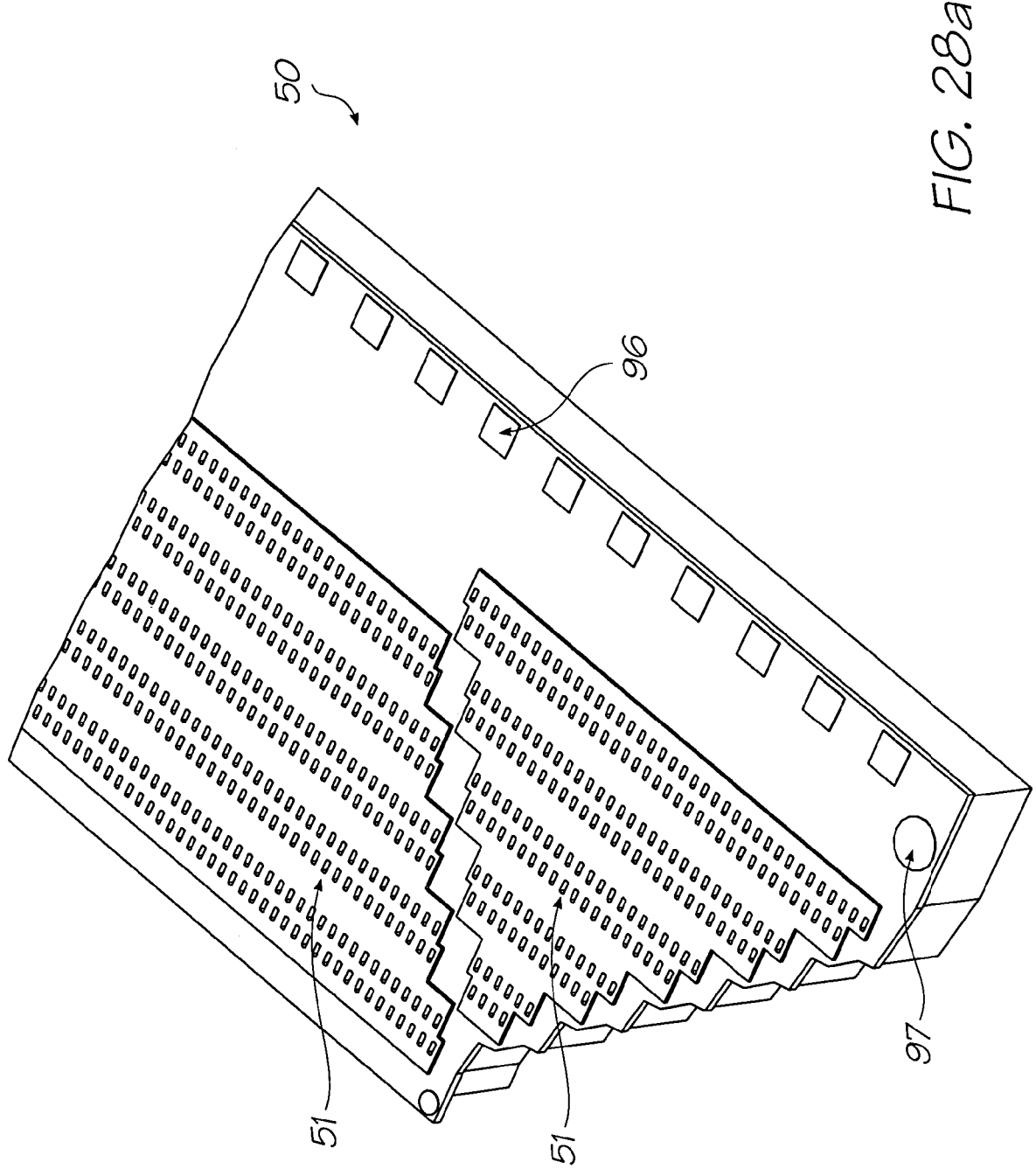
FIG. 28a shows a magnified perspective view of an integrated circuit as shown in FIGS. 27a and 27b employing a dropped triangle nozzle arrangement.
Figure 28B:
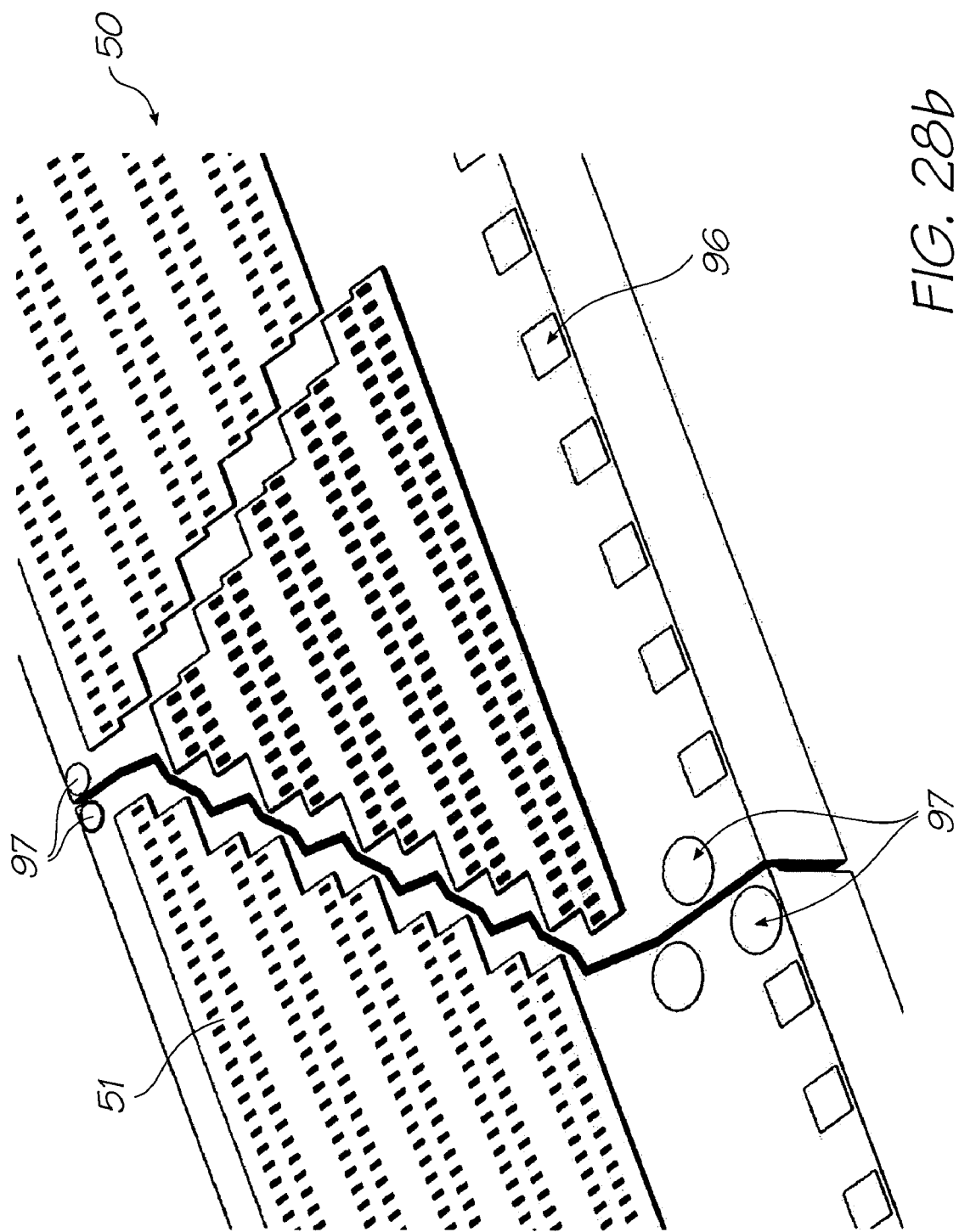

Yet another system for linking the ICs 50 in abutting fashion is shown in FIG. 27*a* and 27*b*. In this arrangement, the ICs 50 are shaped at their ends to link together to form a horizontal line of ICs, with no vertical offset between neighboring ICs. A sloping join is provided between the ICs which has a 45 degree angle to the upper and lower chip edges. Typically, the joining edge is not straight and has a sawtooth profile to facilitate positioning, and the ICs 50 are intended to be spaced about 11 microns apart, measured perpendicular to the joining edge. In this arrangement, the left most ink delivery nozzles on each row are dropped by 10 line pitches and arranged in a triangle configuration as shown in FIG. 27*a* and FIGS. 28*a* and 28*b*. This arrangement provides a degree of overlap of nozzles at the join and maintains the pitch of the nozzles to ensure that the drops of ink are delivered consistently along the printing zone. This arrangement also ensures that more silicon is provided at the edge of the IC 50 to ensure sufficient linkage. Control of the operation of the nozzles is performed by the SoPEC device, however compensation for the nozzles is performed in the printhead, or may also be performed by the SoPEC device, depending on the storage requirements. In this regard it will be appreciated that the dropped triangle arrangement of nozzles disposed at one end of the IC 50 provides the minimum on-printhead storage requirements. However where storage requirements are less critical shapes other than a triangle can be used, for example, the dropped rows may take the form of a trapezoid.

FIG. 28a shows more clearly the upper surface of a portion of the individual ICs. As can be seen bond pads 96 are provided along an edge thereof which provide a means for receiving data and or power to control the operation of the nozzles from the SoPEC of the cradle unit 12. Fiducials 97 are also provided on the surface of the ICs to assist in positioning and aligning the ICs 50 with respect to each other. The fiducials 97 are in the form of markers that are readily identifiable by appropriate positioning equipment to indicate the true position of the IC 50 with respect to a neighbouring IC 50, and are strategically positioned at the edges of the IC, proximal the join. As shown in FIG. 28b, the fiducials 97 align with corresponding fiducials 97 provided on the surface of a neighbouring IC 50 to ensure alignment of the ICs to appropriate limits, as discussed above.

Figure 28C:
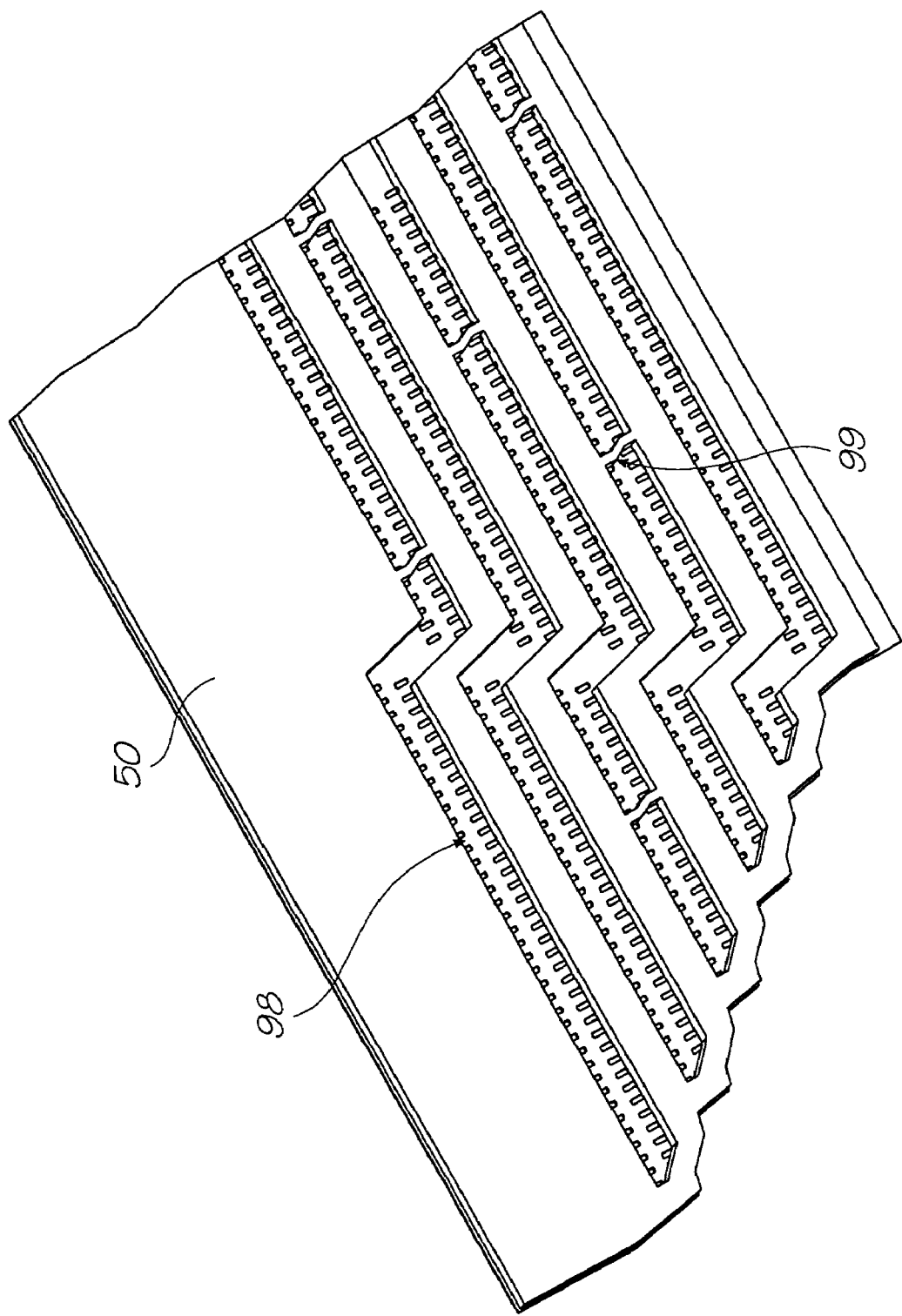

The underside of a printhead IC 50 is shown in relation to FIG. 28c. As shown, along the underside of the IC 50 there are provided a number of etched channels 98, with each channel 98 in communication with a pair of rows of nozzles 51. The channels 98 are about 80 microns wide and extend the length of the IC 50 and include silicon walls 99 formed therein, to divide the channels 98 into portions. The channels are adapted to receive ink from the ink channels 47 of the lower moulding 45 and distribute the ink to the pair of rows of nozzles 51 to eject that ink of a specific colour or type. The partitioning of the channels 98 by the silicon walls 99 ensures that the flow path to the nozzles is not too great thereby reducing the likelihood of ink starvation to the individual nozzles along the length of the IC. In this regard, each portion feeds approximately 128 nozzles and is individually fed a supply of ink.

Each of the ICs 50 are positioned and secured to the surface of the ink distribution member 48. As mentioned previously, the ink distribution member delivers the ink from the 1 mm wide channels 47 formed in the lower moulding 45 to the 80 micron wide channels 98 formed in the underside of the printhead ICs 50.

The ink distribution member 48 can be configured in a number of forms. In one embodiment the ink distribution member 48 may be in the form of a laminated structure consisting of a number of layers bonded to one another, as described in U.S. Pat. No. 6,409,323 and pending U.S. application No. 2004/0113997.

Figure 29:
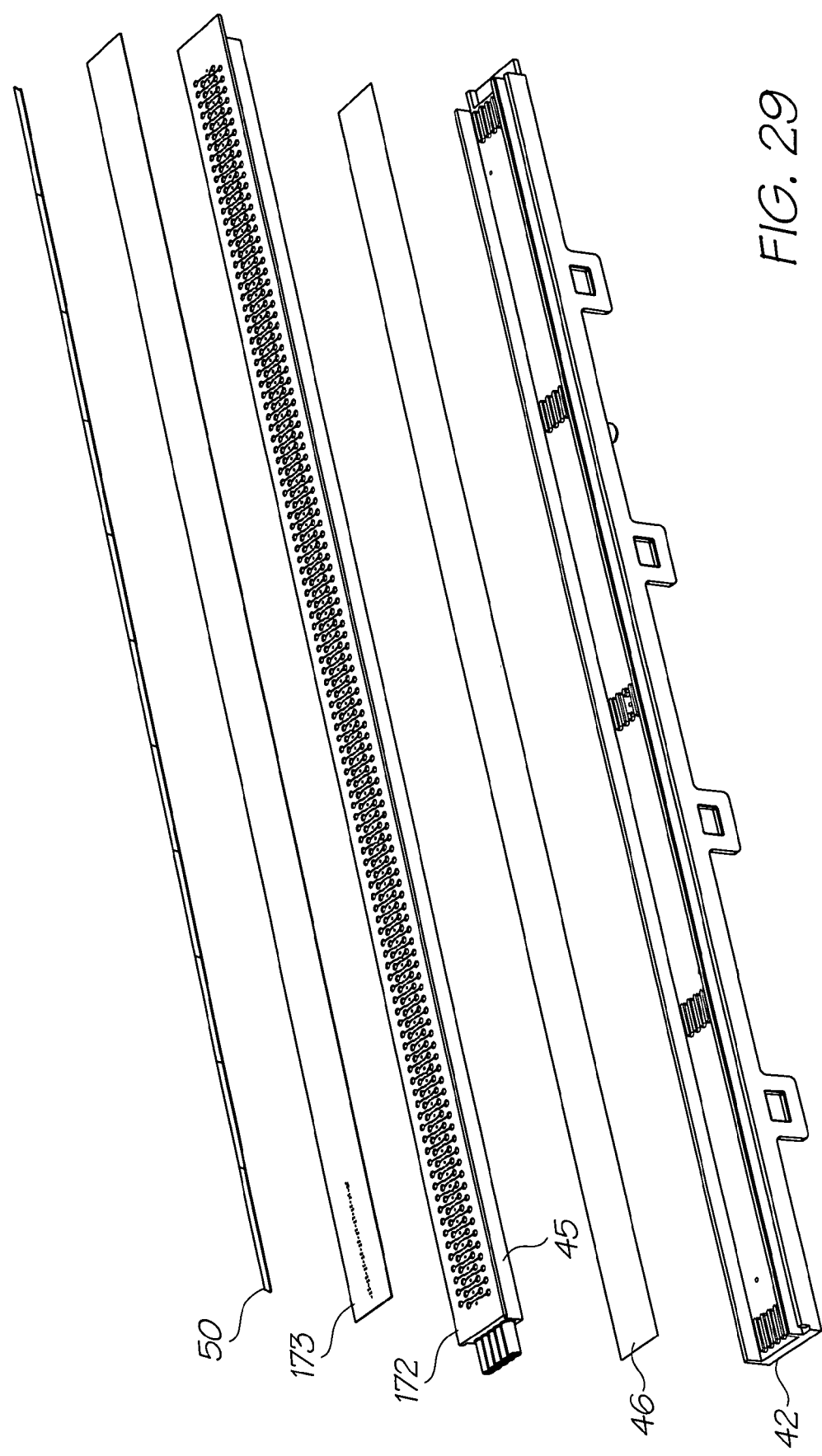
FIG. 29 shows an exploded perspective view of an alternative printhead assembly according to another embodiment of the present invention.

In an alternative embodiment, the ink distribution member 48 may be in a two-part form comprising an intermediate layer 172 and an adhesive layer 173, as shown in FIG. 29. In this arrangement, the intermediate layer 172 is arranged to fit over the exposed channels 47 of the lower moulding 45 to seal the charmers 47 and to form a sealed unit with the lower moulding 45. The intermediate layer 172 has a plurality of holes 174 formed therethrough along its length each of which are aligned with the channels 47 and are spaced at regular intervals along the length thereof.

Figure 30:
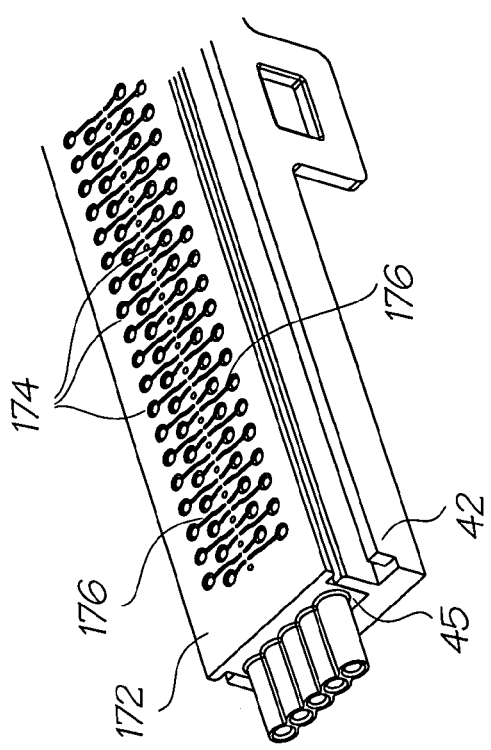
FIG. 30 shows a partly assembled perspective view of the printhead assembly of FIG. 29.

As shown more clearly in FIG. 30, the holes 174 formed through the intermediate layer 172 which relate to the most central channel 47 of the lower moulding 45 are in the form of small diameter holes equi-spaced at intervals along the length of the intermediate layer 172. Larger diameter holes 174 are provided which correspond to the other channels 47 of the lower moulding 45, which are displaced laterally from the most central channel. These holes 174 are similarly equi-spaced along the length of the intermediate layer and micro conduits 176 are provided which extend from the larger diameter holes to terminate at a central region of the intermediate layer 172, proximal the smaller diameter holes. These conduits 176 distribute the ink from each of the holes 172 to a central region of the intermediate layer to deliver the different types/colours of ink to the channels 98 formed in the underside of the integrated circuits 50.

The intermediate layer 172 is also made from a liquid crystal polymer (LCP) which is injection moulded to the appropriate shape and configuration. The intermediate layer 172 is bonded to the lower moulding 45 via a thermal adhesive, such as 3M 816 or Abelflex 5206 or 5205, which is applied between the intermediate layer 172 and the lower moulding 45 and placed in a laminator.

To facilitate placement and to secure the integrated circuits 50 upon the surface of the intermediate layer 172 a bonding film 175 is applied to the surface of the intermediate layer 172. The bonding film 175 is in the form of a laminate polymer film which may be a thermoplastic film such as a PET or Polysulphone film, or it may be in the form of a thermoset film, such as those manufactured by AL technologies and Rogers Corporation. The bonding film 175 preferably has co-extruded adhesive layers formed on both sides thereof and is laminated onto the upper surface of the intermediate layer 172

Figure 31:
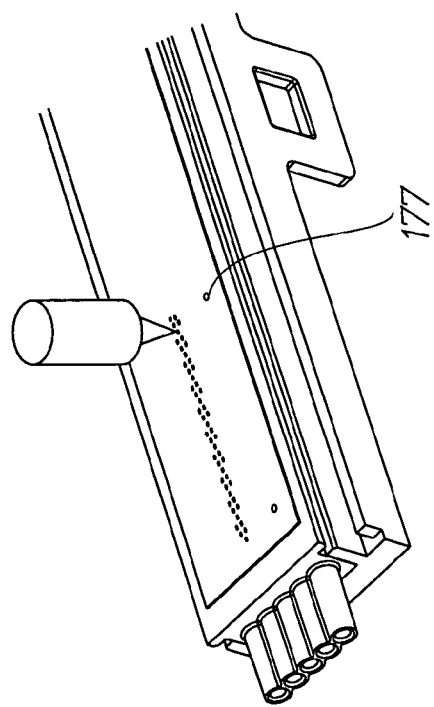
FIG. 31 shows a plurality of holes being laser drilled into the adhesive layer of the printhead assembly of FIG. 29.

Following lamination of the bonding layer 175 to the intermediate layer 172, holes are drilled through the bonding layer 175 to coincide with the centrally located small diameter holes 174, and the ends of the conduits 176. This is shown in FIG. 31. These holes provide a separate flow passage through the bonding layer 175 for each of the different types of inks, which feed directly to the appropriate channel portions 98 formed on the underside of the integrated circuits 50 for supply to the ink delivery nozzles 51 associated with each channel portion 98, as discussed above. Fiducial locating marks 177 are also drilled into the surface of the bonding layer to assist in attaching and positioning the ICs 50 thereon.

Figure 32:
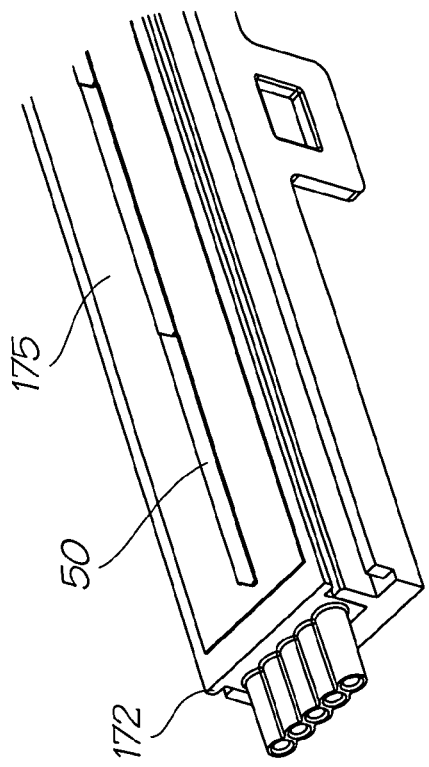
FIG. 32 shows a plurality of integrated circuits being arranged along the surface of the adhesive layer of FIG. 31.

In order to attach the ICs 50 to the surface of the bonding layer 175, the ICs 50 are placed in a die and heated to 170° C. and then pressed into the bonding layer 175 at 40 psi pressure for about 3 seconds. This results in the ICs 50 being thermally bonded to the intermediate layer 172, as shown in FIG. 32. As shown, the fiducial locating marks 177 formed in the surface of the bonding layer 175 aid in positioning the ICs such that the channels 98 formed in the underside of the ICs 50 correctly align with the holes drilled through the bonding layer 175 to provide a flow path for ink to be fed to the nozzles for printing.

In this embodiment the ink distribution member 48 is in the form of a two part element containing an intermediate layer 172 which fits over the channels 47 formed in the lower moulding 45, and a bonding layer 175 allowing fluid flow therethrough and which acts to attach the ICs to the surface of the intermediate layer 172.

In yet another embodiment, the ink distribution member 48 may be in the form of a one-piece element with the ICs being directly attached to its upper surface. In this regard, rather than providing an intermediate layer 172 having holes 174 that extend therethrough and conduits 176 formed in the upper surface thereof to direct the flow of ink towards the central region of the intermediate layer 172, the conduits are formed within the body of the ink distribution member 48 such that the upper surface of the ink distribution member only has small diameter holes formed centrally therein for delivering the ink to the undersurface of the ICs.

Figure 33A:
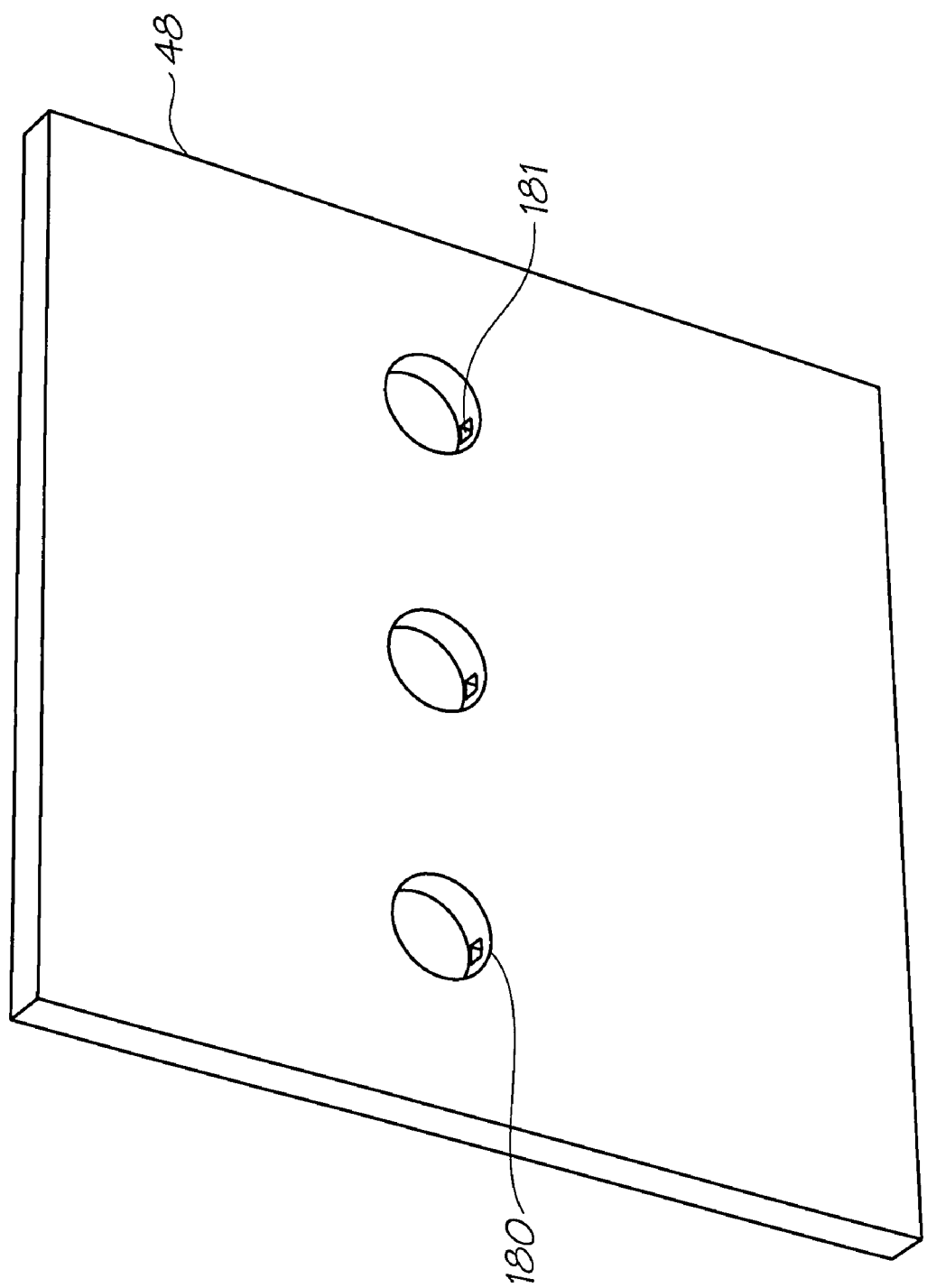
FIGS. 33a-33c show various views of a portion of an ink distribution member according to a further embodiment of the present invention.
Figure 33B:
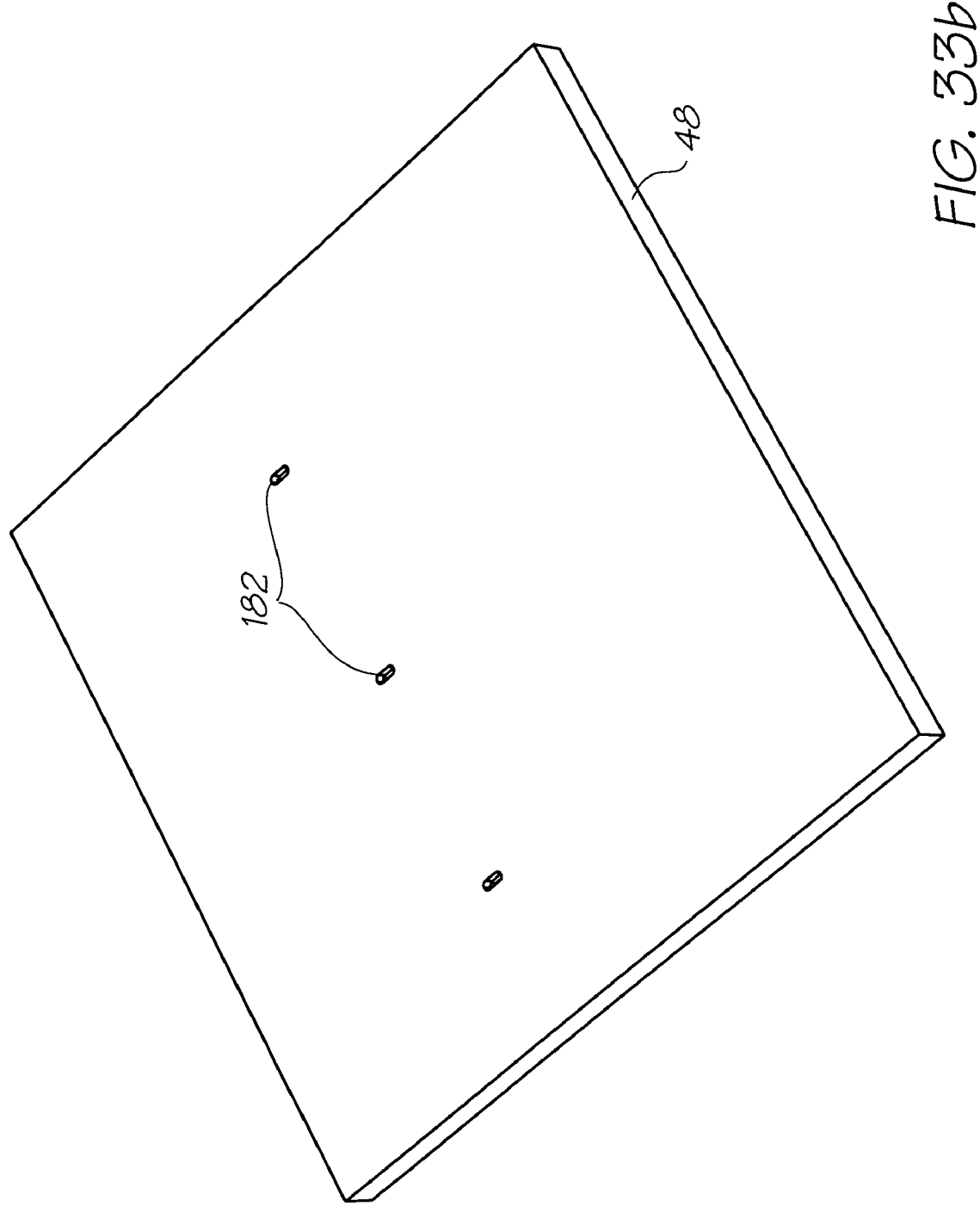
Figure 33C:
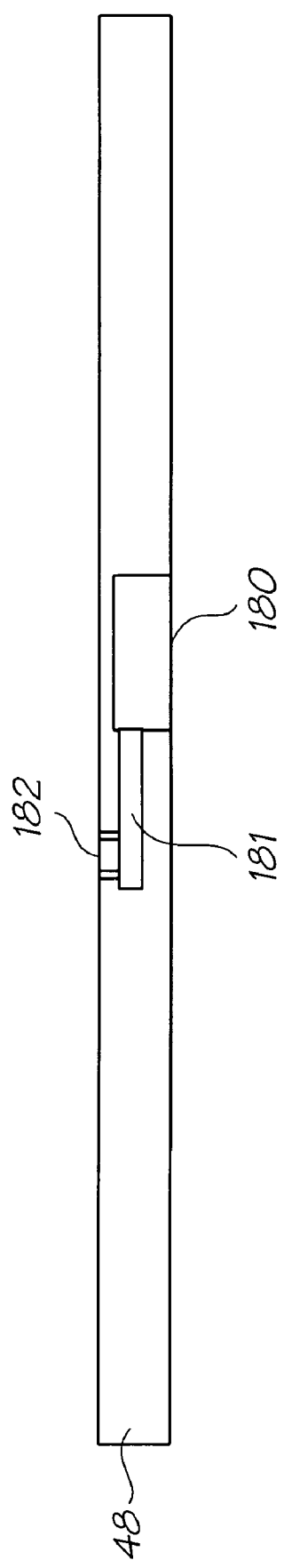

The manner in which this is achieved is shown in FIGS. 33*a*-33*c*. These Figures merely show the manner in which the ink can be directed from one of the channels 47 of the lower moulding 45, and it will be appreciated that the same approach can be similarly applied to deliver ink from the remainder of the channels 47.

As shown, the underside of the ink distribution member 48 is provided with a plurality of holes or inlets 180 therein, each having a diameter of approximately 1 mm, which corresponds to the width of the channels 47 provided in the lower moulding 45. The inlets 180 do not extend through the body of the ink distribution member 48, but rather extend into the member 48 to a depth of about a ¾ the thickness of the member 48, as shown in the sectioned view of FIG. 33*c*.

For the inlets 180 associated with the centre channel 47 of the lower moulding, an outlet 182, in the form of a 80 micron wide hole, is provided in the uppermost surface of the ink distribution member 48 which extends into the end wall of the inlet 180 to provide a path for the ink to flow out of the ink distribution member. For the inlets 180 associated with the other channels 47 of the lower moulding 45, a tunnel 181 is provided from a side wall of the inlet 180 within the ink distribution member 48 which acts to direct the flow of the ink received in the inlet through the body of the ink distribution member 48 to a central position therein. An outlet 182, as described above, is then formed on an uppermost side of the ink distribution member to provide a path for the ink present in the tunnel 181 to exit the ink distribution member at the desired position along the surface of the ink distribution member. The outlets 182 are essentially 80 microns in width, to correspond with the width of the channels 98 provided on the underside of the integrated circuits 50.

The ink distribution member 48 of this embodiment is made from a photo-structurable glass-ceramic material, such as Forturan glass. These materials, when exposed to specific levels of pulsed UV laser energy density (fluence), have a photo-chemical reaction which creates a density of nanocrystals within the volume thereof, the density of which is directly proportional to the fluence of the exposed laser beam. In this regard, in order to form the desired inlets 180, outlets 182 and tunnels 181 connecting the inlets and outlets, the ink distribution member 48 is mounted upon a precision XYZ stage for exposure to a focussed laser beam. Various tools may be used to control the size and shape of the critically exposed volume of the glass structure to ensure that the desired pattern and shape is created within the ink distribution member. Typical exposure times may vary from 15 minutes to 1 hour.

Following exposure the ink distribution member is loaded into an oven for thermal treatment to aid in causing crystallisation of exposed regions of the glass. The exposed and thermally treated glass is then loaded into a mild etchant for around 7 minutes to etch the exposed regions, however the etch time may vary dependant upon the thickness of the glass and the depth of the cut. The thermal treatment and etching steps may be repeated in order to form the complete ink distribution member as shown in the figures.

With this arrangement, ink present in the channels 47 of the lower moulding 45 is drawn into the ink distribution member 48 via inlets 180 which are positioned over the channels 47 at regular intervals therealong. Upon entering the inlets 180, where required, the ink is directed to a central region of the ink distribution member 48 via the above mentioned tunnels 181, where the ink can then exit the ink distribution member 48 via the outlets 182 at a predetermined position which is aligned with the corresponding channels 98 formed in the underside of the ICs 50.

The ICs 50 are secured to the upper surface of the ink distribution member 48 to receive the ink therefrom, using spun coated adhesive applied to the underside of the IC 50, or by screen printing epoxy on the upper surface of the ink distribution member 48. In this regard, the fiducials provided on the ICs 50 and on the surface of the ink distribution member 48 assist in positioning the ICs 50 such that the channels 98 formed in the underside of the IC 50 are aligned with the appropriate outlet 182 formed in the upper surface of the member 48 to receive the correct type/colour of ink.

Figure 34A:
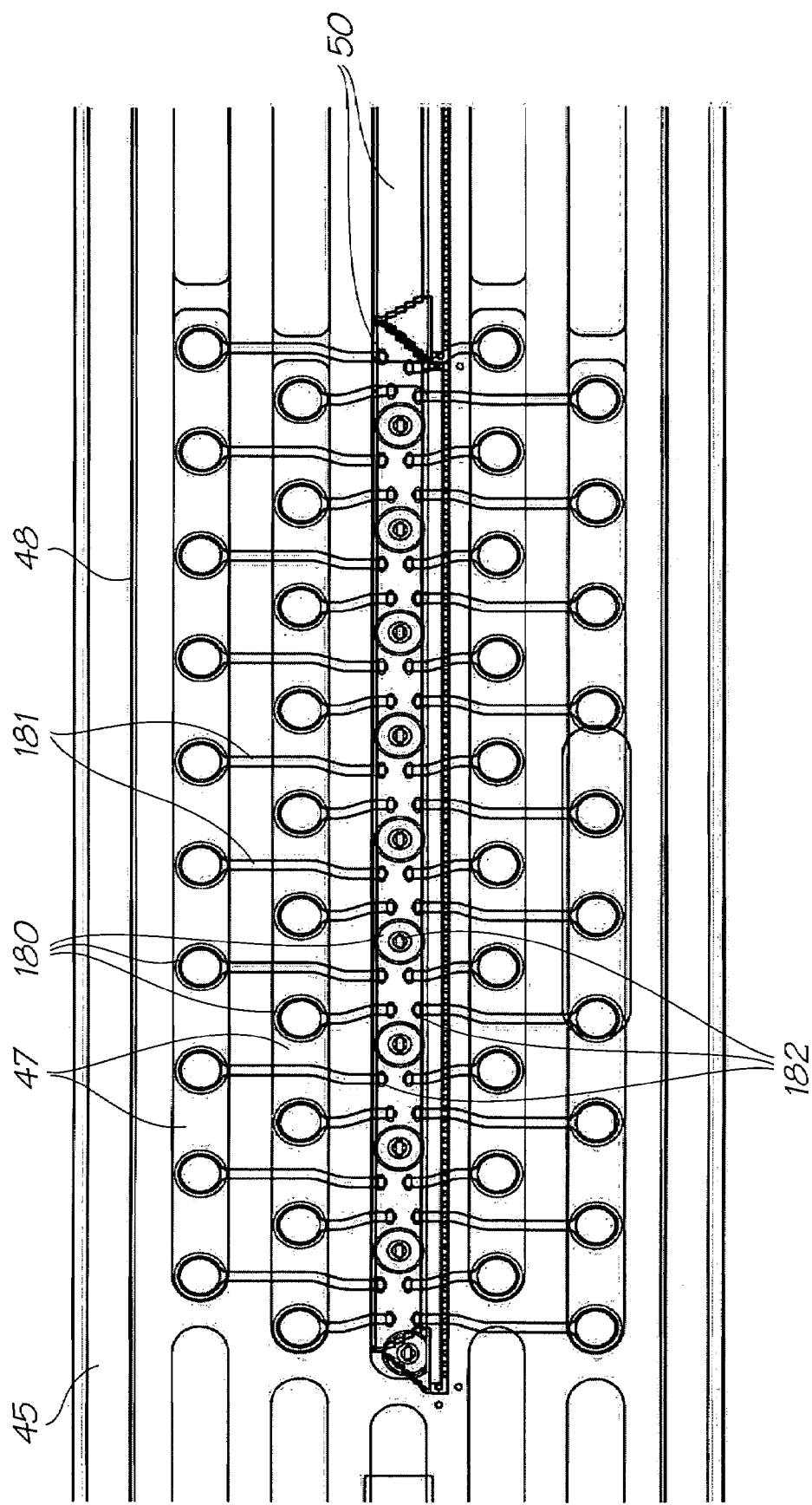
FIG. 34a shows a transparent top view of a printhead assembly employing the ink distribution member of FIGS. 33a-33c showing in particular, the ink passages for supplying ink to the integrated circuits.
Figure 34B:
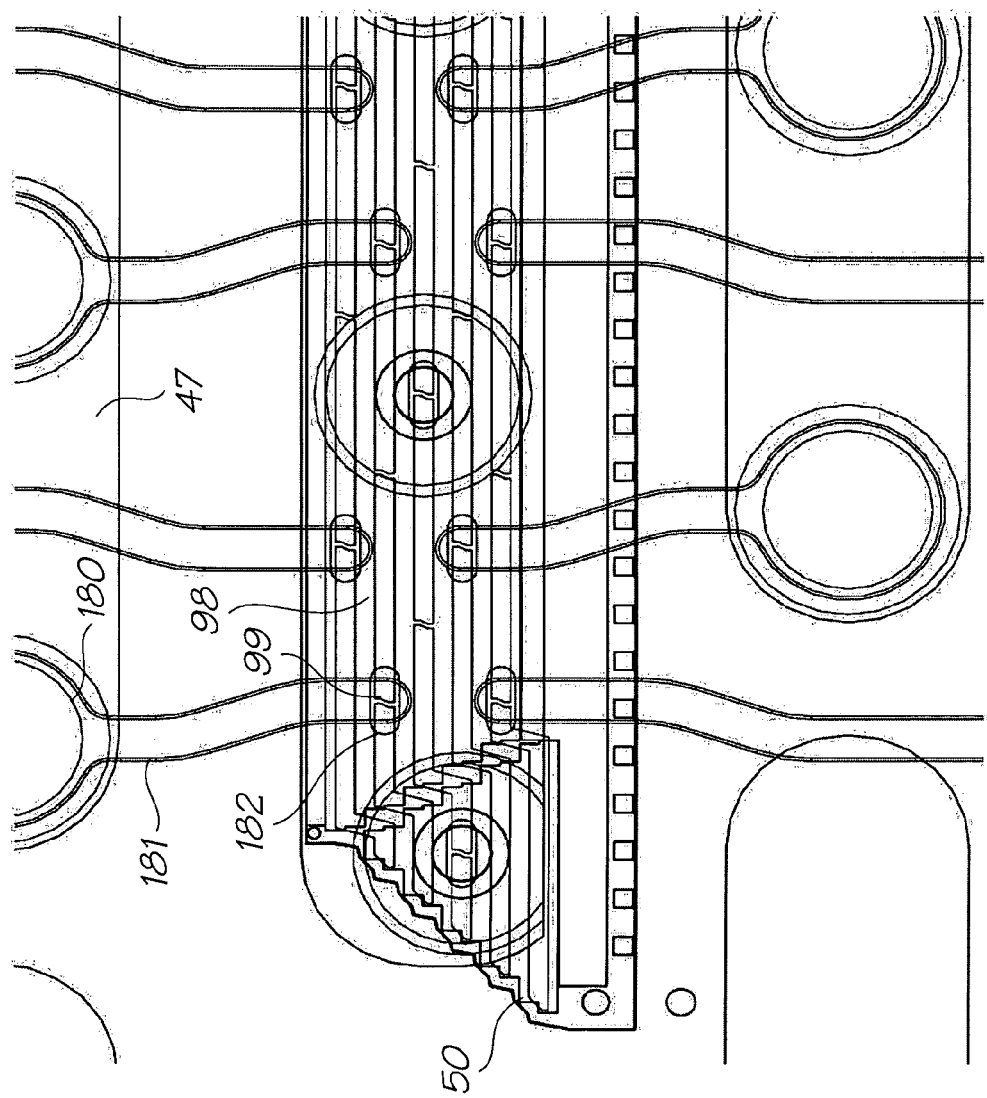

FIGS. 34*a* and 34*b* show the manner in which this is arranged to control the delivery of ink from the five channels 47 of the lower moulding 45. These figures provide a top view of the arrangement and for reasons of clarity, the various elements are shown in outline to indicate the manner in which ink flows between the elements. FIG. 34*a* is a top view of the arrangement showing the ICs 50 located centrally upon the ink distribution member 48. The ink distribution member 48 is in turn secured to the lower moulding 45 such that the inlets 180 align with the respective channels 47 at regular intervals along the length thereof to receive ink from the channels 47 for distribution to the ICs 50. The inlets 180 associated with the central channel 47 are in direct fluid communication with an outlet 182, which delivers the ink to the underside of the ICs 50. The inlets 180 associated with the other channels 47 include tunnels 181 formed within the ink distribution member 48 which are in fluid communication with associated outlets 182 disposed remote from the inlets 180 to deliver ink to the underside of the ICs 50. As is shown, in this arrangement the outlets 182 are centrally arranged on the upper surface of the ink distribution member in a predetermined pattern, with the position of each outlet defining a point at which ink of a specific colour is delivered to the IC 50.

FIG. 34*b* is a magnified view of FIG. 34*a*, showing in detail the manner in which the ink is supplied to the underside of the ICs 50. The channels 98 formed on the underside of the IC 50 are clearly shown, as are the silicon walls 99 provided along the length of the channels 98, which divide the channels 98 into portions. As shown, the ICs 50 are positioned on the surface of the ink distribution member such that the outlets 182 align with the channels 98 at the junction of the channel portions, namely at the region where the silicon walls 99 are situated. This then ensures that one outlet 182 supplies ink to two channel portions, allowing a regular spacing of outlets to be achieved along the surface of the ink distribution member 48.

In the above described embodiment, the ink distribution member 48 is in the form of a on-piece element thereby overcoming the need to provide separate layers and reducing the complexity of the system, as sealing between layers is no longer required.

Following attachment and alignment of each of the printhead ICs 50 to the surface of the ink distribution member 48, a flex PCB 52 is attached along an edge of the ICs 50 so that control signals and power can be supplied to the bond bads 96 of the ICs 50 to effect printing. As shown more clearly in FIG. 20, the flex PCB 52 folds around the printhead assembly 22 in an upward direction with respect to the cartridge unit 10, and has a plurality of dimpled contacts 53 provided along its length for receiving power and or data signals from the control circuitry of the cradle unit 12. A plurality of holes 54 are also formed along the distal edge of the flex PCB 52 which provide a means for attaching the flex PCB 52 to the locating studs 38 formed on the main body 20, such that the dimpled contacts 53 of the flex PCB 52 extends over the flex PCB backer 37. The manner in which the dimpled contacts 53 of the flex PCB 52 contact the power and data contacts 128 of the cradle unit 12 is described later.

A media shield 55 is attached to the printhead assembly 22 along an edge thereof and acts to protect the printhead ICs 50 from damage which may occur due to contact with the passing media. The media shield 55 is attached to the upper moulding 42 upstream of the printhead ICs 50 as shown more clearly in FIG. 21, via an appropriate clip-lock arrangement or via an adhesive. When attached in this manner, the printhead ICs 50 sit below the surface of the media shield 55, out of the path of the passing media.

Figure 21:
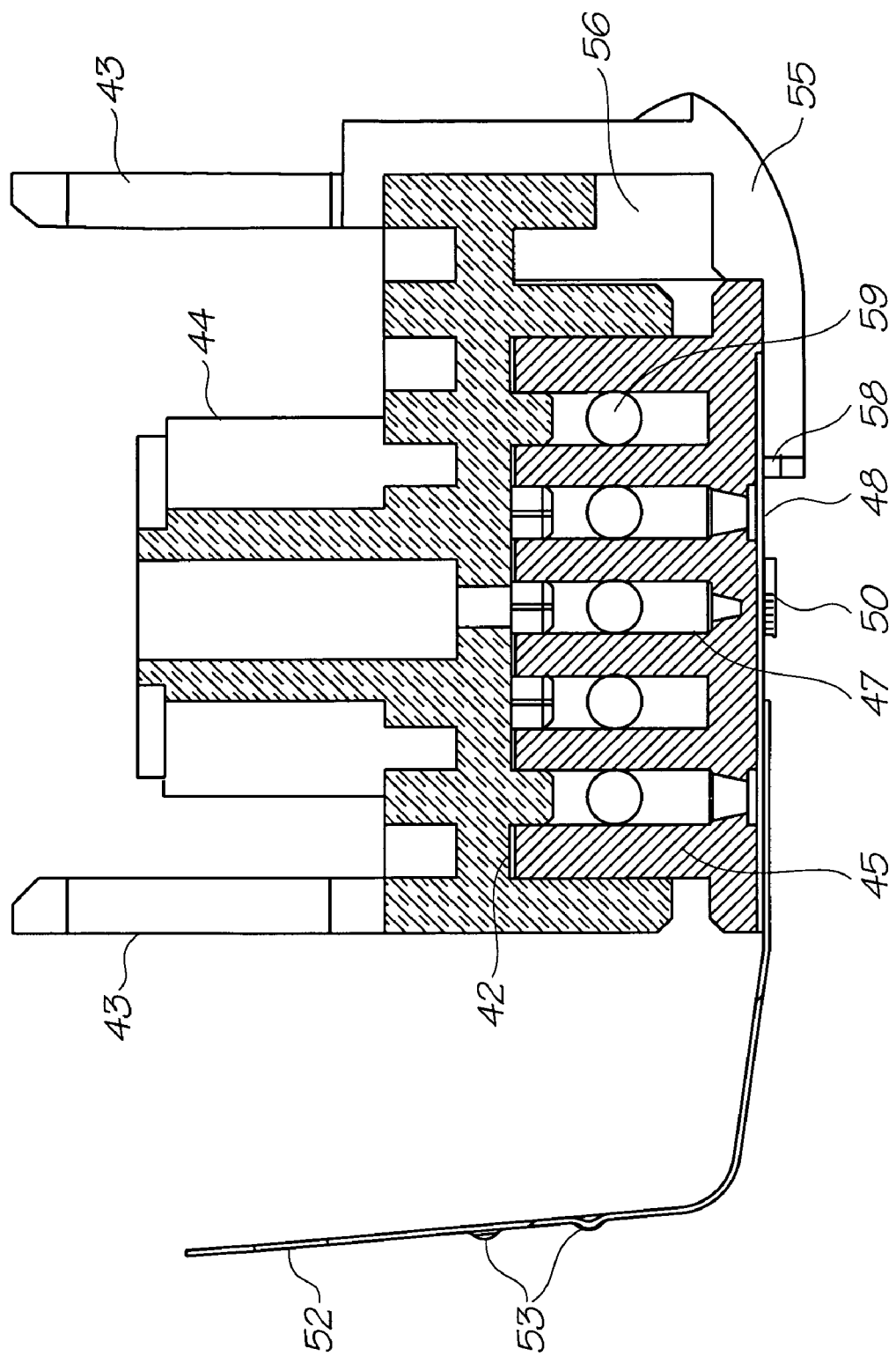
FIG. 21 shows a cross-sectional end view of the printhead assembly of FIG. 18.

As shown in FIGS. 20 and 21, a space 56 is provided between the media shield 55 and the upper 42 and lower 45 moulding which can receive pressurized-air from an air compressor or the like. As this space 56 extends along the length of the printhead assembly 22, compressed air can be supplied to the space 56 from either end of the printhead assembly 22 and be evenly distributed along the assembly. The inner surface 57 of the media shield 55 is provided with a series of fins 58 which define a plurality of air outlets evenly distributed along the length of the media shield 55 through which the compressed air travels. This arrangement therefore provides a stream of air across the printhead ICs 50 in the direction of the media delivery which acts to prevent dust and other particulate matter carried with the media from settling on the surface of the printhead ICs, which could cause blockage and damage to the nozzles.

A cross section of the complete printhead assembly 22 is shown in FIG. 21. As shown, ink is received from the ink storage compartments 24 via the ink inlets 44 of the upper moulding 42, which feed the ink directly into one of the ink channels 47 of the lower moulding 45. The ink is in turn fed from the ink channels 47 to the ink delivery nozzles 51 of the printhead ICs 50 by way of the ink distribution member 48.

As shown in FIGS. 20 and 21, the lower moulding 45 is provided with a plurality of priming inlets 59 at one end thereof. Each of the priming inlets 59 communicate directly with one of the channels 47 and provide a means for priming the printhead assembly 22 and the ink storage compartments 24 with ink prior to shipment and use. Various ways in which the priming is achieved will now be described with reference to FIGS. 35-40.

Figure 35:
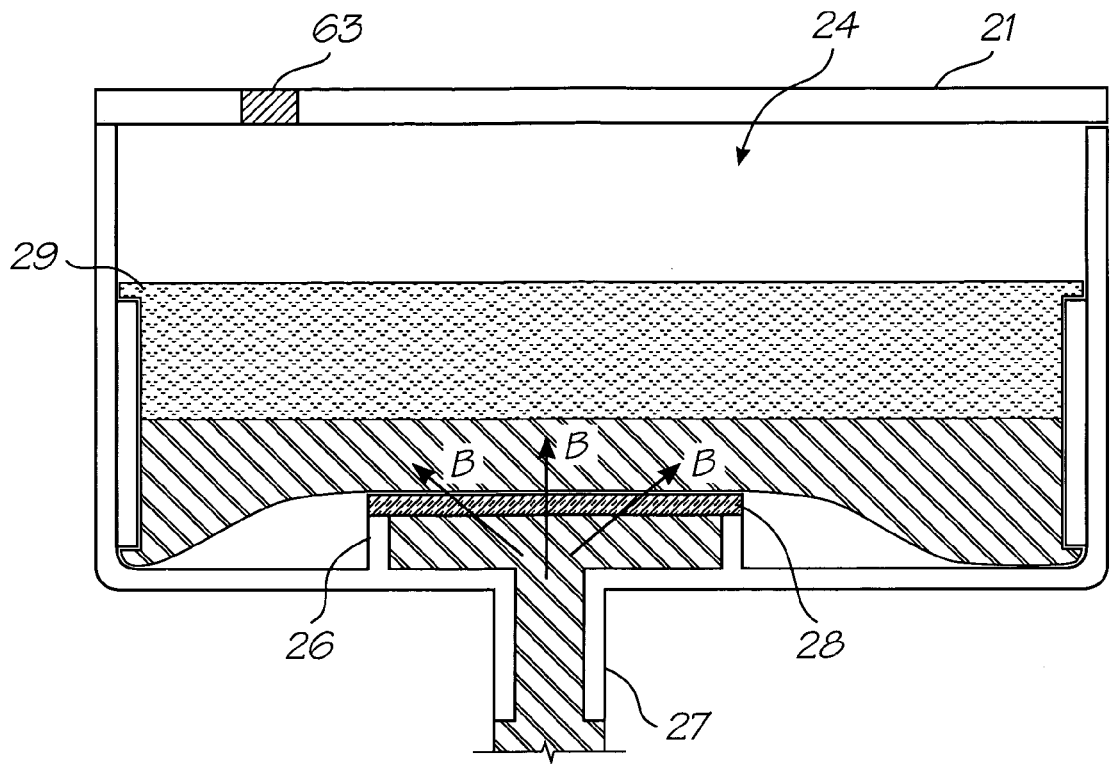
FIG. 35 shows a schematic view of a priming arrangement for priming an ink storage compartment of the present invention.
Figure 36:
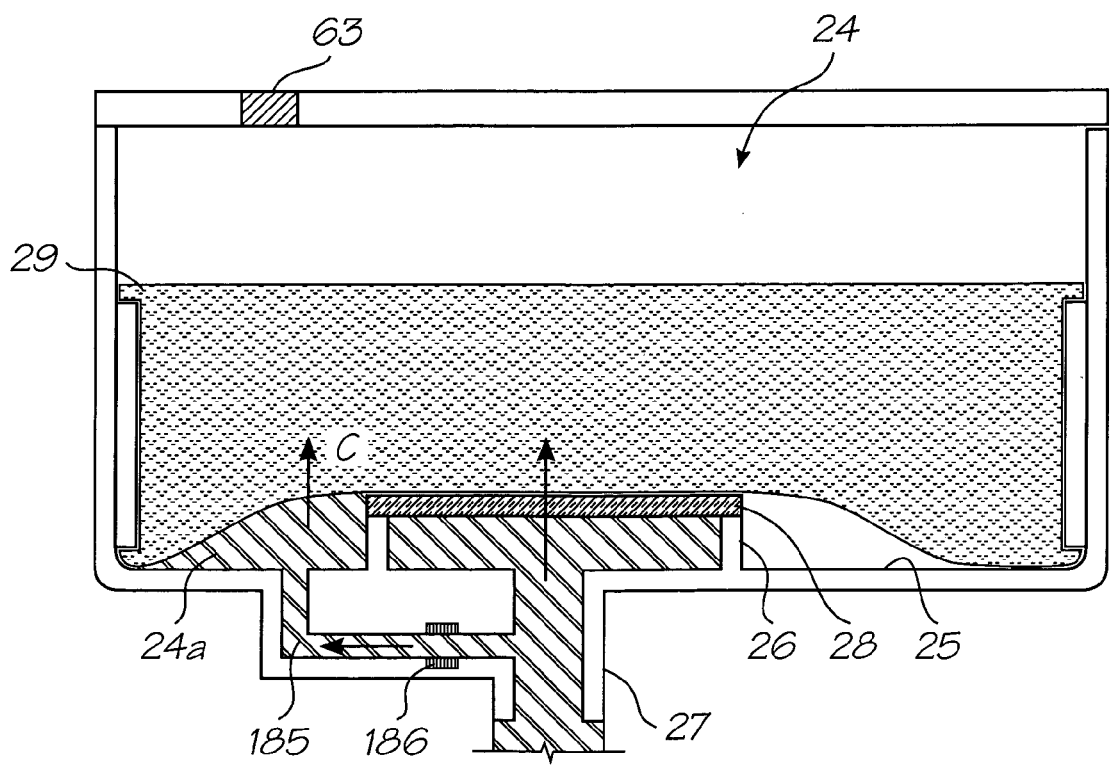
FIG. 36 shows a schematic view of an alternative priming arrangement for priming an ink storage compartment of the present invention.

FIG. 35 is a simplified cross-sectional representation of an ink storage compartment 24 as described previously. Ink is primed into the absorbent material 29 through the ink outlet 27 which links the compartment 24 to the channels 47 of the printhead assembly 22. In this regard, the ink is supplied via the priming inlets 59 along the channels 47 of the lower moulding 45, with each-channel 47 in fluid communication with one ink outlet 27 of an ink storage compartment 24 to deliver ink of a specific type/colour to that ink storage compartment 24.

Priming of the ink storage compartments 24 is typically performed prior to shipment of the cartridge unit 10 and as such, an ink source can be temporarily attached to the priming inlets 59, wherein upon completion of priming, the priming inlets can be capped/sealed.

As discussed above, priming ink is supplied under pressure to the ink storage compartment 24 via the ink outlets 27. The priming ink flows into the space between the ink filter/air barrier 28 and the outlet 27, and is absorbed into the absorbent material 29 through the ink filter/air barrier 28. As discussed above, due to the porous nature of the absorbent material 29 the ink becomes suspended within the absorbent material due to capillary attraction forces. By keeping the upper surface of the absorbent material 29 dry and exposed to atmospheric pressure through the vent hole 63, the ink is able to be continually drawn into the pores of the absorbent material 29 via capillary action (as shown by arrows B).

As discussed above, ink present in the channels 47 of the lower moulding 45 is also supplied to the ink delivery nozzles 51 of the integrated circuits 50, via the ink distribution member 48. During the above described priming process, the ink flows to the nozzles 51 to prime the individual nozzles with ink, and due to the capillary action of the absorbent material 29 in the ink storage compartments 24, a sufficient backpressure is established in the ink supply to prevent leakage of the ink out of the nozzles 51.

In this regard, the priming operation is ceased before the absorbent material becomes completely saturated and its upper surface becomes wet with ink, so that the necessary backpressure can be maintained. This may be controlled by limiting the supply of ink or by more sophisticated methods, such as sensing the level of ink within the body. Hydrophobic material may also be used on the surface of the ICs 50 in the vicinity of the nozzles 51 so as to assist in leakage prevention.

In the above-described arrangement, it may be necessary to maintain the pressure of the supplied ink to be below a level which ensures the ink is not ejected through the nozzle outlets 51 during priming. Practically, this situation may increase the required time necessary to prime the cartridge unit 10.

An alternative embodiment for configuring the ink storage compartments 24 which provides a means of substantially obviating the need to limit the ink pressure during priming is illustrated in FIGS. 35 to 39. In this embodiment, a bypass fluid path 185 is provided in fluid communication with the ink outlet 27.

The bypass fluid path 185 allows the priming ink an additional path into the ink storage compartment 24 where it can be absorbed by the absorbent material 29. In this regard, the priming ink does not only flow through the ink filter air barrier 28 directly into the absorbent material 29, but can also flow into at least a portion of a well region 24a of the compartment 24, as illustrated by arrows C in FIG. 36. The well region 24a is the annular region surrounding the raised portions 26 on the base 25 of the compartments where there is a gap between the base 25 of the compartment 24 and the absorbent material 29. This well region 24a defines a space where the priming ink can be readily delivered via the bypass fluid path 185.

With this arrangement, by providing more than one path for the ink to enter the ink storage compartment 24, a larger surface area of the absorbent material 29 is exposed to the priming ink and as such the ink is drawn into the absorbent material more quickly and the supply pressure of the priming ink can be reduced.

Figure 37:
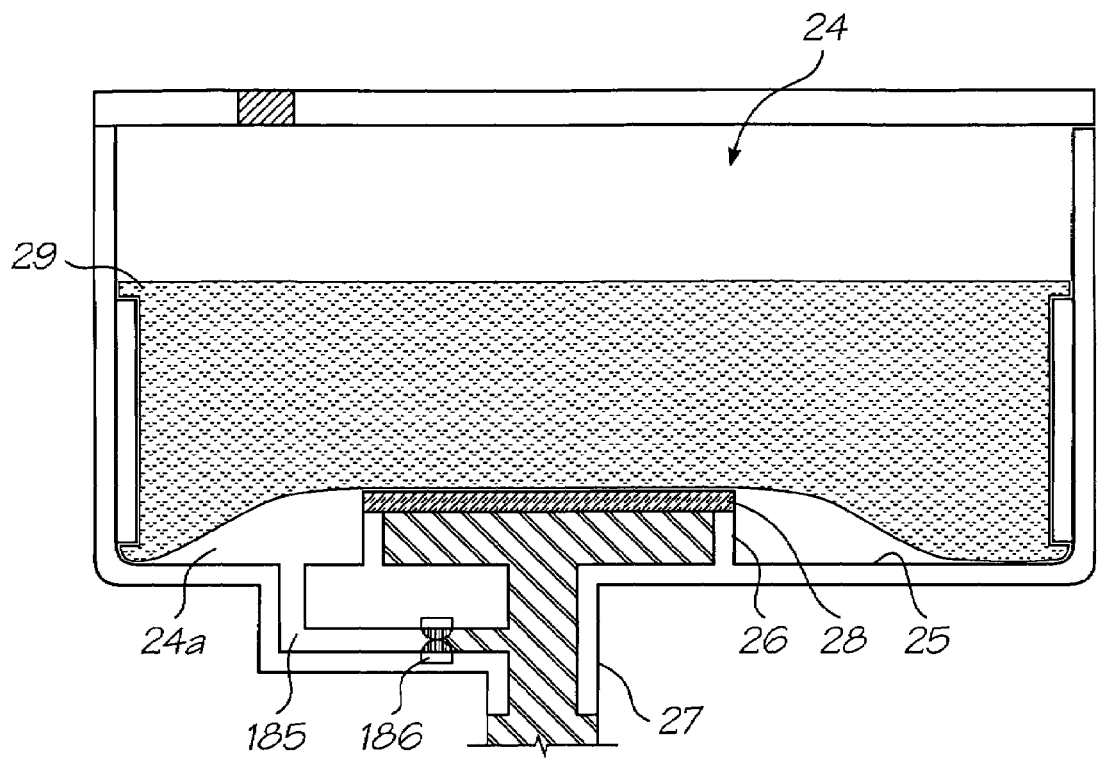
FIG. 37 shows a schematic view of the priming arrangement of FIG. 36 with the bypass valve in the closed position.
Figure 38:
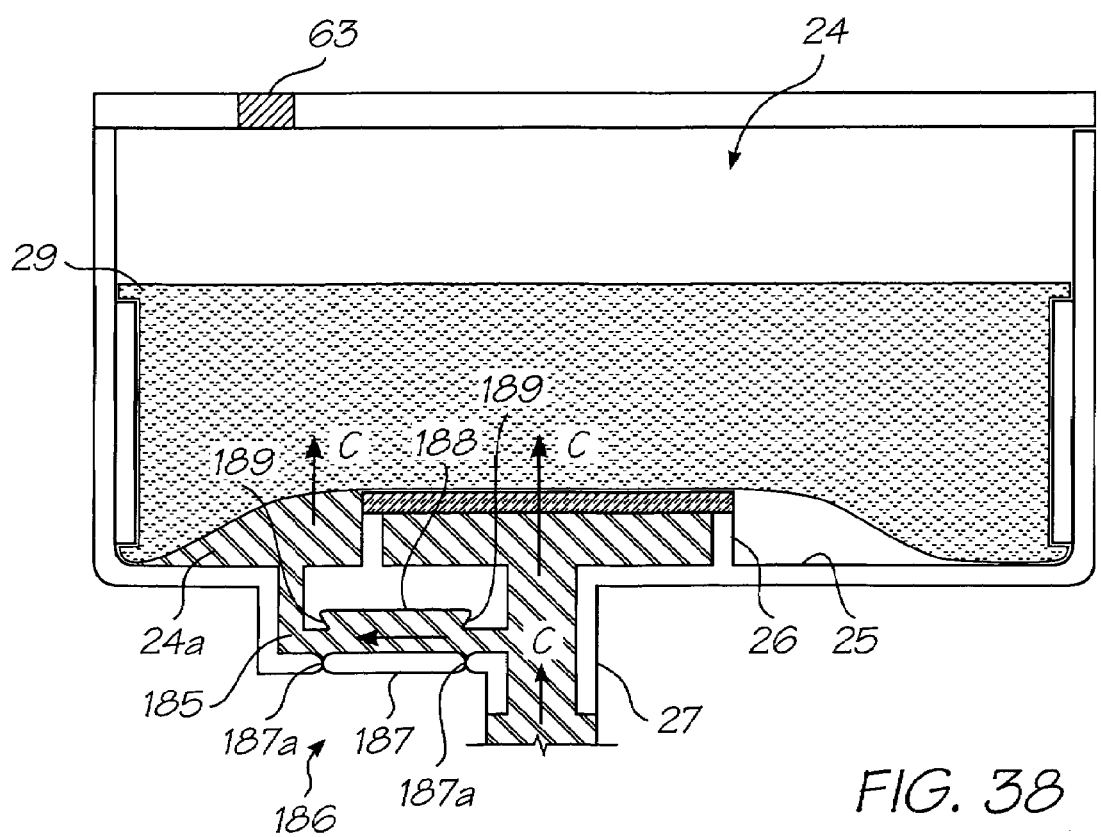
FIG. 38 shows a schematic view of yet another alternative priming arrangement for priming an ink storage compartment of the present invention.
Figure 39:
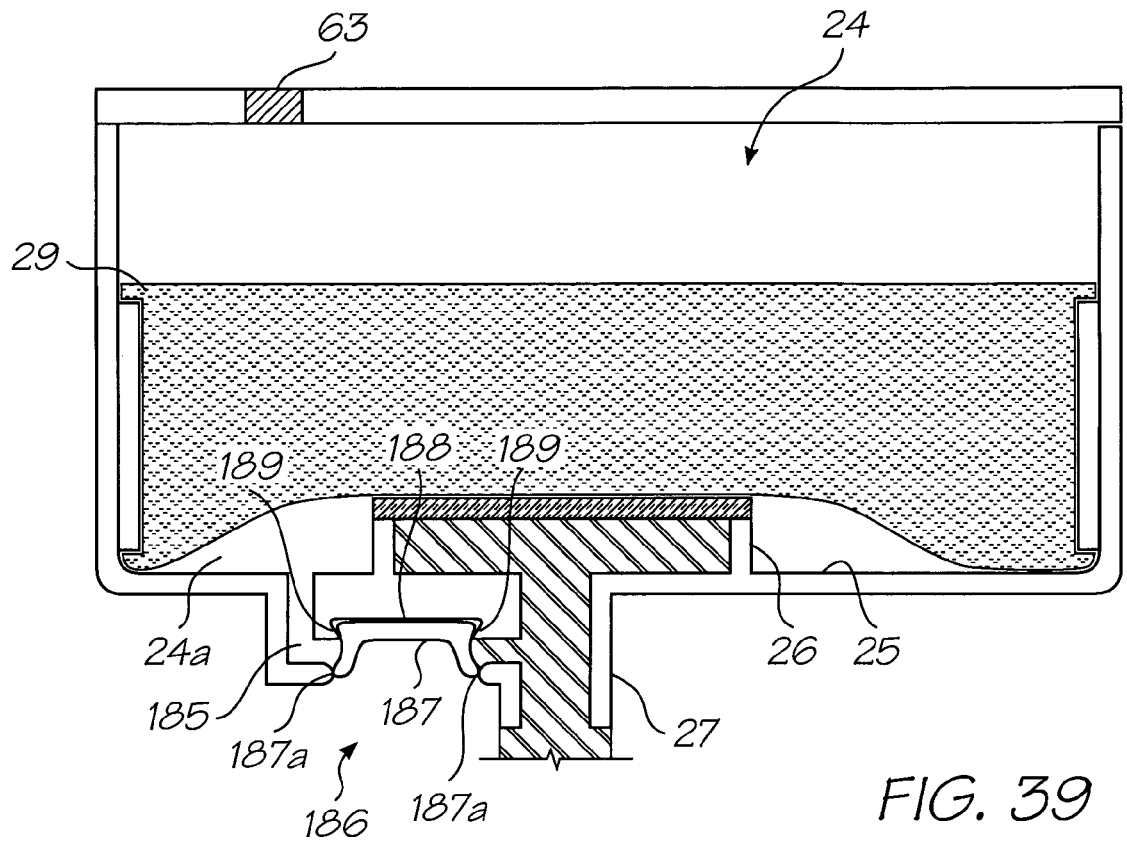
FIG. 39 shows a schematic view of the alternative priming arrangement of FIG. 38 with the bypass valve in a closed position.

The path 185 is provided with a bypass valve 186 which is open during initial priming of the cartridge unit 10 and is closed upon completion of the priming operation, as shown in FIG. 37. The bypass valve 186 may be provided by way of a variety of arrangements and may be either manually or automatically controlled. For example, the bypass valve 186 may be provided as a manual depression button as illustrated in FIGS. 38 and 39.

In this arrangement, the bypass valve 186 is in the form of a button 187 provided as a flexible portion of the bottom wall of the path 185. The button 187 may be made from a rubber material and may be connected to the wall of the path 185 via an annular weakened portion 187*a*. Initially, and during priming, the button 187 is positioned as shown in FIG. 38 to allow the priming ink to flow through the path 185. Once priming is complete, the path 185 is closed by depressing the button 187 into a circular recessed region 188 of the internal wall of the path 185. In this regard, the button 187 is captured by the lip 189 and retained therein, thereby blocking the bypass valve 186, as shown in FIG. 39.

It will be appreciated that those skilled in the art will understand that other bypass valve structures are possible and encompassed by the present invention. For example, a simple alternative to the above may be providing the additional fluid path 185 as a compressible silicon tube or the like.

The bypass valve 186 may be configured to be irreversibly closed once the priming is completed. On the other hand, if refilling of the storage compartments via the priming inlets of the printhead assembly 22 is desired, a bypass valve capable of being opened and closed without limit may be provided.

Figure 40:
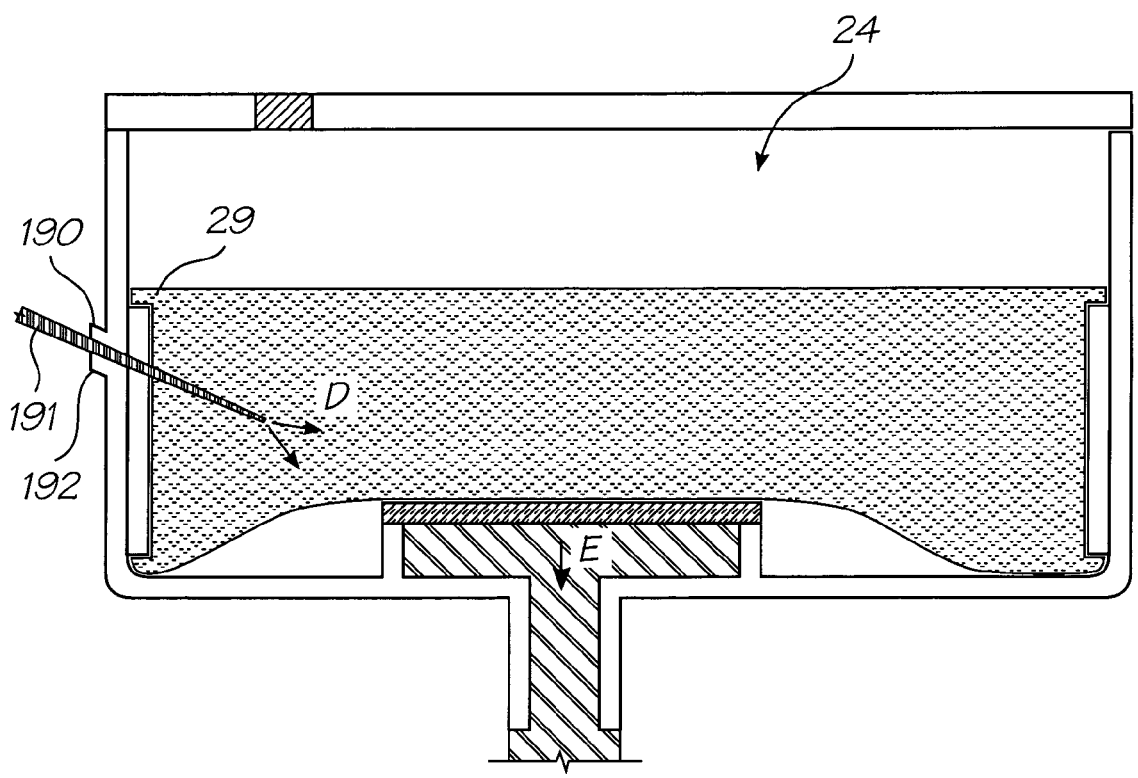
FIG. 40 shows yet another alternative arrangement for priming the ink storage compartment of the present invention, employing a needle which passes through the side wall of the compartment.

Another embodiment of the ink storage compartments 24 which provides an alternative or additional arrangement for priming the compartments 24 with ink is illustrated in FIG. 40.

In this arrangement, a port 190 is provided in at least one of the side walls of each compartment 24 in a position below the upper surface of the absorbent material 29. The ports 190 are provided for the insertion of a needle 191 from an external ink source syringe or the like (not shown) which penetrates into the absorbent material 29, and through which the priming ink is supplied into the body. The ports 190 are configured so that the needle 191 supplies the priming ink towards the lower portion of the absorbent material 29, shown with arrows D in FIG. 40, so as to prevent wetting of the uppermost portion of the absorbent material 29, for the reasons discussed above.

Each port 190 is provided with a valve 192 which allows penetration of the needle 191 and is sealed when the needle is extracted and at other times. For example, the valve 192 may incorporate an elastomeric seal.

In this way, the priming ink is delivered directly to the absorbent material 29 and through capillary force is suspended therein for delivery to the nozzles of the printhead assembly 22, as shown with arrow E in FIG. 40.

The arrangement of this embodiment may be provided independently of those of the above-described embodiments, or may be used in conjunction with those arrangements to provide an additional refilling mechanism for the ink storage compartments 24.

Ink Delivery Nozzles

Figure 49:
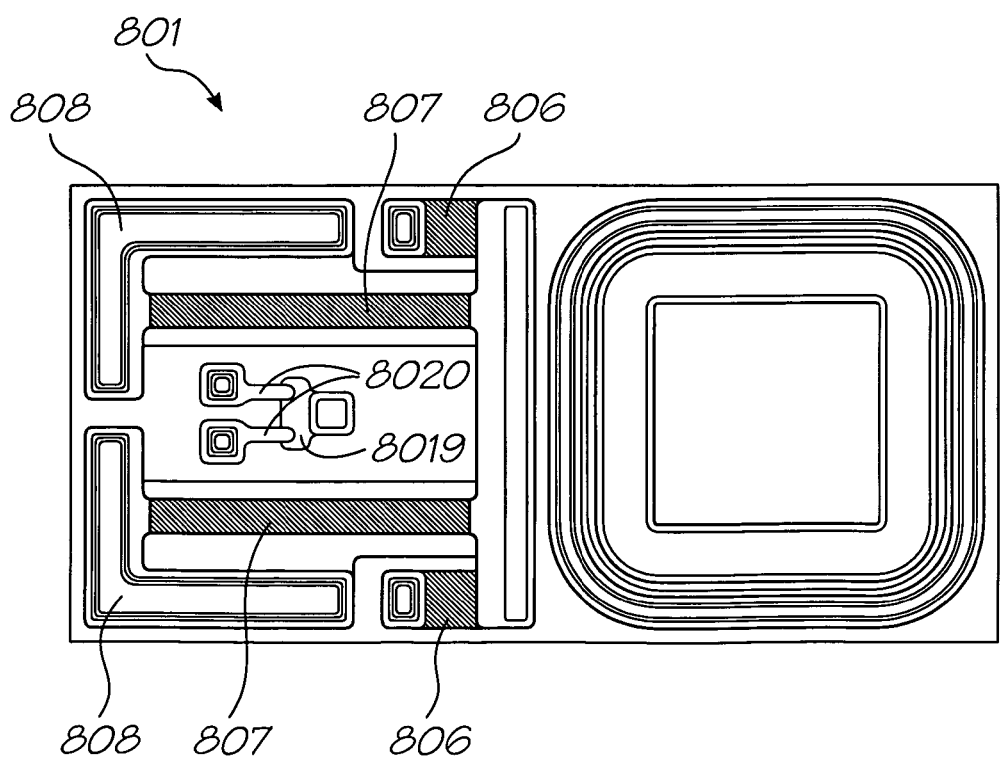
FIG. 49 shows a plan view of the nozzle of FIG. 41 with the lever arm and movable nozzle removed for clarity.
Figure 50:
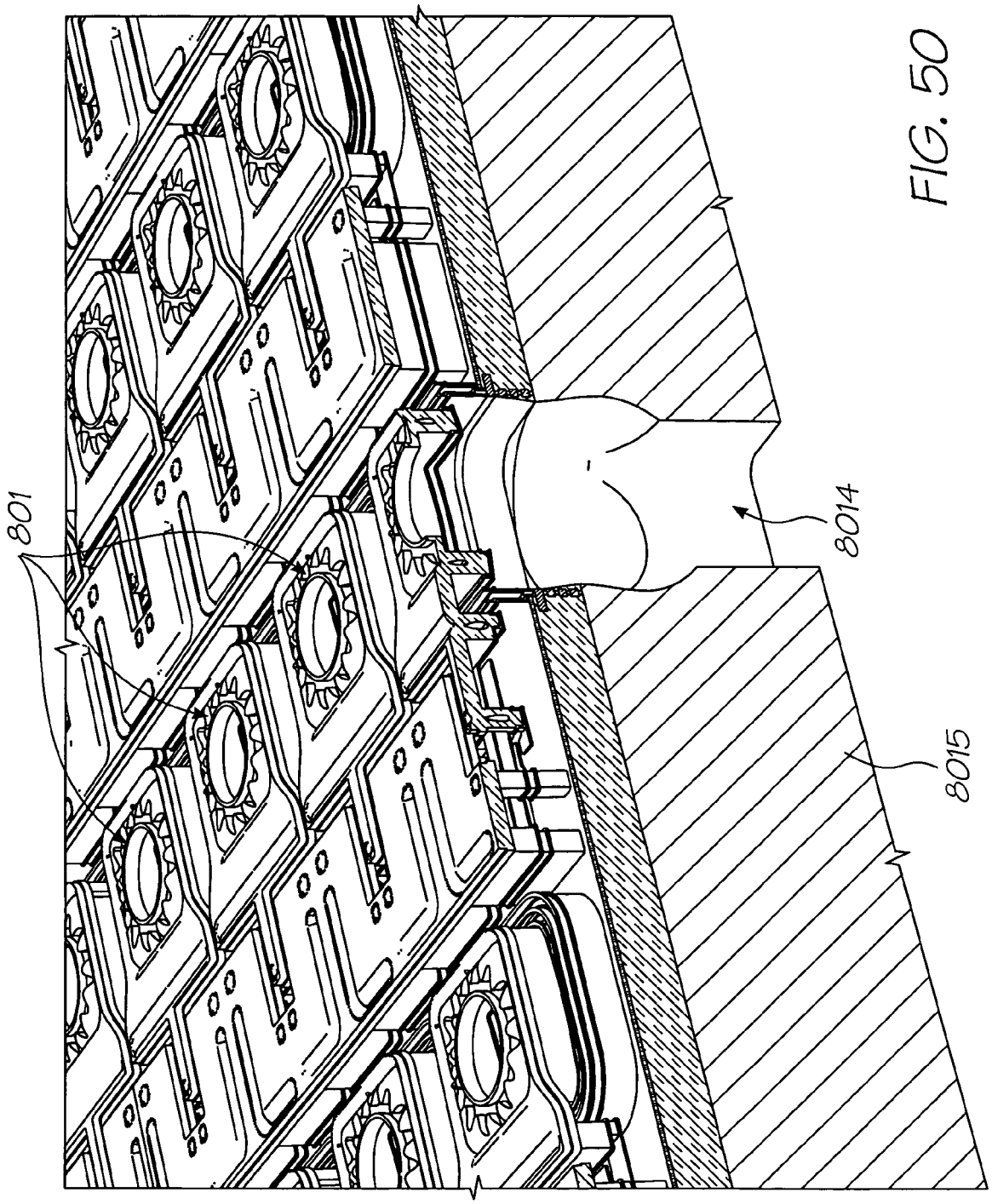
FIG. 50 shows a perspective vertical sectional view of a part of a printhead chip incorporating a plurality of the nozzle arrangements of the type shown in FIG. 41.

An example of a type of ink delivery nozzle arrangement suitable for the present invention, comprising a nozzle and corresponding actuator, will now be described with reference to FIGS. 41 to 50. FIG. 50 shows an array of ink delivery nozzle arrangements 801 formed on a silicon substrate 8015. Each of the nozzle arrangements 801 are identical, however groups of nozzle arrangements 801 are arranged to be fed with different colored inks or fixative. In this regard, the nozzle arrangements are arranged in rows and are staggered with respect to each other, allowing closer spacing of ink dots during printing than would be possible with a single row of nozzles. Such an arrangement makes it possible to provide a high density of nozzles, for example, more than 5000 nozzles arrayed in a plurality of staggered rows each having an interspacing of about 32 microns between the nozzles in each row and about 80 microns between the adjacent rows. The multiple rows also allow for redundancy (if desired), thereby allowing for a predetermined failure rate per nozzle.

Each nozzle arrangement 801 is the product of an integrated circuit fabrication technique. In particular, the nozzle arrangement 801 defines a micro-electromechanical system (MEMS).

For clarity and ease of description, the construction and operation of a single nozzle arrangement 801 will be described with reference to FIGS. 41 to 49.

The inkjet printhead integrated circuit 50 includes a silicon wafer substrate 8015 having 0.35 Micron 1 P4M 12 volt CMOS microprocessing electronics is positioned thereon.

A silicon dioxide (or alternatively glass) layer 8017 is positioned on the substrate 8015. The silicon dioxide layer 8017 defines CMOS dielectric layers. CMOS top-level metal defines a pair of aligned aluminium electrode contact layers 8030 positioned on the silicon dioxide layer 8017. Both the silicon wafer substrate 8015 and the silicon dioxide layer 8017 are etched to define an ink inlet channel 8014 having a generally circular cross section (in plan). An aluminium diffusion barrier 8028 of CMOS metal 1, CMOS metal 2/3 and CMOS top level metal is positioned in the silicon dioxide layer 8017 about the ink inlet channel 8014. The diffusion barrier 8028 serves to inhibit the diffusion of hydroxyl ions through CMOS oxide layers of the drive electronics layer 8017.

A passivation layer in the form of a layer of silicon nitride 8031 is positioned over the aluminium contact layers 8030 and the silicon dioxide layer 8017. Each portion of the passivation layer 8031 positioned over the contact layers 8030 has an opening 8032 defined therein to provide access to the contacts 8030.

Figure 44:
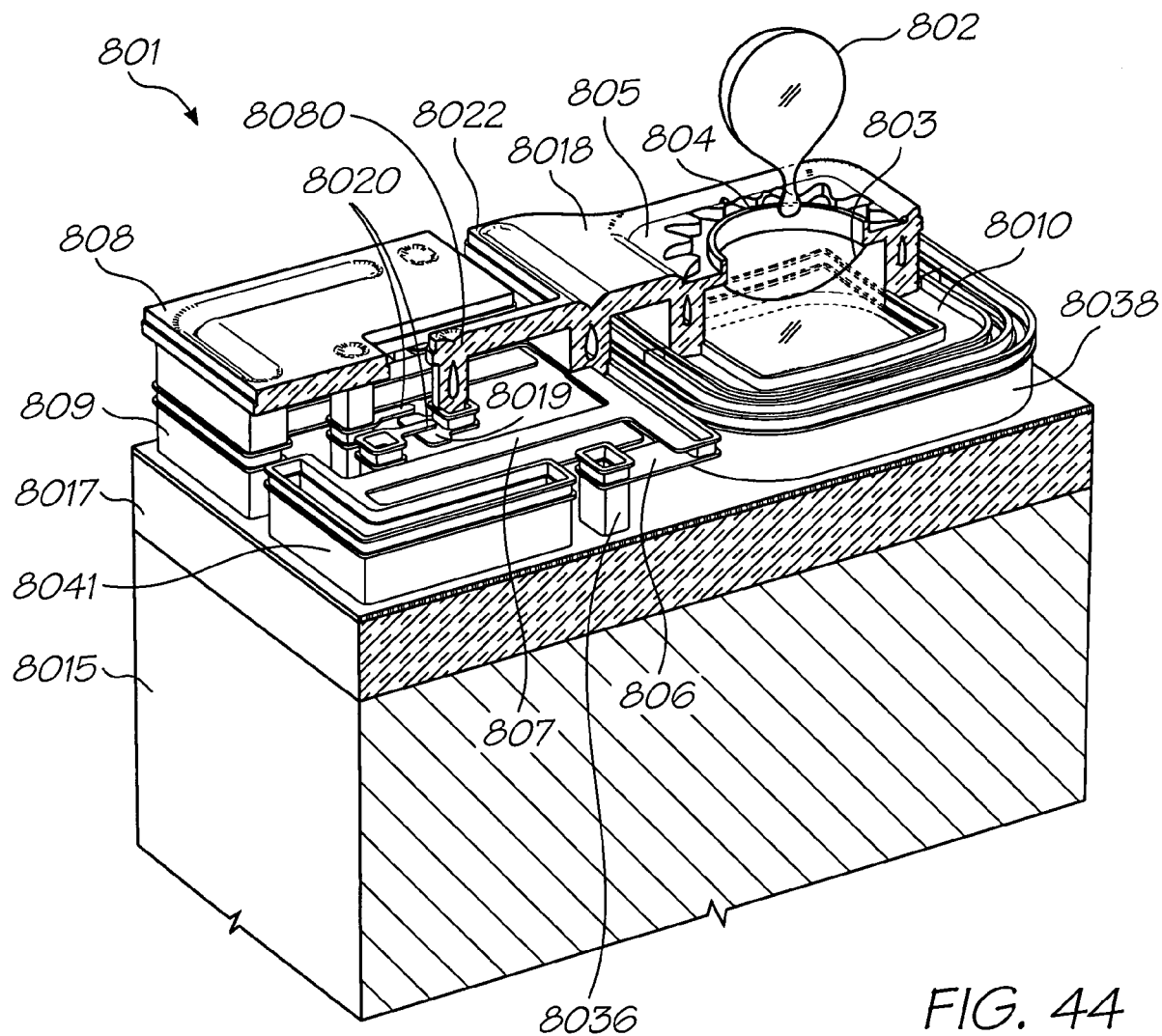
FIG. 44 shows a perspective partial vertical sectional view of the nozzle of FIG. 41, at the actuation state shown in FIG. 43.
Figure 45:
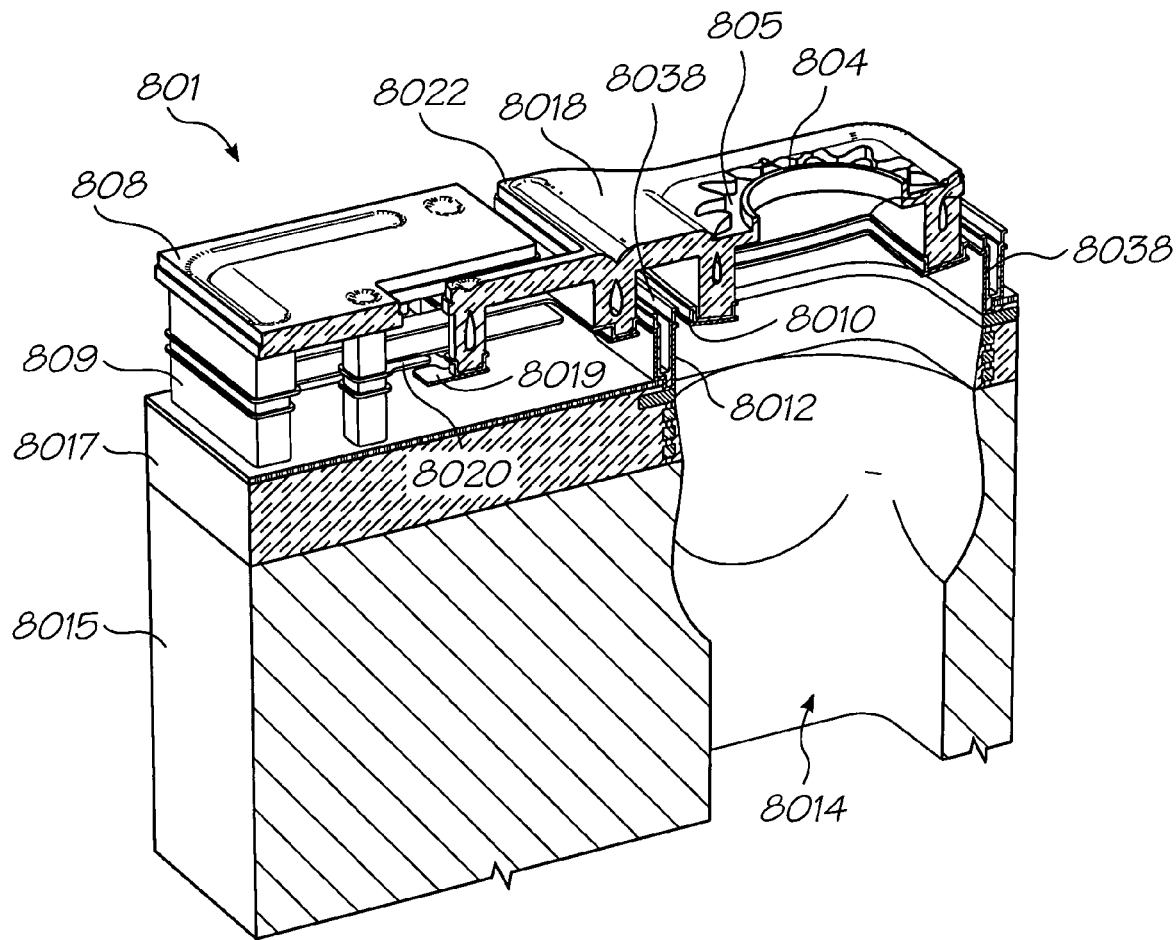
FIG. 45 shows a perspective vertical section of the nozzle of FIG. 41, with ink omitted.
Figure 46:
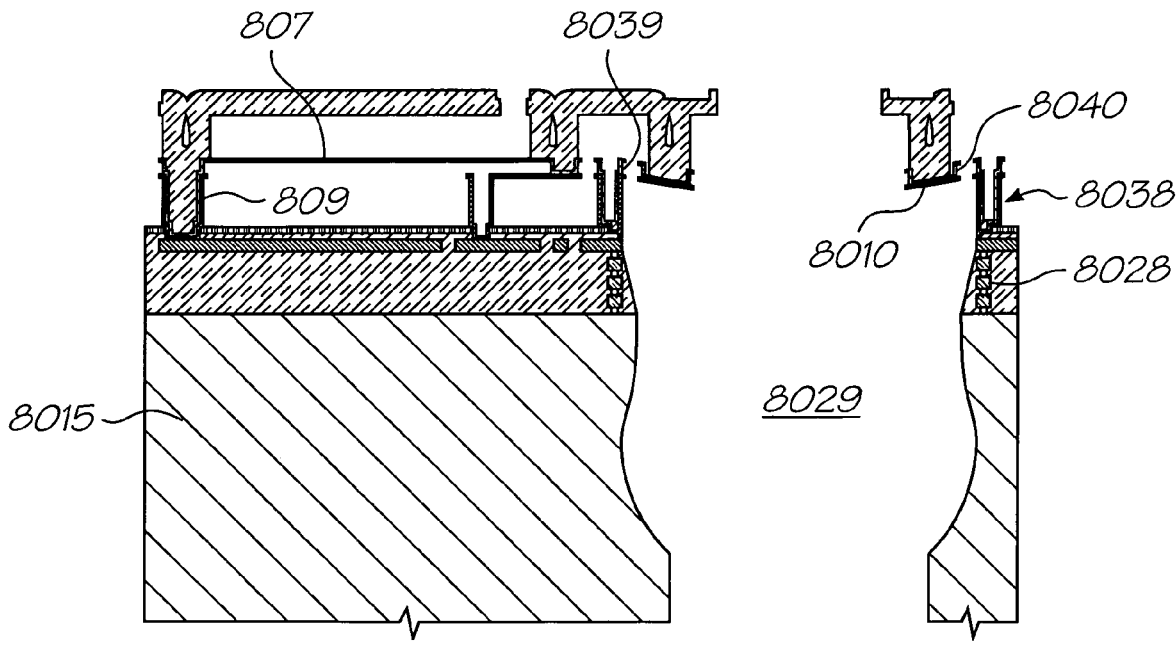
FIG. 46 shows a vertical sectional view of the of the nozzle of FIG. 45.

The nozzle arrangement 801 includes a nozzle chamber 8029 defined by an annular nozzle wall 8033, which terminates at an upper end in a nozzle roof 8034 and a radially inner nozzle rim 804 that is circular in plan. The ink inlet channel 8014 is in fluid communication with the nozzle chamber 8029. At a lower end of the nozzle wall, there is disposed a moving rim 8010, that includes a moving seal lip 8040. An encircling wall 8038 surrounds the movable nozzle, and includes a stationary seal lip 8039 that, when the nozzle is at rest as shown in FIG. 44, is adjacent the moving rim 8010. A fluidic seal 8011 is formed due to the surface tension of ink trapped between the stationary seal lip 8039 and the moving seal lip 8040. This prevents leakage of ink from the chamber whilst providing a low resistance coupling between the encircling wall 8038 and the nozzle wall 8033.

Figure 48:
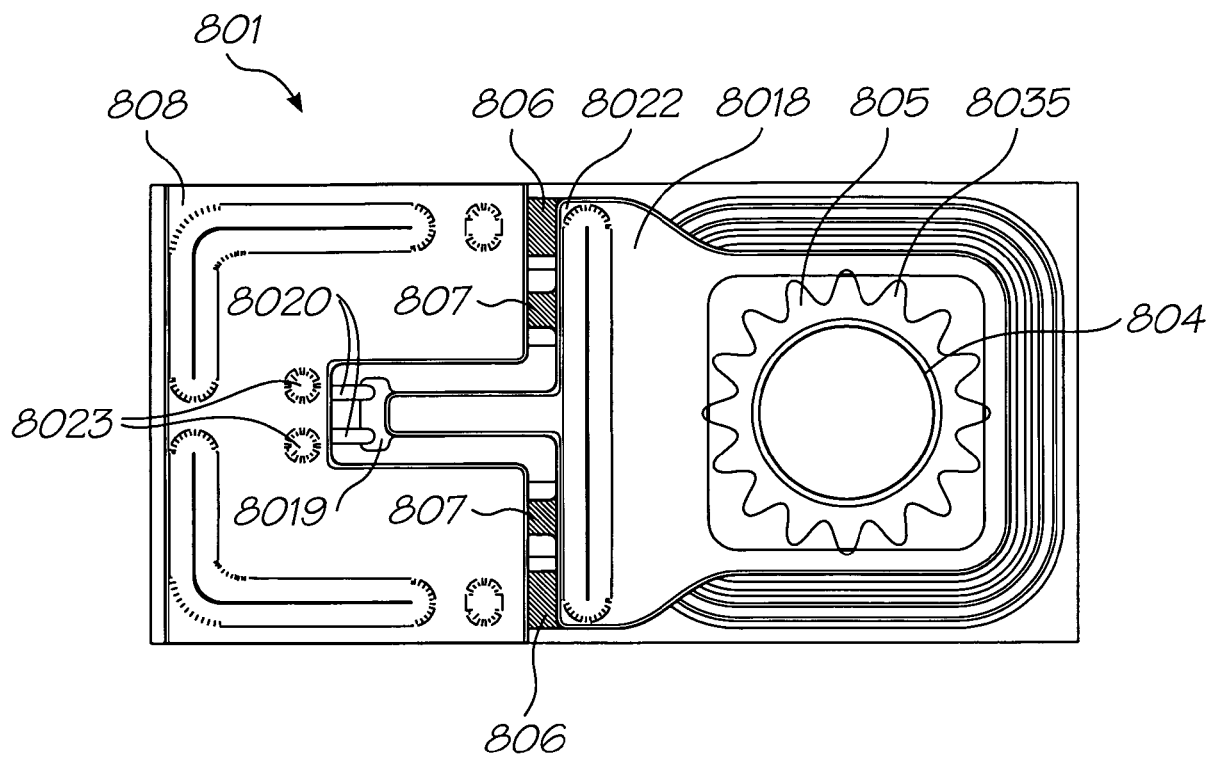
FIG. 48 shows a plan view of the nozzle of FIG. 41.

As best shown in FIG. 48, a plurality of radially extending recesses 8035 is defined in the roof 8034 about the nozzle rim 804. The recesses 8035 serve to contain radial ink flow as a result of ink escaping past the nozzle rim 804.

The nozzle wall 8033 forms part of a lever arrangement that is mounted to a carrier 8036 having a generally U-shaped profile with a base 8037 attached to the layer 8031 of silicon nitride.

The lever arrangement also includes a lever arm 8018 that extends from the nozzle walls and incorporates a lateral stiffening beam 8022. The lever arm 8018 is attached to a pair of passive beams 806, formed from titanium nitride (TiN) and positioned on either side of the nozzle arrangement, as best shown in FIG. 44 and 49. The other ends of the passive beams 806 are attached to the carrier 8036.

The lever arm 8018 is also attached to an actuator beam 807, which is formed from TiN. It will be noted that this attachment to the actuator beam is made at a point a small but critical distance higher than the attachments to the passive beam 806.

Figure 41:
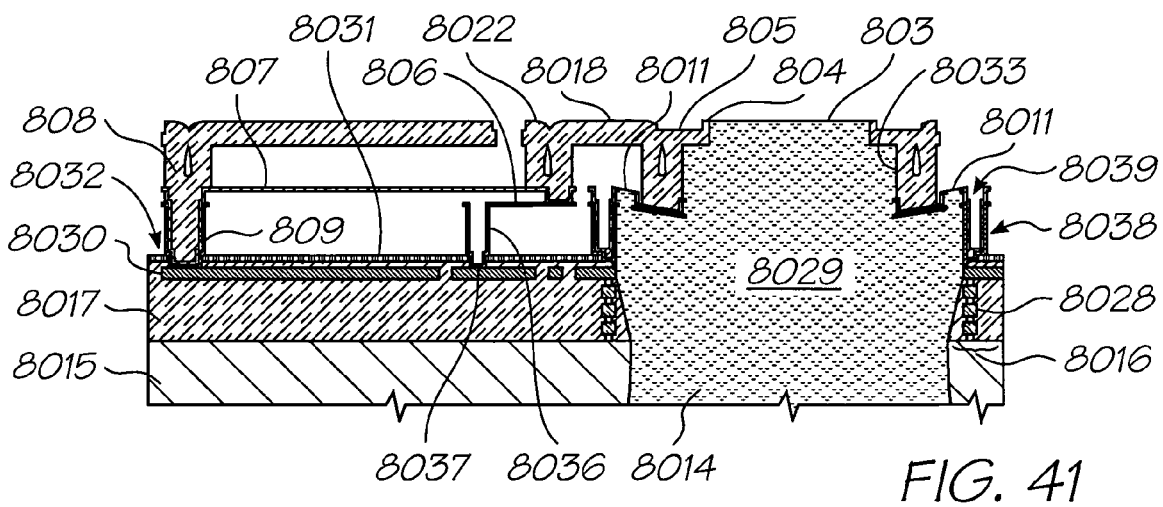
FIG. 41 shows a vertical sectional view of a single nozzle for ejecting ink, for use with the invention, in a quiescent state.
Figure 47:
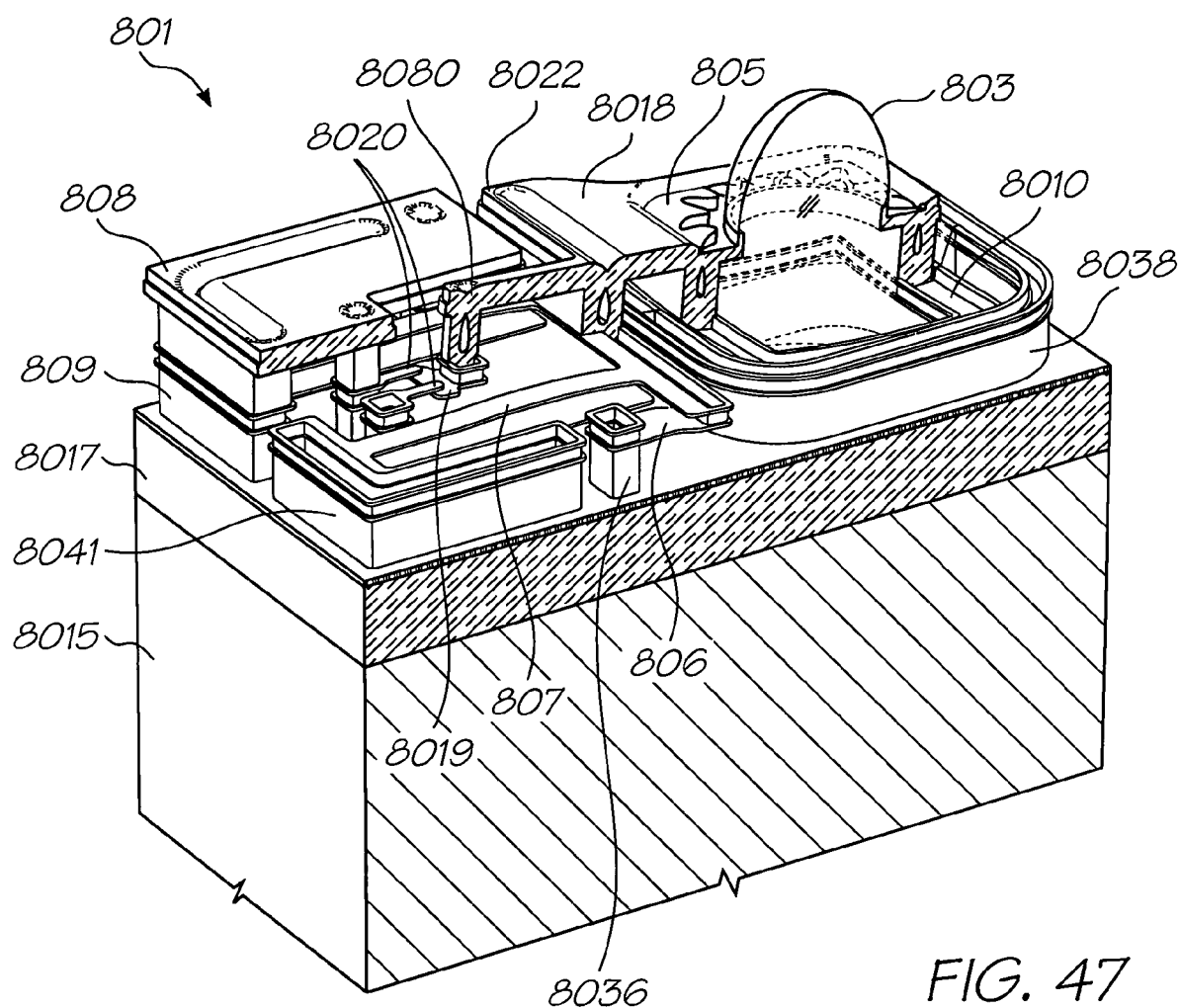
FIG. 47 shows a perspective partial vertical sectional view of the nozzle of FIG. 41, at the actuation state shown in FIG. 42.

As best shown in FIGS. 41 and 47, the actuator beam 807 is substantially U-shaped in plan, defining a current path between the electrode 809 and an opposite electrode 8041. Each of the electrodes 809 and 8041 are electrically connected to respective points in the contact layer 8030. As well as being electrically coupled via the contacts 809, the actuator beam is also mechanically anchored to anchor 808. The anchor 808 is configured to constrain motion of the actuator beam 807 to the left of FIGS. 44 to 46 when the nozzle arrangement is in operation.

The TiN in the actuator beam 807 is conductive, but has a high enough electrical resistance that it undergoes self-heating when a current is passed between the electrodes 809 and 8041. No current flows through the passive beams 806, so they do not expand.

In use, the device at rest is filled with ink 8013 that defines a meniscus 803 under the influence of surface tension. The ink is retained in the chamber 8029 by the meniscus, and will not generally leak out in the absence of some other physical influence.

Figure 42:
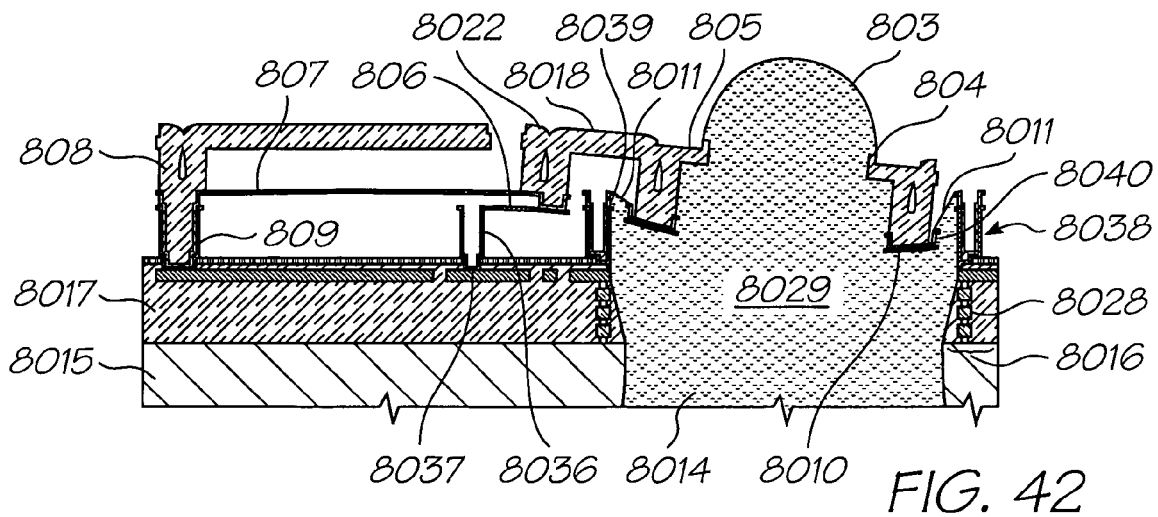
FIG. 42 shows a vertical sectional view of the nozzle of FIG. 41 during an initial actuation phase.

As shown in FIG. 42, to fire ink from the nozzle, a current is passed between the contacts 809 and 8041, passing through the actuator beam 807. The self-heating of the beam 807 due to its resistance causes the beam to expand. The dimensions and design of the actuator beam 807 mean that the majority of the expansion in a horizontal direction with respect to FIGS. 41 to 43. The expansion is constrained to the left by the anchor 808, so the end of the actuator beam 807 adjacent the lever arm 8018 is impelled to the right.

The relative horizontal inflexibility of the passive beams 806 prevents them from allowing much horizontal movement the lever arm 8018. However, the relative displacement of the attachment points of the passive beams and actuator beam respectively to the lever arm causes a twisting movement that causes the lever arm 8018 to move generally downwards. The movement is effectively a pivoting or hinging motion. However, the absence of a true pivot point means that the rotation is about a pivot region defined by bending of the passive beams 806.

The downward movement (and slight rotation) of the lever arm 8018 is amplified by the distance of the nozzle wall 8033 from the passive beams 806. The downward movement of the nozzle walls and roof causes a pressure increase within the chamber 8029, causing the meniscus to bulge as shown in FIG. 42. It will be noted that the surface tension of the ink means the fluid seal 8011 is stretched by this motion without allowing ink to leak out.

Figure 43:
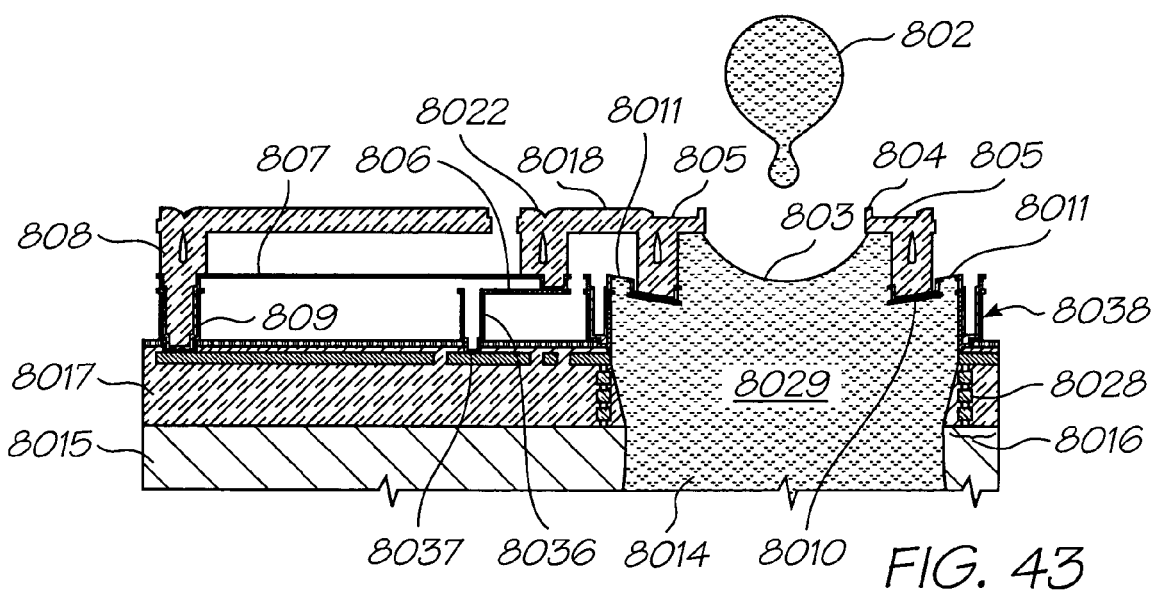
FIG. 43 shows a vertical sectional view of the nozzle of FIG. 42 later in the actuation phase.

As shown in FIG. 43, at the appropriate time, the drive current is stopped and the actuator beam 807 quickly cools and contracts. The contraction causes the lever arm to commence its return to the quiescent position, which in turn causes a reduction in pressure in the chamber 8029. The interplay of the momentum of the bulging ink and its inherent surface tension, and the negative pressure caused by the upward movement of the nozzle chamber 8029 causes thinning, and ultimately snapping, of the bulging meniscus to define an ink drop 802 that continues upwards until it contacts adjacent print media.

Immediately after the drop 802 detaches, meniscus 803 forms the concave shape shown in FIG. 43. Surface tension causes the pressure in the chamber 8029 to remain relatively low until ink has been sucked upwards through the inlet 8014, which returns the nozzle arrangement and the ink to the quiescent situation shown in FIG. 61.

Another type of printhead nozzle arrangement suitable for the present invention will now be described with reference to FIG. 51. Once again, for clarity and ease of description, the construction and operation of a single nozzle arrangement 1001 will be described.

The nozzle arrangement 1001 is of a bubble forming heater element actuator type which comprises a nozzle plate 1002 with a nozzle 1003 therein, the nozzle having a nozzle rim 1004, and aperture 1005 extending through the nozzle plate. The nozzle plate 1002 is plasma etched from a silicon nitride structure which is deposited, by way of chemical vapor deposition (CVD), over a sacrificial material which is subsequently etched.

The nozzle arrangement includes, with respect to each nozzle 1003, side walls 1006 on which the nozzle plate is supported, a chamber 1007 defined by the walls and the nozzle plate 1002, a multi-layer substrate 1008 and an inlet passage 1009 extending through the multi-layer substrate to the far side (not shown) of the substrate. A looped, elongate heater element 1010 is suspended within the chamber 1007, so that the element is in the form of a suspended beam. The nozzle arrangement as shown is a microelectromechanical system (MEMS) structure, which is formed by a lithographic process.

When the nozzle arrangement is in use, ink 1011 from a reservoir (not shown) enters the chamber 1007 via the inlet passage 1009, so that the chamber fills. Thereafter, the heater element 1010 is heated for somewhat less than 1 micro second, so that the heating is in the form of a thermal pulse. It will be appreciated that the heater element 1010 is in thermal contact with the ink 1011 in the chamber 1007 so that when the element is heated, this causes the generation of vapor bubbles in the ink. Accordingly, the ink 1011 constitutes a bubble forming liquid.

The bubble 1012, once generated, causes an increase in pressure within the chamber 1007, which in turn causes the ejection of a drop 1016 of the ink 1011 through the nozzle 1003. The rim 1004 assists in directing the drop 1016 as it is ejected, so as to minimize the chance of a drop misdirection.

The reason that there is only one nozzle 1003 and chamber 1007 per inlet passage 1009 is so that the pressure wave generated within the chamber, on heating of the element 1010 and forming of a bubble 1012, does not effect adjacent chambers and their corresponding nozzles.

The increase in pressure within the chamber 1007 not only pushes ink 1011 out through the nozzle 1003, but also pushes some ink back through the inlet passage 1009. However, the inlet passage 1009 is approximately 200 to 300 microns in length, and is only approximately 16 microns in diameter. Hence there is a substantial viscous drag. As a result, the predominant effect of the pressure rise in the chamber 1007 is to force ink out through the nozzle 1003 as an ejected drop 1016, rather than back through the inlet passage 1009.

Figure 51:
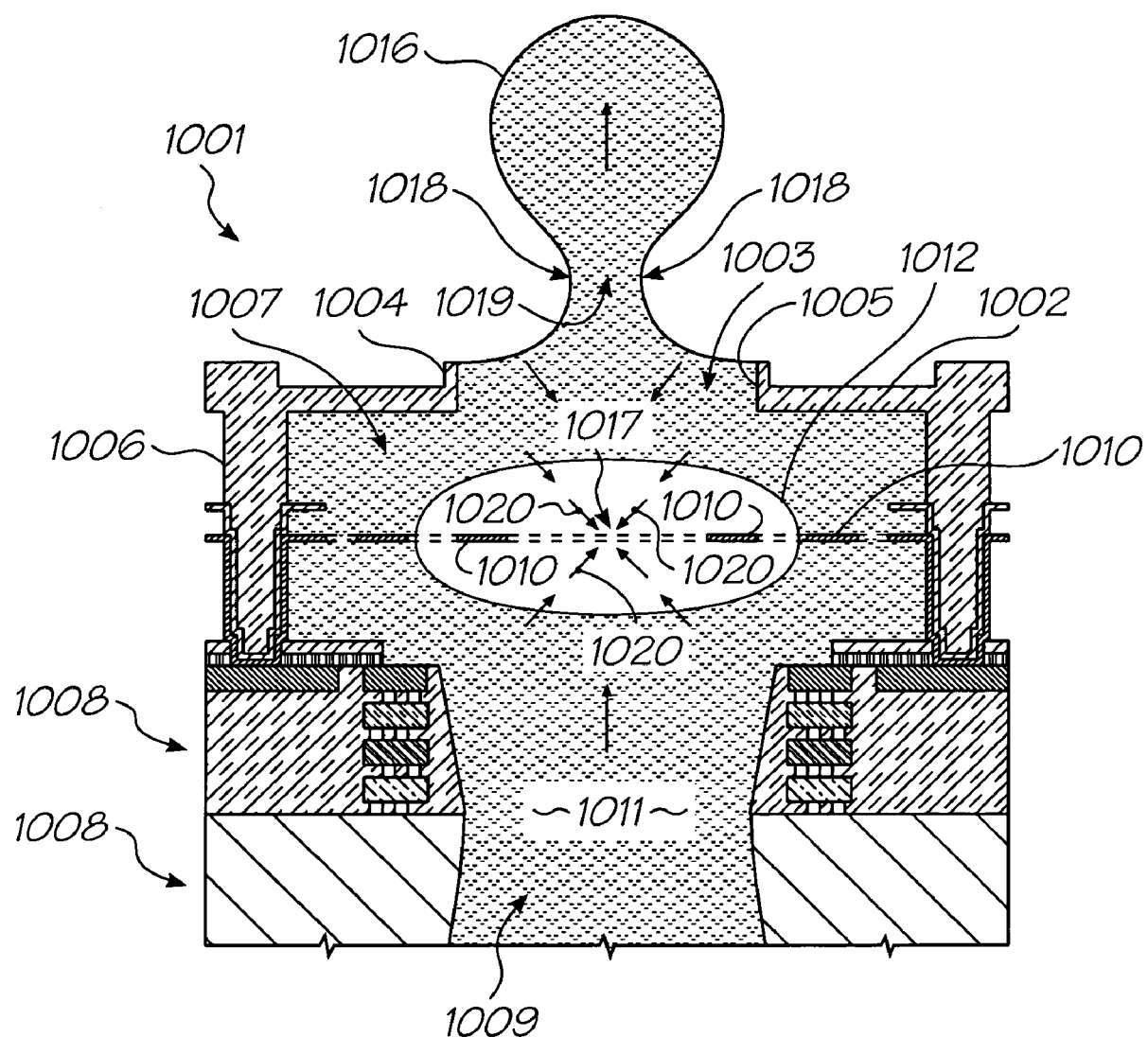
FIG. 51 shows a schematic cross-sectional view through an ink chamber of a single nozzle for injecting ink of a bubble forming heater element actuator type.

As shown in FIG. 51, the ink drop 1016 is being ejected is shown during its "necking phase" before the drop breaks off. At this stage, the bubble 1012 has already reached its maximum size and has then begun to collapse towards the point of collapse 1017.

The collapsing of the bubble 1012 towards the point of collapse 1017 causes some ink 1011 to be drawn from within the nozzle 1003 (from the sides 1018 of the drop), and some to be drawn from the inlet passage 1009, towards the point of collapse. Most of the ink 1011 drawn in this manner is drawn from the nozzle 1003, forming an annular neck 1019 at the base of the drop 16 prior to its breaking off.

The drop 1016 requires a certain amount of momentum to overcome surface tension forces, in order to break off. As ink 1011 is drawn from the nozzle 1003 by the collapse of the bubble 1012, the diameter of the neck 1019 reduces thereby reducing the amount of total surface tension holding the drop, so that the momentum of the drop as it is ejected out of the nozzle is sufficient to allow the drop to break off.

When the drop 1016 breaks off, cavitation forces are caused as reflected by the arrows 1020, as the bubble 1012 collapses to the point of collapse 1017. It will be noted that there are no solid surfaces in the vicinity of the point of collapse 1017 on which the cavitation can have an effect.

Yet another type of printhead nozzle arrangement suitable for the present invention will now be described with reference to FIGS. 52-54. This type typically provides an ink delivery nozzle arrangement having a nozzle chamber containing ink and a thermal bend actuator connected to a paddle positioned within the chamber. The thermal actuator device is actuated so as to eject ink from the nozzle chamber. The preferred embodiment includes a particular thermal bend actuator which includes a series of tapered portions for providing conductive heating of a conductive trace. The actuator is connected to the paddle via an arm received through a slotted wall of the nozzle chamber. The actuator arm has a mating shape so as to mate substantially with the surfaces of the slot in the nozzle chamber wall.

Figure 52A:
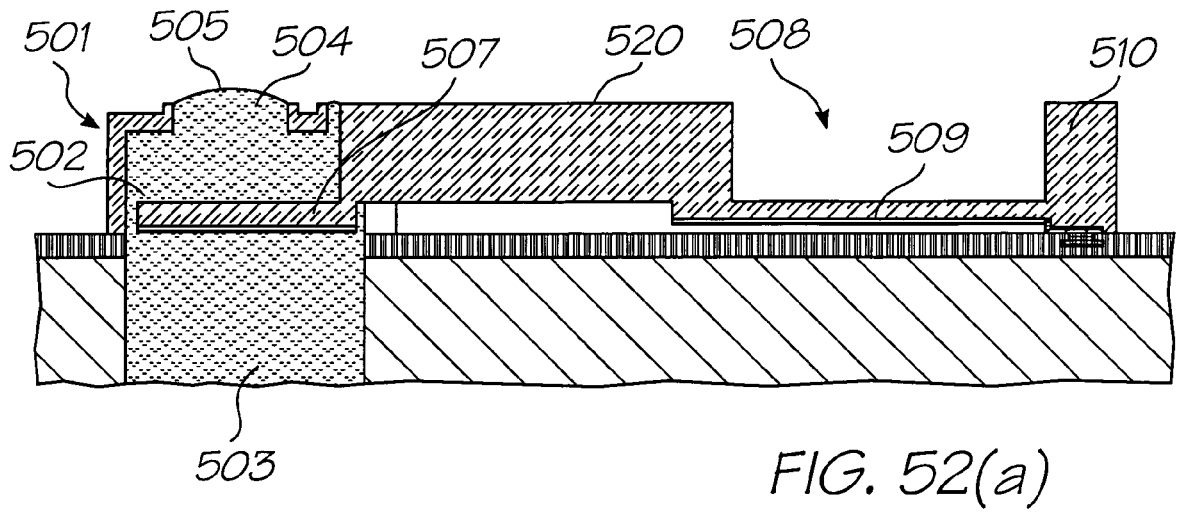
FIGS. 52(a) to 52(c) show the basic operational principles of a thermal bend actuator.
Figure 52B:
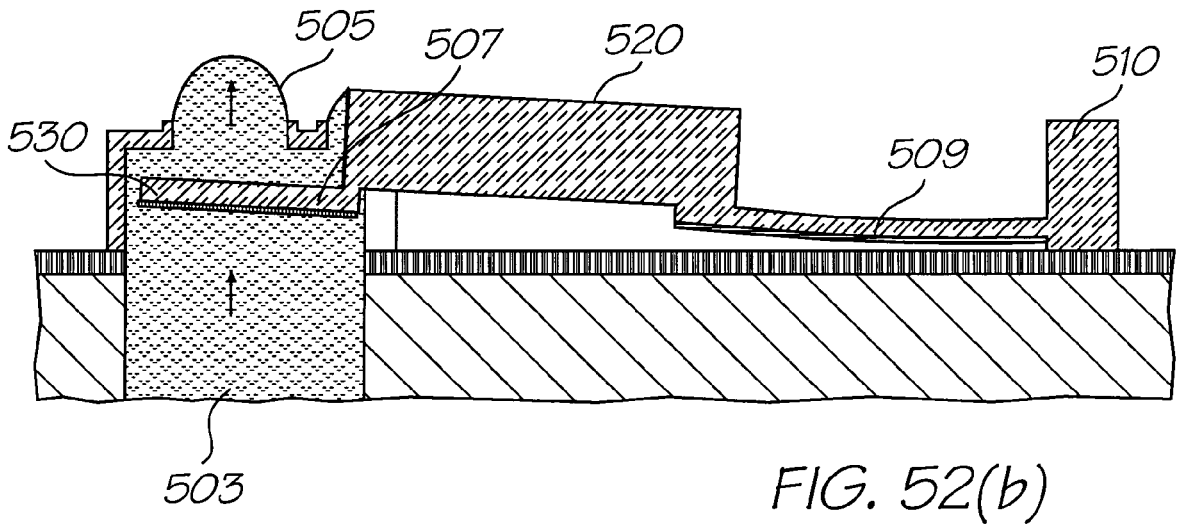
Figure 52C:
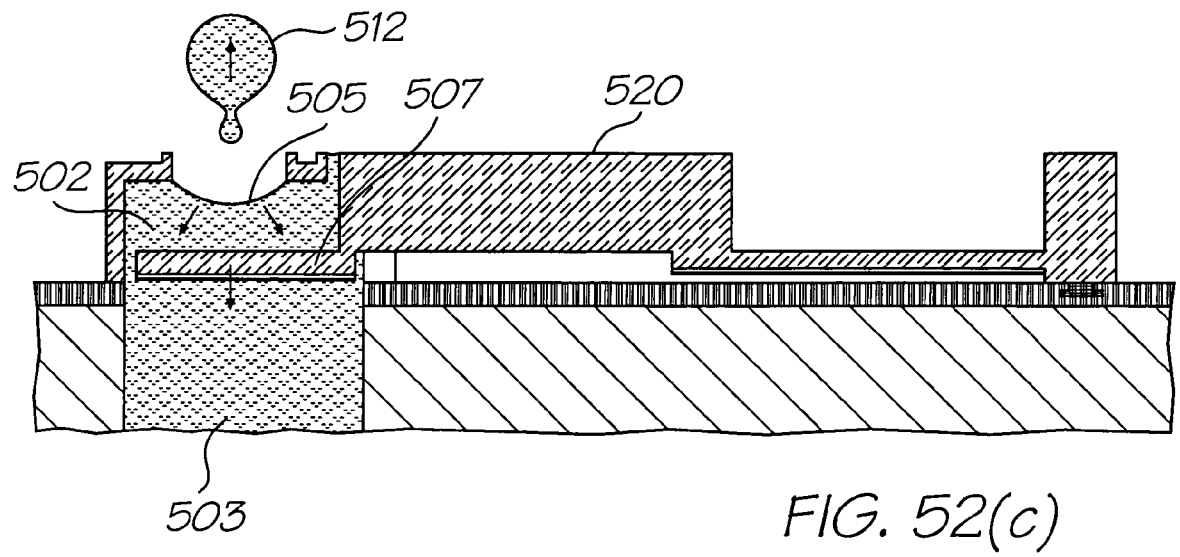

Turning initially to FIGS. 52(a)-(c), there is provided schematic illustrations of the basic operation of a nozzle arrangement of this embodiment. A nozzle chamber 501 is provided filled with ink 502 by means of an ink inlet channel 503 which can be etched through a wafer substrate on which the nozzle chamber 501 rests. The nozzle chamber 501 further includes an ink ejection port 504 around which an ink meniscus forms.

Inside the nozzle chamber 501 is a paddle type device 507 which is interconnected to an actuator 508 through a slot in the wall of the nozzle chamber 501. The actuator 508 includes a heater means e.g. 509 located adjacent to an end portion of a post 510. The post 510 is fixed to a substrate.

When it is desired to eject a drop from the nozzle chamber 501, as illustrated in FIG. 52(b), the heater means 509 is heated so as to undergo thermal expansion. Preferably, the heater means 509 itself or the other portions of the actuator 508 are built from materials having a high bend efficiency where the bend efficiency is defined as:

$$\text{bend efficiency} = \frac{\text{Young's Modulus} \times \text{(Coefficient of thermal Expansion)}}{\text{Density} \times \text{Specific Heat Capacity}}$$

A suitable material for the heater elements is a copper nickel alloy which can be formed so as to bend a glass material.

The heater means 509 is ideally located adjacent the end portion of the post 510 such that the effects of activation are magnified at the paddle end 507 such that small thermal expansions near the post 510 result in large movements of the paddle end.

The heater means 509 and consequential paddle movement causes a general increase in pressure around the ink meniscus 505 which expands, as illustrated in FIG. 52(b), in a rapid manner. The heater current is pulsed and ink is ejected out of the port 504 in addition to flowing in from the ink channel 503.

Subsequently, the paddle 507 is deactivated to again return to its quiescent position. The deactivation causes a general reflow of the ink into the nozzle chamber. The forward momentum of the ink outside the nozzle rim and the corresponding backflow results in a general necking and breaking off of the drop 512 which proceeds to the print media. The collapsed meniscus 505 results in a general sucking of ink into the nozzle chamber 502 via the ink flow channel 503. In time, the nozzle chamber 501 is refilled such that the position in FIG. 52(a) is again reached and the nozzle chamber is subsequently ready for the ejection of another drop of ink.

Figure 53:
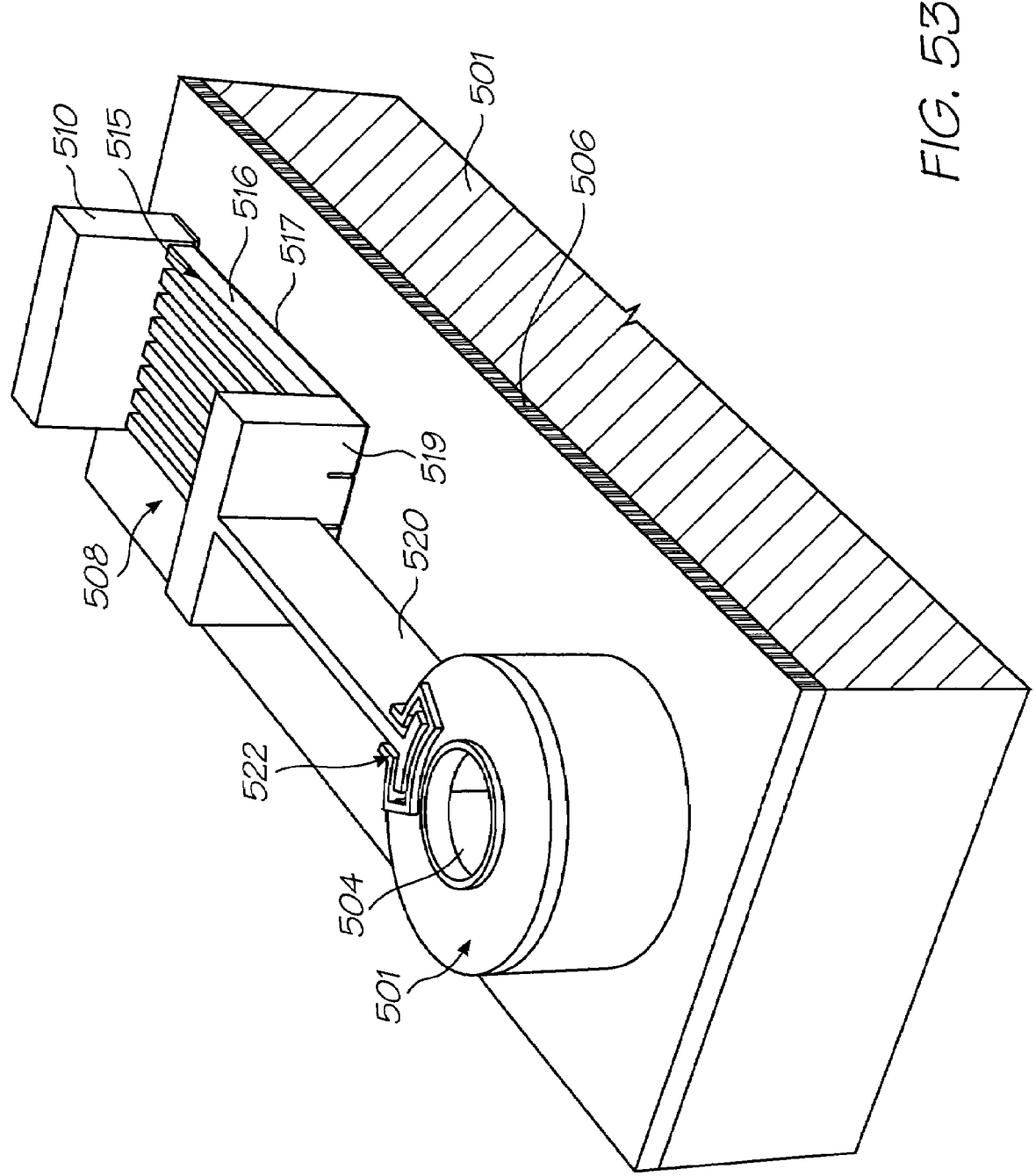
FIG. 53 shows a three dimensional view of a single ink jet nozzle arrangement constructed in accordance with FIG. 22.
Figure 54:
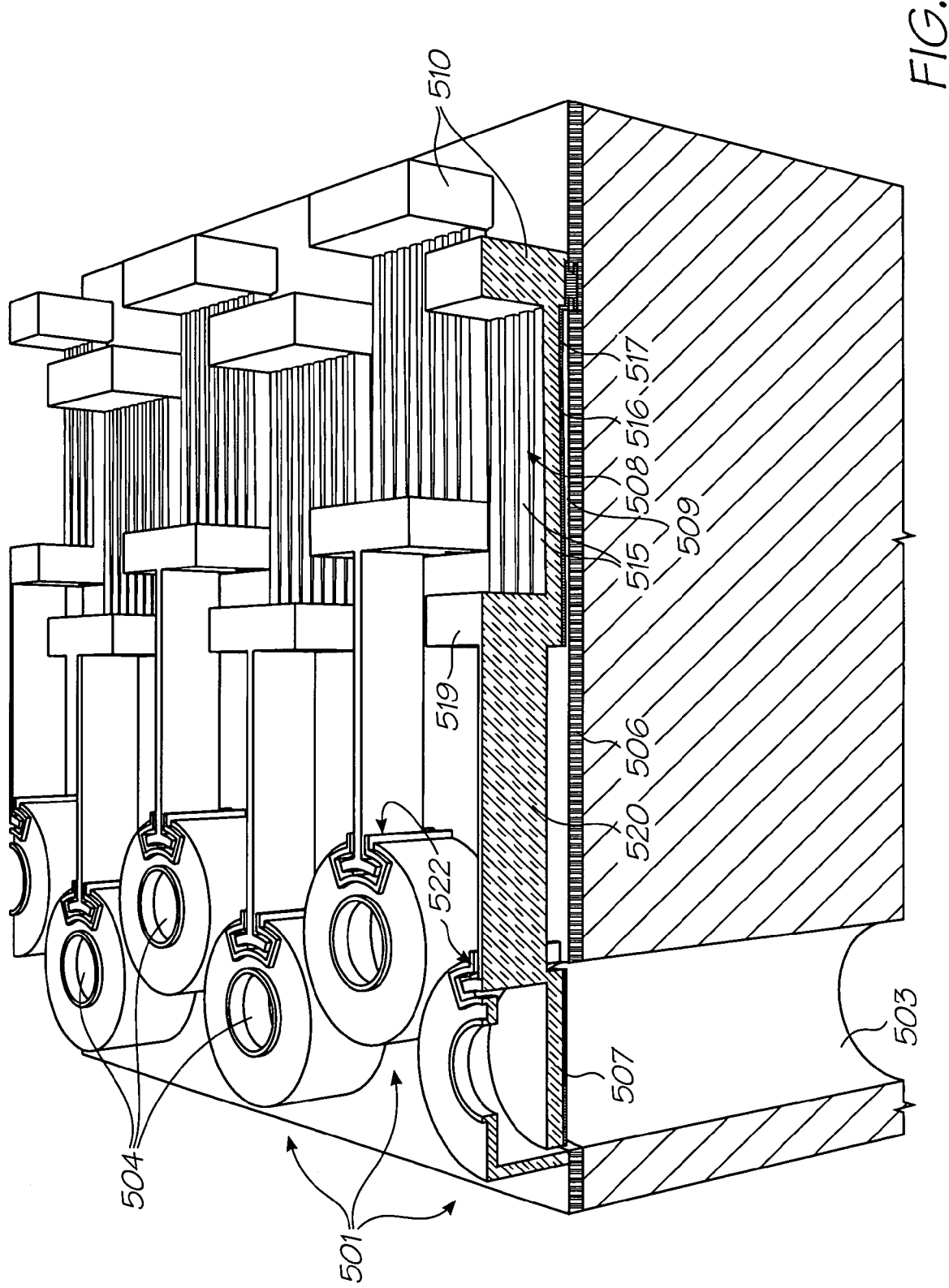
FIG. 54 shows an array of the nozzle arrangements shown in FIG. 53.

FIG. 53 illustrates a side perspective view of the nozzle arrangement. FIG. 54 illustrates sectional view through an array of nozzle arrangement of FIG. 53. In these figures, the numbering of elements previously introduced has been retained.

Firstly, the actuator 508 includes a series of tapered actuator units e.g. 515 which comprise an upper glass portion (amorphous silicon dioxide) 516 formed on top of a titanium nitride layer 517. Alternatively a copper nickel alloy layer (hereinafter called cupronickel) can be utilized which will have a higher bend efficiency.

The titanium nitride layer 517 is in a tapered form and, as such, resistive heating takes place near an end portion of the post 510. Adjacent titanium nitride/glass portions 515 are interconnected at a block portion 519 which also provides a mechanical structural support for the actuator 508.

The heater means 509 ideally includes a plurality of the tapered actuator unit 515 which are elongate and spaced apart such that, upon heating, the bending force exhibited along the axis of the actuator 508 is maximized. Slots are defined between adjacent tapered units 515 and allow for slight differential operation of each actuator 508 with respect to adjacent actuators 508.

The block portion 519 is interconnected to an arm 520. The arm 520 is in turn connected to the paddle 507 inside the nozzle chamber 501 by means of a slot e.g. 522 formed in the side of the nozzle chamber 501. The slot 522 is designed generally to mate with the surfaces of the arm 520 so as to minimize opportunities for the outflow of ink around the arm 520. The ink is held generally within the nozzle chamber 501 via surface tension effects around the slot 522.

When it is desired to actuate the arm 520, a conductive current is passed through the titanium nitride layer 517 within the block portion 519 connecting to a lower CMOS layer 506 which provides the necessary power and control circuitry for the nozzle arrangement. The conductive current results in heating of the nitride layer 517 adjacent to the post 510 which results in a general upward bending of the arm 20 and consequential ejection of ink out of the nozzle 504. The ejected drop is printed on a page in the usual manner for an inkjet printer as previously described.

An array of nozzle arrangements can be formed so as to create a single printhead. For example, in FIG. 54 there is illustrated a partly sectioned various array view which comprises multiple ink ejection nozzle arrangements of FIG. 73 laid out in interleaved lines so as to form a printhead array. Of course, different types of arrays can be formulated including full color arrays etc.

The construction of the printhead system described can proceed utilizing standard MEMS techniques through suitable modification of the steps as set out in U.S. Pat. No. 6,243,113 entitled "Image Creation Method and Apparatus (IJ 41)" to the present applicant, the contents of which are fully incorporated by cross reference.

The integrated circuits 50 may be arranged to have between 5000 to 100,000 of the above described ink delivery nozzles arranged along its surface, depending upon the length of the integrated circuits and the desired printing properties required. For example, for narrow media it may be possible to only require 5000 nozzles arranged along the surface of the printhead assembly to achieve a desired printing result, whereas for wider media a minimum of 10,000, 20,000 or 50,000 nozzles may need to be provided along the length of the printhead assembly to achieve the desired printing result. For full colour photo quality images on A4 or US letter sized media at or around 1600 dpi, the integrated circuits 50 may have 13824 nozzles per color. Therefore, in the case where the printhead assembly 22 is capable of printing in 4 colours (C, M, Y, K), the integrated circuits 50 may have around 53396 nozzles disposed along the surface thereof. Further, in a case where the printhead assembly 22 is capable of printing 6 printing fluids (C, M, Y, K, IR and a fixative) this may result in 82944 nozzles being provided on the surface of the integrated circuits 50. In all such arrangements, the electronics supporting each nozzle is the same.

The manner in which the individual ink delivery nozzle arrangements may be controlled within the printhead assembly 22 will now be described with reference to FIGS. 55-58.

Figure 55:
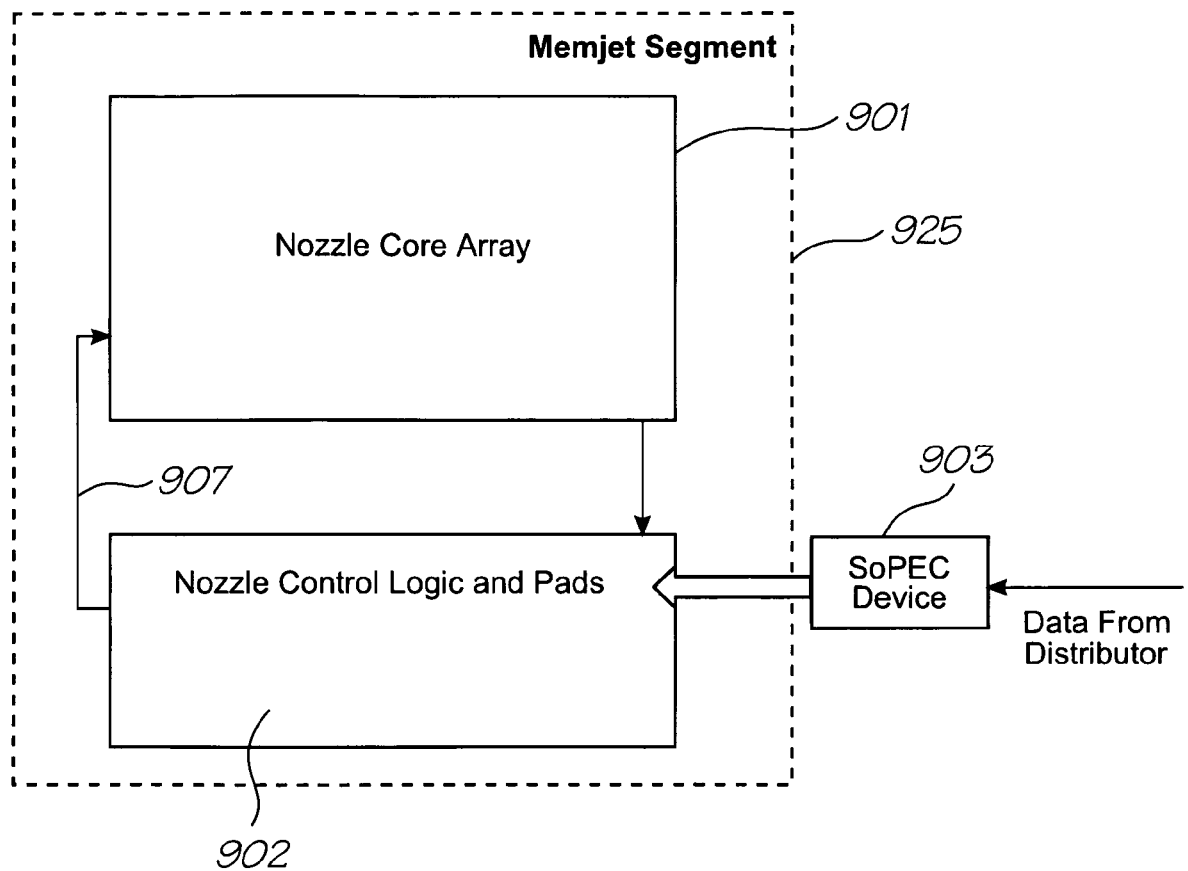
FIG. 55 shows a schematic showing CMOS drive and control blocks for use with the printer of the present invention.

FIG. 55 shows an overview of the integrated circuit 50 and its connections to the SoPEC device (discussed above) provided within the control electronics of the print engine 1. As discussed above, integrated circuit 50 includes a nozzle core array 901 containing the repeated logic to fire each nozzle, and nozzle control logic 902 to generate the timing signals to fire the nozzles. The nozzle control logic 902 receives data from the SoPEC device via a high-speed link.

The nozzle control logic 902 is configured to send serial data to the nozzle array core for printing, via a link 907, which may be in the form of an electrical connector. Status and other operational information about the nozzle array core 901 is communicated back to the nozzle control logic 902 via another link 908, which may be also provided on the electrical connector.

Figure 56:
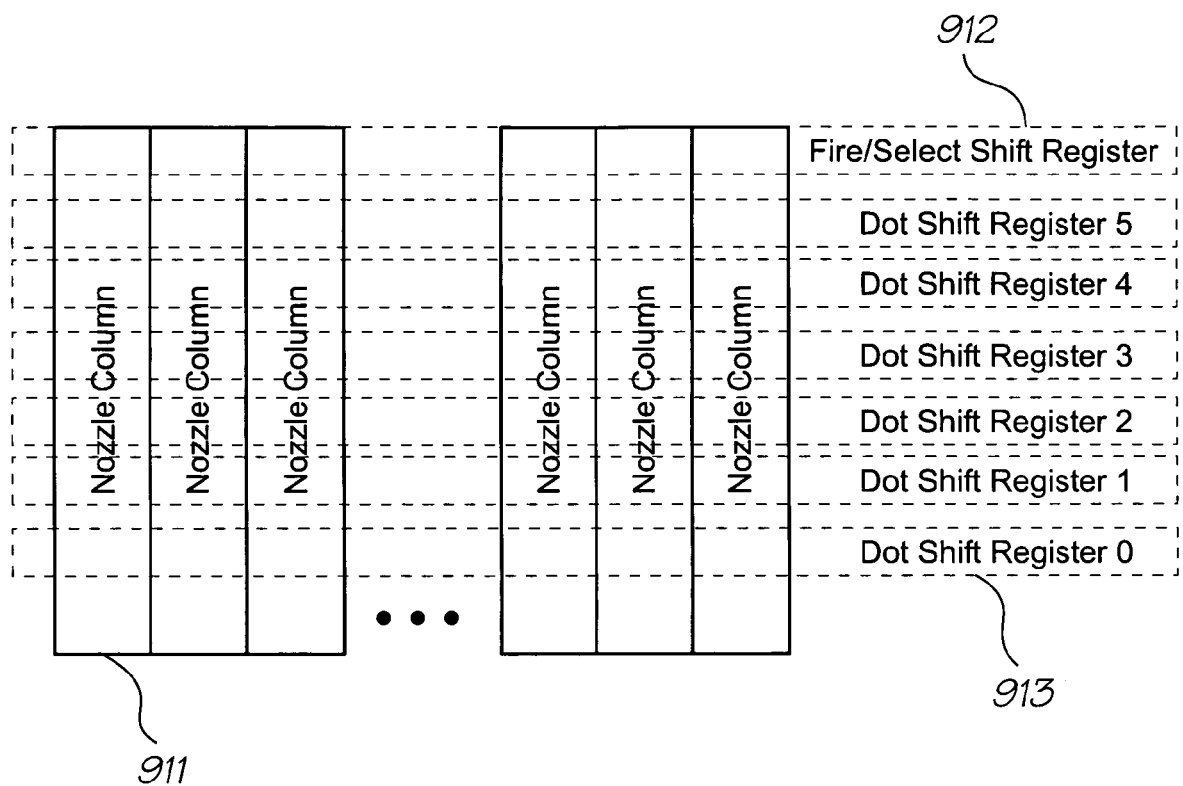
FIG. 56 shows a schematic showing the relationship between nozzle columns and dot shift registers in the CMOS blocks of FIG. 55.
Figure 57:
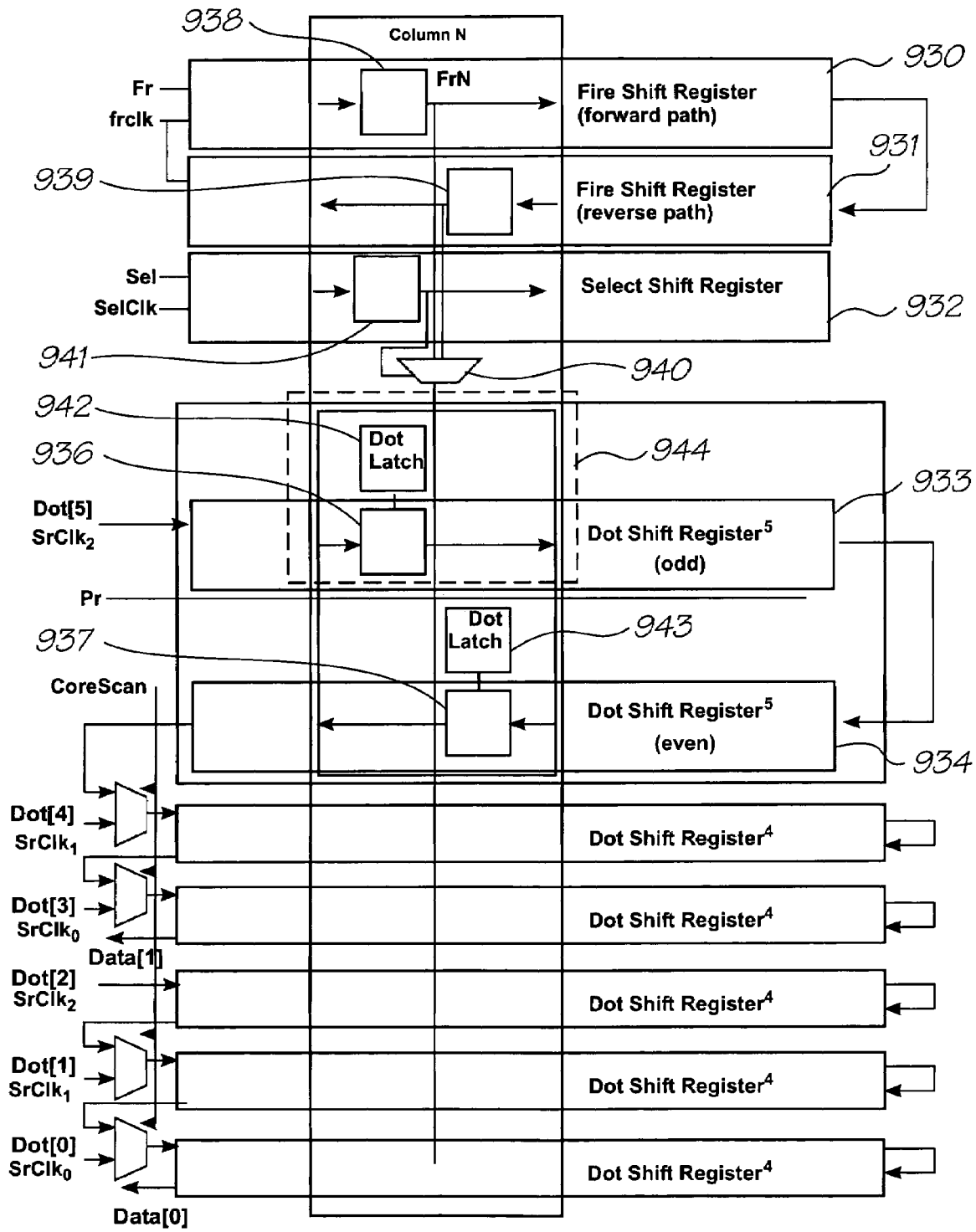
FIG. 57 shows a more detailed schematic showing a unit cell and its relationship to the nozzle columns and dot shift registers of FIG. 56.

The nozzle array core 901 is shown in more detail in FIGS. 56 and 57. In FIG. 56, it will be seen that the nozzle array core 901 comprises an array of nozzle columns 911. The array includes a fire/select shift register 912 and up to 6 color channels, each of which is represented by a corresponding dot shift register 913.

As shown in FIG. 57, the fire/select shift register 912 includes forward path fire shift register 930, a reverse path fire shift register 931 and a select shift register 932. Each dot shift register 913 includes an odd dot shift register 933 and an even dot shift register 934. The odd and even dot shift registers 933 and 934 are connected at one end such that data is clocked through the odd shift register 933 in one direction, then through the even shift register 934 in the reverse direction. The output of all but the final even dot shift register is fed to one input of a multiplexer 935. This input of the multiplexer is selected by a signal (corescan) during post-production testing. In normal-operation, the corescan signal selects dot data input Dot[x] supplied to the other input of the multiplexer 935. This causes Dot[x] for each color to be supplied to the respective dot shift registers 913.

A single column N will now be described with reference to FIG. 77. In the embodiment shown, the column N includes 12 data values, comprising an odd data value 936 and an even data value 937 for each of the six dot shift registers. Column N also includes an odd fire value 938 from the forward fire shift register 930 and an even fire value 939 from the reverse fire shift register 931, which are supplied as inputs to a multiplexer 940. The output of the multiplexer 940 is controlled by the select value 941 in the select shift register 932. When the select value is zero, the odd fire value is output, and when the select value is one, the even fire value is output.

Each of the odd and even data values 936 and 937 is provided as an input to corresponding odd and even dot latches 942 and 943 respectively.

Each dot latch and its associated data value form a unit cell, such as unit cell 944. A unit cell is shown in more detail in FIG. 58. The dot latch 942 is a D-type flip-flop that accepts the output of the data value 936, which is held by a D-type flip-flop 944 forming an element of the odd dot shift register 933. The data input to the flip-flop 944 is provided from the output of a previous element in the odd dot shift register (unless the element under consideration is the first element in the shift register, in which case its input is the Dot[x] value). Data is clocked from the output of flip-flop 944 into latch 942 upon receipt of a negative pulse provided on LsyncL.

The output of latch 942 is provided as one of the inputs to a three-input AND gate 945. Other inputs to the AND gate 945 are the Fr signal (from the output of multiplexer 940) and a pulse profile signal Pr. The firing time of a nozzle is controlled by the pulse profile signal Pr, and can be, for example, lengthened to take into account a low voltage condition that arises due to low power supply (in a removable power supply embodiment). This is to ensure that a relatively consistent amount of ink is efficiently ejected from each nozzle as it is fired. In the embodiment described, the profile signal Pr is the same for each dot shift register, which provides a balance between complexity, cost and performance. However, in other embodiments, the Pr signal can be applied globally (ie, is the same for all nozzles), or can be individually tailored to each unit cell or even to each nozzle.

Once the data is loaded into the latch 942, the fire enable Fr and pulse profile Pr signals are applied to the AND gate 945, combining to the trigger the nozzle to eject a dot of ink for each latch 942 that contains a logic 1.

The signals for each nozzle channel are summarized in the following table:

| Name | Direction | Description |
|---|---|---|
| D | Input | Input dot pattern to shift register bit |
| Q | Output | Output dot pattern from shift register bit |
| SrClk | Input | Shift register clock in - d is captured on rising edge of this clock |
| LsyncL | Input | Fire enable - needs to be asserted for nozzle to fire |
| Pr | Input | Profile - needs to be asserted for nozzle to fire |

Figure 58:
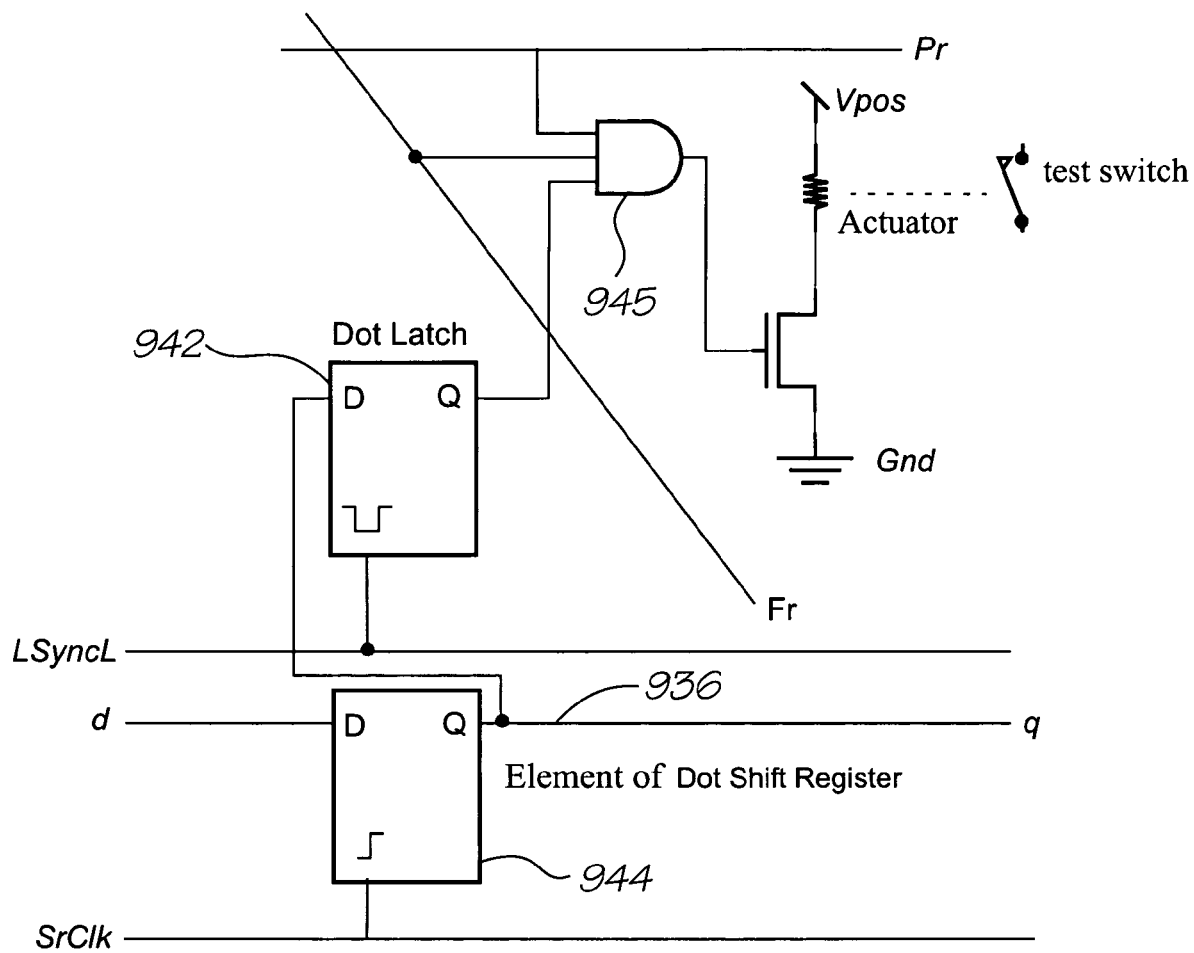
FIG. 58 shows a circuit diagram showing logic for a single printer nozzle in the printer of the present invention.

As shown in FIG. 58, the fire signals Fr are routed on a diagonal, to enable firing of one color in the current column, the next color in the following column, and so on. This averages the current demand by spreading it over 6 columns in time-delayed fashion.

The dot latches and the latches forming the various shift registers are fully static in this embodiment, and are CMOS-based. The design and construction of latches is well known to those skilled in the art of integrated circuit engineering and design, and so will not be described in detail in this document.

The nozzle speed may be as much as 20 kHz for the printer unit 2 capable of printing at about 60 ppm, and even more for higher speeds. At this range of nozzle speeds the amount of ink than can be ejected by the entire printhead assembly 22 is at least 50 million drops per second. However, as the number of nozzles is increased to provide for higher-speed and higher-quality printing at least 100 million drops per second, preferably at least 500 million drops per second and more preferably at least 1 billion drops per second may be delivered. At such speeds, the drops of ink are ejected by the nozzles with a maximum drop ejection energy of about 250 nanojoules per drop.

Consequently, in order to accommodate printing at these speeds, the control electronics must be able to determine whether a nozzle is to eject a drop of ink at an equivalent rate. In this regard, in some instances the control electronics must be able to determine whether a nozzle ejects a drop of ink at a rate of at least 50 million determinations per second. This may increase to at least 100 million determinations per second or at least 500 million determinations per second, and in many cases at least 1 billion determinations per second for the higher-speed, higher-quality printing applications.

For the printer unit 2 of the present invention, the above-described ranges of the number of nozzles provided on the printhead assembly 22 together with the nozzle firing speeds and print speeds results in an area print speed of at least 50 $cm^2$ per second, and depending on the printing speed, at least 100 $cm^2$ per second, preferably at least 200 $cm^2$ per second, and more preferably at least 500 $cm^2$ per second at the higher-speeds. Such an arrangement provides a printer unit 2 that is capable of printing an area of media at speeds not previously attainable with conventional printer units.

Lid Assembly

Figure 59:
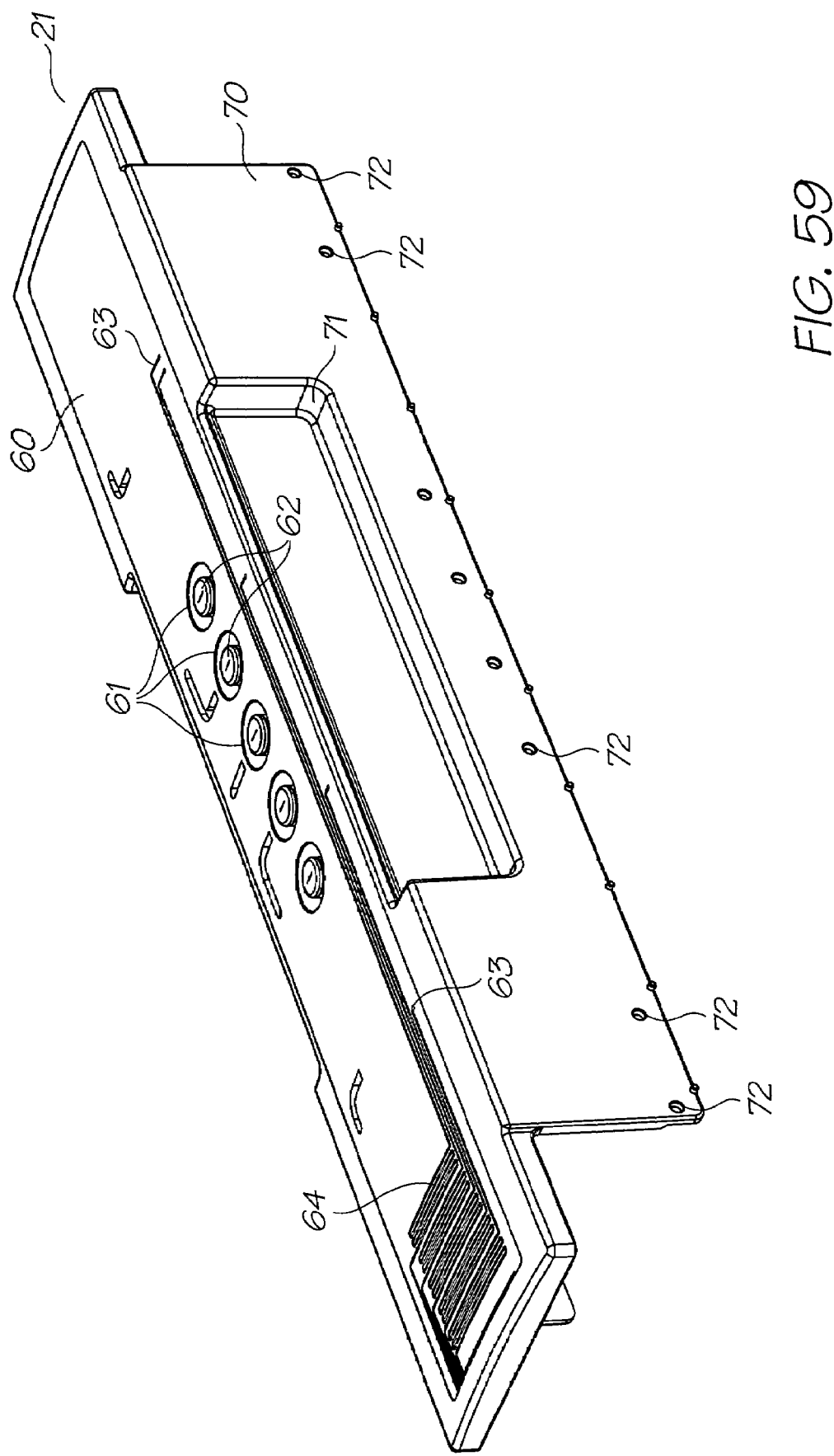
FIG. 59 shows a front perspective view of a lid assembly of a cartridge unit according to an embodiment of the present invention.
Figure 60:
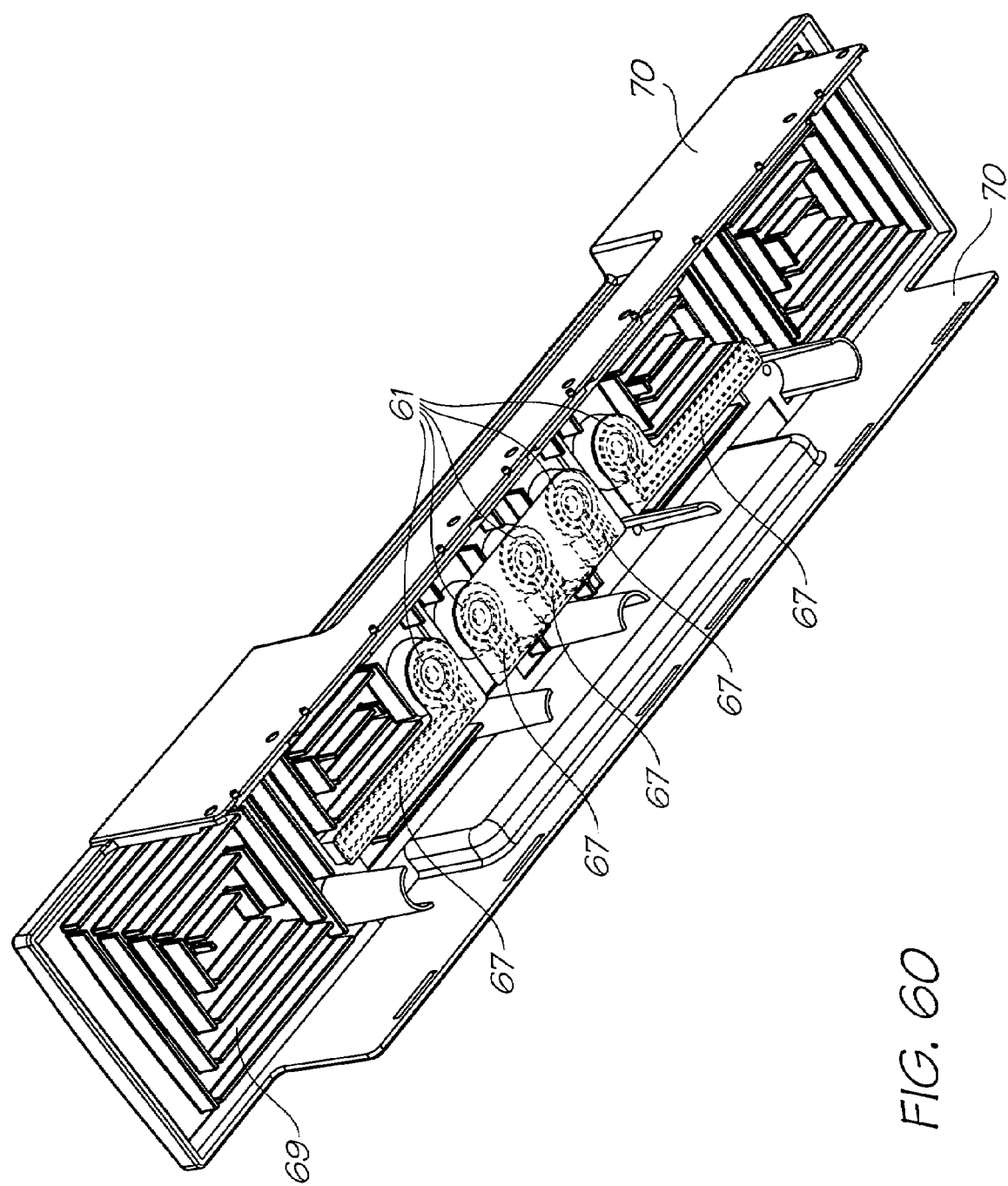
FIG. 60 shows a front perspective view of the underside of the lid assembly of FIG. 59.
Figure 61:
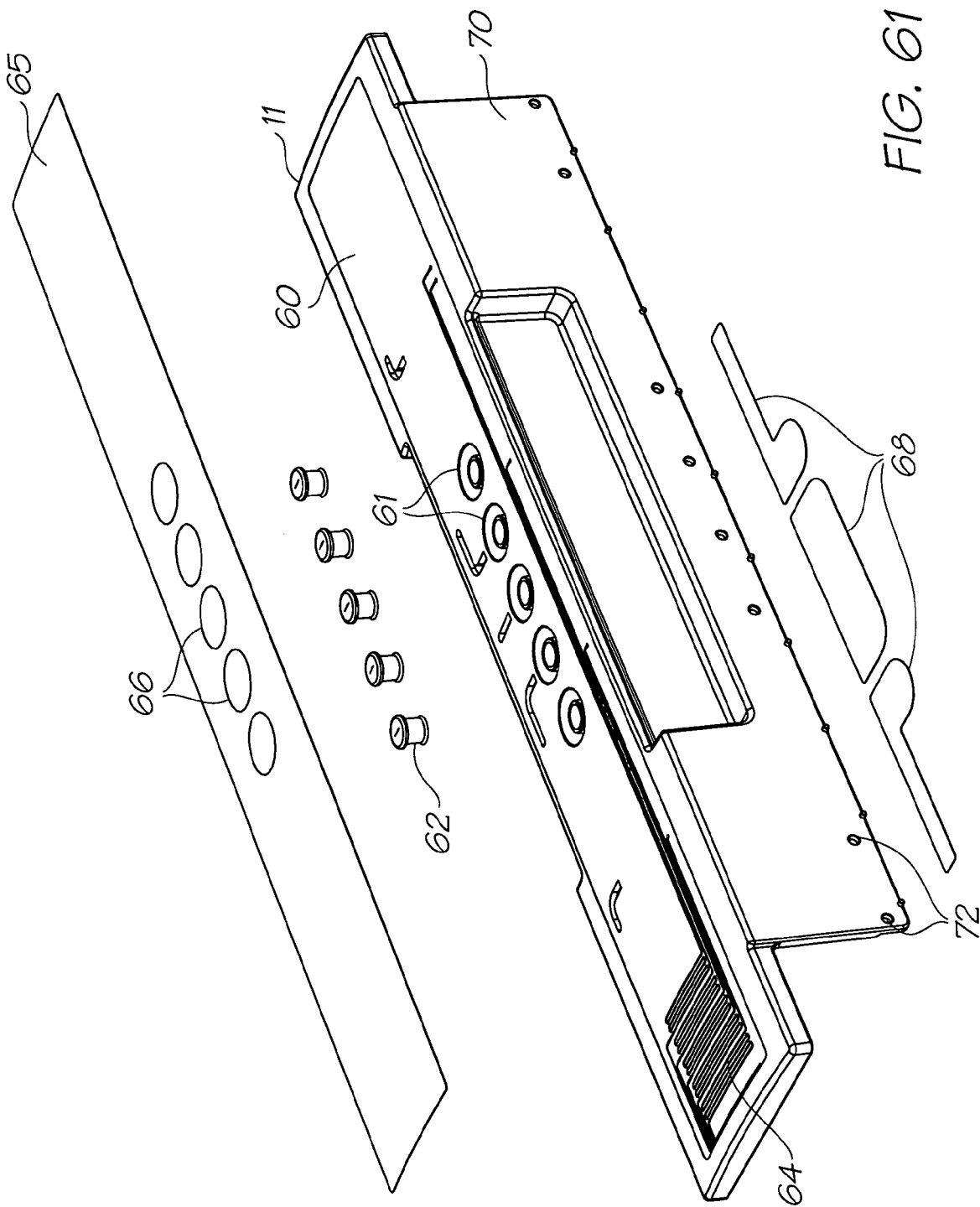
FIG. 61 shows an exploded front perspective view of the lid assembly of FIG. 59.

The lid assembly 21 of the cartridge unit 10 is shown in FIGS. 59-61. The lid assembly 21 is arranged to fit over the main body 20, thereby sealing each of the ink storage compartments 24. As such, the lid assembly 21 is shaped to conform to the shape of main body 20 and is attached to the main body via ultrasonic welding, or any other suitable method which provides a sealed connection.

The outer surface 60 of the lid assembly 21 is provided with a number of ink refill ports 61, for receiving ink from a refill unit 200 and for directing the refill ink into one of the ink storage compartments 24 of the main body 20. In the embodiment shown in FIG. 59, there are five ink refill ports 61 provided, with each of the refill ports being in fluid communication with one of the five ink storage compartments 24 to facilitate refilling of the associated compartments with ink.

The ink refills ports 61 are in the form of holes extending through the lid assembly 11 and each hole is provided with a valve fitting 62 made from an elastomeric moulding. The valve fittings 62 act to seal the ports 61 during non refill periods and provide a means for interacting with an outlet of the ink refill unit 200 to ensure controlled transfer of ink between the ink refill unit 200 and the ink storage compartment 24. In this regard, when an ink refill unit 200 is not in communication with the ink refill ports 61 the valve fittings 62 seal the ink refill ports, and when the ink refill unit 200 is in communication with the ink refill ports, the valve fittings permits transfer of ink from the ink refill unit through the ink refill ports. The manner in which this is achieved is described later in the description.

The outer surface 60 of the lid assembly 21 also includes a venting arrangement which provides air venting of each ink storage compartment 24. The venting arrangement consists of individual vent holes 63 which extend into the individual ink storage compartments 24 and channels 64 which extend from the vent holes 63 to the edge of the lid assembly 21. The channels 64 are preferably etched into the outer surface 60 of the lid assembly and assume a tortuous path in the passage from the vent holes 63 to the edge of the lid assembly.

As shown in FIG. 61, a film 65 is placed over the outer surface 60 of the lid assembly and includes holes 66 formed therein which fit around the ink refill ports 61. The film 65 may be an adhesive film such as a sticker/label or the like which may also have printed thereon instruction information to assist the user in handling the cartridge unit 10. When applied to the surface of the lid assembly 21, the film sits atop the etched channels 64 formed in the outer surface 60, thereby enclosing the venting passage from the vent hole 63 to the edge of the lid assembly 21 which enables the ink storage compartment to breathe via the tortuous path.

The underside of the lid assembly 21 is shown in more detail in FIG. 60 and includes flow channels 67 extending from the underside of the ink refill ports 61 to direct the refill ink into the appropriate ink storage compartment 24. As shown in FIG. 61, a weld membrane 68 is welded to the underside of the ink refill ports 61 and the flow channels 67 to form sealed delivery passages along which the ink passes en route to each of the ink storage compartments 24.

The underside of the lid assembly 21, also includes moulded features or ridges 69 which extend into the ink storage compartments 24 when the lid assembly 21 is sealed to the main body 20. These moulded features or ridges 69 ensure that an air gap is formed above the absorbent material 29 for venting via the vent hole 63 to assist the absorbent material 29 to function to absorb the ink and retain the ink suspended therein under capillary action.

As shown in FIGS. 59 and 60, extending downwardly from the outer surface 60 of the lid assembly 21 are a pair of guide walls 70. The guide walls 70 assist in locating the lid assembly 21 on the main body 20 during assembly. The guide walls 70 also have a recessed portion 71 formed therein which acts as a hand grip to assist in handling the cartridge unit during use.

As shown more clearly in FIG. 59, the guide wall 70 that extends along the face of the main body 20 proximal the printhead assembly 22 also includes a series of holes 72 in a lower edge thereof. These holes 72 are arranged to align with and receive the locating studs 38 provided on the main body 20 onto which the flex PCB backer 37 and the flex PCB 52 of the printhead assembly 22 are attached. In this arrangement, when the lid assembly 21 is fixed to the main body 20, a portion of the flex PCB 52 of the printhead assembly 22 is sandwiched between the guide wall 70 and the flex PCB backer 37, thereby acting to help retain the flex PCB 52 in position.

Capper Assembly

As discussed previously and shown in FIGS. 11 and 12, the main body 20 of the cartridge unit 10 is provided with downwardly projecting end supports 40. The end supports 40 are integral with the main body 20 and are arranged such that the printhead assembly 22 is positioned between the end supports. Each of the end supports 40 are configured to receive the capping assembly 23 and as such have retaining projections 73 formed on their surfaces to retain the capping assembly 23 in position.

The capping assembly 23 is shown in more detail in FIGS. 62 to 67, and generally consists of a capper chassis 74 which receives the various components of the capping assembly 23 therein. The capper chassis 74 is in the form of an open ended channel having a pair of upwardly extending tongue portions 75 at its ends which are shaped to fit over the end supports 40 of the main body and engage with the retaining projections 73 provided thereon to secure the capper assembly 23 in position. The capper chassis 74 essentially retains the parts of the capper assembly 23 therein, and is made from a suitable metal material, having rigidity and resilience, such as a pressed steel plate.

Figure 64:
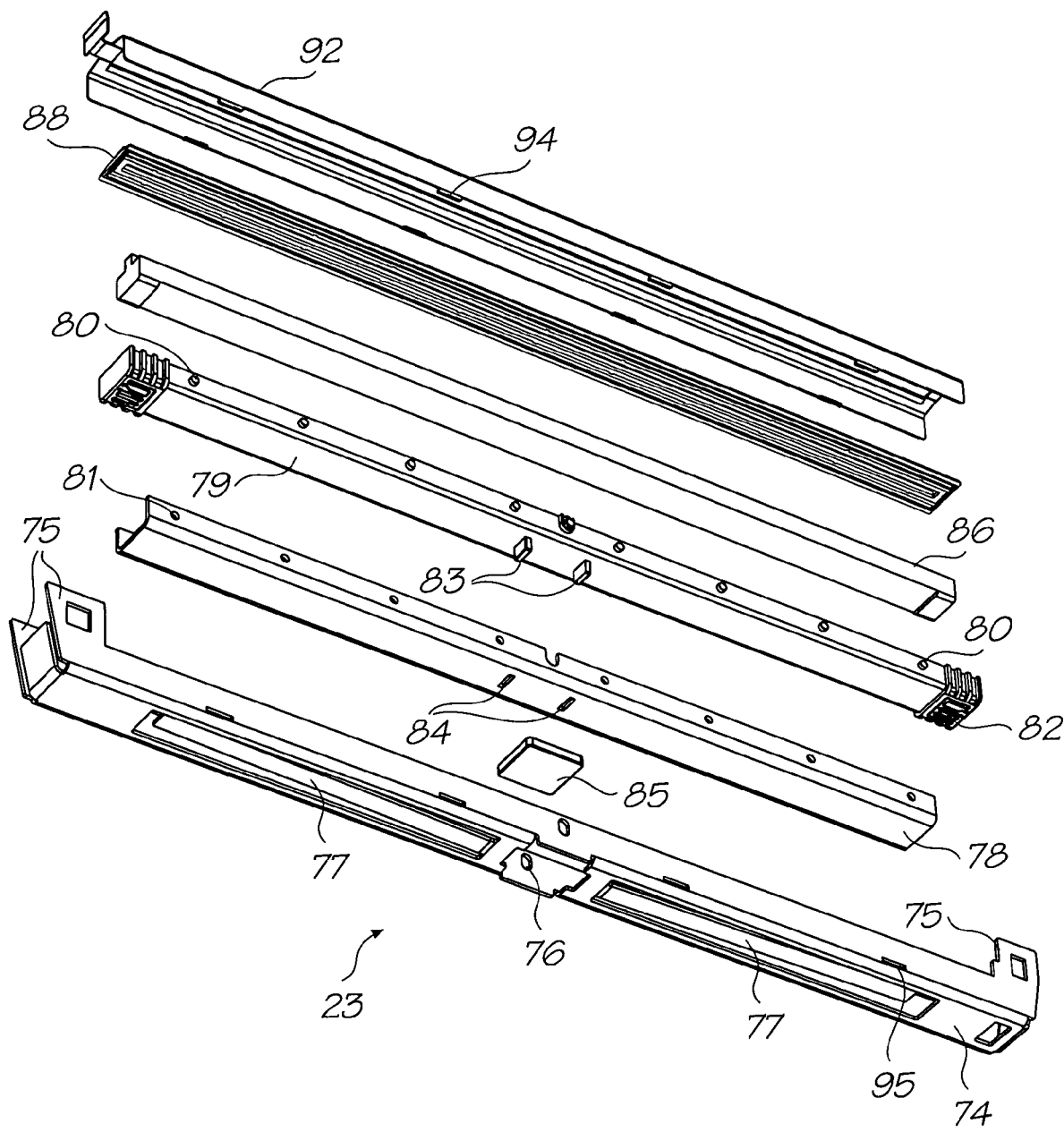
FIG. 64 shows an exploded front perspective view of the underside of the capper assembly of FIG. 62.

The base of the capper chassis 74 is shown more clearly in FIG. 64 and includes a centrally located removed portion 76 and spring arms 77 extending from either side of the removed portion 76 towards the tongue portions 75. The spring arms 77 are hingedly fixed to the chassis 74 at the region proximal the removed portion, and are biased inwards of the capper chassis. The spring arms 77 may be made from the same material as the chassis and formed by removing material from the chassis pressing the arms from the base of the chassis. Whilst the spring arms 77 are shown as being integral with the chassis 74, they may be provided as a separate insert which may be inserted into the open channel of the chassis 74, as would be appreciated by a person skilled in the art.

A rigid insert 78 is provided to fit within the chassis 74 to provide added rigidity to the capper assembly 23. In this regard the insert 78 is made from moulded steel and forms an open u-shaped channel. A lower capper moulding 79 is located within the insert 78 and retained within the insert via engagement of a number of lugs 80 formed along the sides of the lower capper moulding 79 with corresponding holes 81 provided in the sides of the insert 78. The lower capper moulding 79 is made from a suitable plastic material and forms a body having closed ends and an open top. The ends of the lower capper moulding 79 are provided with air vents 82 which provide a means for air to enter the capper assembly and ventilate the capper assembly.

The base of the lower capper moulding is provided with a pair of centrally located projections 83 which are received within slots 84 formed in the base of the rigid insert 78. The projections 83 extend through the rigid insert 78, beyond its outer base surface to define a region for receiving an electromagnetic button 85, which is spot welded to the outer base surface of the rigid insert 78 between the projections 83. The purpose of the electromagnetic button 85 will be discussed in more detail later in the description; however it should be appreciated that the electromagnetic button 85 can be made of any material which is capable of experiencing magnetic attraction forces.

A strip of absorbent media 86 is provided to fit within the lower capping moulding 79, and may be made from any type of material capable of absorbing and retaining ink therein, such as urethane foam or the like. The absorbent media 86 is shaped to fit within the lower capper moulding 79 and includes a stepped portion 87 which projects above the lower capper moulding 79 and extends centrally along the length of the absorbent media 86, as is shown more clearly with regard to FIGS. 63 and 65.

An upper capper moulding 88 is then provided to fit over the lower capper moulding 79 and the absorbent media 86. The upper capper moulding 88 has essentially two portions, a lower portion 89 which seals along the edges of the lower capper moulding 79 to retain the absorbent media 86 therein, and an upper portion 90 which essentially conforms to the shape of the stepped portion 87 of the absorbent media 86. The lower portion 89 is made from a rubber or plastics material and has an edge portion which sits along the upper edge of the lower capping moulding 79 and which is attached thereto by an ultrasonic weld or any other suitable attachment means. The upper portion 90 has an open upper surface and is made from a dual shot elastomeric material. The open upper surface is in the form of a rim portion 91 that extends beyond the absorbent media 86 and defines a perimeter seal for sealing the integrated circuits 50 of the printhead assembly 22, as is shown in relation to FIG. 65. The space formed between the upper edge of the rim portion 91 and the absorbent media 86 is the space which seals the integrated circuits 50 of the printhead assembly 22.

Figure 62:
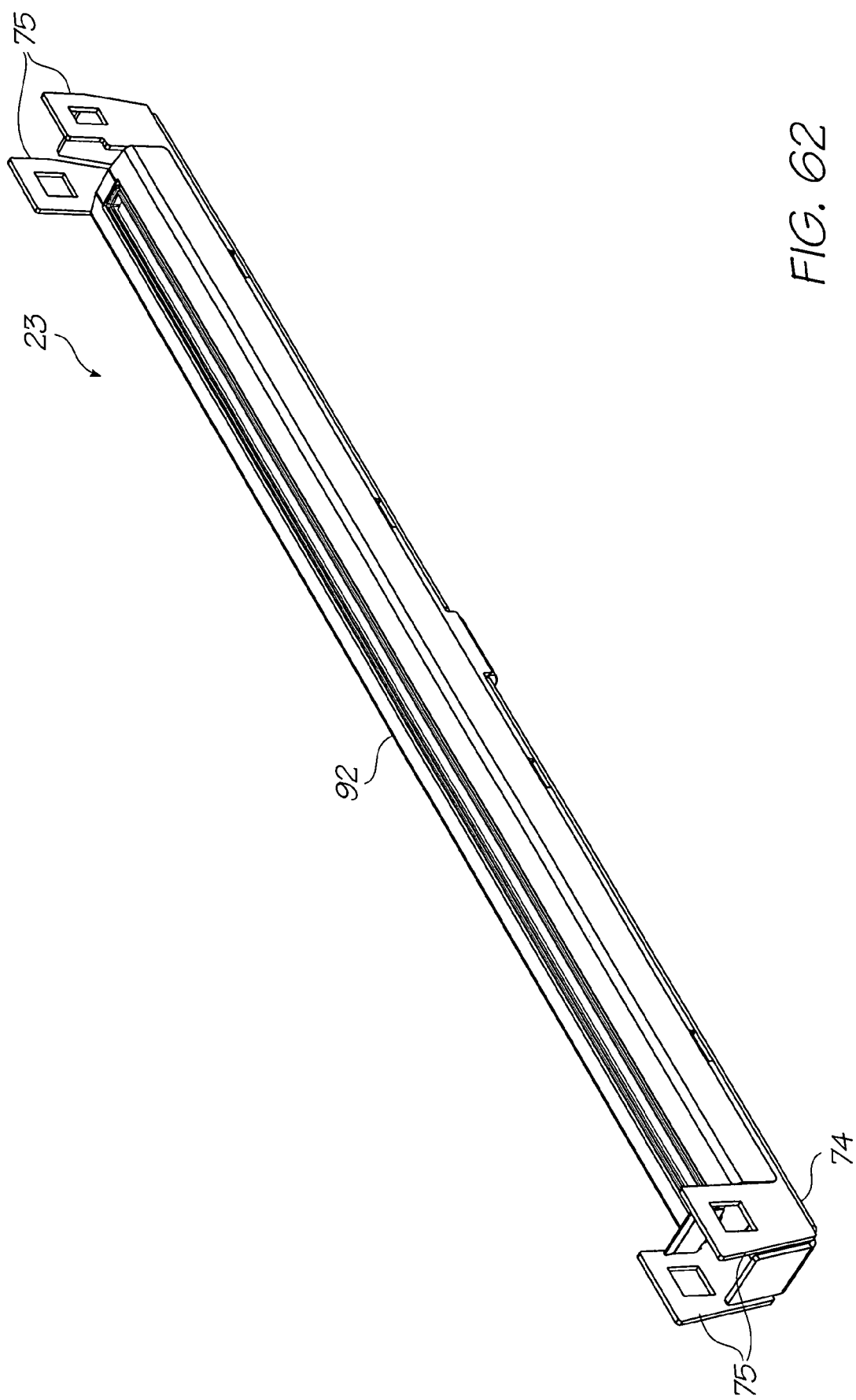
FIG. 62 shows a front perspective view of a capper assembly of a cartridge unit according to an embodiment of the present invention.
Figure 63:
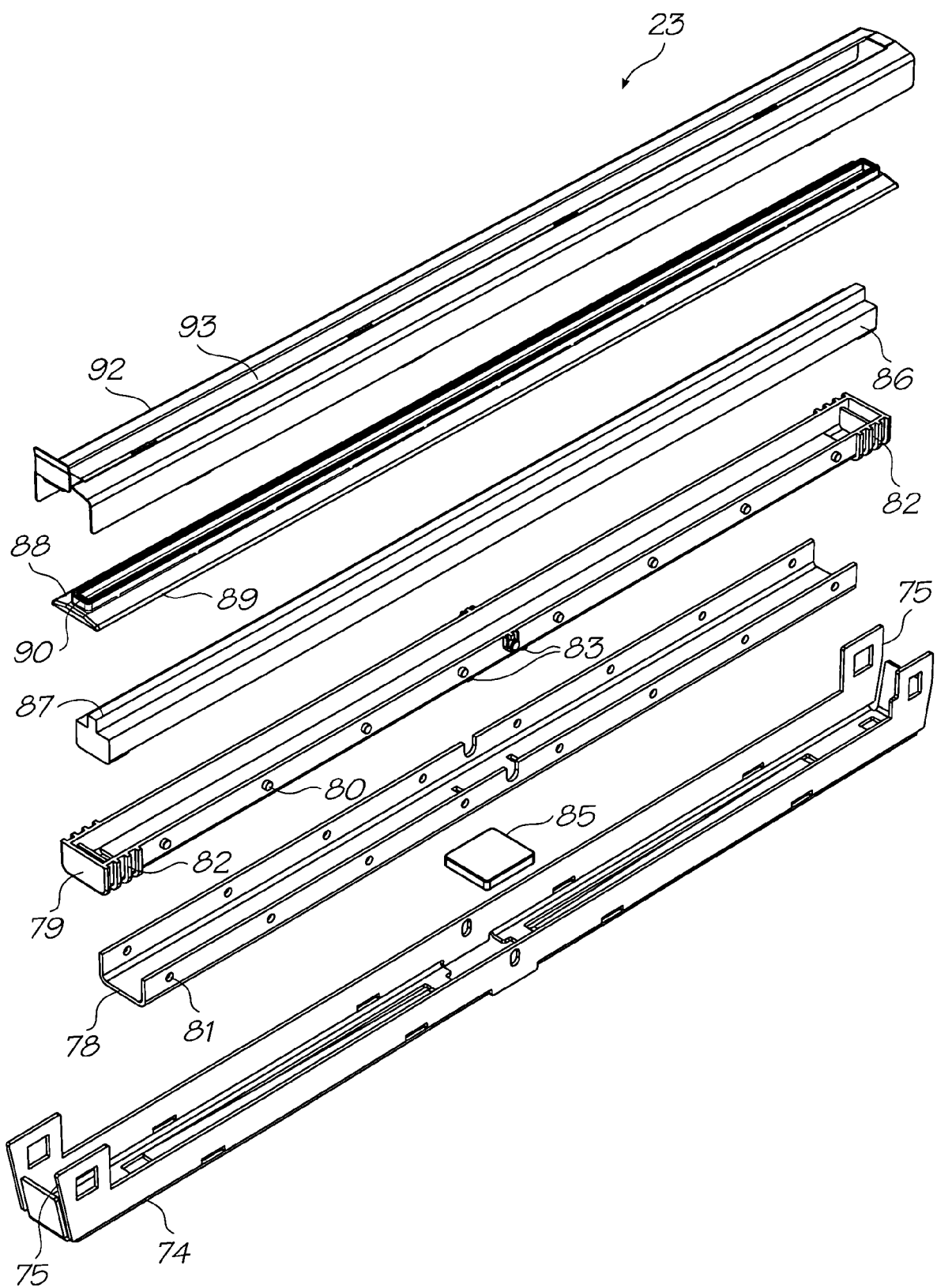
FIG. 63 shows an exploded front perspective view of the capper assembly of FIG. 62.

In this arrangement, the upper capper moulding 88, absorbent media 86, lower capper moulding 79 and the rigid insert 78 form a unit which is adapted to fit within the capper chassis 74. In order to secure the unit in place, a retainer element 92 is provided which fits over the upper capping moulding 88 and is secured to the chassis 74 as shown in FIG. 62.

Figure 65:
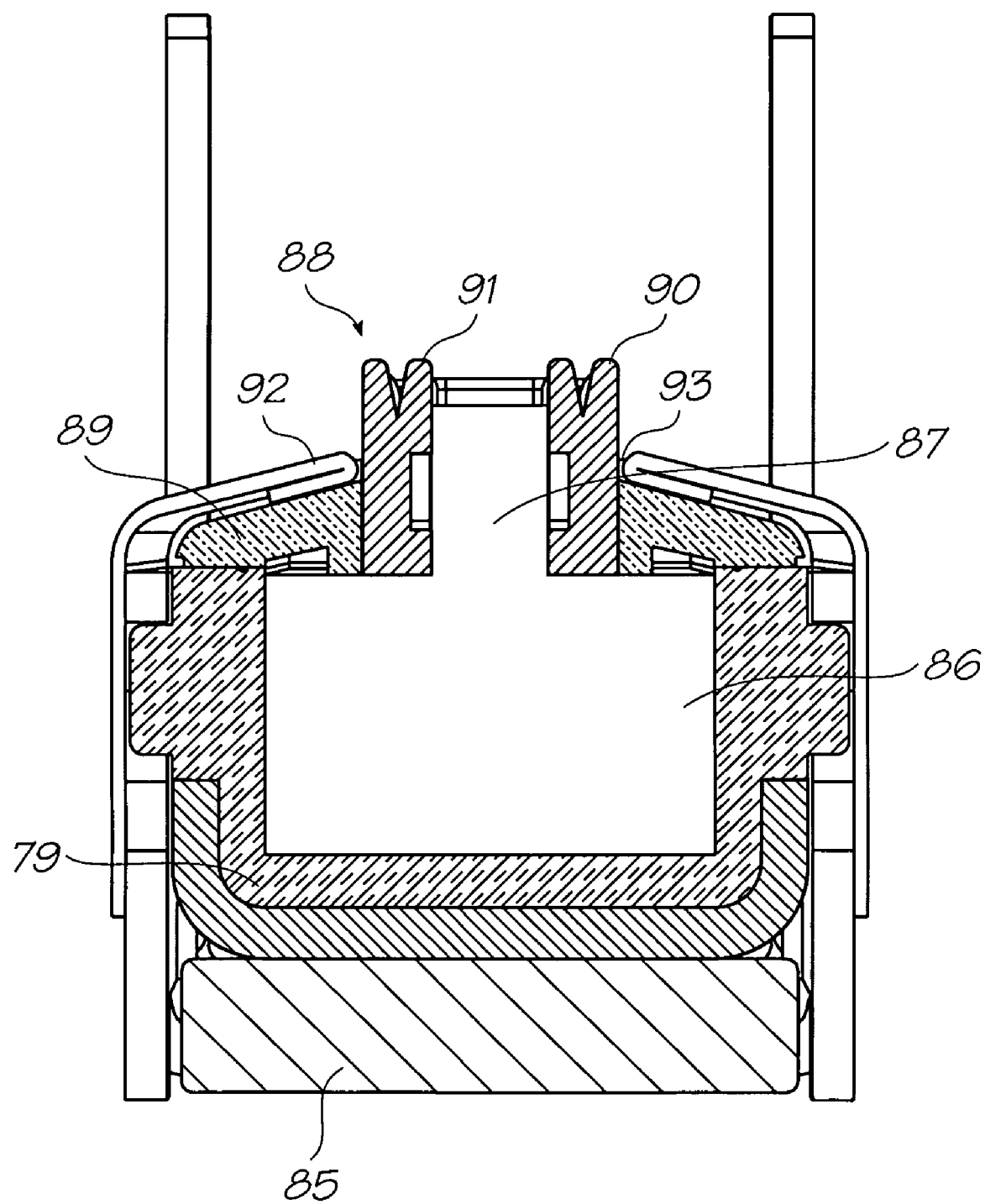
FIG. 65 shows a sectional end view of the capper assembly of FIG. 62.

The retainer element 92 is essentially in the form of an open ended channel which fits over the upper capper moulding 88 and encloses the components therein. A slot 93 is formed in the upper surface of the retainer element 92 through which the upper portion 90 of the upper capper moulding 88 can protrude and the slot is shaped to conform to the shape of the upper portion 90 of the upper capper moulding 88, as is shown in FIG. 65. The upper surface of the retainer element 92 is curved and acts as a media guide during printing, as will be described in more detail later. The retainer element 92 is fixed to the chassis via a snap-fit arrangement whereby lugs 94 formed in the retainer element 92 are received in recesses 95 provided in the chassis 74. When assembled in this manner, the components of the capper assembly 23 are contained within the retainer element 92 and the chassis 74, and the electromagnetic button 85 secured to the rigid insert 78 is aligned with the centrally located removed portion 76 of the chassis.

Upon assembly and attachment of the capper assembly 23 to the end supports 40 of the main body 20, due to the presence of the spring arms 77 extending inwardly from the base of the chassis 74, the rigid insert 78 which contains the lower capper moulding 79, absorbent media 86 and the upper capper moulding 88 therein, is supported on the spring arms 77 and is raised from the base of the chassis 74. This state is shown in FIGS. 62 and 65, and in this state the upper portion 90 of the upper capper moulding 88 protrudes through the slot 93 provided in the retainer element 92. This state is the capping state, whereby the upper rim portion 91 of the upper capper moulding 88 contacts the printhead assembly 22 and acts as a perimeter seal around the printhead integrated circuits 50, sealing them within the confined space of the capper assembly 23. In the capping state, the nozzles 51 of the printhead integrated circuits 50 may fire and spit ink into the absorbent material 86. The absorbent material 86, is typically retained in a moist state at all times, such that when the integrated circuits are in the capping state, the nozzles are sealed in a moist environment which prevents ink from drying in the nozzles of the integrated circuits and blocking the nozzles.

In order to perform printing, the capper assembly 23 must be moved from a capping state to a printing state. This is achieved by causing the rigid insert 78 to act against the spring arms 77 of the chassis 74 and move in a downwards direction, towards the base of the chassis 74. This movement is caused by applying an electromagnetic force in the vicinity of the base of the capper assembly 23, proximal the centrally located removed portion 76. The activation of the electromagnet force attracts the electromagnet button 85 fixed to the underside of the rigid insert 78, thereby causing the rigid insert, which contains the lower capper moulding 79, absorbent media 86 and the upper capper moulding 88 therein, to move in a downward direction with respect to the printhead assembly 22. The centrally located removed portion 76 of the base of the chassis 74 allows the electromagnet button 85 to be fully retracted against the spring arms 77 towards the source of the electromagnetic force. This in turn causes the upper rim portion 91 of the upper capping moulding 88 to retract into the retainer element 92 such that it is flush with the outer surface of the retainer element 92 and does not protrude therefrom. It will be appreciated that the retainer element 92 does not move and is fixed in position. Such a state is referred to as the printing state, and in this state there is a gap formed between the retainer element 92 and the printhead assembly 22 through which the media can pass for printing. In the printing state, the retainer element 92 acts as a media guide and the media contacts the retainer element and is supported on the surface of the retainer element as it passes the printhead assembly for printing.

Figure 66:
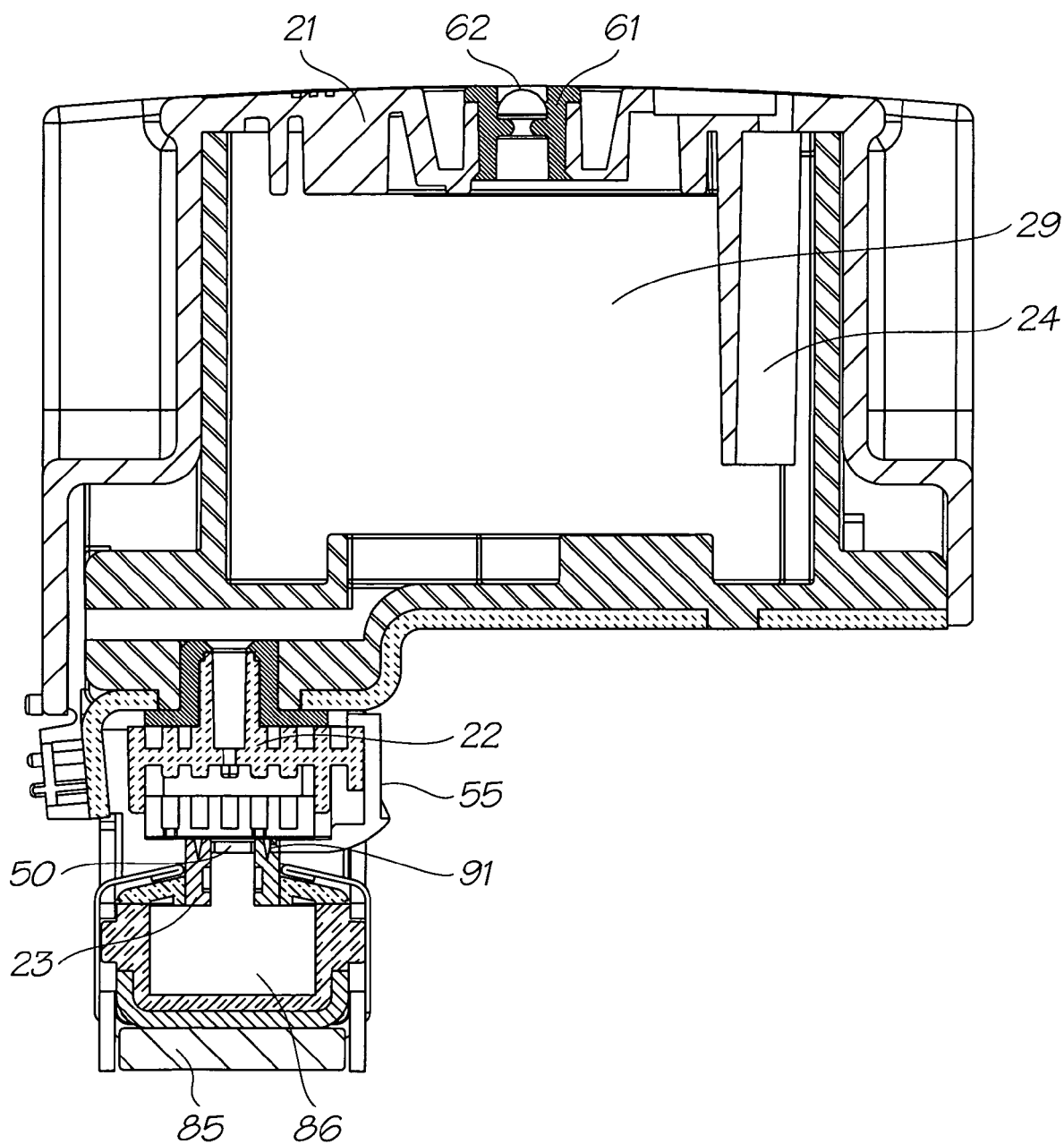
FIG. 66 shows a sectional perspective view of the capper assembly operationally mounted to the cartridge unit of the present invention in a capped state.
Figure 67:
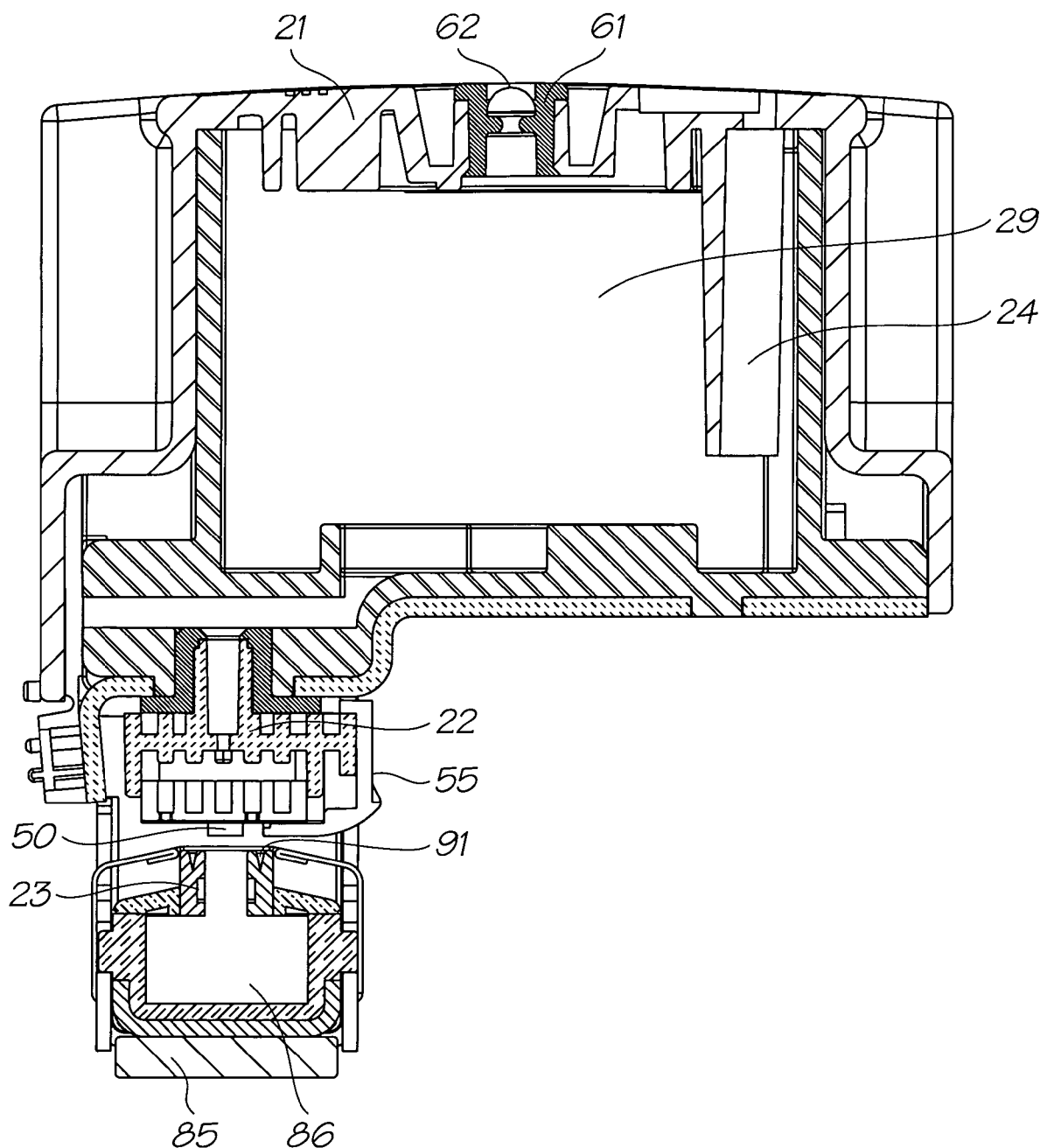
FIG. 67 shows a sectional perspective view of the capper assembly operationally mounted to the cartridge unit of the present invention in an uncapped state.

FIGS. 66 and 67 show the cartridge unit 10 in the capping state and the printing state respectively. It will be appreciated that due to the action of the spring arms 77, the capping state is the relaxed state of the capper assembly 23 and whenever printing is not occurring the cartridge unit 10 is in the capping state. In this regard, the cartridge unit 10 is packaged and shipped in the capping state. As such, to move the cartridge unit 10 into a printing state, power must be supplied to an electromagnet, which is located in the cradle unit 12 as described later, to cause the upper capper moulding 88 to retract into the retainer element 92. In the event of power failure or cessation of power to the printer unit, the electromagnetic force is removed, and the capper assembly 23 returns to the capping state under action of the spring arms 77, thereby protecting the printhead integrated circuits 50 against prolonged periods of exposure to drying air.

Cradle Unit

The cradle unit 12 is shown in relation to FIGS. 6-8 and generally consists of a main body 13 which defines an opening for receiving the cartridge unit 10, and a cover assembly 11 adapted to close the opening to secure the cartridge unit 10 in place within the cradle unit 12.

The main body 13 of the cradle unit 12 includes a frame structure 101 as shown in FIGS. 68a-68d. The frame structure 101 generally comprises two end plates 102 and a base plate 103 connecting each of the end plates 102. As mentioned previously, each of the end plates 102 is provided with anchor portions 14 formed the base thereof to enable the print engine 1 to be secured in position within the printer unit 2. A drive roller 104 and an exit roller 105 are mounted between the end plates 102 via mounting bearings 106 and are separated a distance to accommodate the cartridge unit 10 when the print engine 1 is fully assembled. The drive roller 104 and the exit roller 105 are each driven by a brushless DC motor 107 which is mounted to one of the end plates 102 and drives each of the drive and exit rollers via a drive mechanism 108, such as a drive belt. Such a system ensures that both the drive roller 104 and the exit roller 105 are driven at the same speed to ensure a smooth and consistent passage of the media through the print engine 1.

Figure 68A:
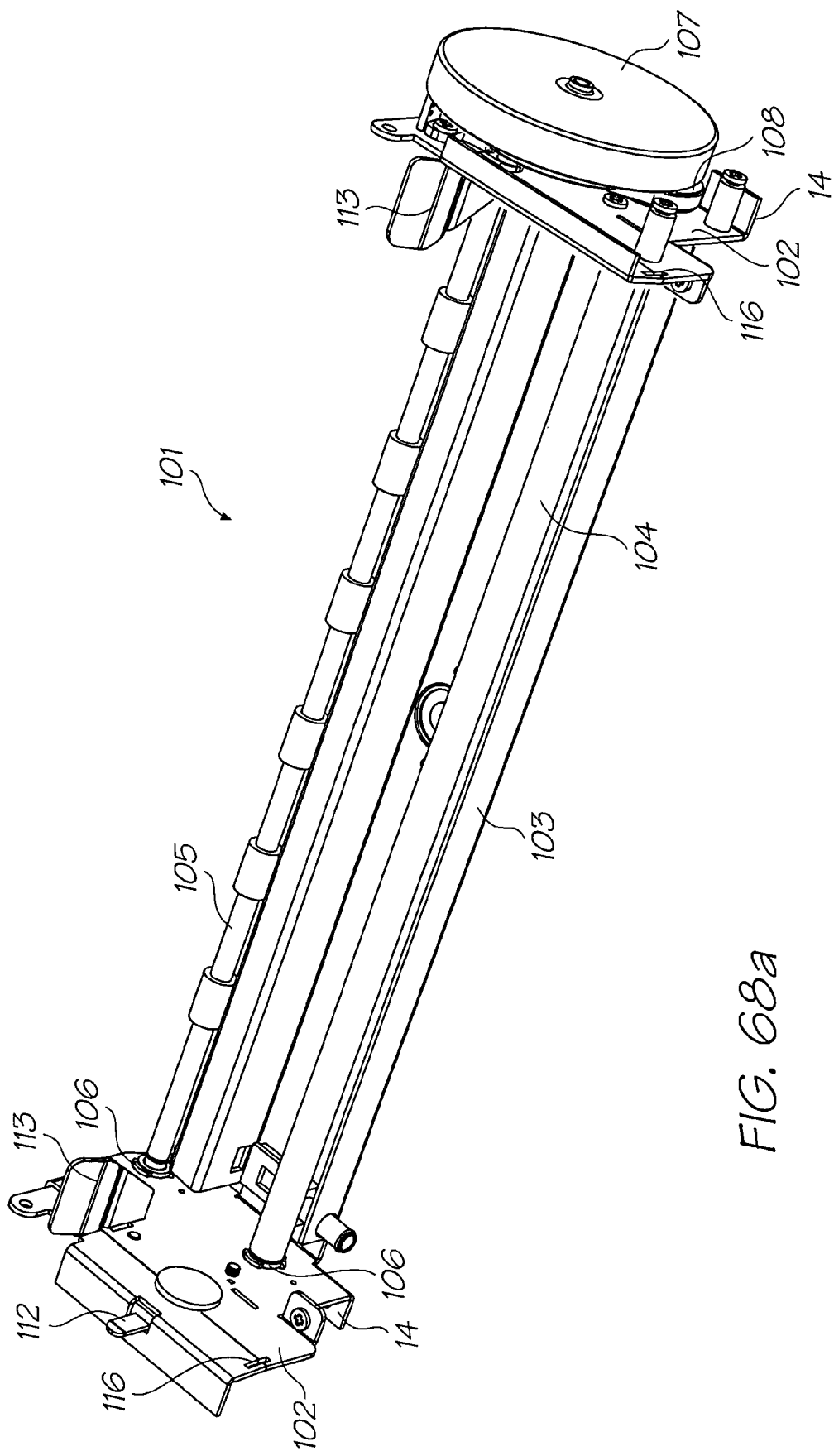
FIGS. 68a-68d show various perspective views of the frame structure of the cradle unit according to an embodiment of the present invention.
Figure 68B:
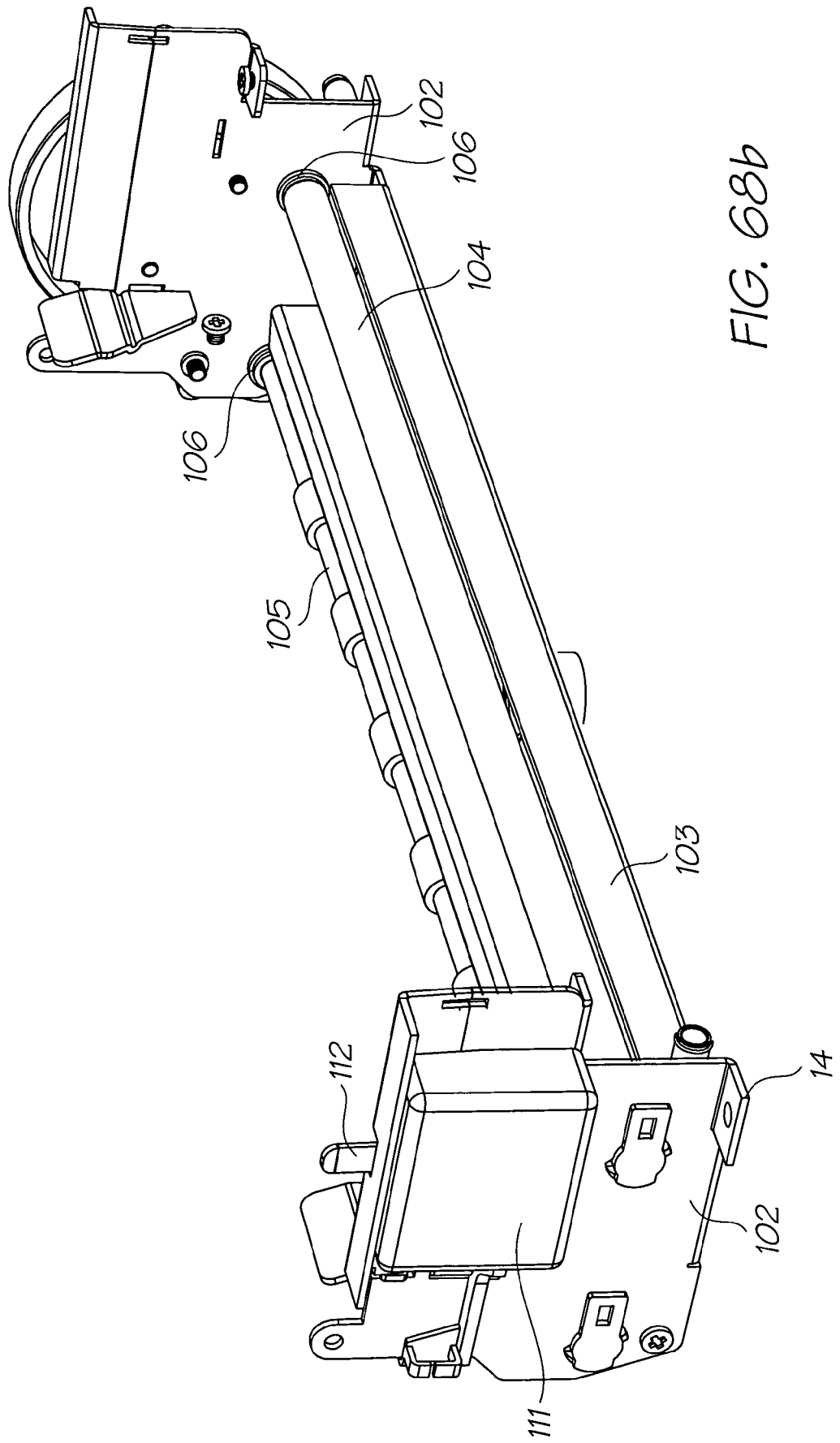
Figure 68C:
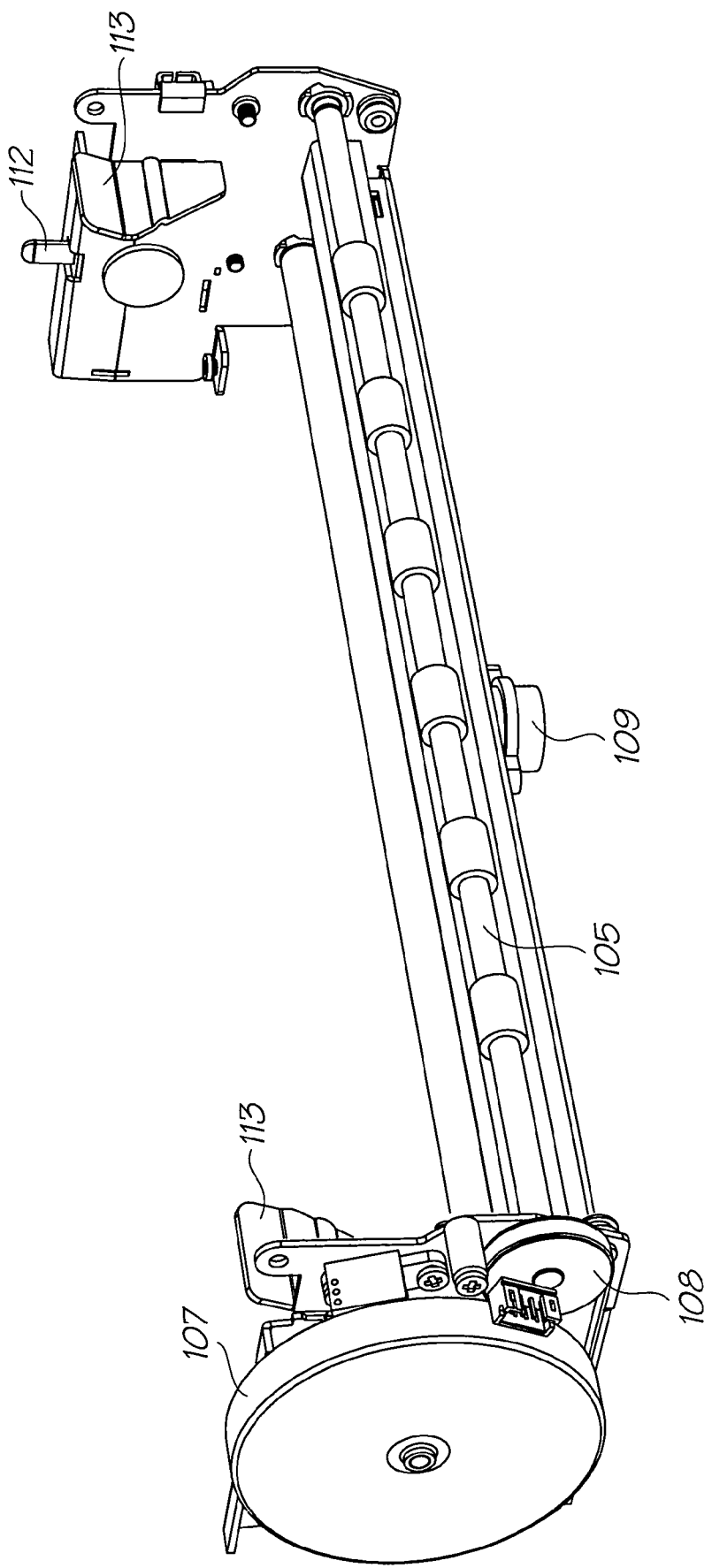
Figure 68D:
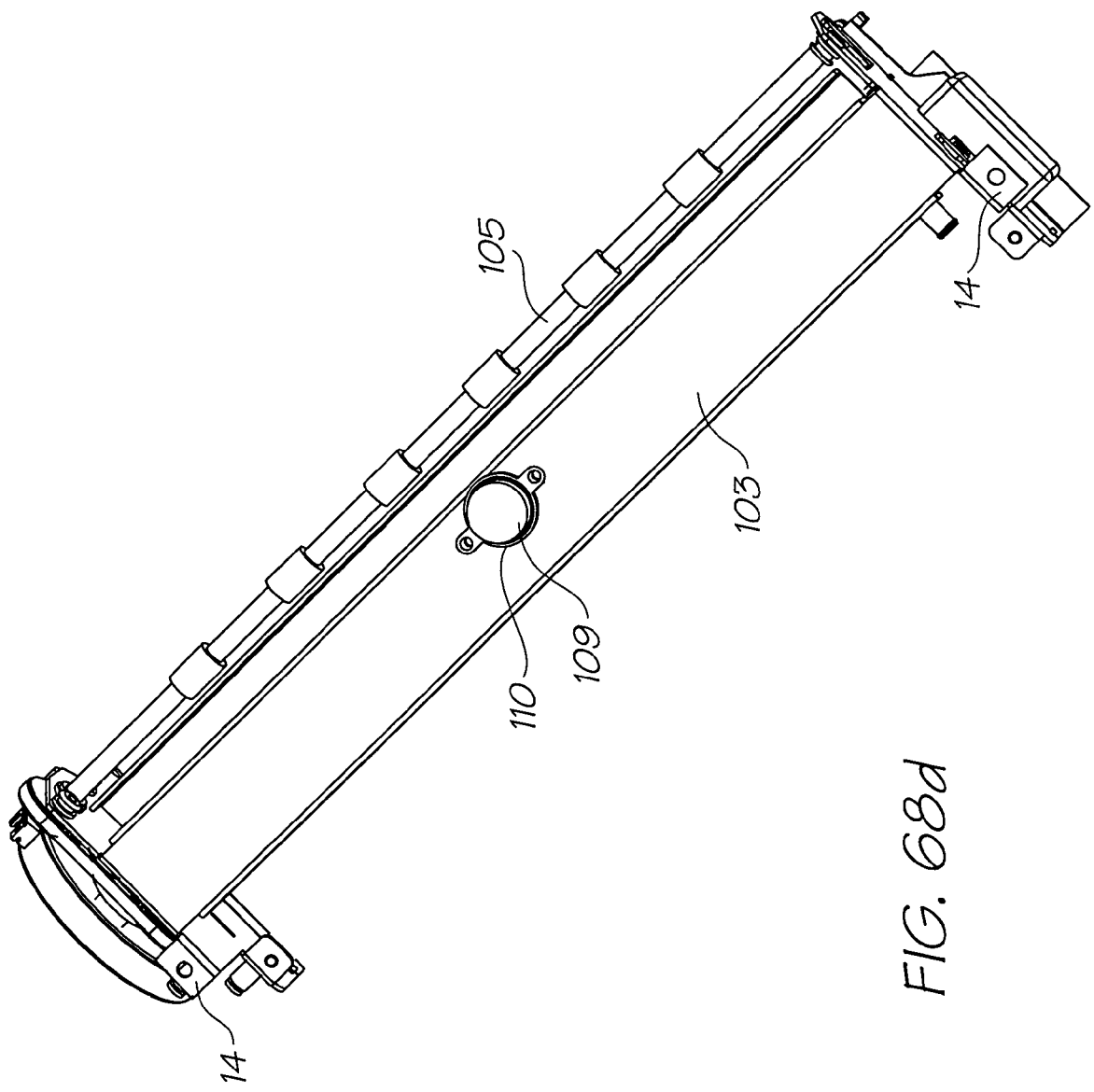

An electromagnet assembly 109 is mounted to the underside of the base plate 103 in a central position as shown most clearly in FIGS. 68c and 68d. The purpose of the electromagnet assembly 109 is to actuate the capper assembly 23 of the cartridge unit 10, as previously discussed. A hole 110 is provided in the base plate 103 around the electromagnet assembly 109 to facilitate communication with the electromagnet button 85 on the capper assembly 23.

A refill solenoid assembly 111 is mounted to the other end plate 102, opposite the DC motor 107, and is provided to operate a refill unit 200 to refill the cartridge unit 10 with refill ink, as will be described later. The refill solenoid assembly 111 is positioned such that an actuator arm 112 extends beyond the upper edge of the end plate 102, the purpose of which will become apparent later in the description.

Figure 69:
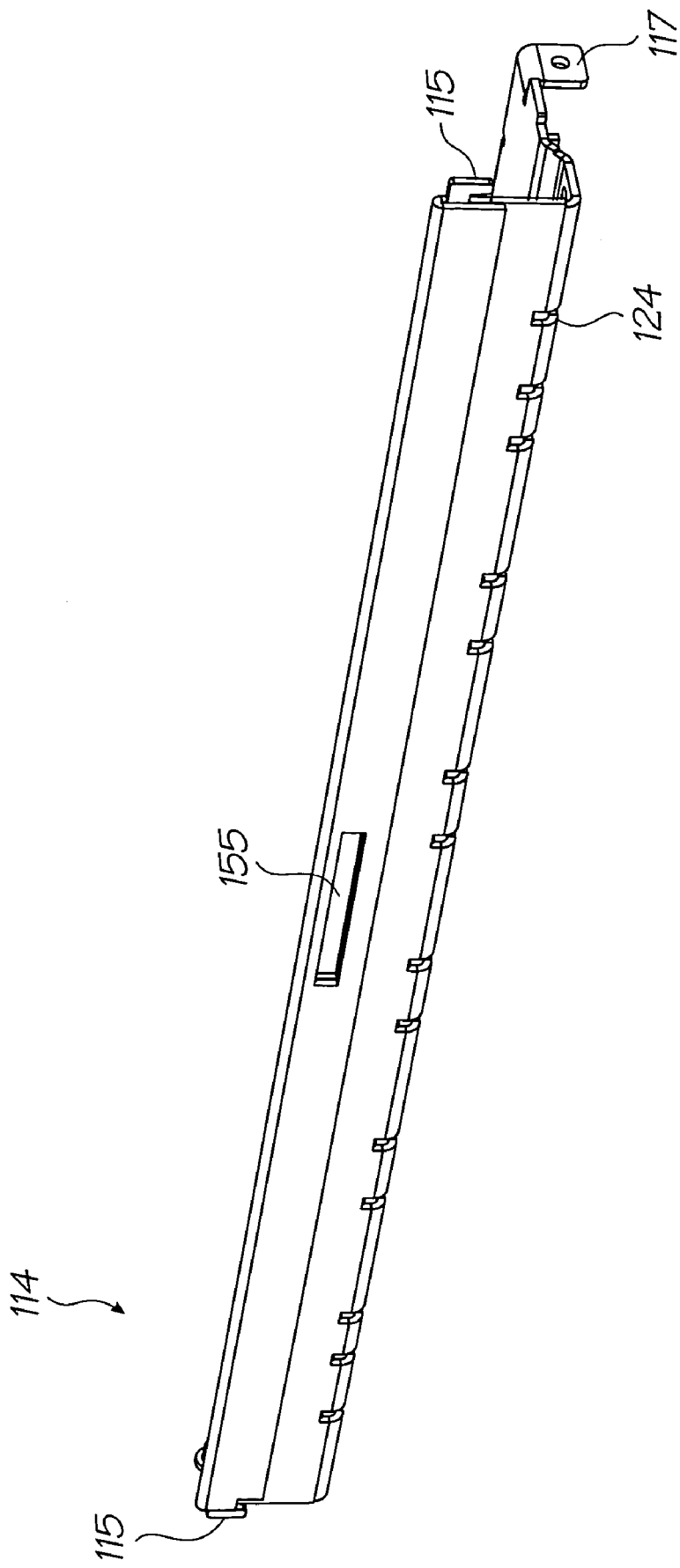
FIG. 69 shows a perspective front view of a cartridge unit support member of the cradle unit according to an embodiment of the present invention.
Figure 70:
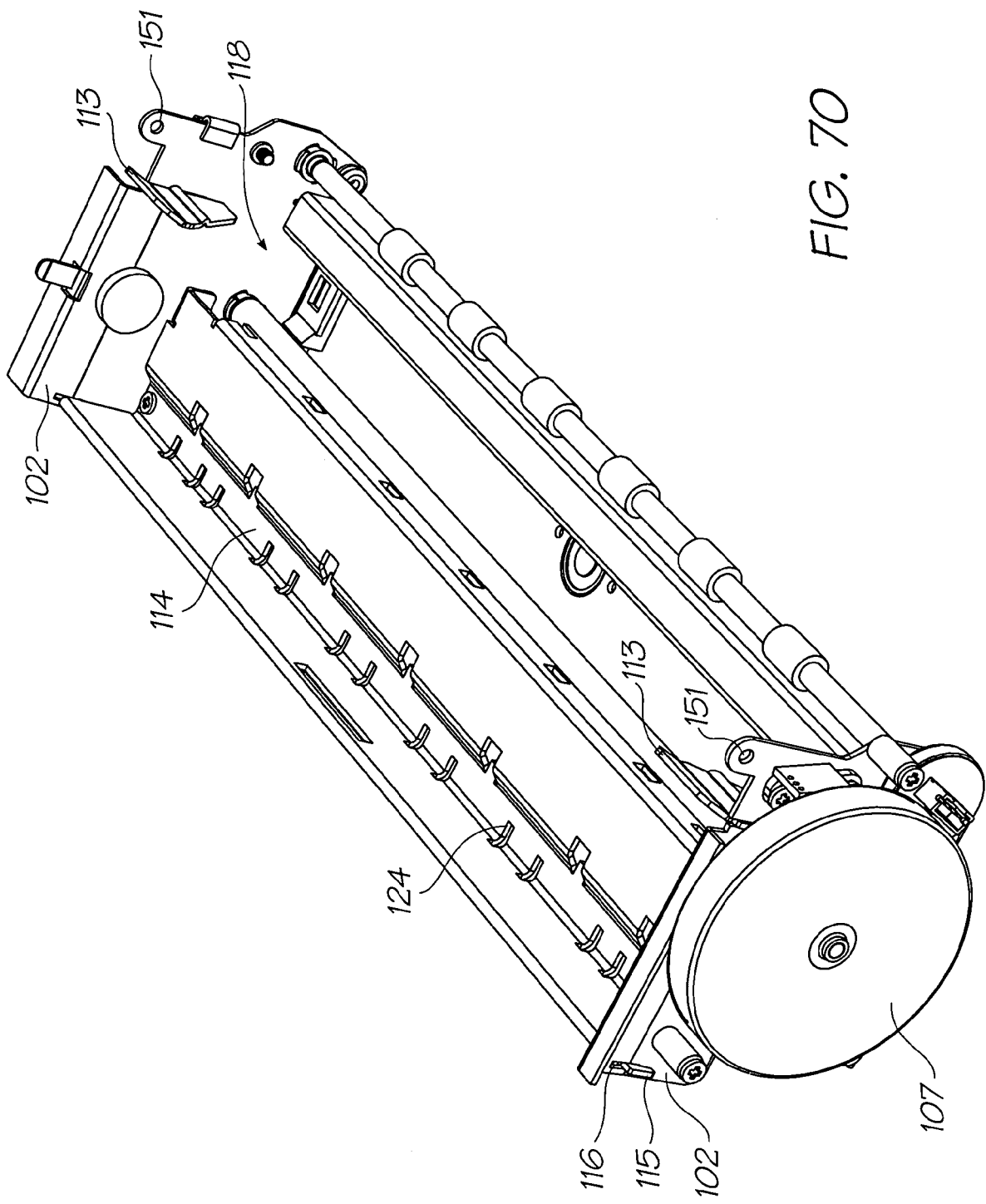
FIG. 70 shows a perspective side view of the frame structure of FIGS. 68a-68d with the cartridge unit support member of FIG. 69 attached thereto.

Cartridge unit guides 113 are also mounted to the interior surfaces of each of the end plates 102. The guides are located at the rear of the cradle unit 12 and assist in positioning the cartridge unit 10 within the cradle unit 12 to ensure that removal and replacement of the cartridge unit 10 is a simple process. To further accommodate the cartridge unit 10, a cartridge unit support member 114 is mounted between the end plates 102 at the front of the cradle unit 12. The cartridge unit support member 114 is shown in more detail in FIG. 69, and is in the form of a shaped plate fixed to the front portion of the cradle unit 12. The cartridge unit support member 114 has a pair of clips 115 which fit into recesses 116 formed in the end plates 102 and has further anchor points 117 which enable the cartridge unit support member to be fixed to the end plates 102, via screws or the like, to form a surface upon which the cartridge unit 10 can be received and supported. The cartridge unit support member 114 together with the cartridge unit guides 113, defines a space 118 for receiving the cartridge unit 10 therein which conforms to the shape of the cartridge unit 10, as shown in FIG. 70.

Figure 71A:
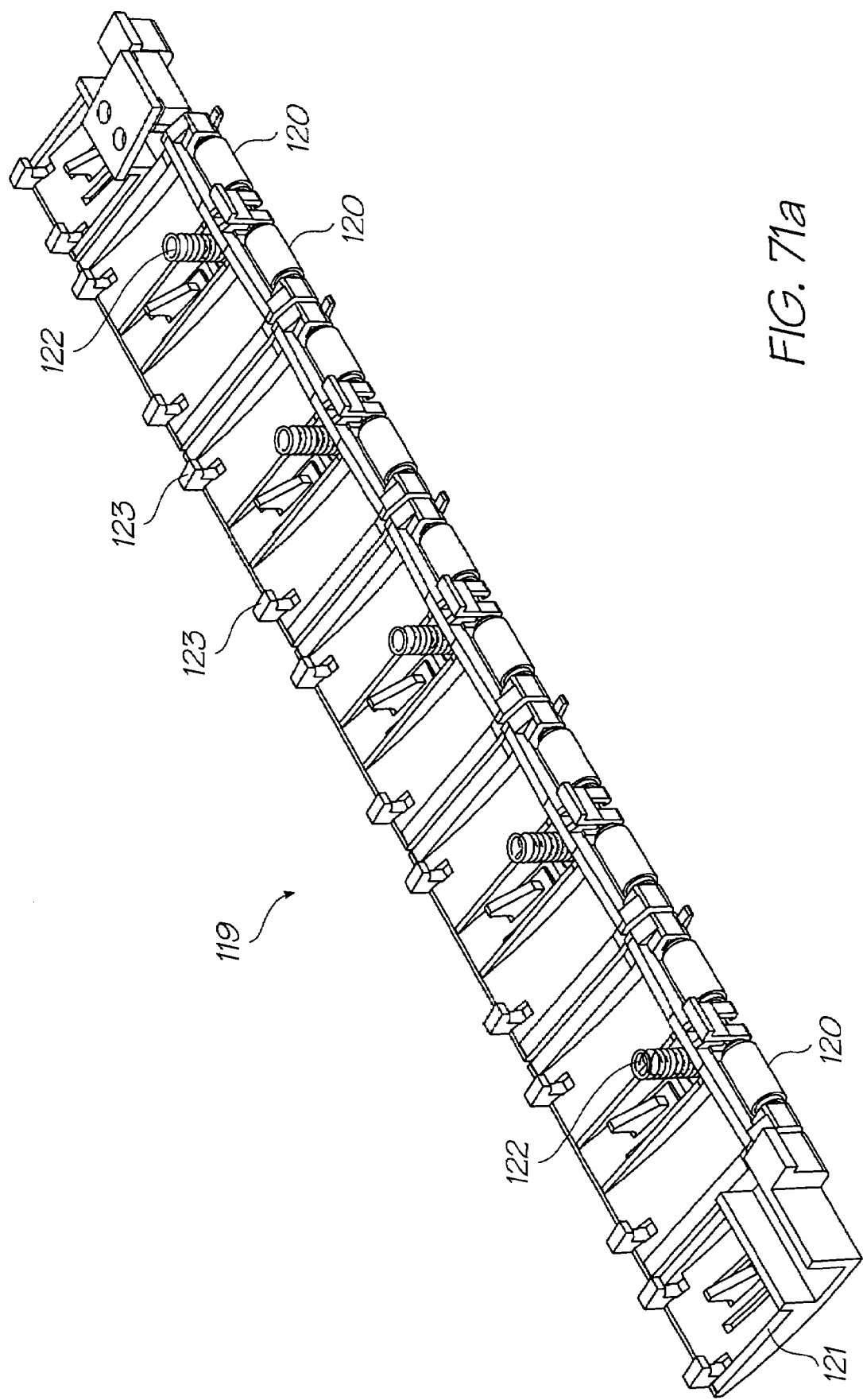
FIGS. 71a-71b show various views of the idle roller assembly of the cradle unit according to one embodiment of the present invention.
Figure 71B:
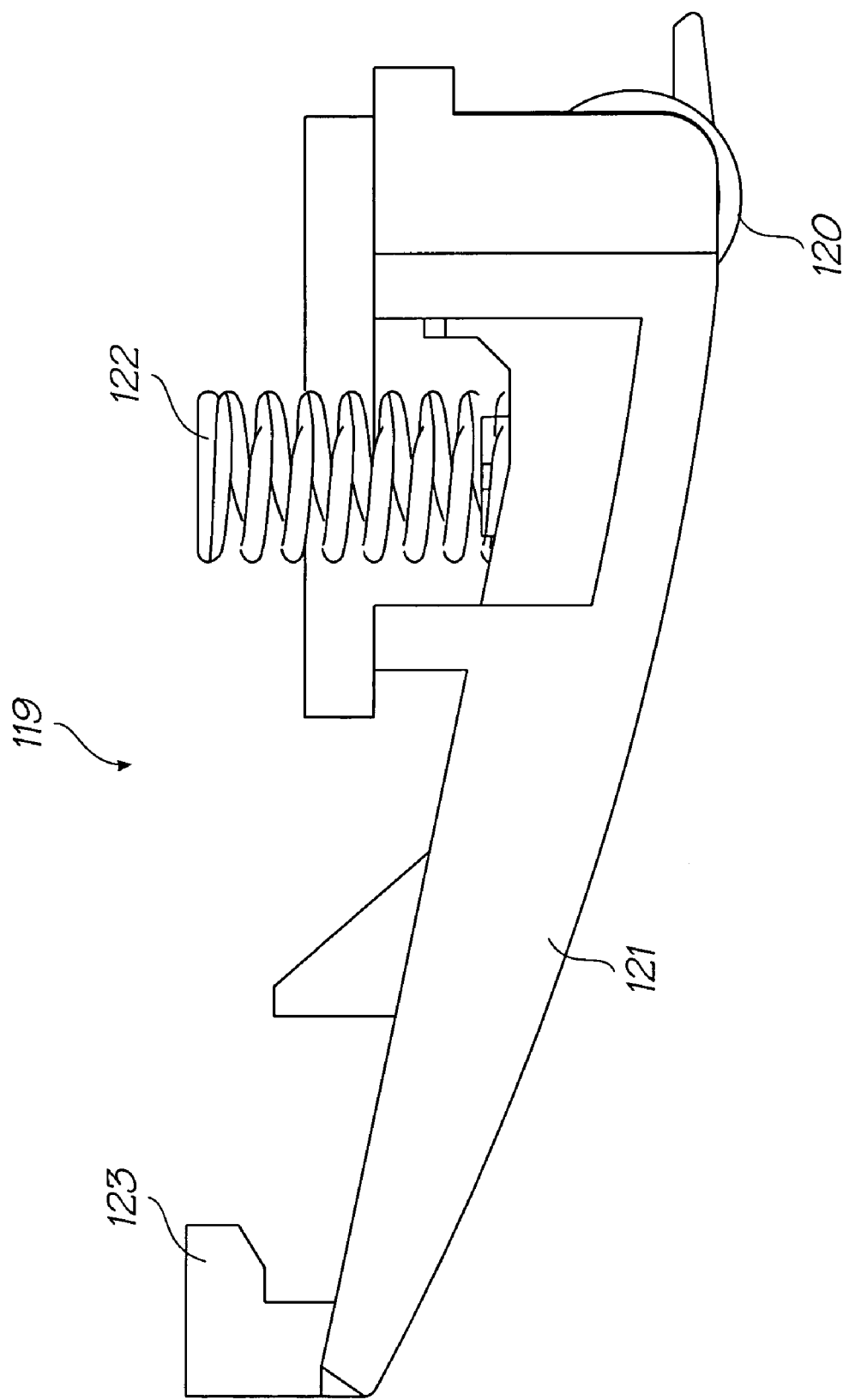
Figure 72:
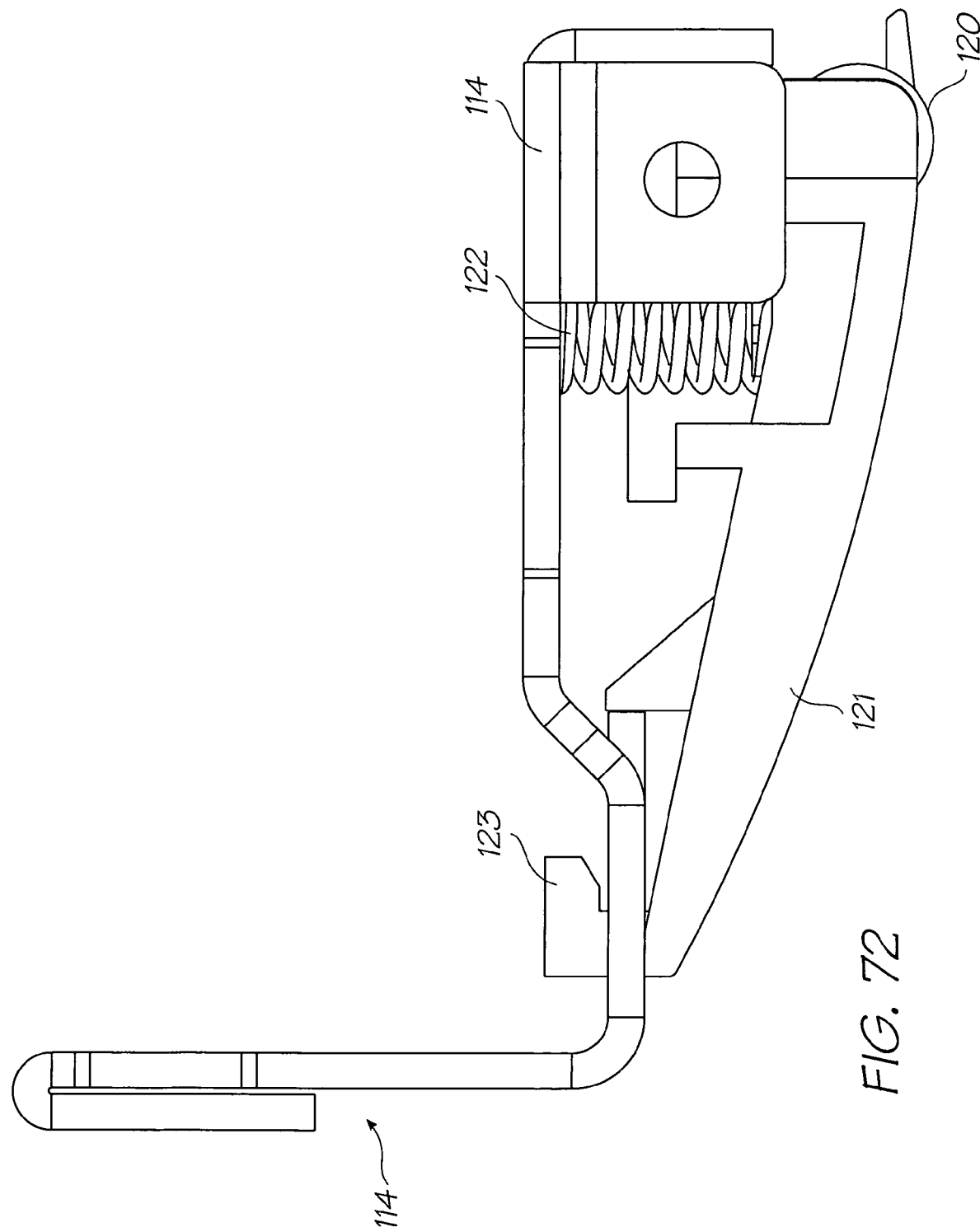
FIG. 72 shows a sectional side view of the idle roller assembly of FIGS. 71a-71b mounted to the cartridge support member of FIG. 69.

An idle roller assembly 119 is fixed to the cartridge unit support member 114 and includes a plurality of roller wheels 120 which are positioned to contact the surface of the drive roller 104 and rotate therewith. The idle roller assembly 119 is shown in FIGS. 71a and 71b and comprises a curved multi-sectioned plate 121 with each section of the plate having a pair of roller wheels 120 provided at its distal end. Each section of the plate 121 is spring loaded against the surface of the cartridge unit support member 114 via a suitable spring means 122, to allow the roller wheels 120 to move with respect to the surface of the drive roller 104 to accommodate print media therebetween. The idle roller assembly 119 is attached to the under-surface of the cartridge unit support member 114 via clips 123 which are received in corresponding slots 124 formed in the cartridge unit support member 114, as is shown in FIG. 72. Such an arrangement ensures that the media that is presented to the print engine 1 from the picker mechanism 9 of the printer unit 2, is gripped between the drive roller 104 and the idle roller assembly 119 for transport past the printhead assembly 22 of the cartridge unit 10 for printing.

Figure 73A:
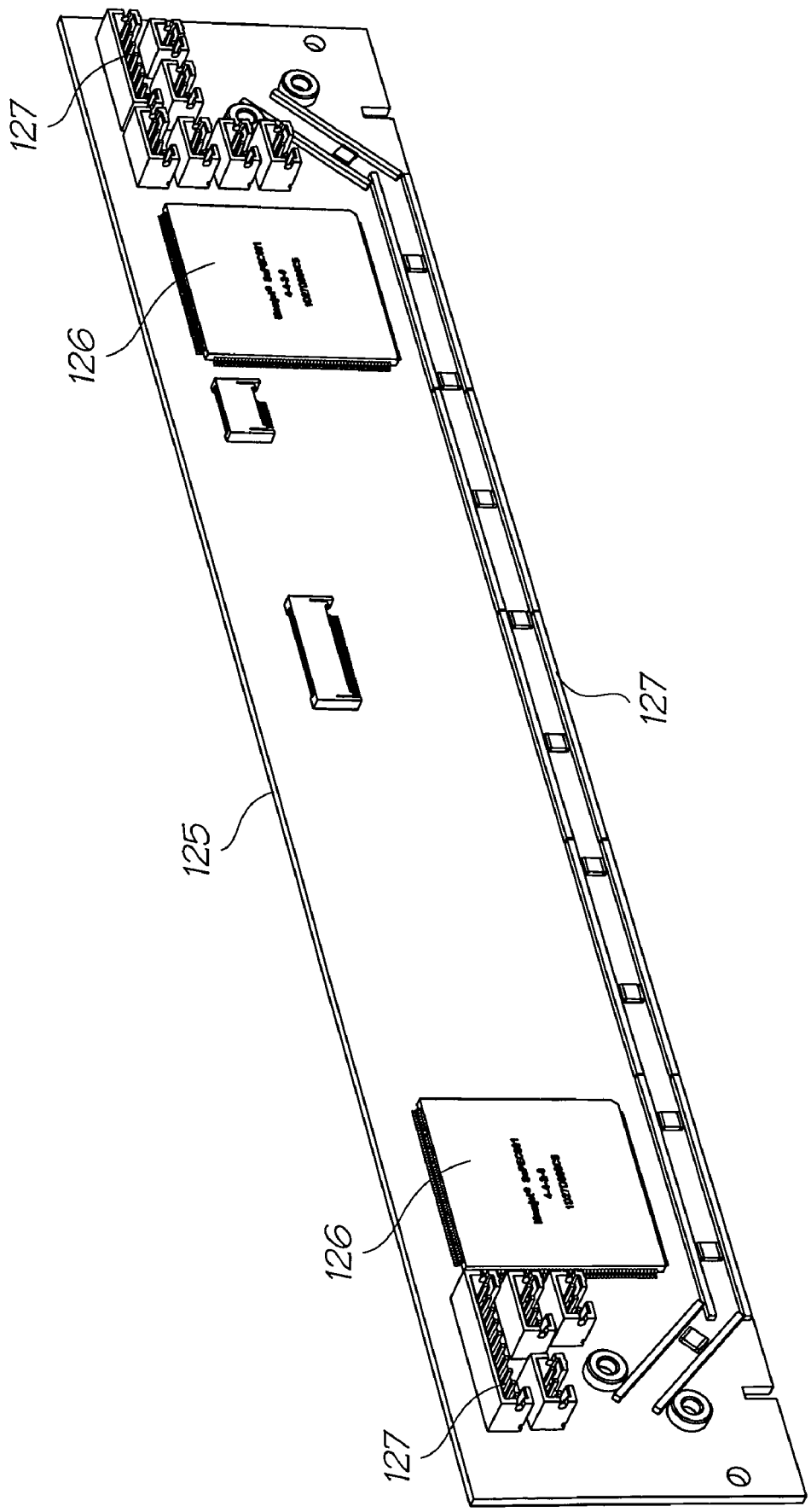
FIGS. 73a and 73b show front and back perspective views of the PCB assembly of the present invention having the control circuitry mounted thereto for controlling the print engine of the present invention.
Figure 73B:
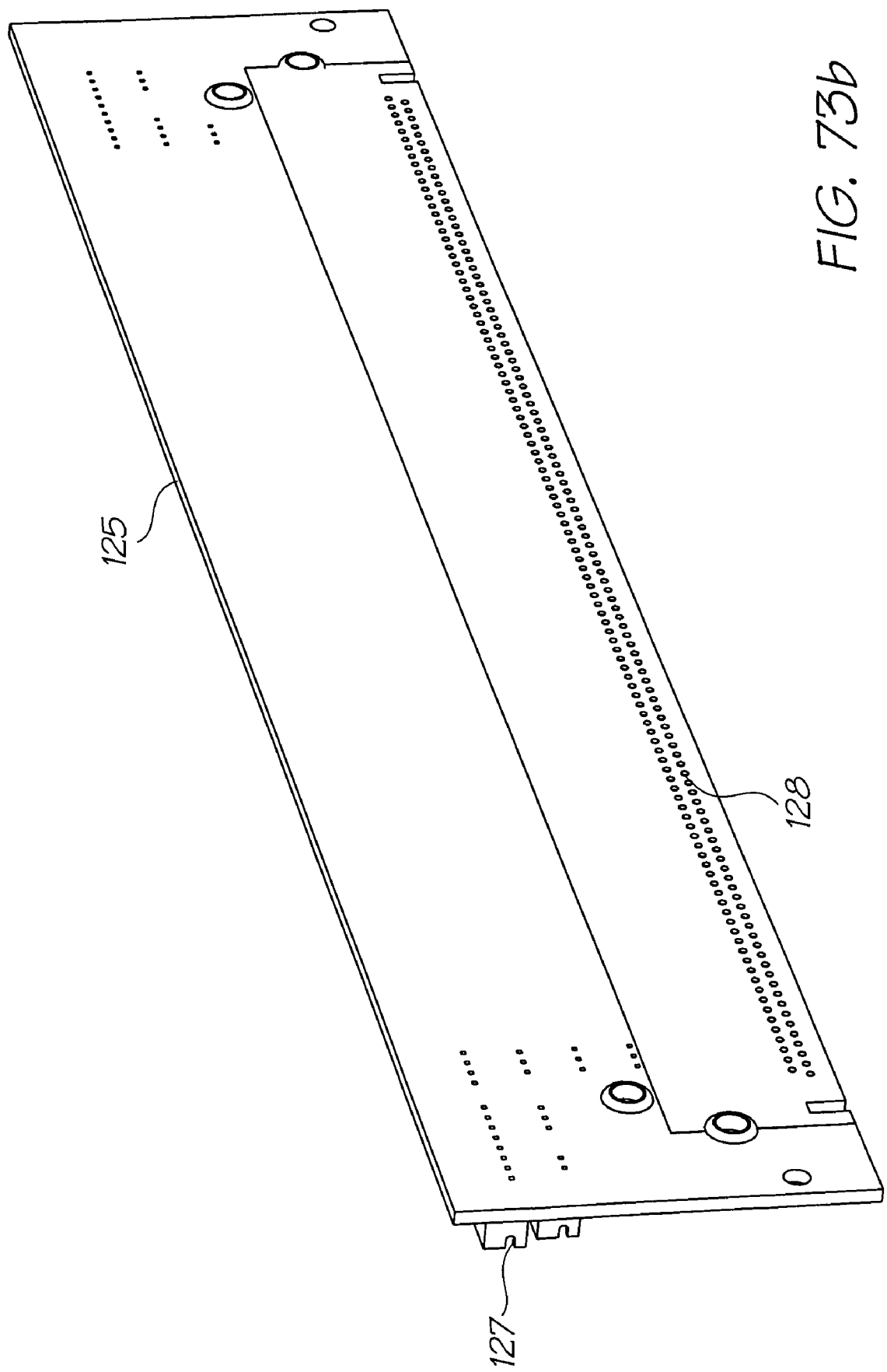

The control electronics for the print engine which controls the operation of the integrated circuits 50 of the printhead assembly 22, as well as the operation of the drive roller 104 and exit roller 105 and other related componentry, is provided on a printed circuit board (PCB) 125 as shown in FIGS. 73a and 73b. As can be seen, one face of the PCB 125 contains the SoPEC devices 126 and related componentry 127 for receiving and distributing the data and power received, as will be discussed later, whilst the other face of the PCB includes rows of electrical contacts 128 along an edge thereof which provides a means for transmitting the power and data signals to the printhead assembly 22 in a manner to be described below.

Figure 74A:
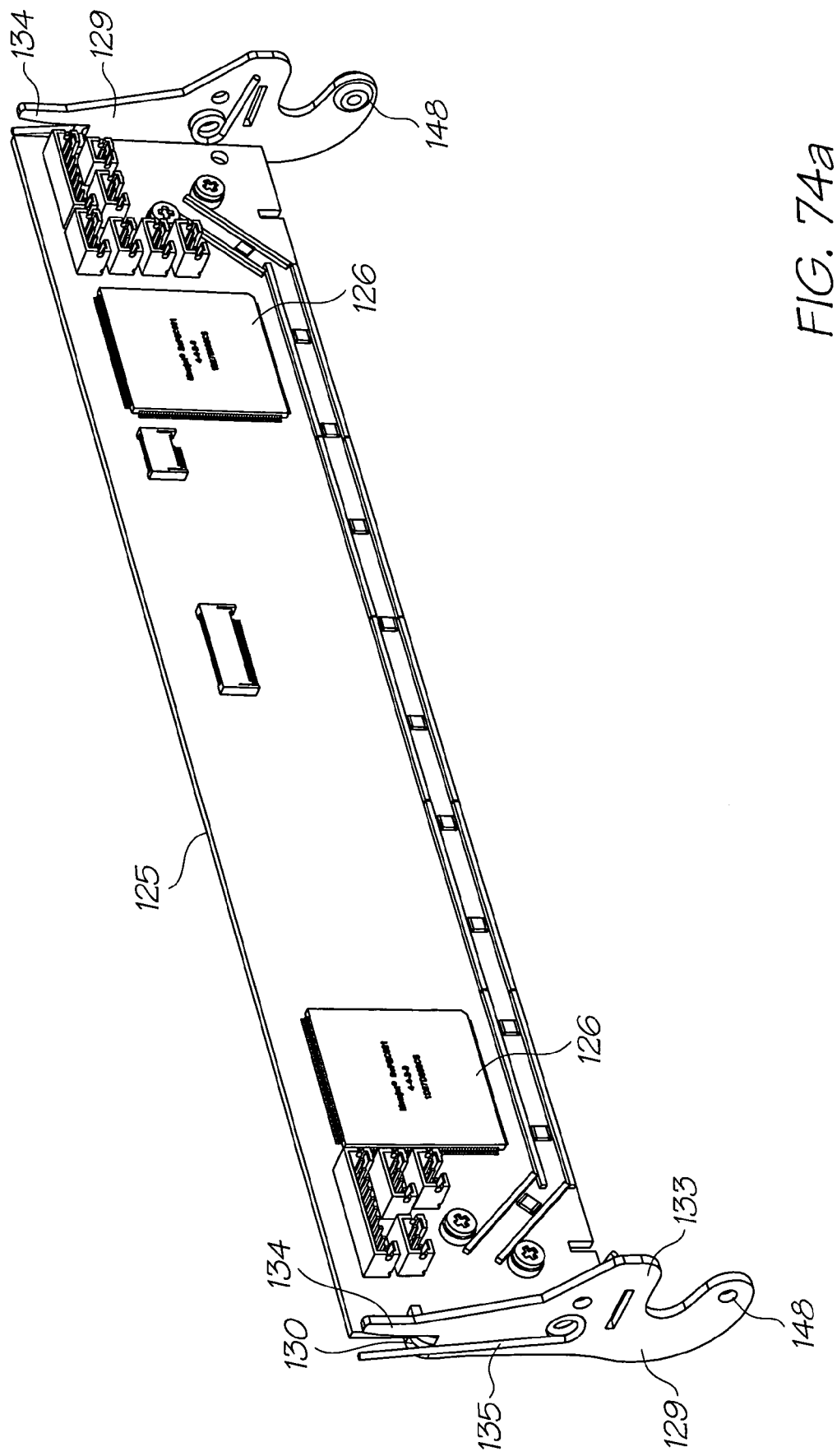
FIGS. 74a-74c show various views of the PCB assembly of FIGS. 73a and 73b mounted between arm supports.
Figure 74B:
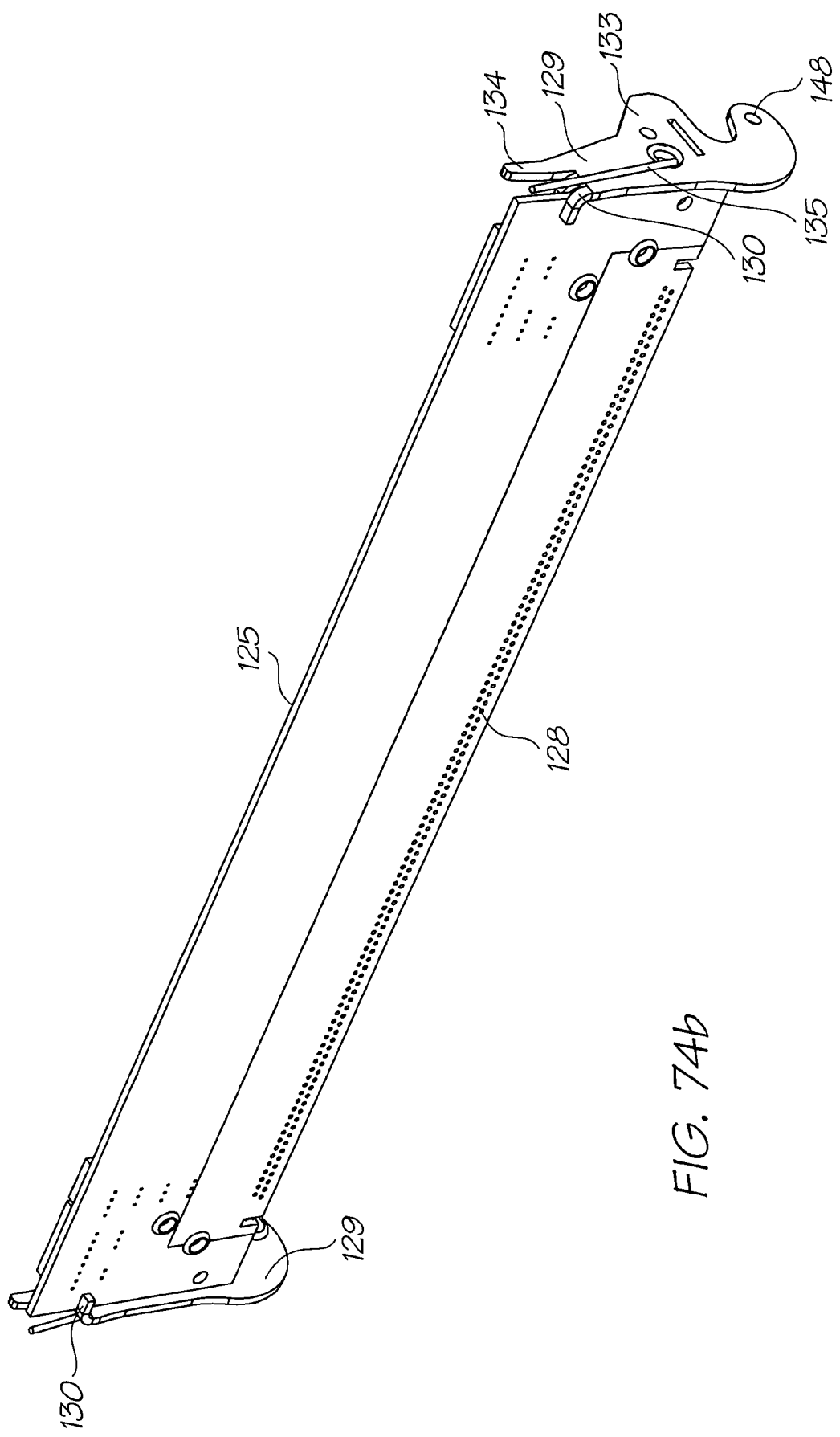
Figure 74C:
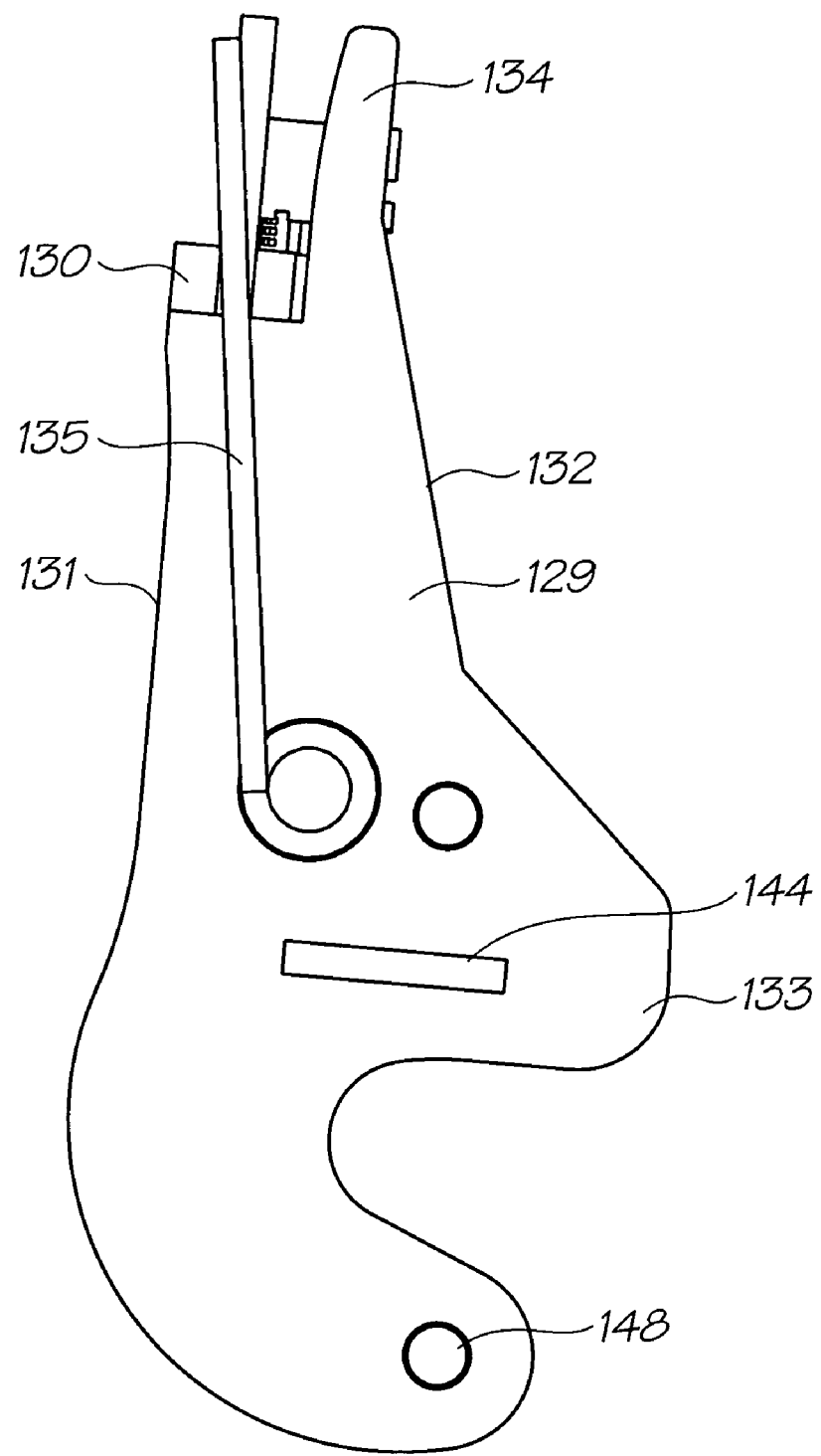

The PCB 125 is mounted between two arms 129, with each of the arms having a claw portion 130 to receive the PCB 125 in position, as shown in FIGS. 74a-74c. Each arm 129 is configured to have a substantially straight edge 131 and an angled edge 132 having a protrusion 133 formed thereon. The PCB 125 is positioned between the arms 129 such that the face of the PCB having the electrical contacts 128 formed along the lower edge thereof extends between the substantially straight edges 131 of the arms 129.

The upper region of each of the arms 129 includes an upwardly extending finger portion 134 and a spring element 135 is provided for each of the arms 129, the purpose of the finger portion 134 and the spring element 135 will be discussed in more detail later.

Figure 75A:
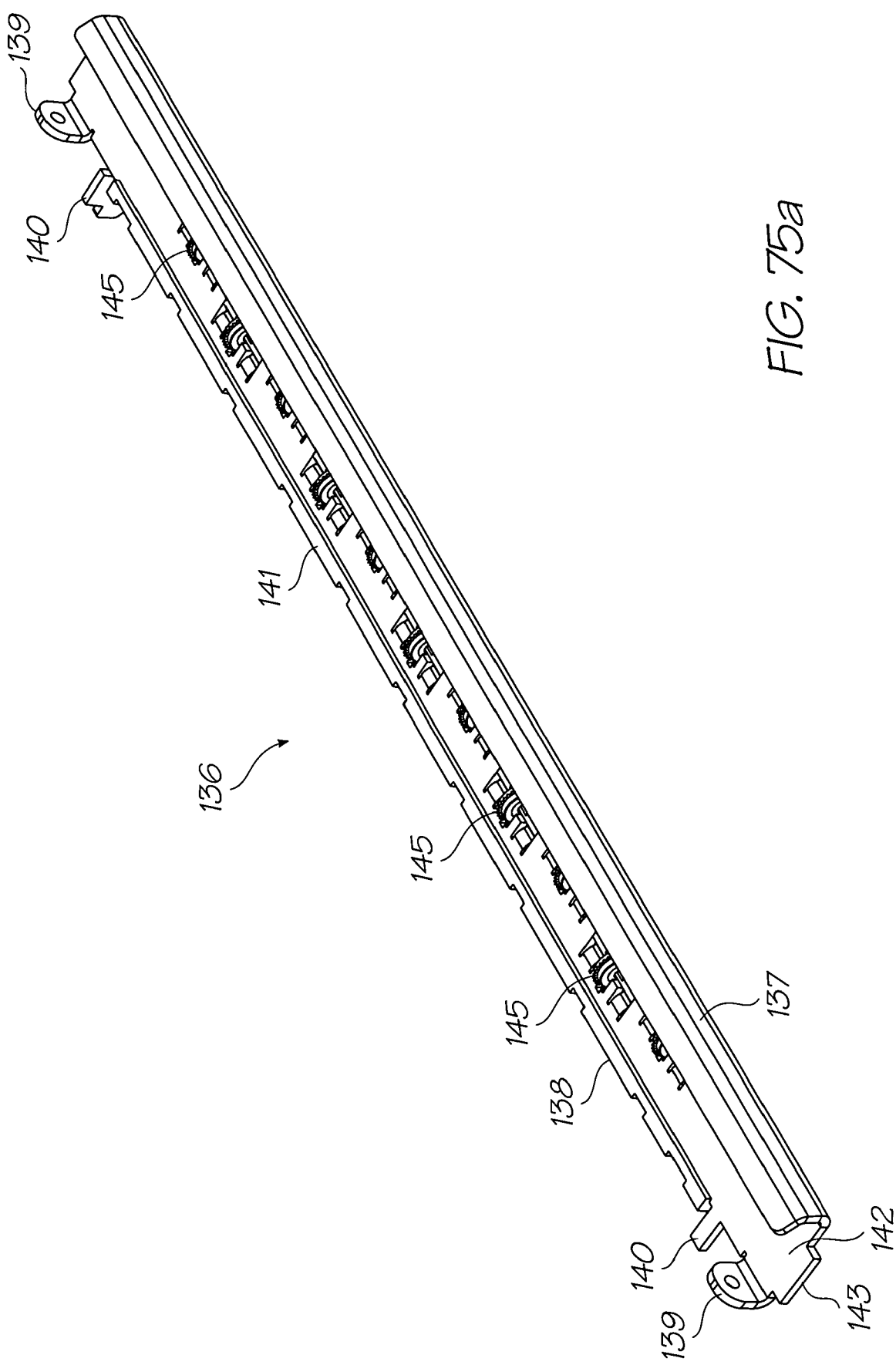
FIGS. 75a and 75b show a support bar assembly for the PCB assembly of FIGS. 73a and 73b in accordance with one embodiment of the present invention.
Figure 75B:
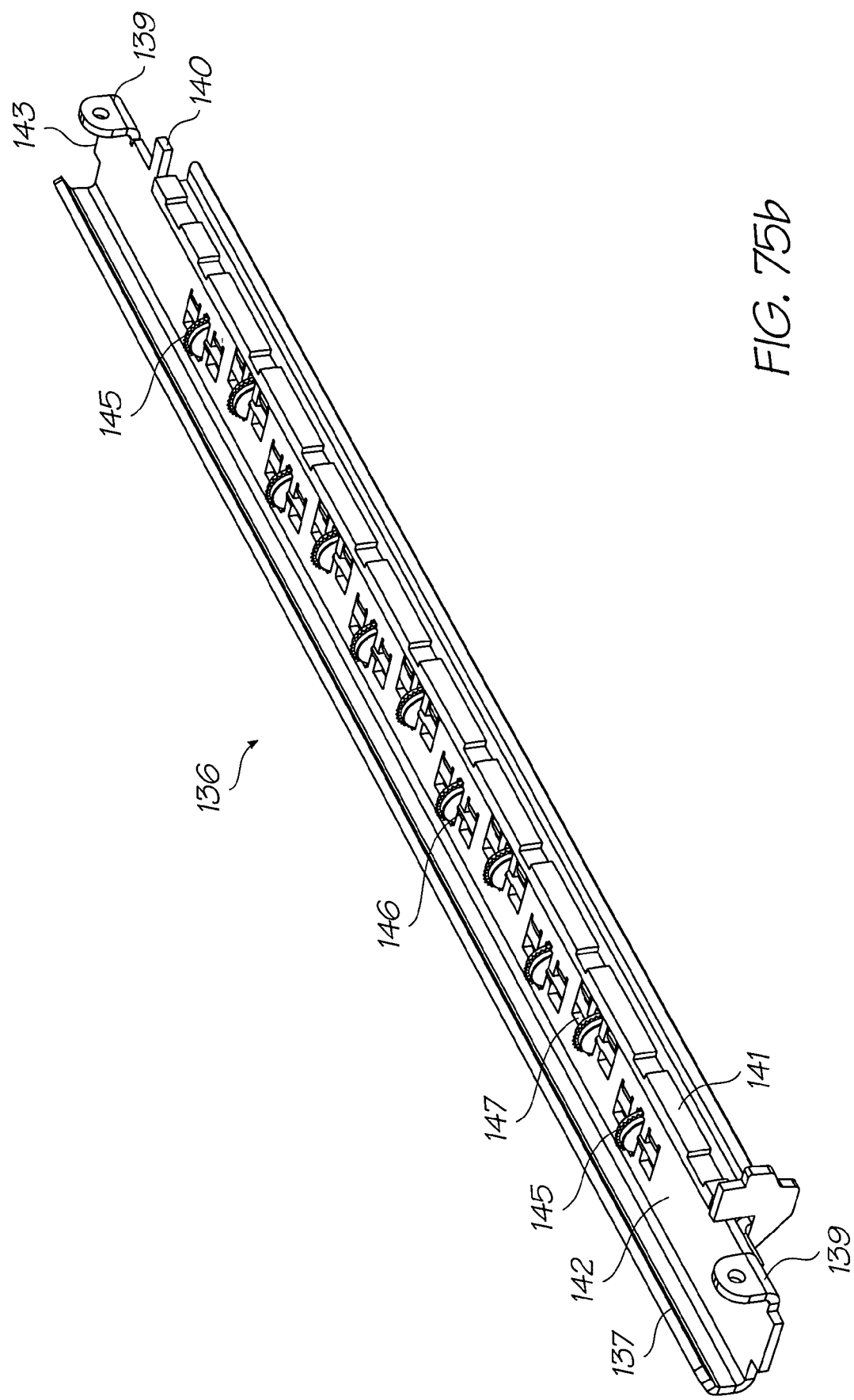

In order to provide stability to the PCB 125 as it is mounted between the two arms 129, a support bar 136 is attached to the assembly which acts along the bottom edge of the PCB 125, on the face that contains the SoPEC devices 126 and the related componentry 127. This support bar 136 is shown in FIGS. 75a-75b and consists of a curved plate 137 made from a suitable material such as steel which has appropriate strength and rigidity properties. The support bar 136 has a contact edge 138 which is arranged to contact the surface of the PCB 125, along its bottom edge opposite the electrical contacts 128. The contact edge 138 has a pair of attachment points 139 at its ends which allow the support bar 136 to be secured to the PCB 125 via screws or other suitable attachment means. Locating projections 140, are also provided to mate with appropriate locating holes in the PCB 125 to assist in correctly position the support bar 136 in place. The contact edge 138 includes an electrical insulator coating 141 along its length which performs the contact between the support bar 136 and the PCB 125. It will be appreciated that the support bar 136 contacts the surface of the PCB 125 along its' lower edge and provides backing support to the electrical contacts 128 when they come into contact with the corresponding dimple contacts 53 provided on the flex PCB 52 of the printhead assembly 22.

Figure 76:
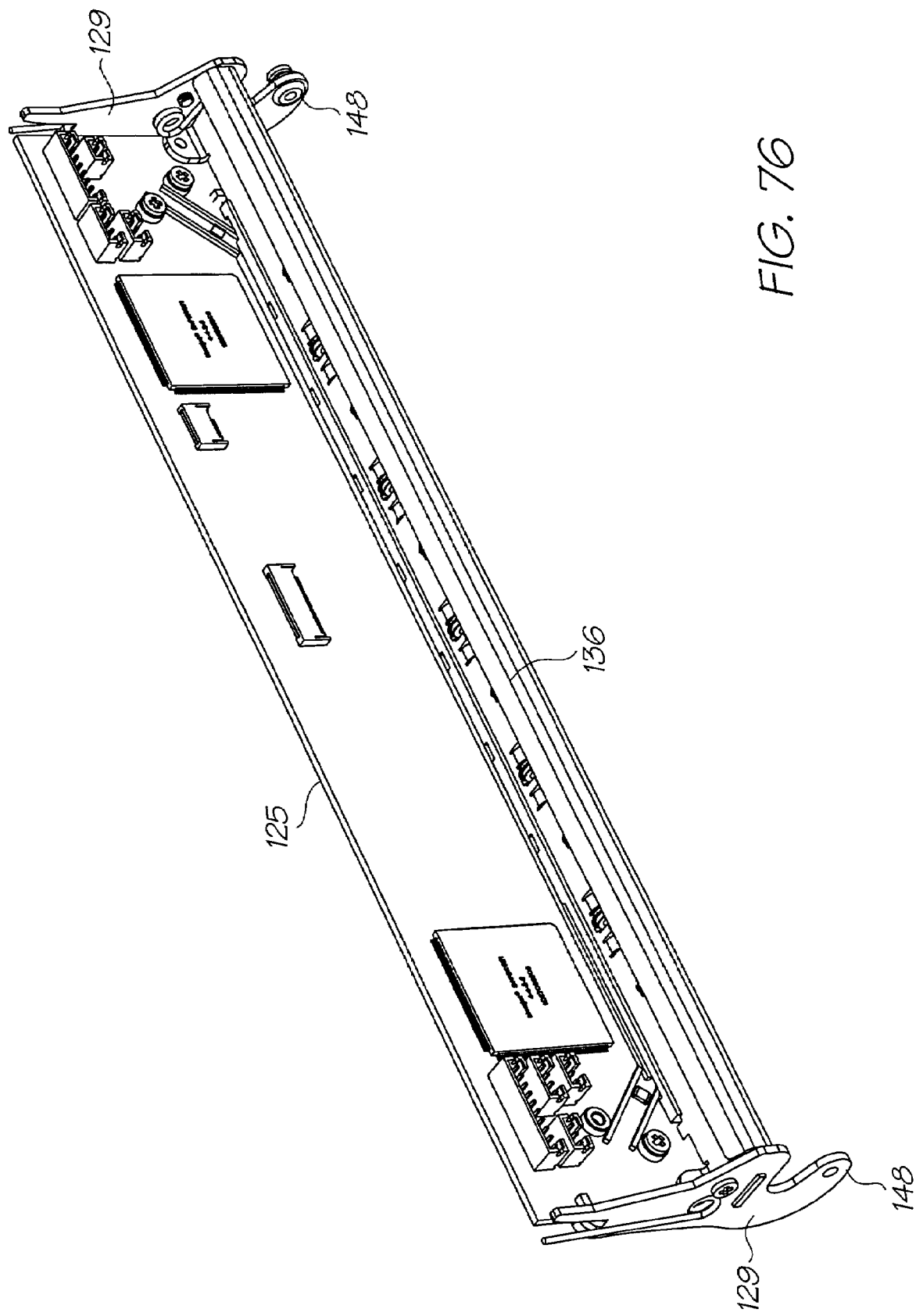
FIG. 76 shows a perspective view of the support bar assembly of FIGS. 75a and 75b assembled to the PCB assembly of FIGS. 74a-74c.

The support bar 136 also includes a relatively straight portion 142 which extends substantially horizontally from the contact edge 138. The straight portion 142 includes a pair of tabs 143 that extend longitudinally from its ends to engage with corresponding slots 144 provided in the arms 129 to further secure the support bar 136 in position. A plurality of star wheels 145 is also provided along the length of the straight portion 142 in a staggered arrangement. The star wheels 145 are secured within slots 146 formed in the straight portion 142 and are provide on spring loaded axles 147 which permits relative movement of the star wheels 145 with respect to the straight portion of the support bar 146. The star wheels 145 are provided to contact the surface of the exit roller 105 to assist in gripping and removing the printed media from the print engine 1, as will be discussed below. FIG. 76 shows the support bar 136 attached to the PCB 125 and arms 129.

Figure 77A:
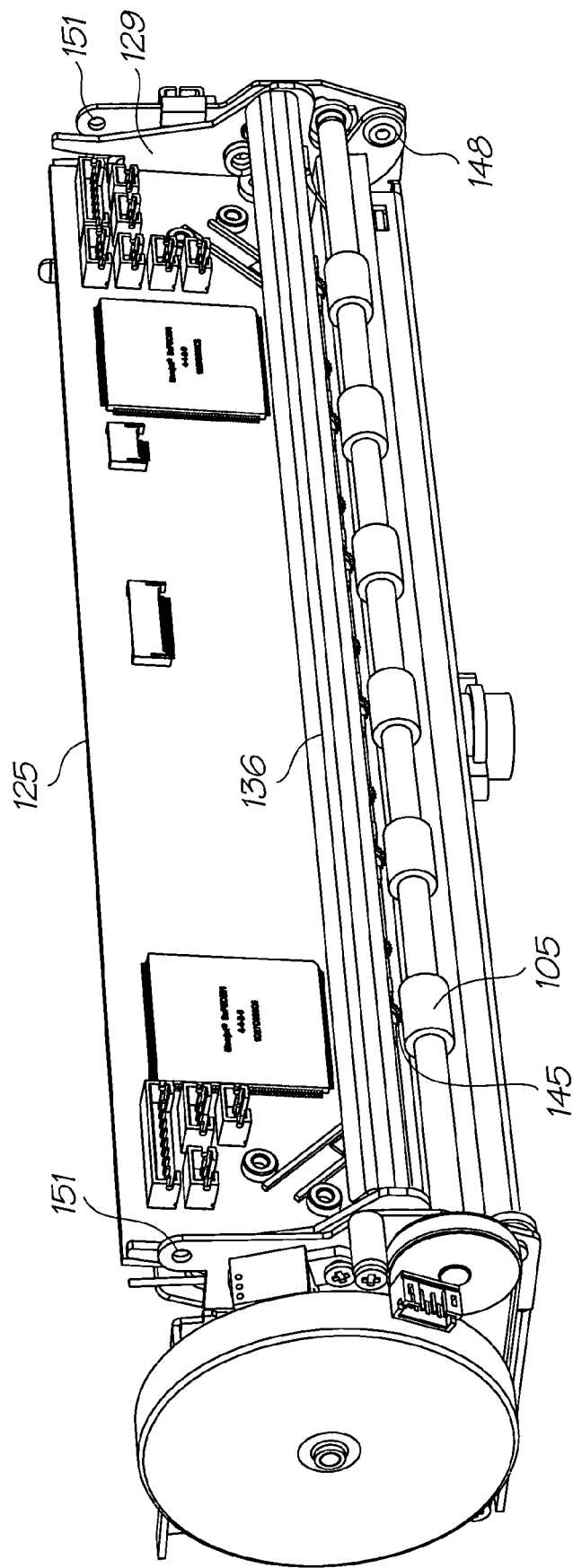
FIG. 77a and 77b shows perspective views of the assembly of FIG. 76 attached to the cradle unit of the present invention.
Figure 77B:
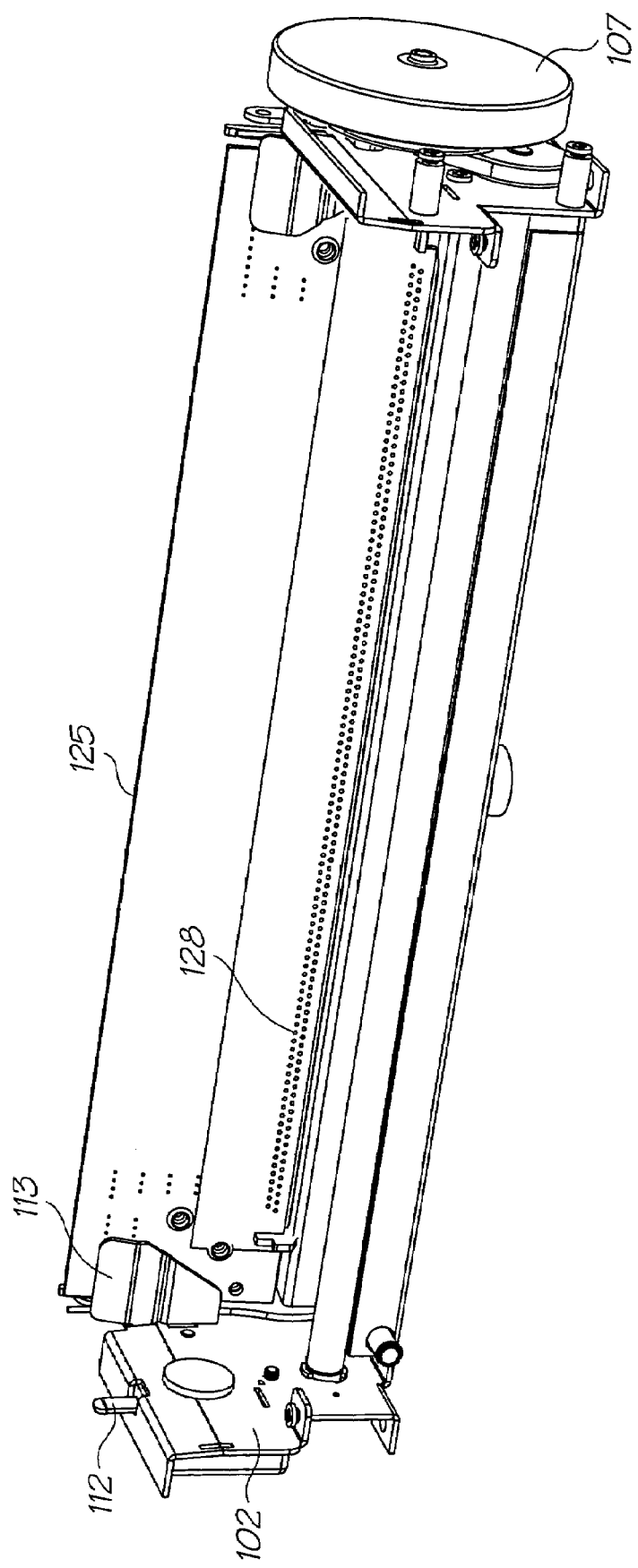

The arms 129 are attached to a bottom portion of end plates 102 at the pivot point 148 via a screw arrangement as shown in FIGS. 77a and 77b. In this arrangement the arms 129, and subsequently the PCB 125 and support bar 136, is able to pivot about the pivot point 148 between an open position wherein the contacts 128 on the PCB 125 are remote from the dimpled contacts 53 on the flex PCB 52 of the cartridge unit 22, and a closed position where the contacts 128 on the PCB 125 are in pressing contact with the dimpled contacts 53 on the flex PCB 52 of the cartridge unit 22. As clearly shown, upon attachment of the arms 129 to the end plates 102, the star wheels 145 are in contact with the surface of the exit roller 105, to capture the sheet of media therebetween for removal of the sheet from the print engine 1 to a collection area 4 for collection.

Figure 78A:
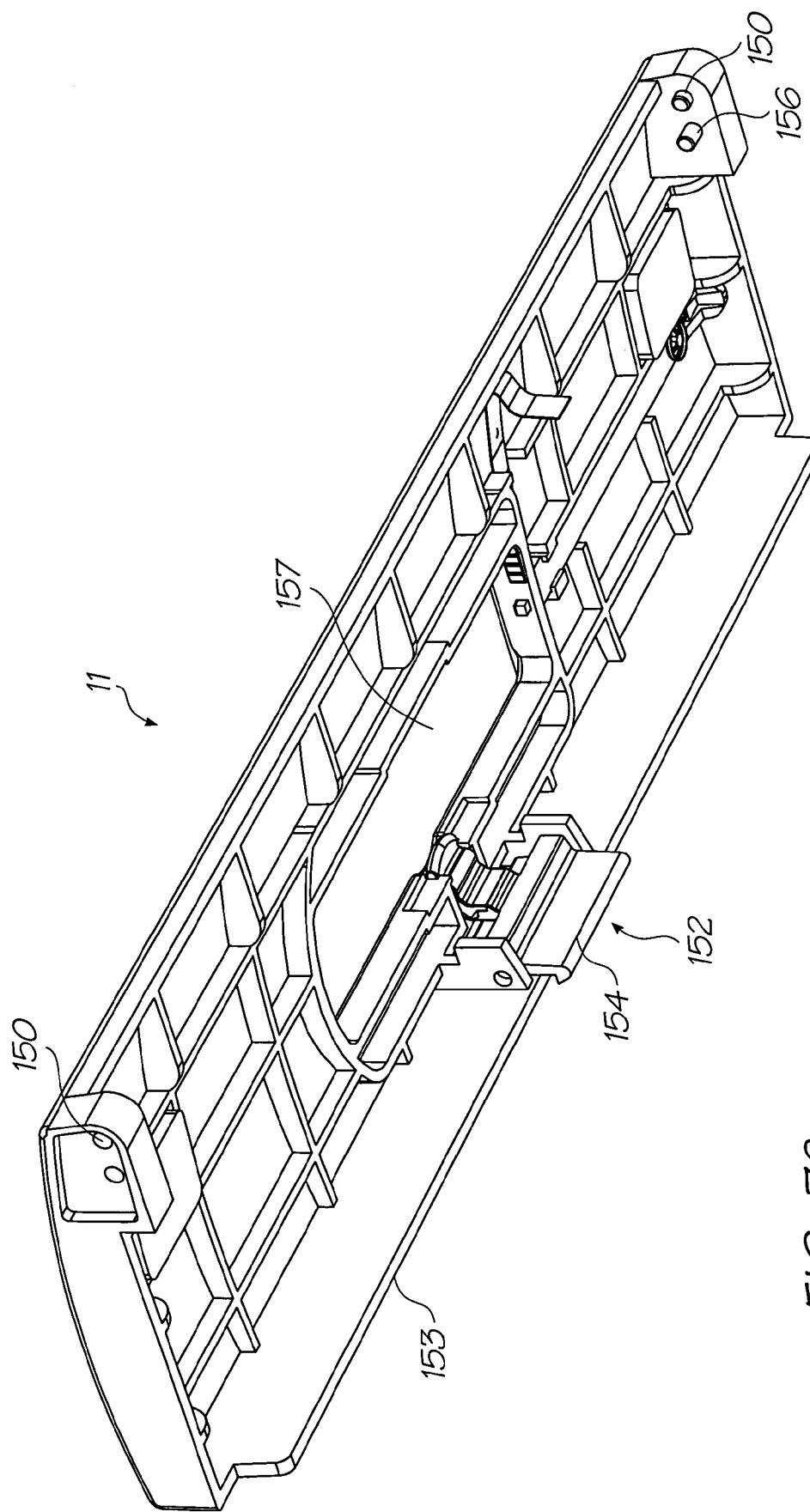
FIG. 78a-78c show various views of the cover assembly of the cradle unit according to an embodiment of the present invention.
Figure 78B:
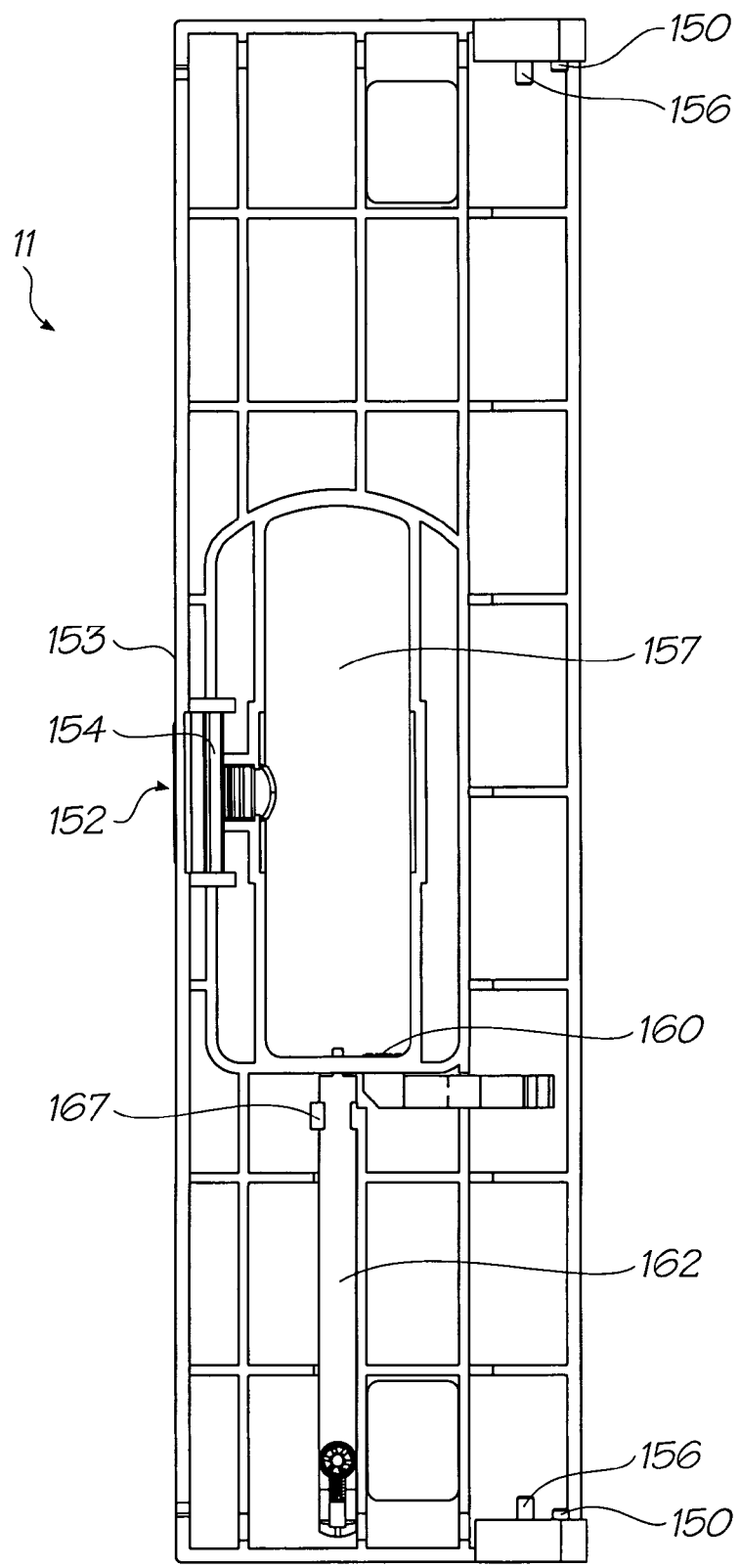
Figure 78C:
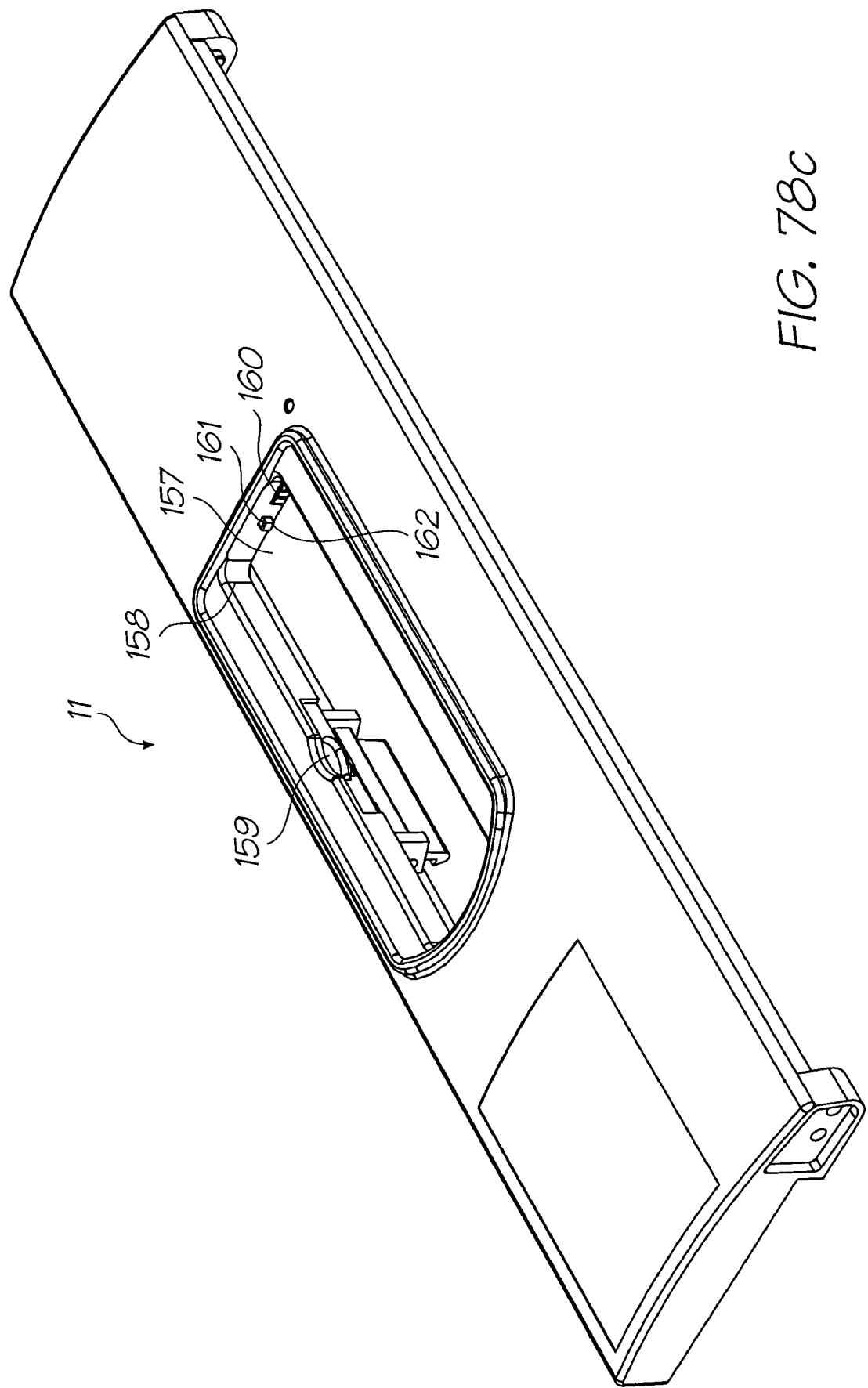
Figure 80:
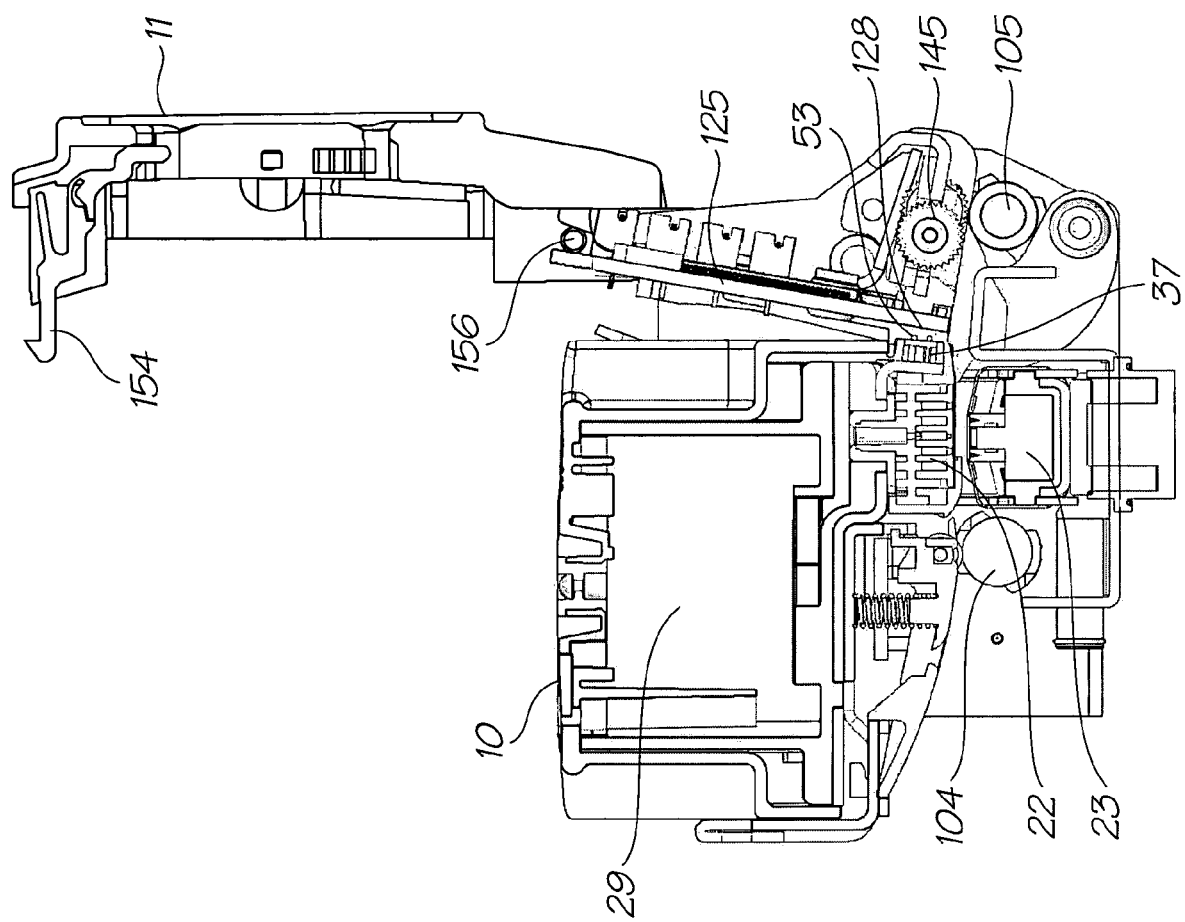
FIG. 80 shows the print engine of the present invention with the cover assembly in an open position.
Figure 81:
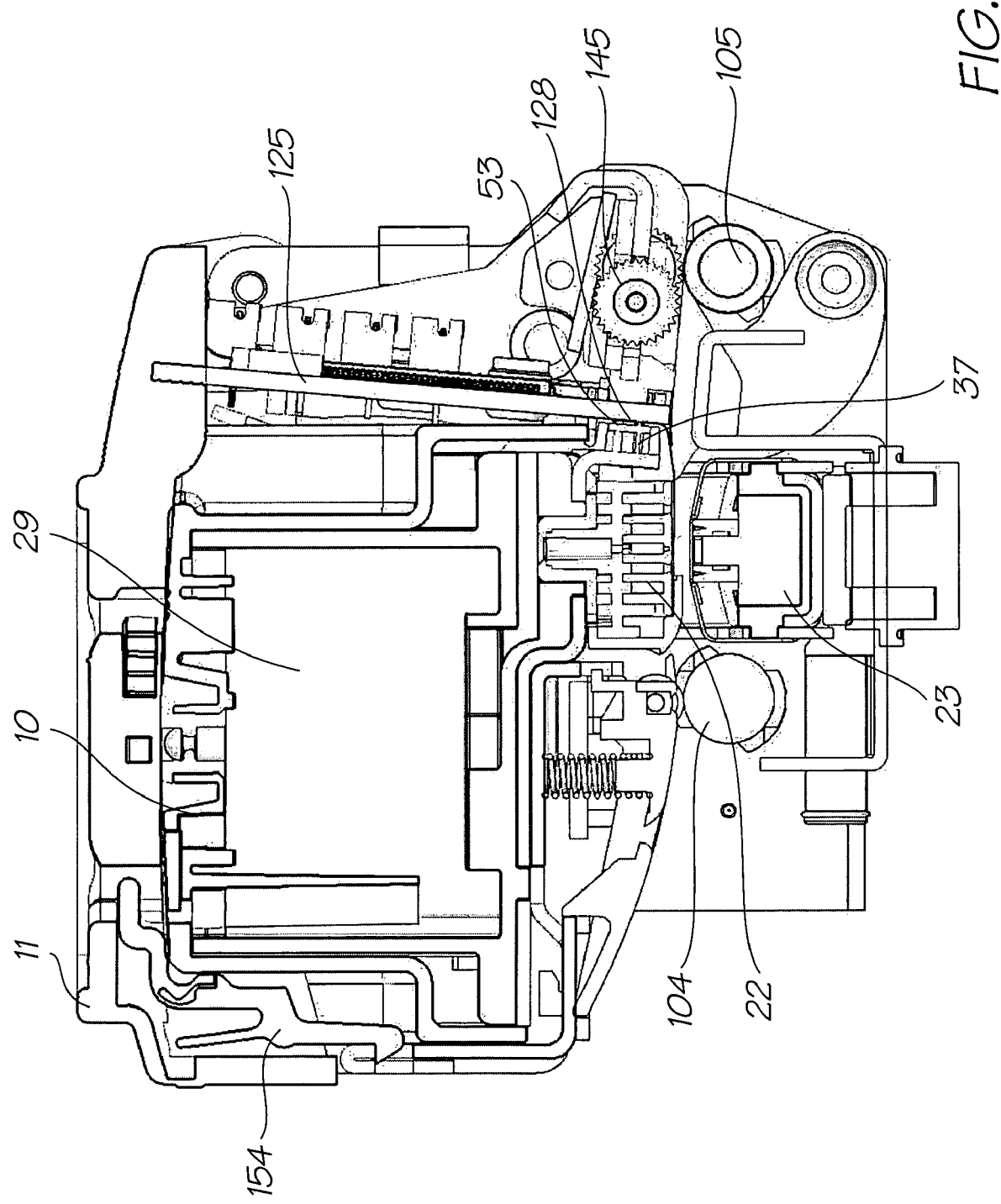
FIG. 81 shows the print engine of the present invention with the cover assembly in a closed position.

The cover assembly 11, as shown in FIGS. 78a-78c, is attached to the upper portion of the end plates 102 via pivot pins 150 which are received in holes 151 formed in the upper portion of the end plates 102. The cover assembly 11 is made from a moulded plastic material and the pivot pins 150 are formed proximal to a rear edge of the cover assembly 11 during the moulding process. The pivot pins 150 allow the cover assembly 11 to pivot about the end plates 102 between a closed position, where the cartridge unit 10 is secured within the cradle unit 12, and an open position, where the cartridge unit 10 can be removed from the cradle unit 12 and replaced. A latch 152 is provided in a front edge 153 of the cover assembly 11. The latch 152, has a flexible clip element 154 which is received within a recess 155 provided in the cartridge unit support member 114 when the cover assembly 11 is in the closed position, as shown in FIG. 81. The flexible clip element 154 is spring loaded via a spring element (not shown) such that the clip element 154 can be readily depressed to release engagement between it and the recess 155 provided in the cartridge unit support member 114 so that the cover assembly 11 can be pivoted into an open position, as shown in FIG. 80.

Positioned adjacent the pivot pins 150, on the inside of the cover assembly 11, are a pair of posts 156. The posts 156 are arranged substantially alongside the pivot pins 150, towards the front edge 153 of the cover assembly 11. The posts 156 are configured such that they are a greater length than the pivot pins 150 and hence extend inwardly a greater distance, to contact the spring element 135 of the arms 129 which support the PCB 125.

Figure 79:
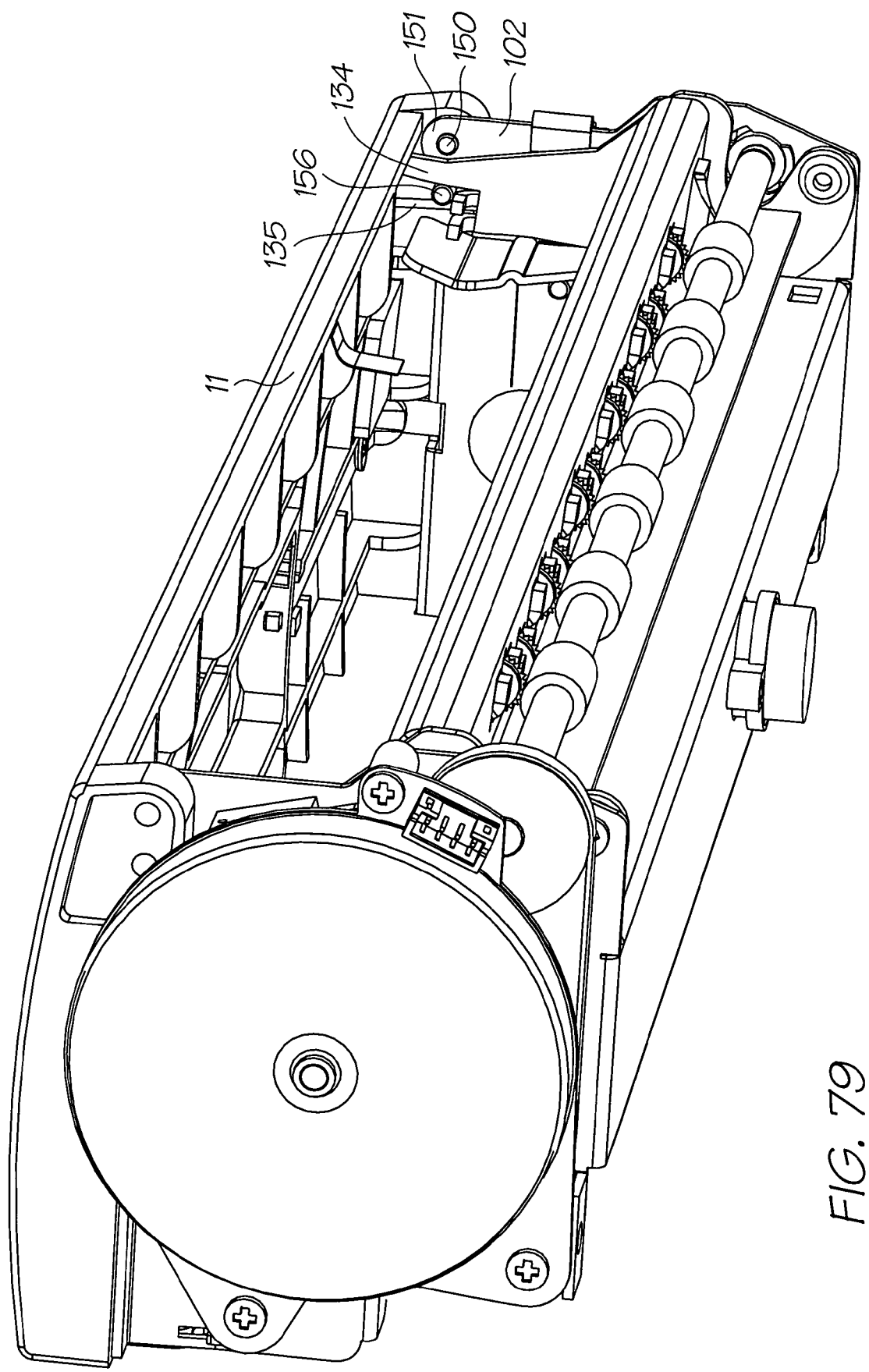
FIG. 79 shows a perspective view of the cover assembly as attached to the cradle unit.

In this regard, the act of opening and closing the cover assembly 11 also performs the function of bringing the contacts 128 provided on the surface of the PCB 125, into contact with the corresponding dimpled contacts 53 provided on the flex PCB 52 of the printhead assembly 22. To achieve this, the cover assembly 11 and the arms 129 are arranged as shown in FIG. 79.

As shown, the cover assembly 11 is attached to the end plates 102 such that the posts 156 extend between the upwardly extending finger portion 134 and the spring element 135 at each end thereof. When the cover assembly 11 is moved to the open position, as shown in FIG. 80, the posts 156 act against the upwardly extending finger portion 134 of the arms 129 causing the arms 129, and the PCB 125, to pivot away from contact with the dimpled contacts 53 of the flex PCB 52 of the cartridge unit 22. This movement is due to the swing action of the cover assembly 11 when opened which in turn causes the posts 156 to move in an arcuate direction towards the rear of the print engine 1. When the cover assembly 11 moves to the closed position as shown in FIG. 81, the cover assembly 11 pivots about the pivot pins 150, causing the posts 156 to move in an arcuate direction towards the front of the print engine 1. As the posts 156 move, they contact the upright portion of the spring element 135, causing the PCB 125 and the arms 129 to pivot forward. The spring element 135 has considerable rigidity to transfer the force exerted upon it by the posts 156 into forward movement of the PCB 125 and arms 129 which results in the contacts 128 on the outward lower portion of the PCB 125 to contact the corresponding dimpled contacts 53 provided on the flex PCB 52 of the cartridge unit 10, which is positioned and supported on the flex PCB backer 37. As the cover assembly 11 is secured in place by the clip element 154 gripping the recessed portion 155 of the cartridge unit support member 114, the contacts 128 remain in aligned contact with the dimpled contacts 53, ensuring that power and data can be transmitted between the SoPEC devices 126 and the integrated circuits 50 of the printhead assembly 22. Due to the fact that the posts 156 act against the upright portion of the spring element 135, with the corresponding horizontal portion of the spring element 135 being secured against the arms 129, there is a return force stored in the spring element 135 such that when the latch 152 of the cover assembly 11 is released the PCB 125 and the arms 129 will begin to pivot away from contact with the dimpled contacts 53 of the flex PCB 52, breaking electrical contact therebetween and allowing ready removal of the cartridge unit 10.

As shown in FIGS. 78*a*-78*c*, the cover assembly 11 includes a centrally located docking port 157 in the form of a hole formed through the cover assembly 11. The docking port 157 is shaped to enable a refill unit 200 to pass therethrough to dock with the cartridge unit 10 thereby enabling refilling of the cartridge unit 10 with ink, in a manner which will be described below. The docking port 157 has a rim portion 158 upon which a portion of the base of the refill unit 200 is received. Formed within the rim portion 158 of the docking port 157 is an engagement means 159 which engages with the refill unit 200 to retain the refill unit securely in position to facilitate refilling of the cartridge unit 12. A QA chip reader 160 is also formed in the rim 158 of the docking port 157 to mate with a corresponding QA chip provided in the refill unit 200 to ensure integrity of the refill unit. The manner in which the engagement means 159 and the QA chip reader 160 functions will be described in more detail later in the description.

Figure 82:
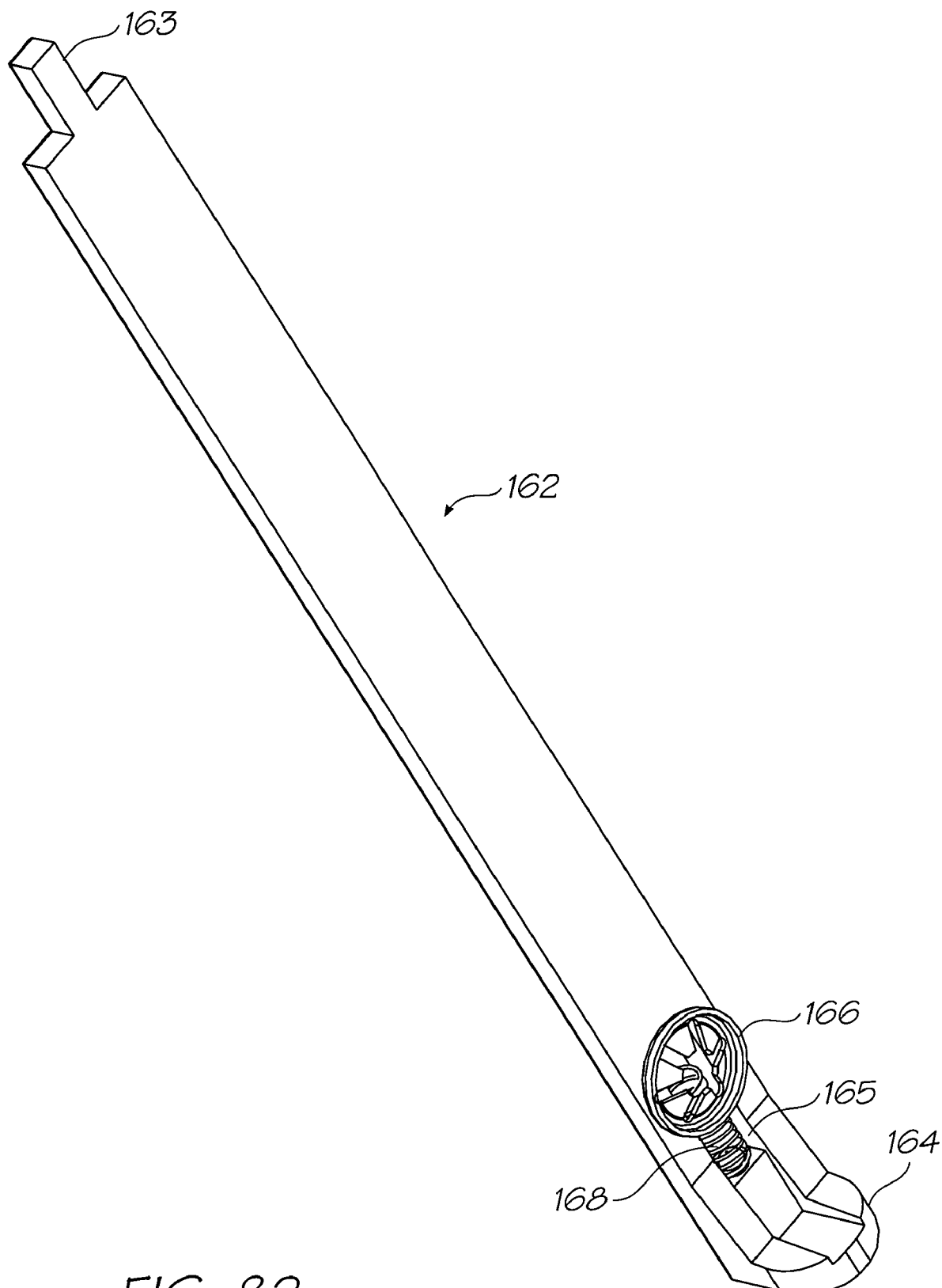
FIG. 82 shows a front perspective view of the push rod assembly in isolation from the cover assembly.

Projecting into the docking port 157 via a hole 161 formed in the wall of the rim portion 158, as shown in FIG. 78*c*, is a push rod 162. As shown more clearly in FIG. 82, the push rod 162 is in the form of an elongate bar member having an end 163 of reduced cross section which extends through the hole 161 in the wall of the rim portion 158; and an end having a foot portion 164, a part of which extends perpendicular to the length of the push rod 162. The body of the push rod 162, proximal the foot portion 164, has a slot 165 formed therein which enables the push rod 162 to be secured to the underside of the cover assembly 11 by way of a screw or the like upon which a push clip 166 is secured. The push clip 166 allows the push rod 162 to move longitudinally with respect to the push clip 166 but prevents any sideways or downward movement of the push rod 162. A retainer 167 is also provided in the underside of the cover assembly 11 proximal the docking port 157 to retain the push rod in position and to prevent any non-longitudinal movement of the push rod 162. In this configuration, the pushrod 162 is free to move in a longitudinal direction with respect to its length, such that the end 163 of reduced cross section can enter and be withdrawn from the docking port 157. A spring element 168 is provided in the slot 165 formed in the push rod 162 and acts to bias the push rod 162 into position, such that its natural position is to have its end 163 extend into the docking port 157.

Figure 83:
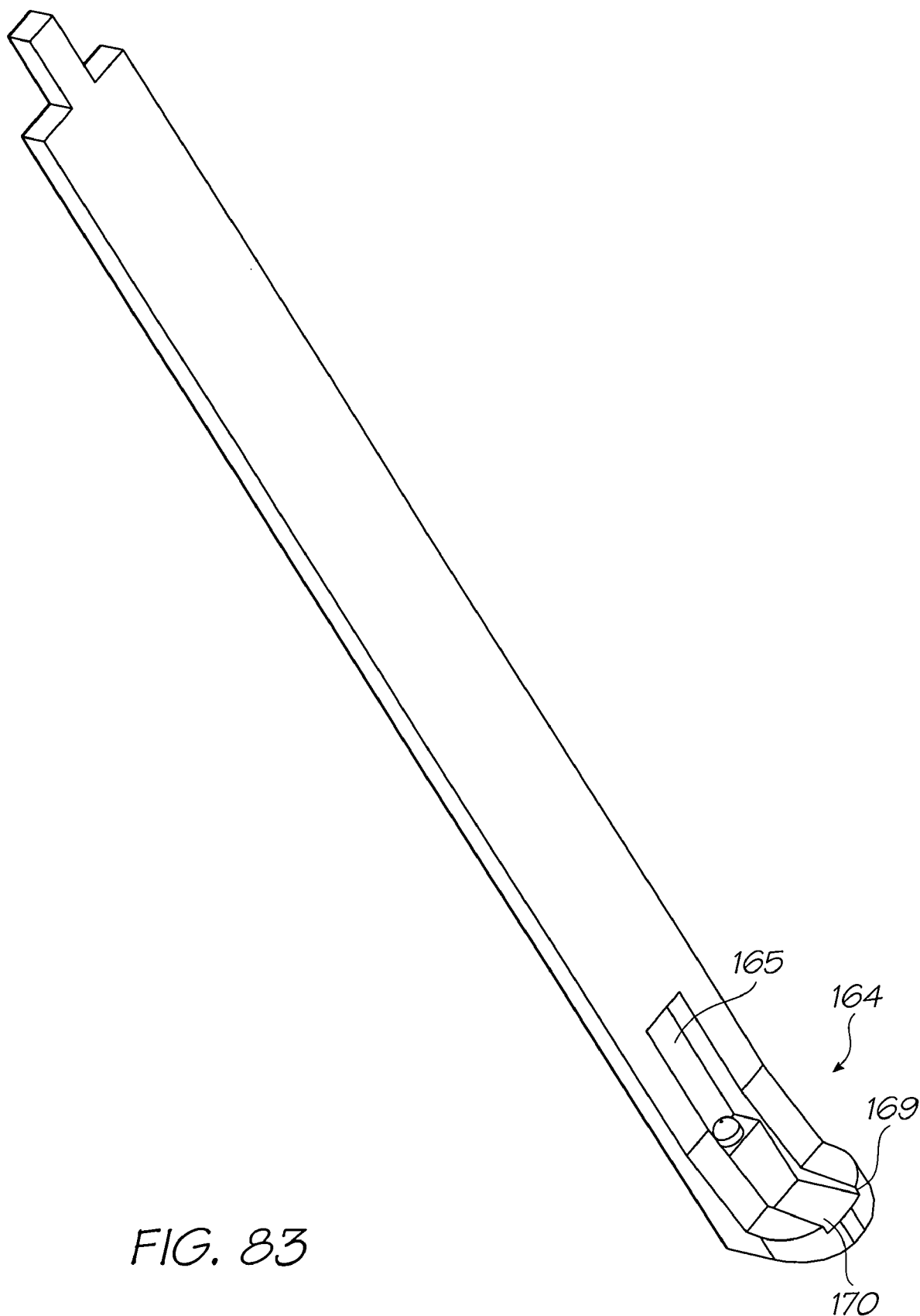
FIG. 83 shows a perspective view of the foot portion of the push rod assembly of FIG. 82.
Figure 84:
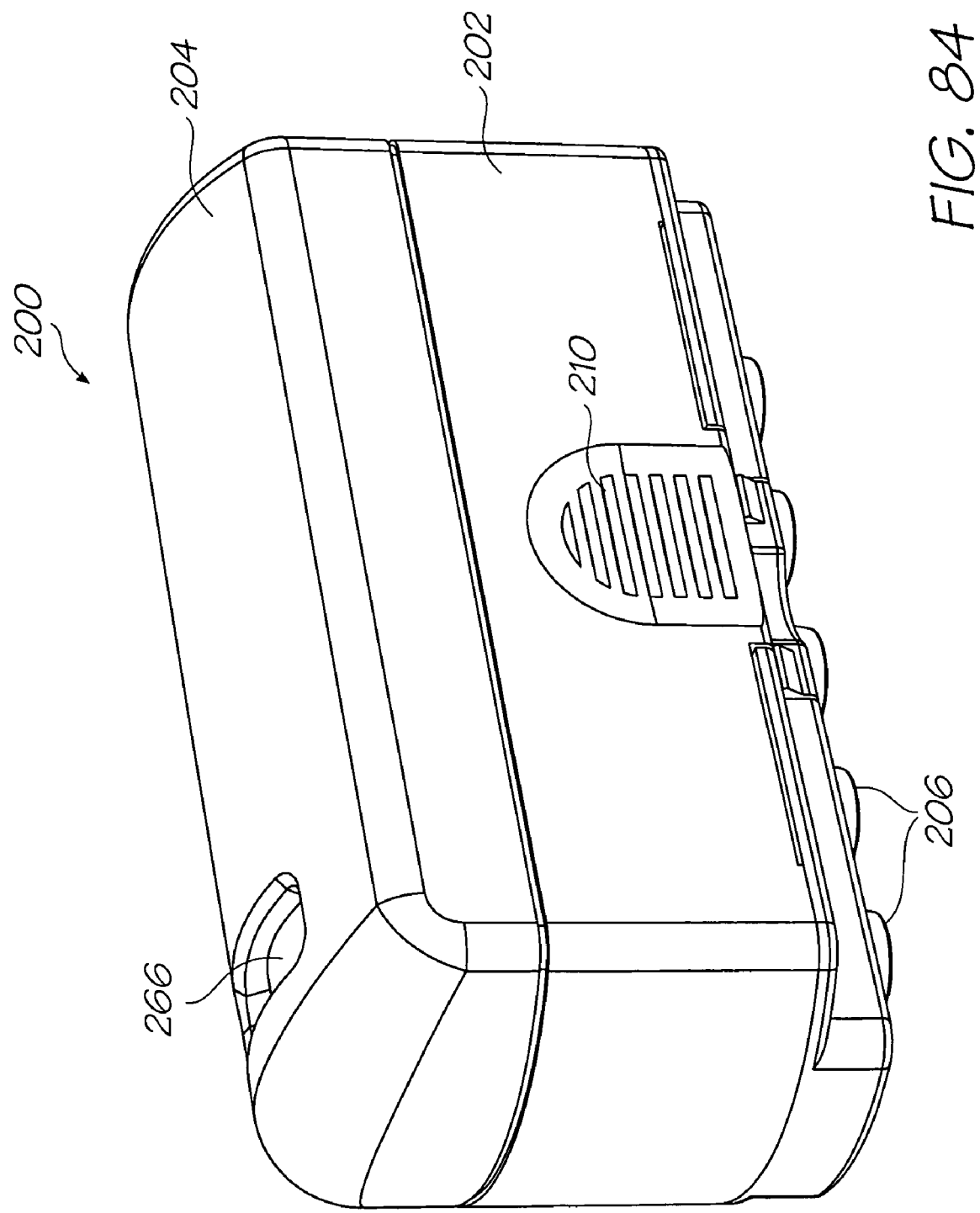
FIG. 84 shows an ink refill unit according to one embodiment of the present invention.
Figure 85:
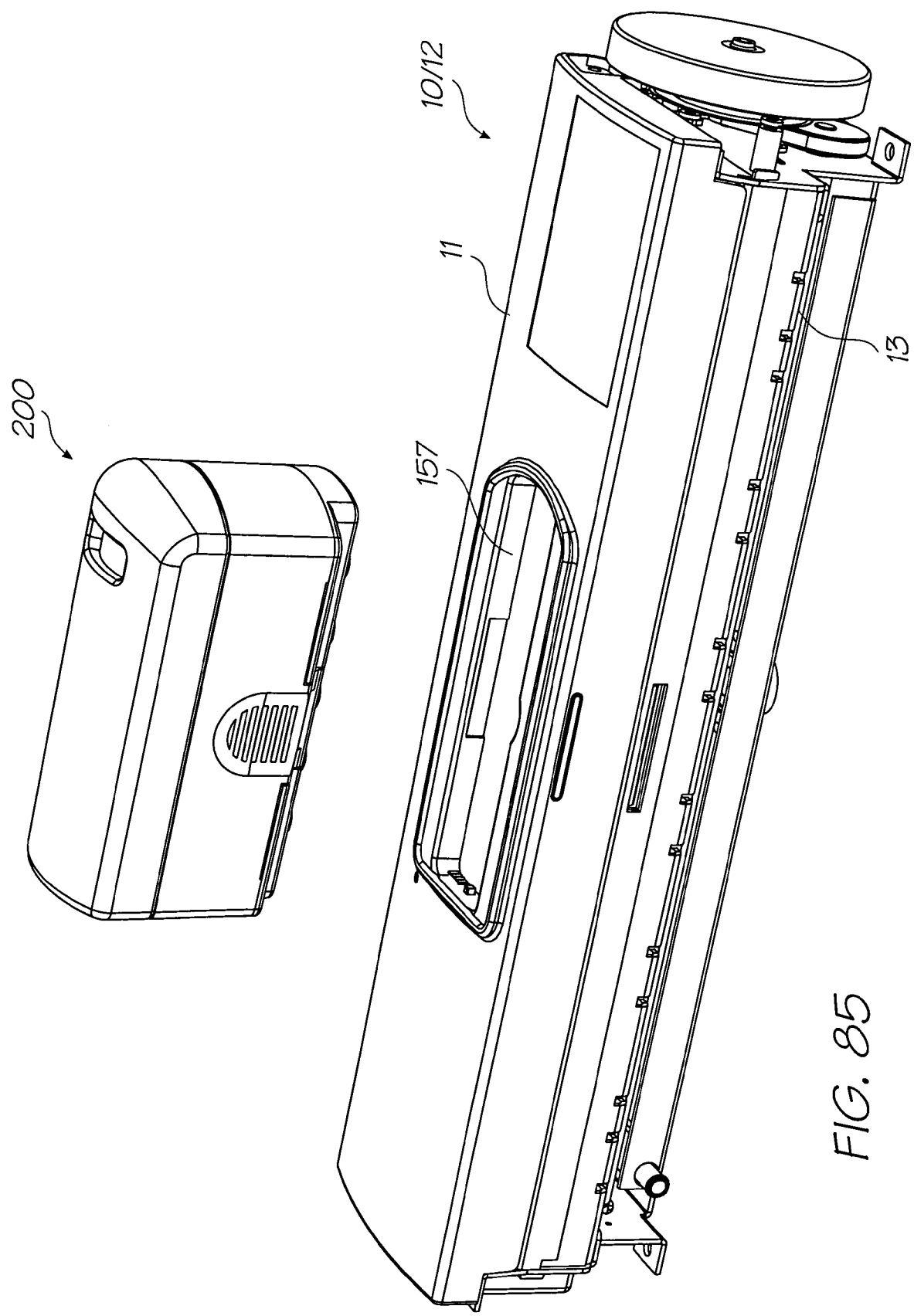
FIG. 85 shows the ink refill unit of FIG. 84 in relation to the print engine of the present invention.
Figure 86:
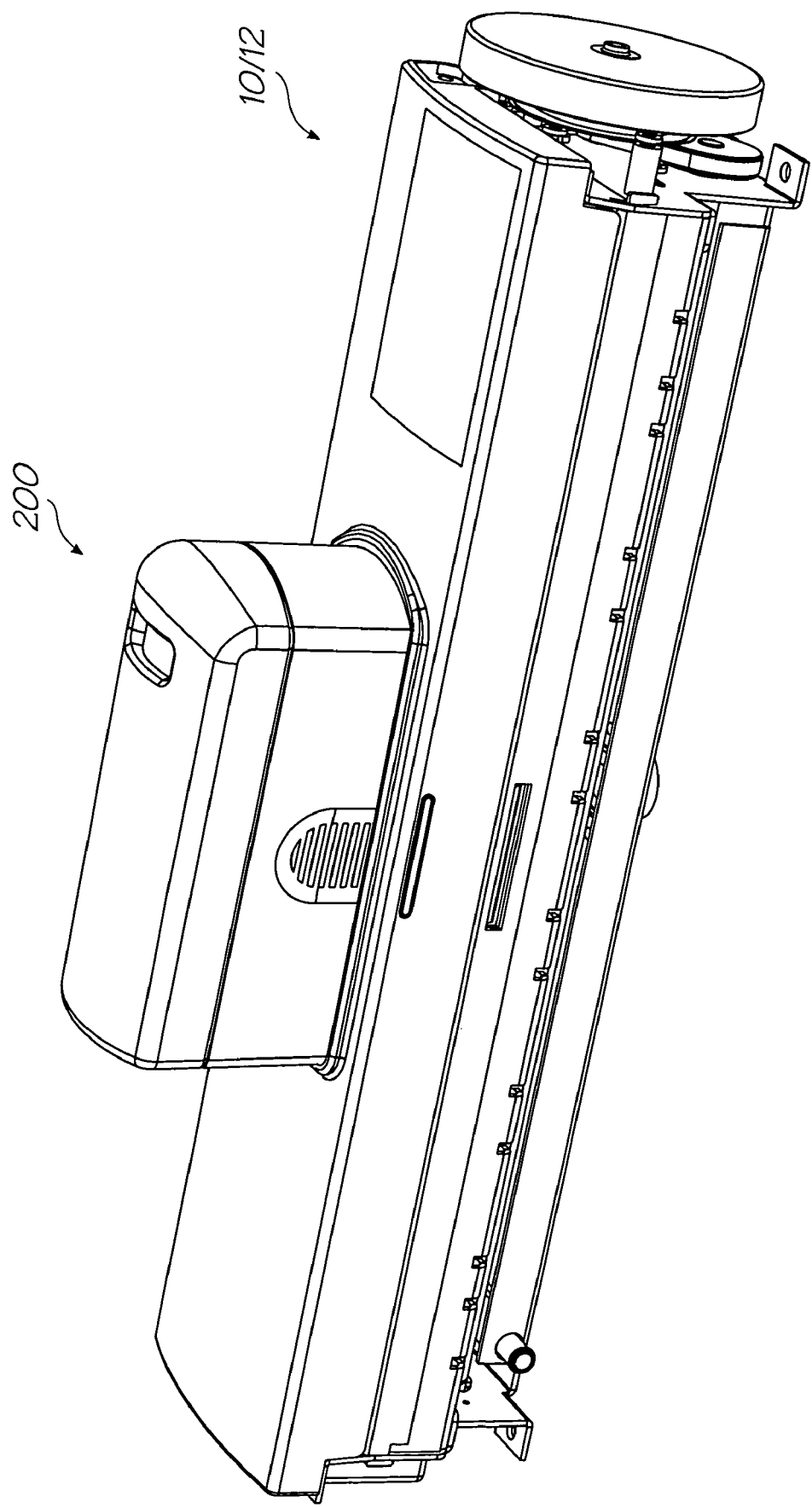
FIG. 86 shows the ink refill unit positioned for refilling ink within the print engine as shown in FIG. 85.
Figure 87:
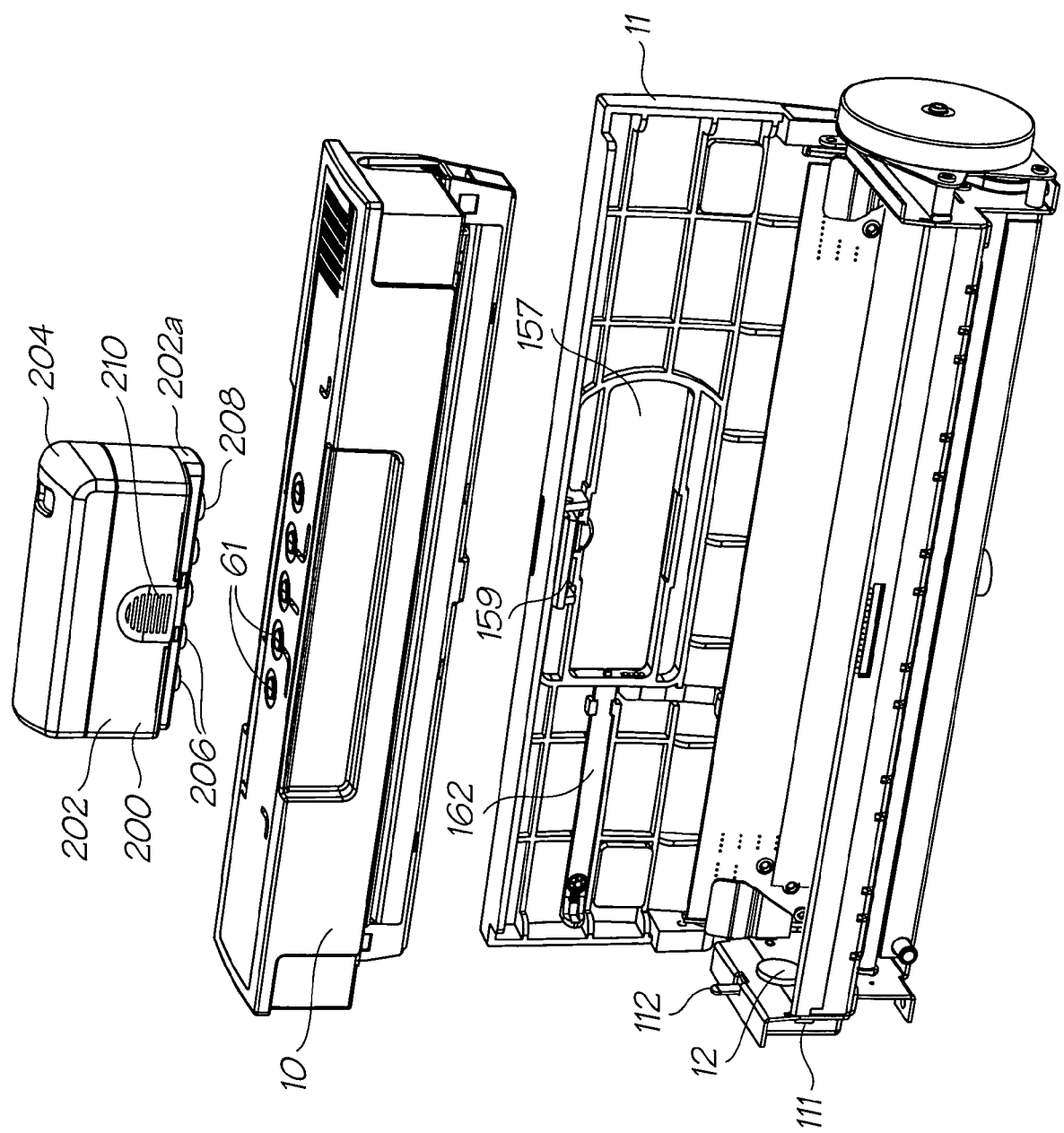
FIG. 87 shows the cartridge unit as removed from the cradle unit of FIGS. 85 and 86.

The foot portion 164 of the push rod 162 is shown in more detail in FIG. 83. The part of the foot portion 164 which extends perpendicular to the length of the push rod, has a groove 169 formed therein. The surface 170 of the groove is angled towards the end 163 of the push rod, as shown. The foot portion 164 is positioned at the side edge of the cover assembly 11 and extends in a downward direction with respect to the cover assembly 11. In this position the actuator arm 112 of the refill solenoid assembly 111 mounted on the cradle unit 12 is orientated such that it is aligned with the groove 169 of the foot portion 164. As the actuator arm 112 is raised by the solenoid assembly 111 in a vertical direction, it travels along the surface 170 of the groove 169 thereby causing the push rod 162 to retract such that the end 163 of the push rod 162 no longer extends into the docking port 157. Lowering of the actuator arm 112 by the solenoid assembly 111 results in the push rod 162 returning to its naturally biased position under the action of the spring element 168, whereby the end 163 extends into the docking port 157. The manner in which the end 163 of the push rod interacts with the refill assembly 200 will be discussed in more detail below, however it should be appreciated that the the position of the push rod is controlled by the SoPEC device 126 with regard to the state of operation of the printer unit.

Refill Unit

Figure 88:
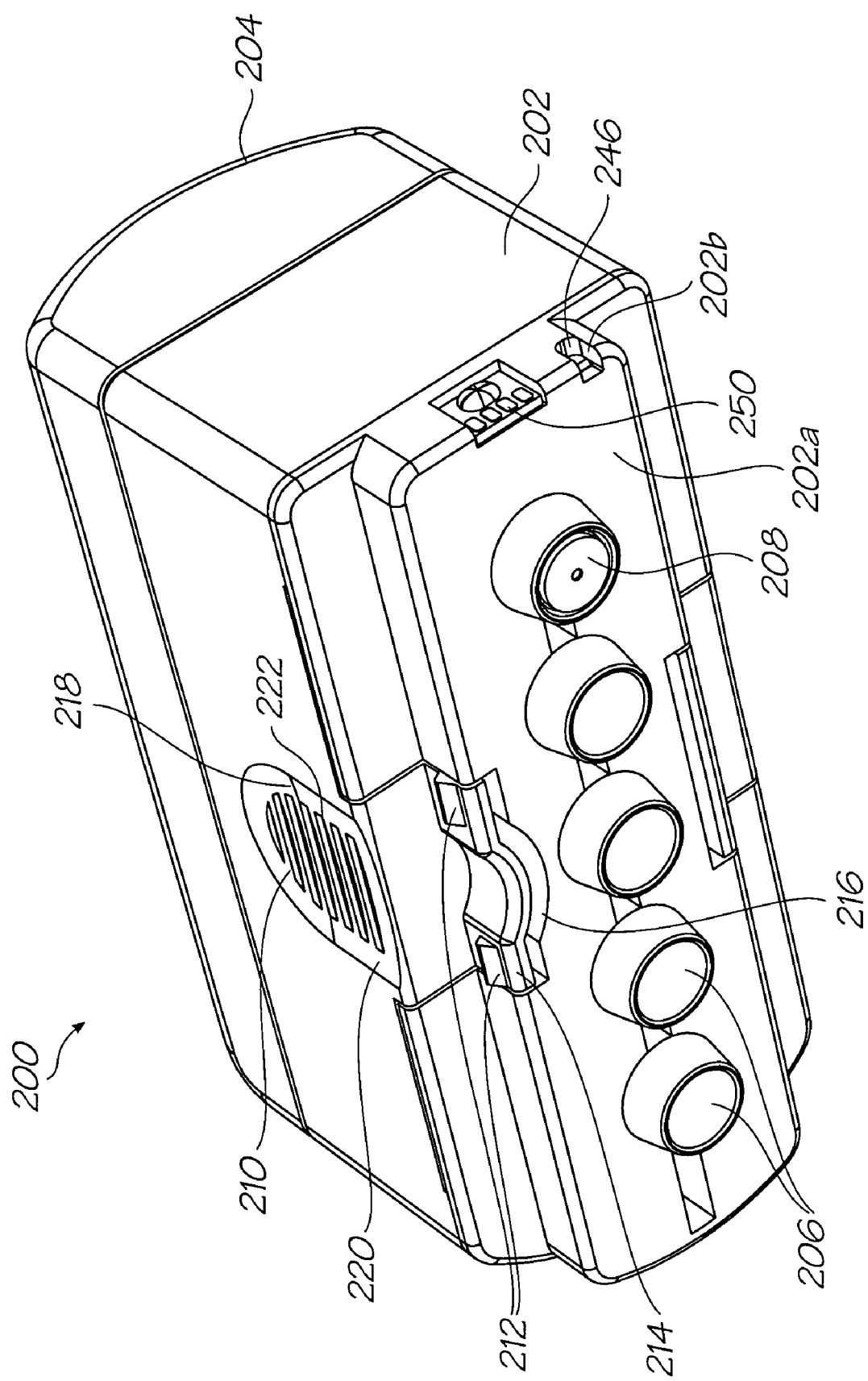
FIG. 88 shows an underside view of the ink refill unit of FIG. 84.
Figure 89:
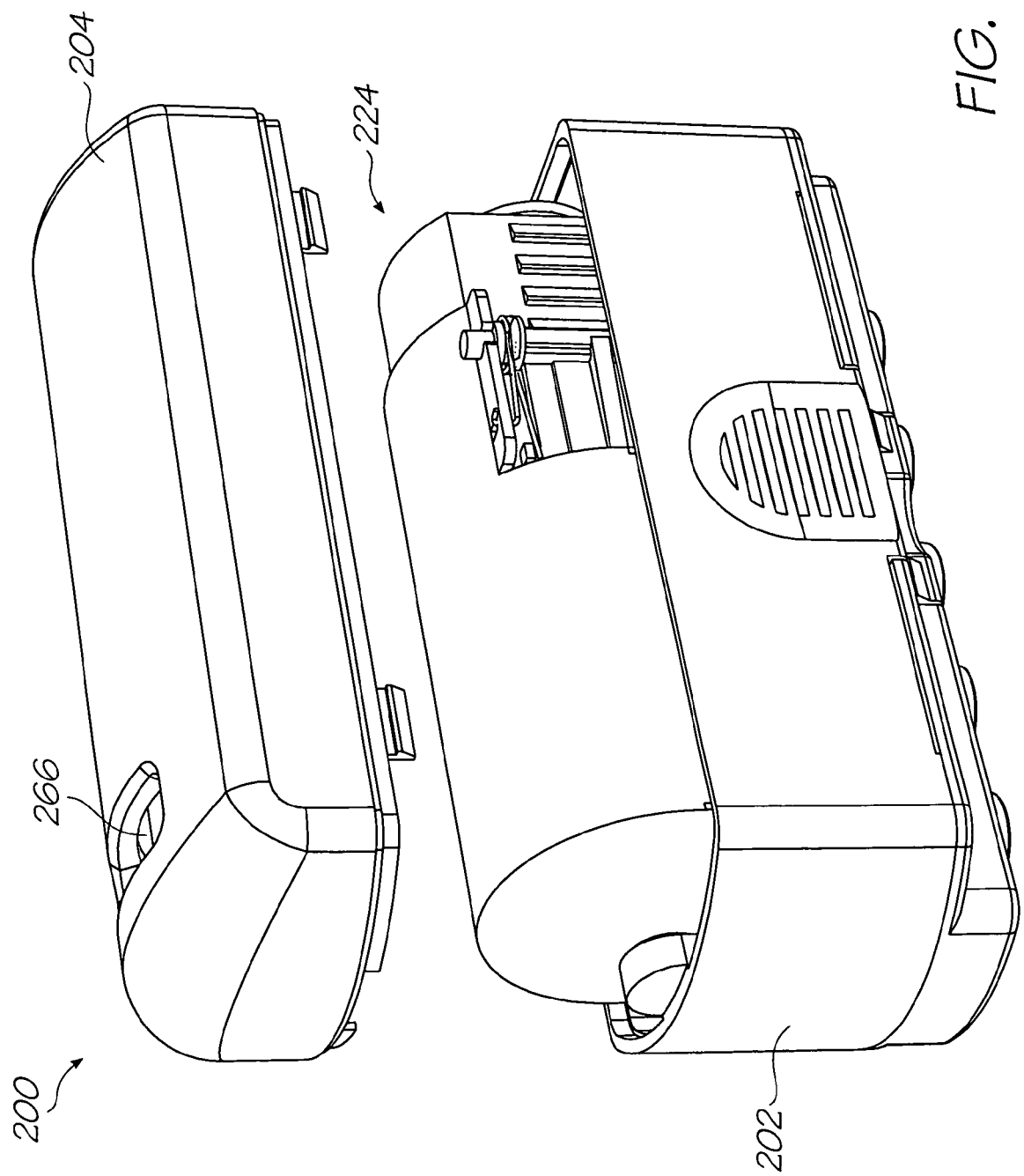
FIG. 89 illustrates the ink refill unit of FIG. 84 with its lid assembly removed.

FIG. 47 illustrates one embodiment of an ink refill unit 200. The ink refill unit 200 generally comprises a base assembly 202 which houses internal ink refilling components and a lid assembly 204 which fits onto the base assembly 202. The base and lid assemblies may be moulded from a plastics material and the base assembly may be moulded as a single piece or in sections (as shown in FIG. 88).

As mentioned previously, the refill unit 200 contains ink and is intended to be used as a means for refilling the ink storage compartments 24 within the cartridge unit 10. The refill unit 200 is configured to dock with the surface of the cartridge unit 10 in order to transfer the ink it contains into the ink storage compartments 24 of the cartridge unit 10. For this purpose, the cover assembly 11 of the cradle unit 12 has a docking port 157 formed therein through which the refill unit 200 is able to pass to dock with the upper surface of the print cartridge 10.

As discussed previously in relation to the lid assembly 21 of the cartridge unit 10, the upper surface 60 of the lid assembly 21 has a plurality of ink refill ports 61 formed therein, with each of the individual ink refill ports 61 being in fluid communication with one of the ink storage compartments 24 to deliver ink to that compartment. The position of the individual ink refill ports 61 on the surface of the cartridge unit 10 is specific to the type or colour of ink stored by the cartridge unit, and the position and configuration of the ink refill ports 61 is consistent between different cartridge units. In this regard, each refill unit 200 is configured with a plurality of outlets 206 located in a bottom section 202*a* of the base assembly 202 for docking with the cartridge unit. However in each instance, only one of the outlets is in fluid communication with the supply of ink for distributing ink to an ink storage compartment of the cartridge unit through the corresponding ink refill port, the position of the outlet being dependant upon the type or colour of ink to be supplied from the refill unit. As shown in FIG. 88, the refill unit 200 is arranged with one working outlet 208 for the distribution of the particular coloured ink contained in the refill unit to the ink refill port 61 of the correspondingly coloured ink storage compartment 24 in the cartridge unit 10. That is, if the refill unit 200 contains cyan ink, the working outlet 208 is positioned so as to correspond to the ink refill port 61 of the cyan ink chamber of the cartridge unit 10 when the refill unit is docked with the cartridge unit.

A clip arrangement 210 is provided on at least one side of the base assembly 202 of the refill unit 200 for securing the refill unit to the print engine during the refilling operation. This ensures reliable and efficient transfer of ink from the refill unit 200 to the cartridge unit as the refill unit 200 is substantially immovable from the print engine until the clip arrangement 210 is disengaged, thereby ensuring a complete seal between the refill unit and the cartridge unit and preventing the possibility of ink spillage or air ingress between the outlet and the ink refill port.

In this regard, the clip arrangement 210 is formed as a resilient section of the side wall of the base assembly 202 and is movable with respect the remainder of the side wall so as to engage and disengage with a corresponding engagement means 159 provided in the docking port 157 of the cover assembly 11 of the cradle unit. The clip arrangement includes clip portions 212 in the form of projections that project from a resilient arm 214, the arm 214 being depressible to move into and out of a recess 216 about a pivot region 218, the pivot region 218 being a weakened region in the surface of the base assembly 202. In this way, when the bottom section 202a of the base assembly 202 is moved into docking engagement with the surface of the cartridge unit by being passed through the docking port 157 of the cover assembly, the engagement means 159 of the cover assembly comes into contact with the clip portions 212. This contact causes the arm 214 to deflect into the recess 216 as the refill unit is pushed into docking position with the cartridge unit, until the clip portions pass the engagement means 159 of the cover assembly. At this point, the arm 214 is no longer in contact with the engagement means 159 and hence returns to its original position thereby engaging the clip portions 212 with the lip of the engagement means 159.

The clip and engagement means of the refill unit and the cover assembly, respectively, are configured so that in the docked (refilling) position, the outlets 206, and most importantly the working outlet 208, of the refill unit 200 is snugly positioned on the refill ports of the cartridge unit.

Once refilling has been completed, the refill unit 200 can be removed from docking engagement with the cartridge unit, by depressing the resilient arm 214 such that the clip portions 212 disengage with the lip of the engagement means. Suitable detail ridges 222 may be provided on the resilient arm 214 to provide grip for a user's finger(s) to manipulate the clip arrangement 210.

The clip arrangement 210 and corresponding engagement portion 110 may be provided on only one side of the refill unit 200 and cover assembly, or may be provided on both (opposite) sides.

Figure 90:
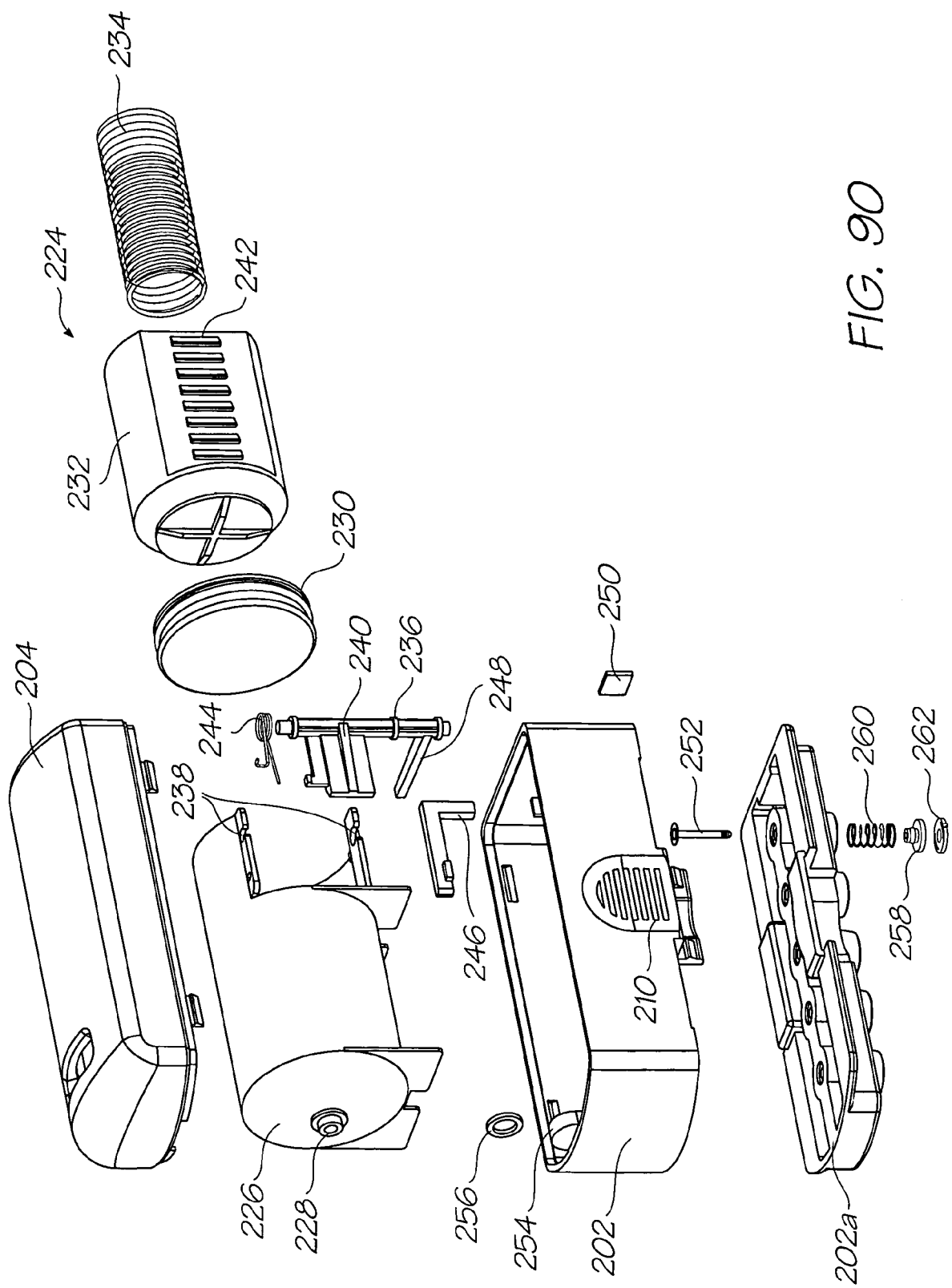
FIG. 90 shows an exploded view of the various components of the ink refill unit of FIG. 84.
Figure 91:
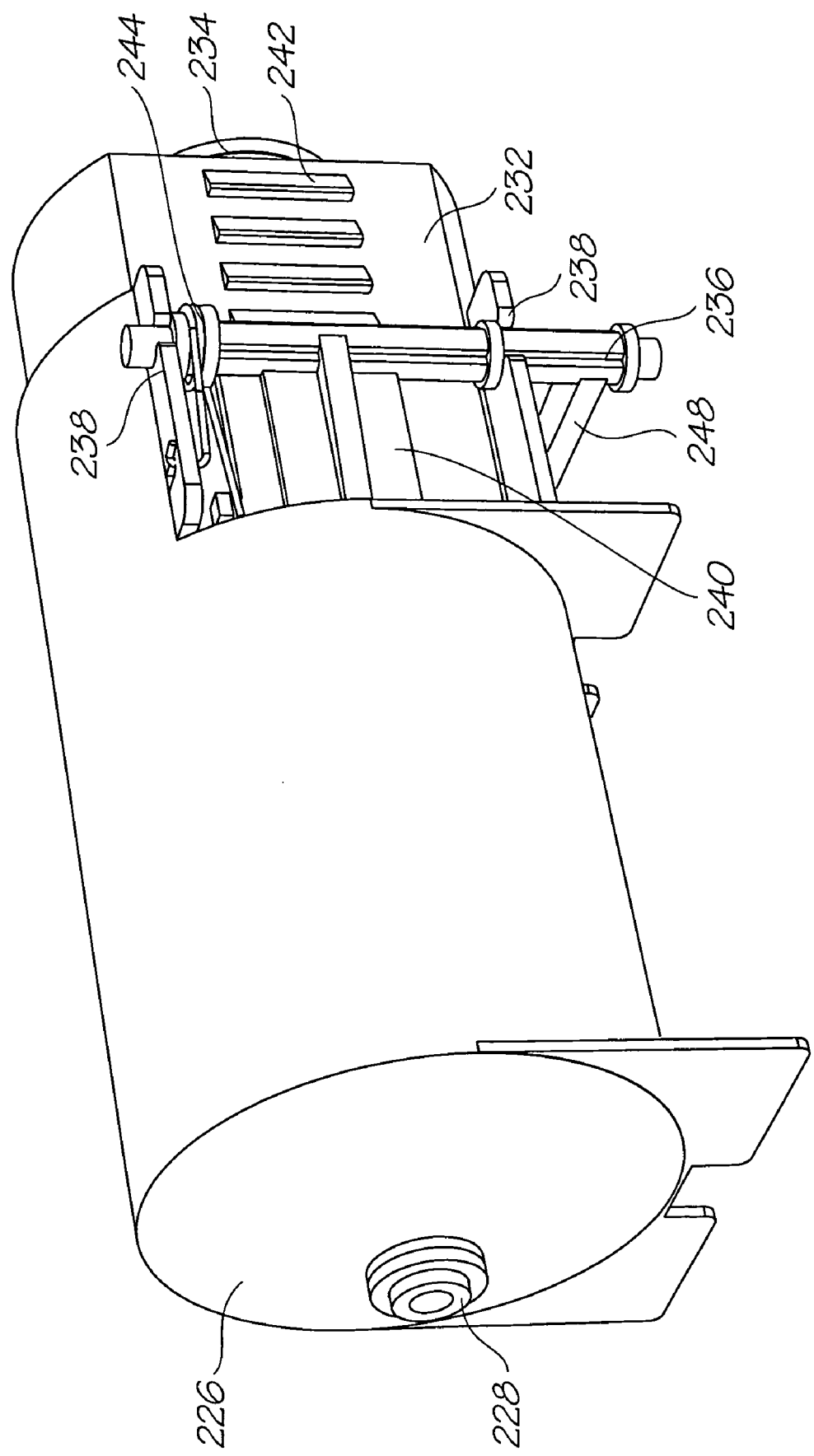
FIG. 91 illustrates a syringe assembly isolated from the ink refill unit as shown in FIGS. 89 and 90.
Figure 92:
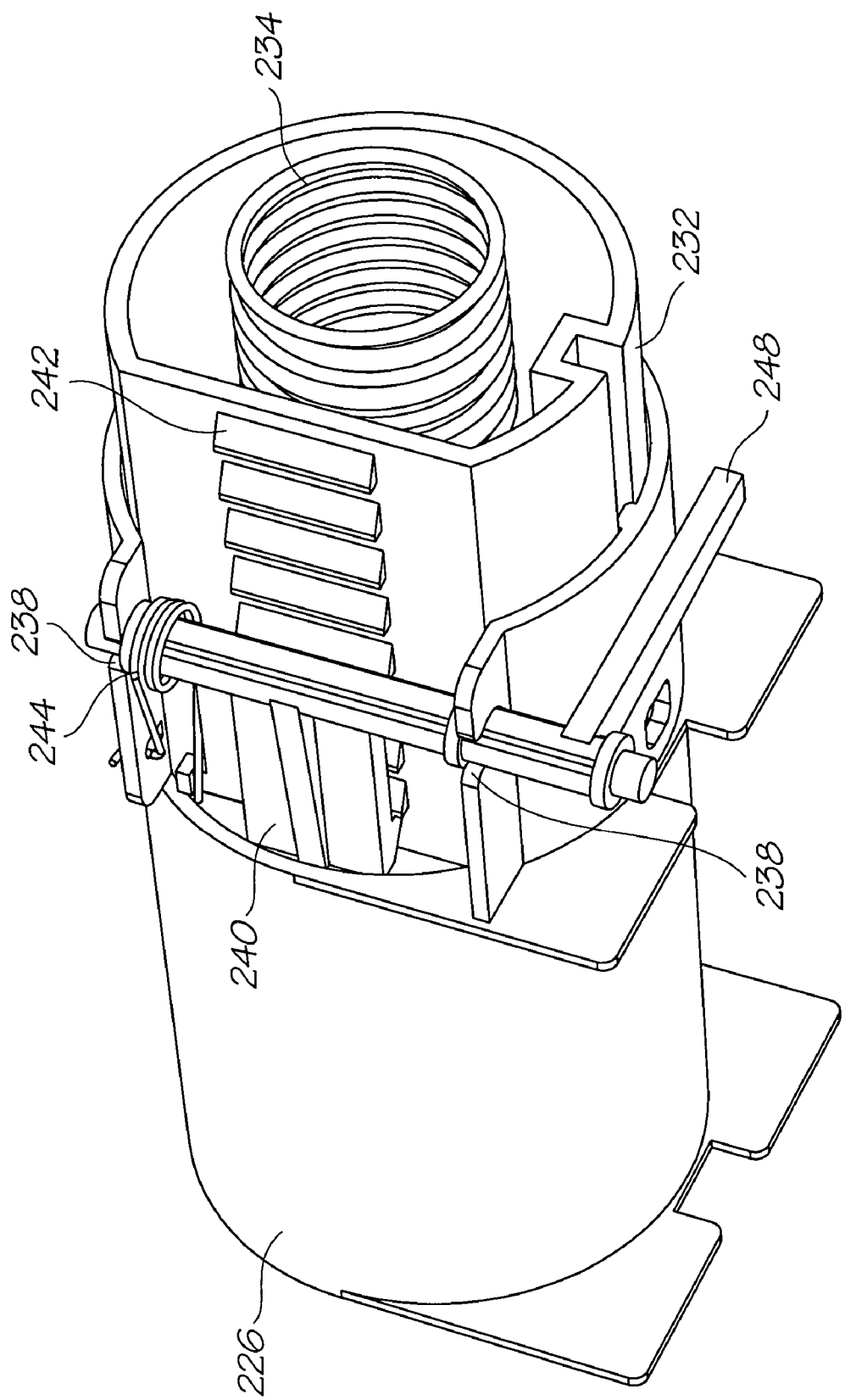
FIG. 92 shows an end perspective view of the syringe assembly as shown in FIG. 91.

Within the refill unit 200 the ink is stored in a syringe-type assembly 224. The syringe-type assembly 224 is mounted within the base assembly 202 of the refill unit 200 so as to be covered by the lid assembly 204. The syringe-type assembly 224 has the necessary capacity to store the amount of ink required for refilling of the ink storage compartments of the cartridge unit. The components of the syringe assembly 224 are most clearly seen in FIG. 90.

A tank 226 is provided in the syringe assembly 224 for storing the ink within the refill unit 200. The tank 226 has at one end an ejection port 228 through which the ink is ejected for distribution and is sealed at the other end by a syringe seal 230. The syringe seal 230 is mounted on a plunger 232 which is received within the hollow internal space of the tank 226 to expel the stored ink from the ejection port 228. The plunger 232 is arranged to be driven into the hollow internal space of the tank 226 under action of a compression spring 234. The compression spring is provided within the plunger 232 and projects from the plunger to contact with the internal end wall of the base assembly 202 (i.e., opposite the internal end wall adjacent the ejection port 228 of the tank 226). In this way, the compression spring 234 applies a constant force to the plunger 232 urging it plunge towards the interior of the tank 226 when the syringe assembly 224 is housed in the base assembly 202.

Control of the plunging operation, and hence control of the delivery of the ink from the refill unit, is provided by ratchet arrangement of the syringe assembly 224. The ratchet arrangement comprises an actuator rod 236 which mounts at its upper end and an intermediate position towards its lower end to mounting slots 238 provided on the tank 226. The rod 236 has a pawl 240 projecting from one side thereof between the positions mounted through the slots 238. The pawl 240 is engageable with a series of grooves providing a ratchet 242 on a side surface of the plunger 232.

The rod 236 is rotatable about its long axis so as to engage and disengage the pawl 240 with the ratchet 242. An actuator spring 244 is provided at the upper end of the rod 236 which acts against the side surface of the plunger 232 so as to bias the pawl 240 into the ratchet 242. The engagement of the pawl 240 and the ratchet 242 provides sufficient resistance against the plunging of the plunger 232 into the interior of the tank 226 under action of the compression spring 234.

Thus, upon initial use of the refill unit 200, the pawl 240 is engaged with the first groove of the ratchet 242, thereby preventing the plunger from substantially entering the interior of the tank 226 and in turn providing maximum ink storage capacity within the tank 226. In order to commence refilling of the cartridge unit, ink must be ejected from the tank 226 through the ejection port 228. This is achieved through rotation of the rod 236 which disengages the pawl from the first groove. The plunger 232 then enters into the interior of the tank 226 under action of the compression spring, causing ink to be ejected out the ejection port 228. The pawl 240, following disengagement with the first groove, engages with the next groove of the ratchet 242 through the return action of the actuator spring 244 against the initial rotation the rod 236. This causes movement of the plunger 232 within the interior of the tank 226 to stop, thereby stopping delivery of ink from the ejection port 228. More ink can be ejected from the tank 226 by repeated rotation of the rod 236 and engagement/disengagement of the pawl 240 with the ratchet 242, thereby providing incremental delivery of ink in controlled amounts. This continues until the pawl engages with the final groove of the ratchet, at which point the ink within the tank 226 has been depleted.

Figure 93:
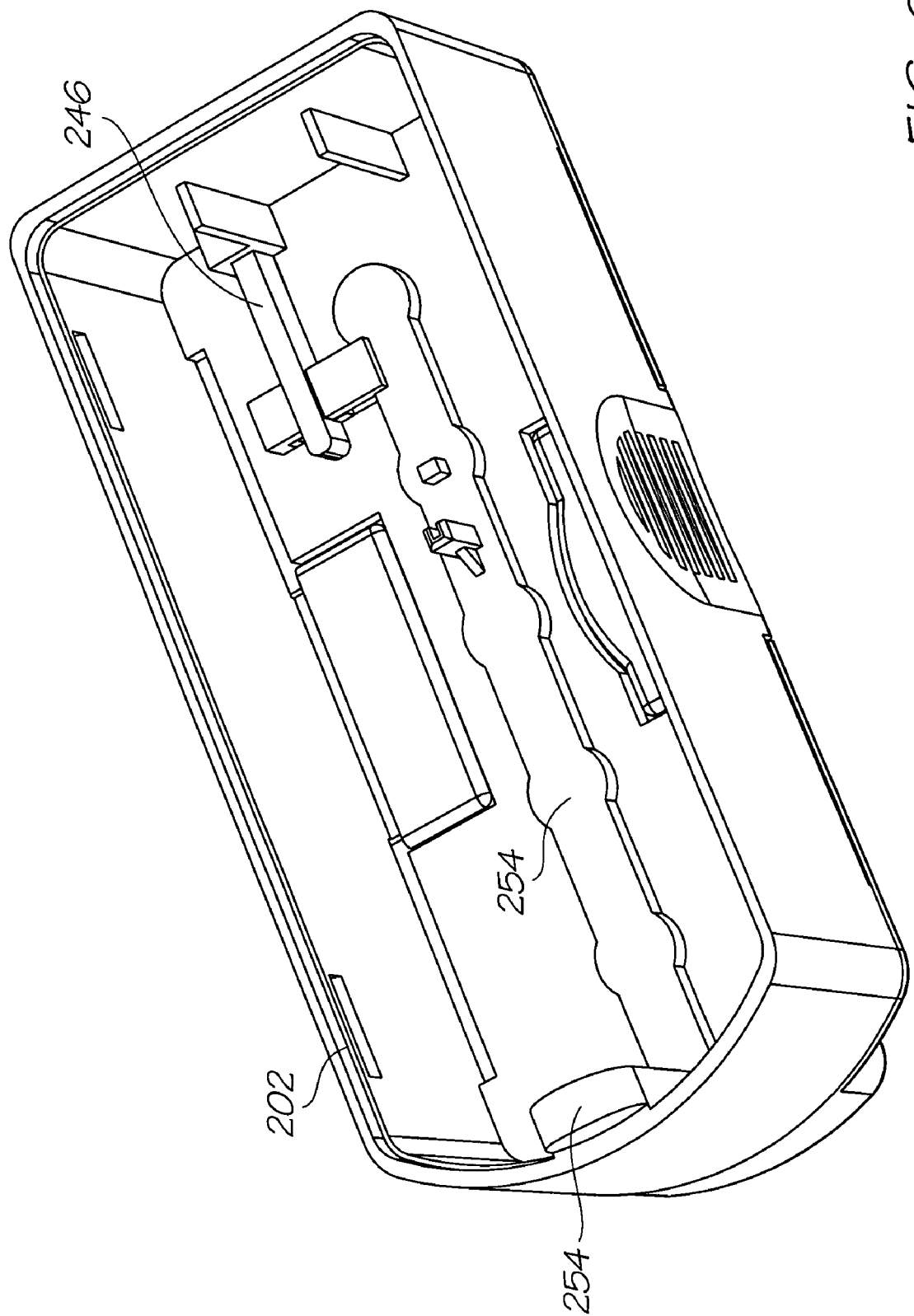
FIG. 93 illustrates a base assembly isolated from the other components of the ink refill unit as shown in FIGS. 89 and 90.

The rotation of the rod 236 to disengage the pawl 240 is caused by action of an actuator shaft 246 on an arm 248 which projects from the rod. The actuator shaft 246 is housed within the base assembly 202, as shown in FIG. 93, so as to be slidable along its long axis. One end of the actuator shaft 246 is slidable to contact the arm 248 of the rod 236 when the syringe assembly 224 is mounted into the base assembly 202 and the other end of the actuator shaft is slidable to be exposed to the outside of the base assembly through a hole 202b formed in one of its end walls.

In order to performing the refilling operation, the exposed end of the actuator shaft 246 comes into contact with the end of the push rod provided on the underside of the cover assembly, which projects into the docking port of the cover assembly. The manner in which the push rod operates has been discussed in detail above; however, when the refill unit 200 is in its refill position, the solenoid assembly can cause the push rod to extend and push the actuator shaft 246 into contact with the arm 248 of the rod 236 so as to disengage the pawl 240 with the ratchet 242 following which the push rod returns to its retracted position. Then, once the pawl 240 re-engages through action of the actuator spring 244, the arm 248 of the rod 236 pushes the actuator shaft 246 back so as to be exposed again for subsequent contact by the push rod.

More ink is refilled from the refill unit 200 through repeated actuation of the push rod by the solenoid assembly, delivering controlled amounts of refill ink each time. As such, the refill cartridge is provided with the ability to perform multiple refilling operations.

The status of the amount of the ink stored within the refill unit 200 is monitored by a quality assurance (QA) control chip 250 provided in the base assembly 202. Initially, the QA chip 250 may store information in a memory thereof such as the ink capacity of the tank 226 (e.g., about 50 ml), the amount of ink which will be ejected from the tank with each pawl/ratchet 240/242 shift (e.g., about 6 ml), the colour of the ink stored within the tank and the position of the working outlet 208.

In this regard, a sensor or other means is provided connected to the QA chip 250 which senses either the position of the pawl/ratchet or the number of times the rod 236 has been rotated by the actuator shaft 246 or some other mechanism which informs the QA chip 250 of the remaining capacity/number of refills of the refill unit. In this regard, the memory of the QA chip 250 is provided as a rewritable memory.

The QA chip 250 is provided in an exposed position on the end surface of the base assembly 202, such as in the vicinity of the hole 202*b* for the actuator shaft 246 (see FIG. 88), so as to align and connect with the corresponding QA chip reader provided within the rim of the docking port of the cover assembly.

The QA chip reader is connected to a QA chip and/or controller of the print engine. In this way, the QA chip 250 is able to communicate the above-described information to the print engine. For example, the controller of the print engine is able to check whether the ink storage compartment of the cartridge unit containing the ink colour/type which matches the refill unit 200 requires refilling by the amount of at least one pawl/ratchet shift. In response to such determinations, the controller controls the solenoid assembly so as to operate the push rod the appropriate number of times to refill the corresponding ink chamber.

This communication between the refill unit 200 and the print engine ensures that the correct type/colour of ink and the correct amount of ink is refilled into the correct ink storage compartment. Other checks can be performed also, such as correct positioning of the working outlet 208 on the appropriate refill port of the cartridge unit.

In order to deliver the refill ink into the refill ports, the working outlet 208 of the refill unit comprises a syringe needle 252 which is connected to the ejection port 228 of the tank 226 through a fluid channel 254 provided on the inner side and bottom surfaces of the base assembly 202. Sealing between the ejection port 228 and the fluid channel 254 is provided by an O-ring 256. The syringe needle 252 is arranged to penetrate the valve fittings provided within the corresponding ink refill ports so as to allow the flow of ink into the ink storage compartments.

As previously mentioned, the valve fittings may be provided as an elastomeric seal which seals the ink storage compartments from the surroundings, thus preventing dust and the like entering the chambers and providing an elastically walled channel through which the syringe needle 252 can pass.

Sealing between the working outlet 208 and the valve fittings is provided by a seal ring 258 which surrounds the syringe needle 252. In the refill unit's isolated state, the syringe needle 252 is protected by the seal ring 258 within the working outlet 208 (see FIG. 88). Whereas, in the refill position, the syringe needle 252 is exposed to the valve fitting by action of valve's upper surface on the seal ring 258 to push the seal ring into the working outlet 208. The seal ring 258 is able to 'ride' up the syringe needle 252 and upon release from the refill position, the seal ring is returned to its protection position via action of a seal spring 260 situated between the seal ring and the inner surface of the fluid channel 254 above the syringe needle. The seal spring 260 is held to the seal ring 258 with a support washer 262.

Figure 94A:
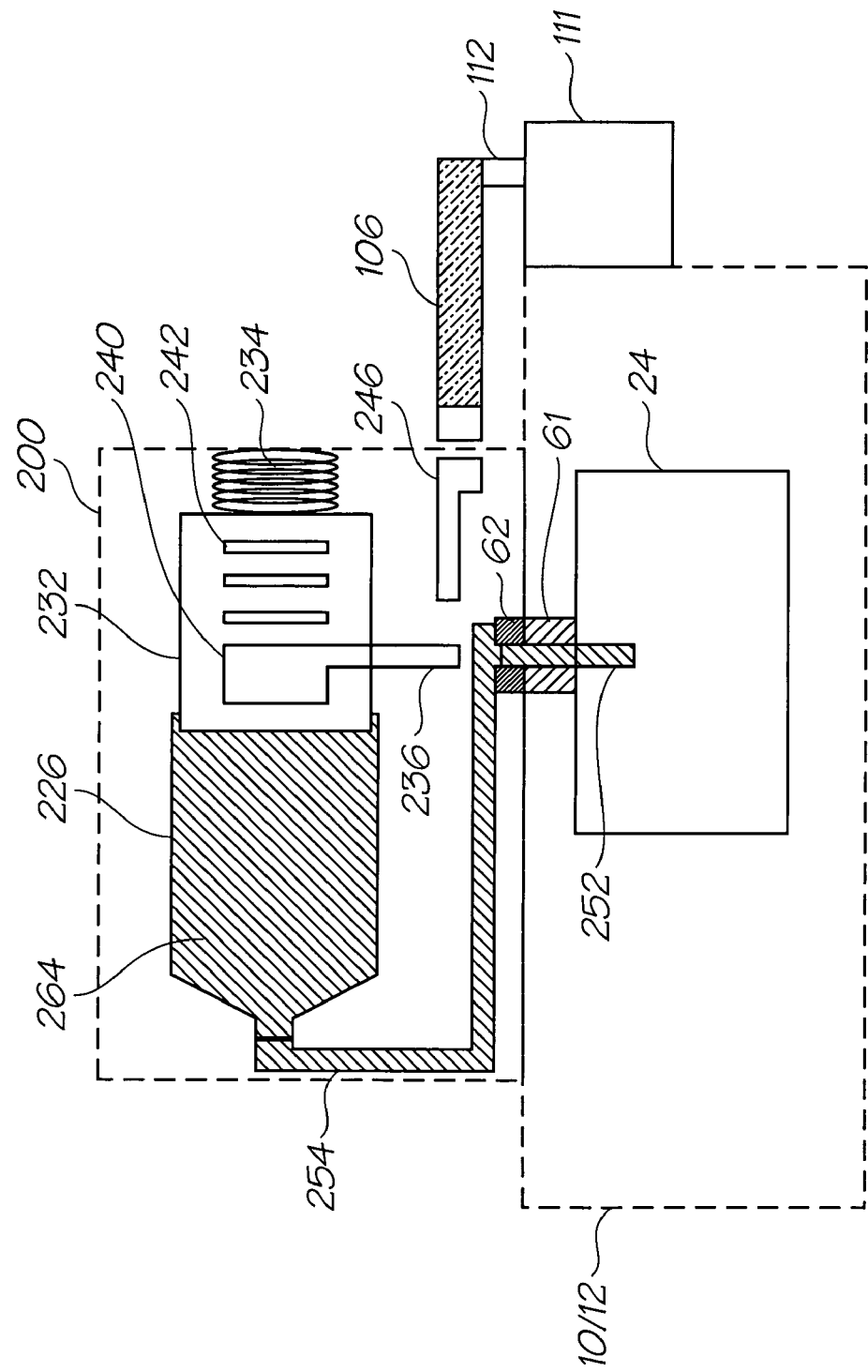
FIGS. 94a-94c show an ink distribution system provided by the ink refill unit positioned on the print engine as shown in FIG. 85.
Figure 94B:
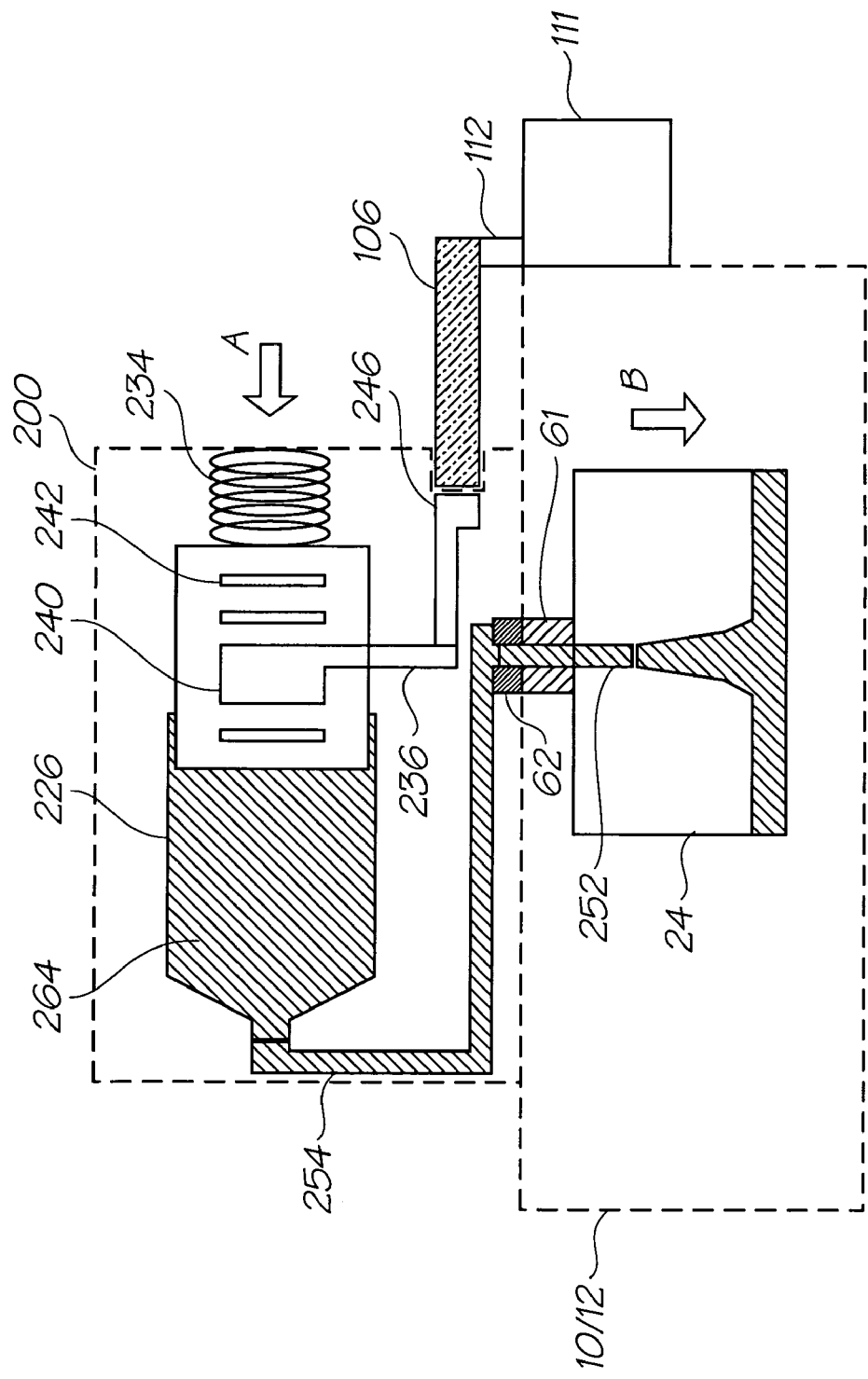
Figure 94C:
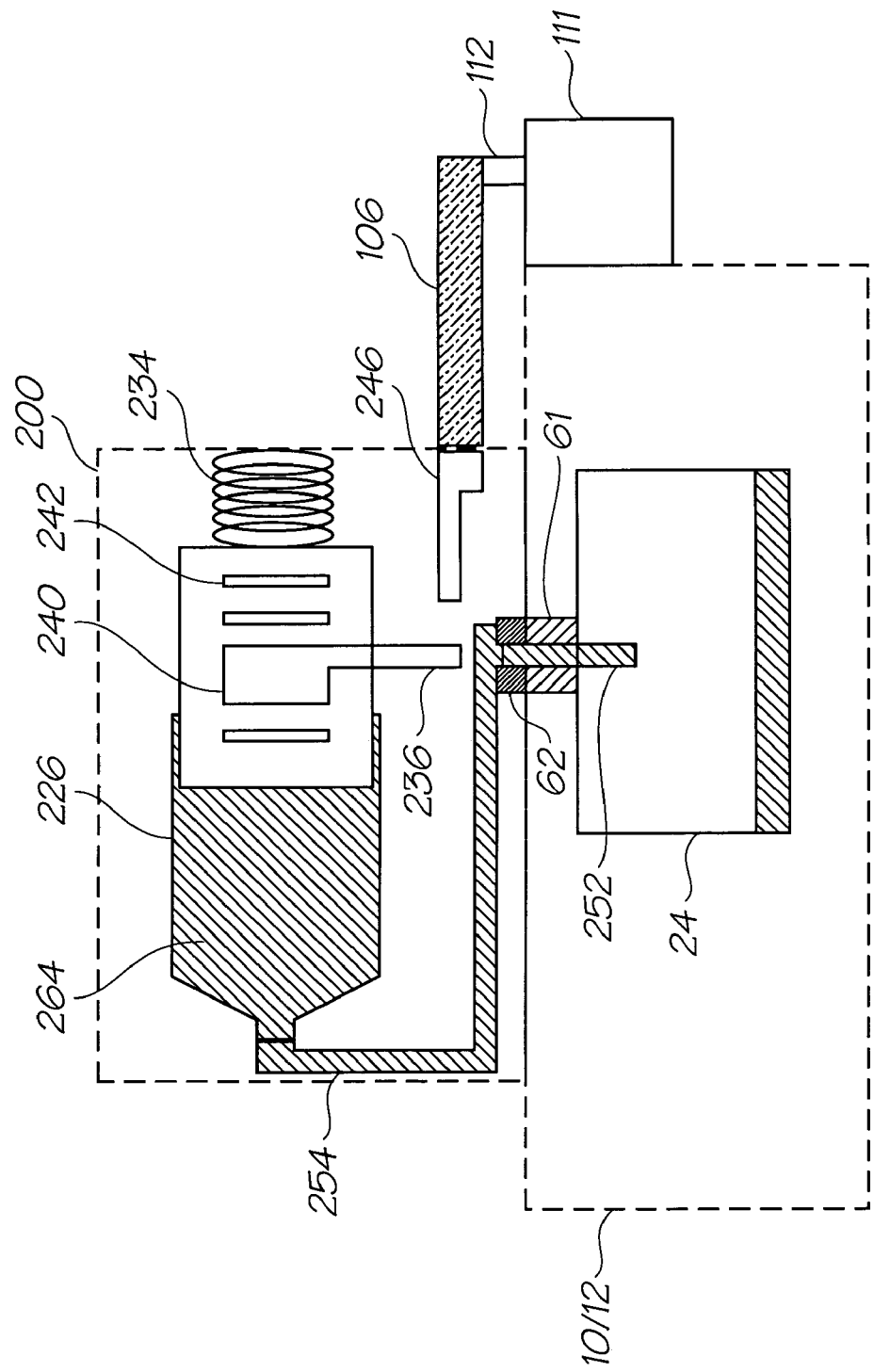
Figure 95:
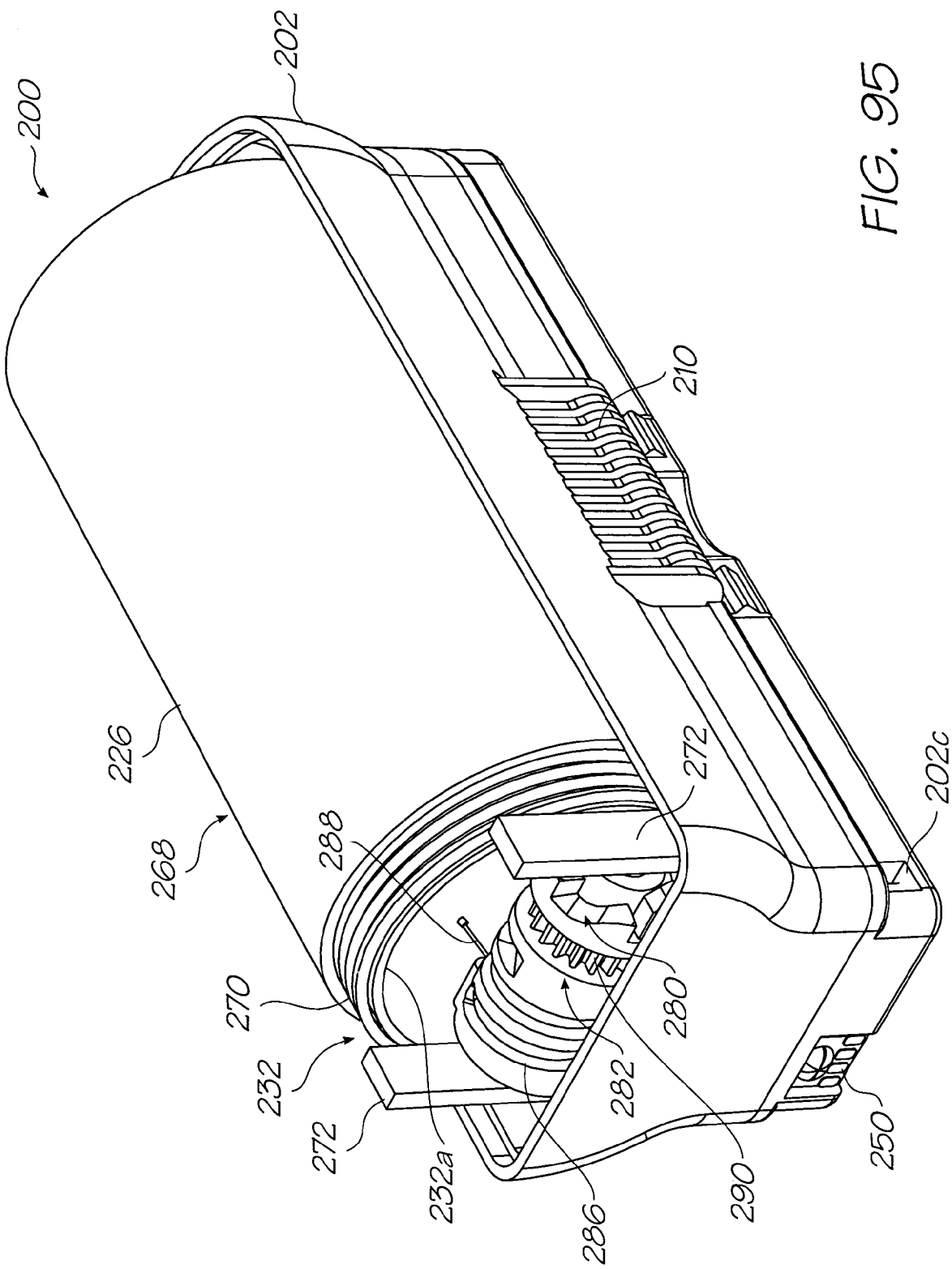
FIG. 95 shows the ink refill unit with its lid assembly removed in accordance with an alternative embodiment of a syringe assembly.
Figure 96:
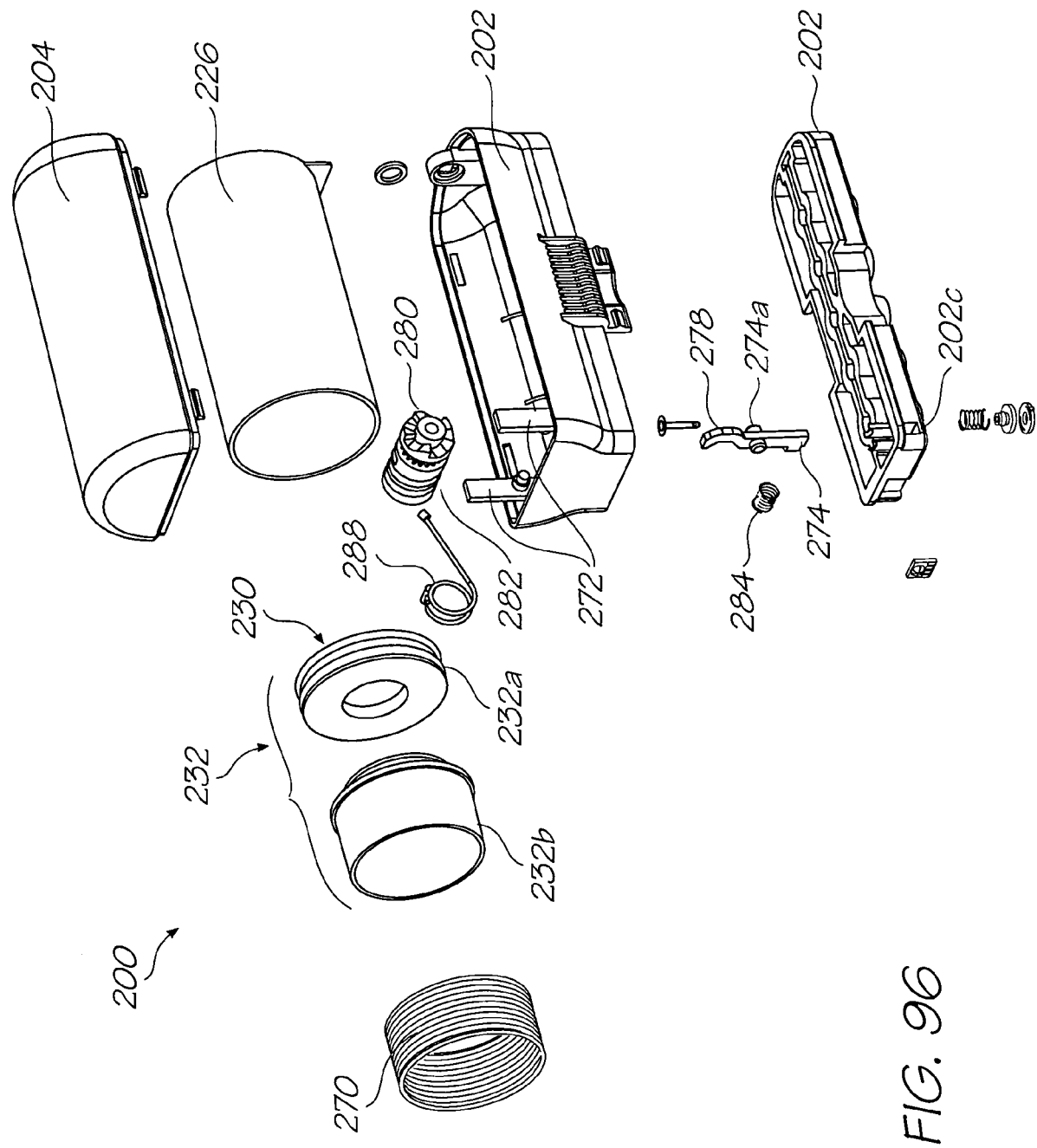
FIG. 96 shows an exploded view of the various components of the ink refill unit as shown in FIG. 95.
Figure 97:
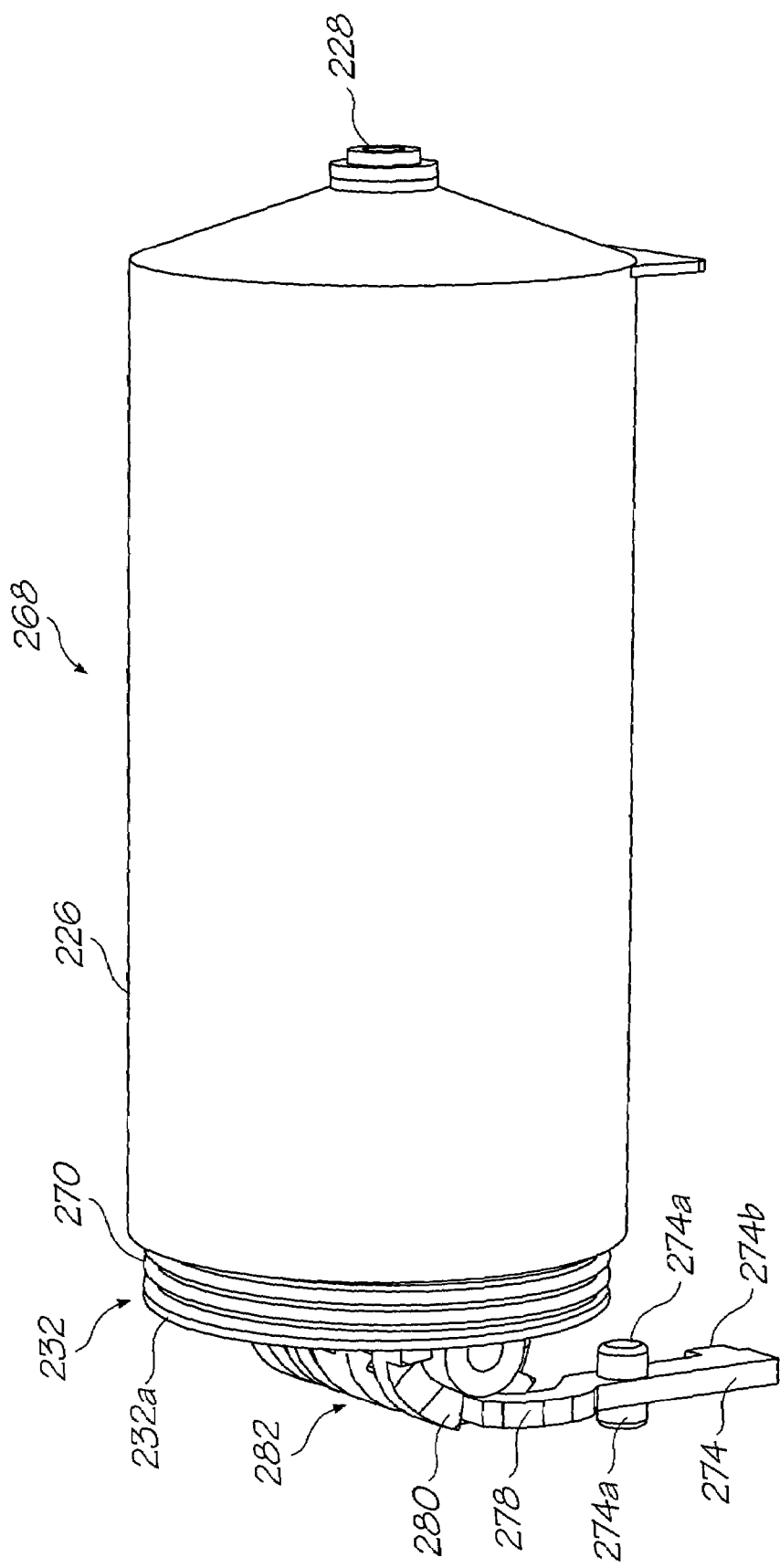
FIG. 97 shows a syringe assembly isolated from the ink refill unit as shown in FIG. 95.

An exemplary refilling operation is illustrated in FIG. 94*a* to 94*c*.

In FIG. 94*a*, the refill unit 200 is in its refilling position with the syringe needle 252 penetrating the valve fittings of an ink storage compartment of the cartridge unit. At the stage shown, ink 264 stored within the tank 226 has been primed into the fluid channel 254 and the syringe needle 252. Alternatively, the fluid channel 254 may comprise air or other gas at this stage, e.g., before the first refilling operation for the refill unit has been performed. The ink is held within this fluid path without escaping through the syringe needle due to vacuum pressure created in the fluid path.

Alternatively, a cap may be provided to be either manually or automatically fitted within the working outlet so as to cap the end of the syringe needle. Such a cap additionally provides a means of ensuring that the stored ink does not dry out before the first application and between multiple refill applications.

In FIG. 94*b*, the actuator arm of the solenoid assembly of the cradle unit is operated to extend the push bar into contact with the actuator shaft 246, moving the actuator shaft 246 into contact against the arm 248 of the rod 236. Immediately after this, the push bar returns to its retracted position of FIG. 94*a*. The pawl 240 is then disengaged from the ratchet groove 242, thus causing the compression spring 234 to depress the plunger 232 into the tank 224 in the direction of arrow A. As a result, ink 264 is ejected from the ejection port 228 and thus through the syringe needle 252 into the ink storage compartment in the direction of arrow B.

In FIG. 94*c*, the plunger 232 has moved sufficiently for the pawl 240 to engage with the next ratchet groove 242. At this point, the plunger 232 is stopped and as such the ejection of the ink 264 from the syringe needle 252 ceases.

The above process may be repeated until the ink chamber 122 is deemed refilled by the controller of the printer unit or until the refill unit 200 is depleted of ink. The status of the amount of ink in the refill unit 200 can be relayed to a user through the operation of an indicator light 266, such as an LED, provided on the lid assembly 204. The indicator light 266 is connected to the QA chip 250 when the lid assembly 204 is fitted to the base assembly 202, and may be operated to illuminate during the refilling operation and cease illumination when this operation is finished and when the refill unit 200 is depleted. Alternatively, the indicator light 266 may be capable of multi-coloured illumination, such that different light colours are used to indicate the particular status of the refill unit 200, e.g., a green light during refilling; a red light when the refill unit is depleted.

Power for the indicator light 266 and the QA chip 250 may be provided via the connection with the QA chip reader. Alternatively, a battery may be provided within the refill unit 200 having a power capacity sufficient for operating the unit until the ink is depleted.

An alternative embodiment of a syringe assembly 268 housed within the refill cartridge 200 is illustrated in FIGS. 95 to 99. Like the syringe assembly 224 of the previous embodiment, the syringe assembly 268 is mounted within the base assembly 202 of the refill unit 200 so as to be covered by the lid assembly 204 and has the necessary capacity to store and distribute the amount of ink required for refilling to the print cartridge 102 through the working outlet 208.

Like the syringe assembly of the previous embodiment, the syringe assembly 268 is provided with the tank 226 for storing the ink within the refill unit 200. The tank 226 has at one end the ejection port 228 through which the ink is ejected for distribution and is sealed at the other end by the syringe seal 230. The syringe seal 230 is mounted on the plunger 232 which plunges into the hollow internal space of the tank 226 to drive the stored ink out of the ejection port 228.

The plunger 232 is plunged into the tank 226 through action of a compression spring 270 which is attached at one and about the circumference of the body 232a of the plunger 232. The other end of the spring 270 acts against a ring 232b fixed between posts 272 which project from the lower internal surface of the base assembly 202. In this arrangement, due to the nature compression spring 270, it acts to constantly bias the plunger 232 towards the interior of the tank 226 when the syringe assembly 268 is housed in the base assembly 202, as did the earlier described embodiment.

In this instance, control of the plunging operation is provided by a pawl and ratchet arrangement of the syringe assembly 268. The pawl and ratchet arrangement comprises an actuator rod 274 which is mounted via pins 274a, between its upper and lower ends, to mounting slots 276 which project from the lower internal surface of the base assembly 202. In this way, the rod 274 is able to swing or pivot about the mounted pins 274a.

Figure 98:
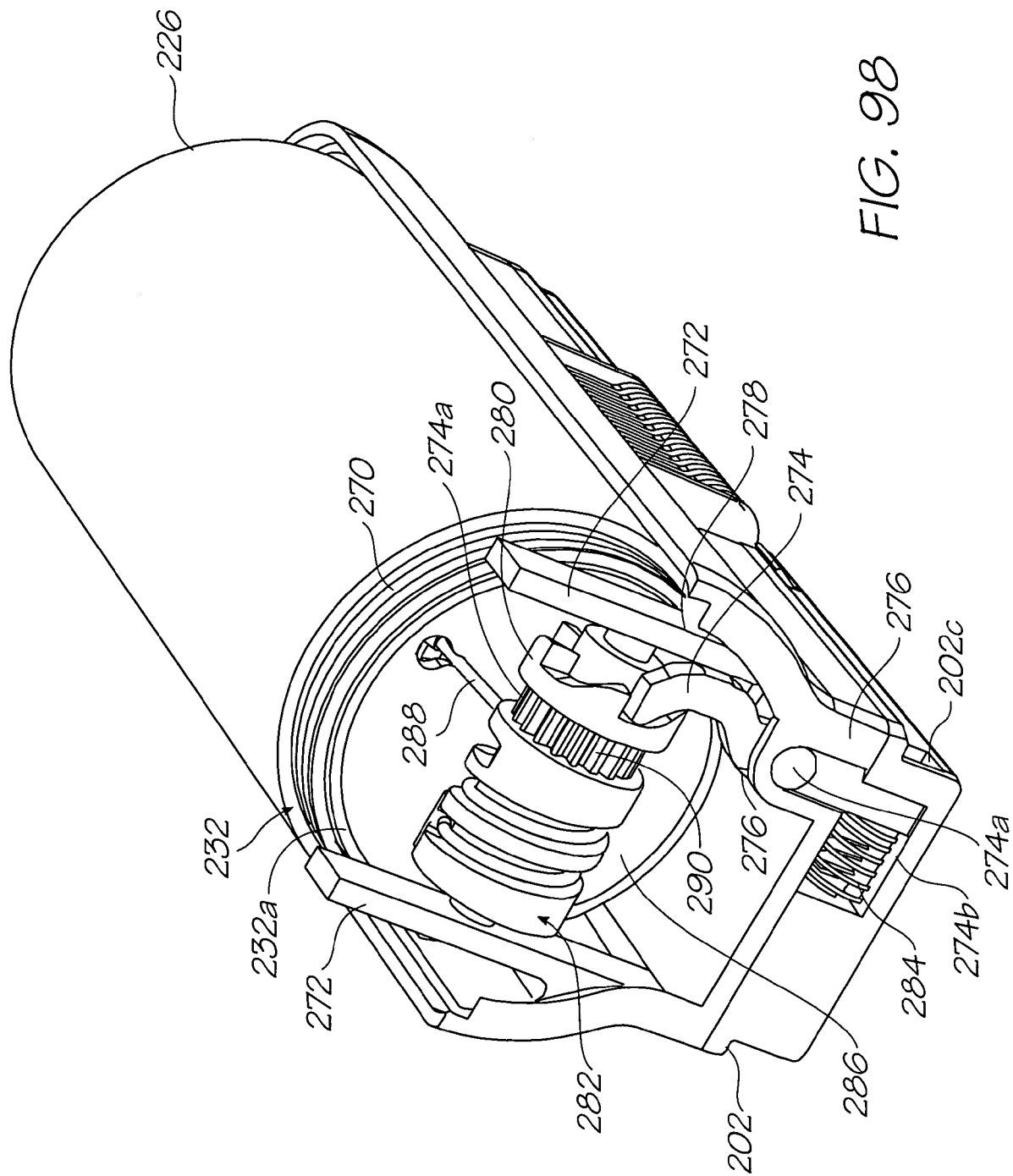
FIG. 98 shows an end sectional view of the syringe assembly as shown in FIG. 95.
Figure 99:
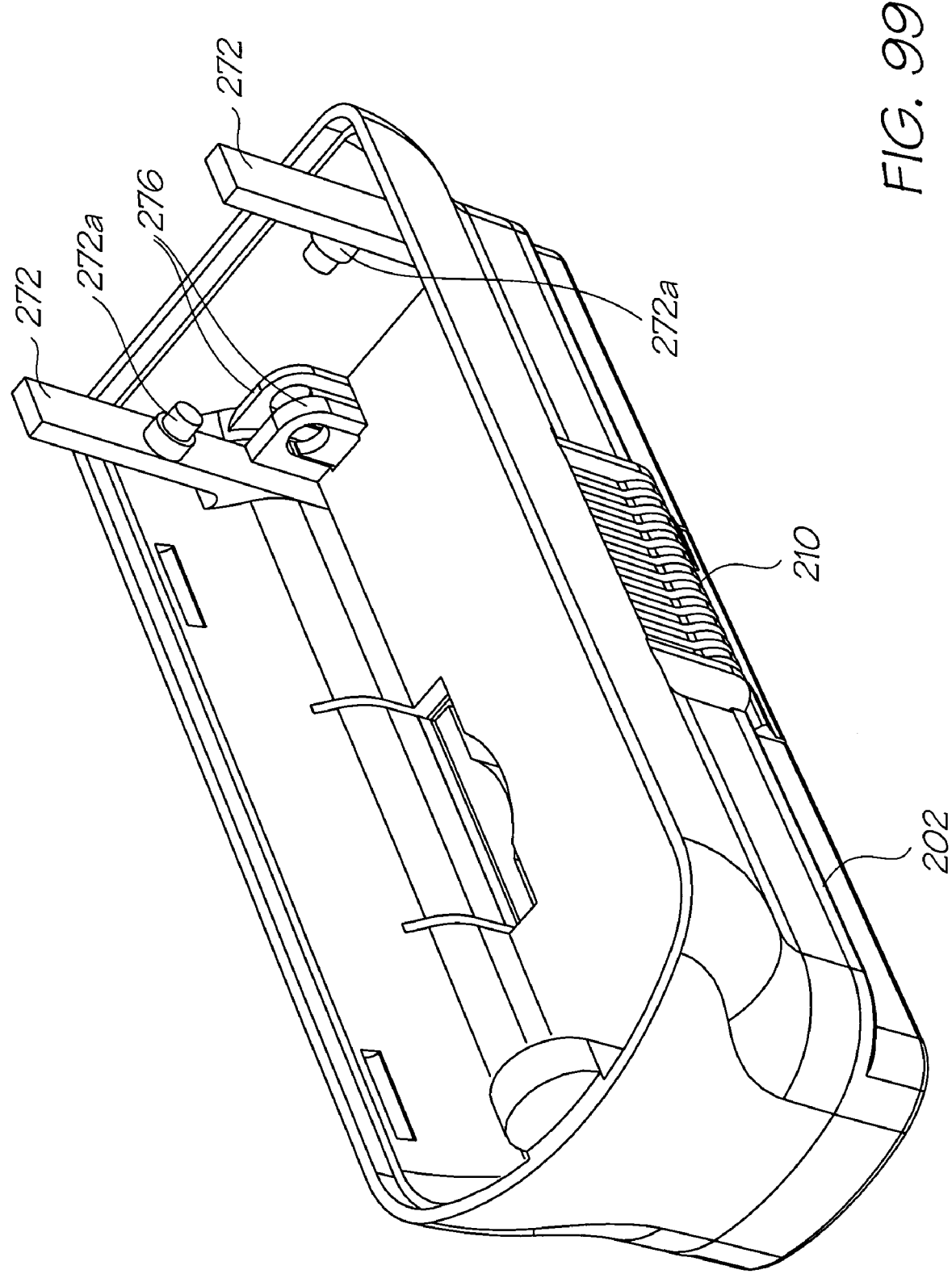
FIG. 99 shows a base assembly isolated from the other components of the ink refill unit as shown in FIGS. 95 and 96.
Figure 100:
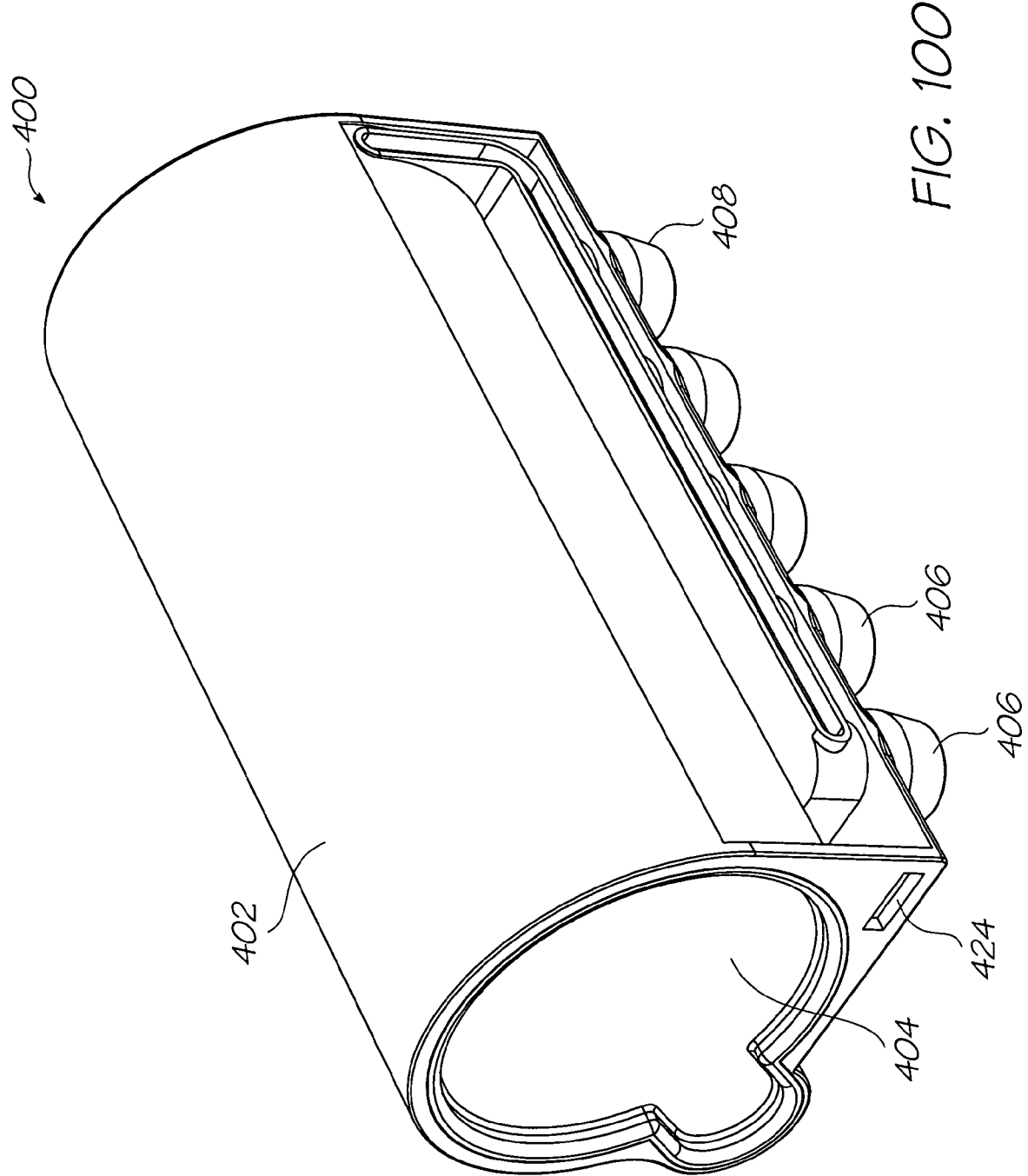
FIG. 100 shows yet another embodiment of an ink refill unit suitable for use with the present invention.
Figure 101:
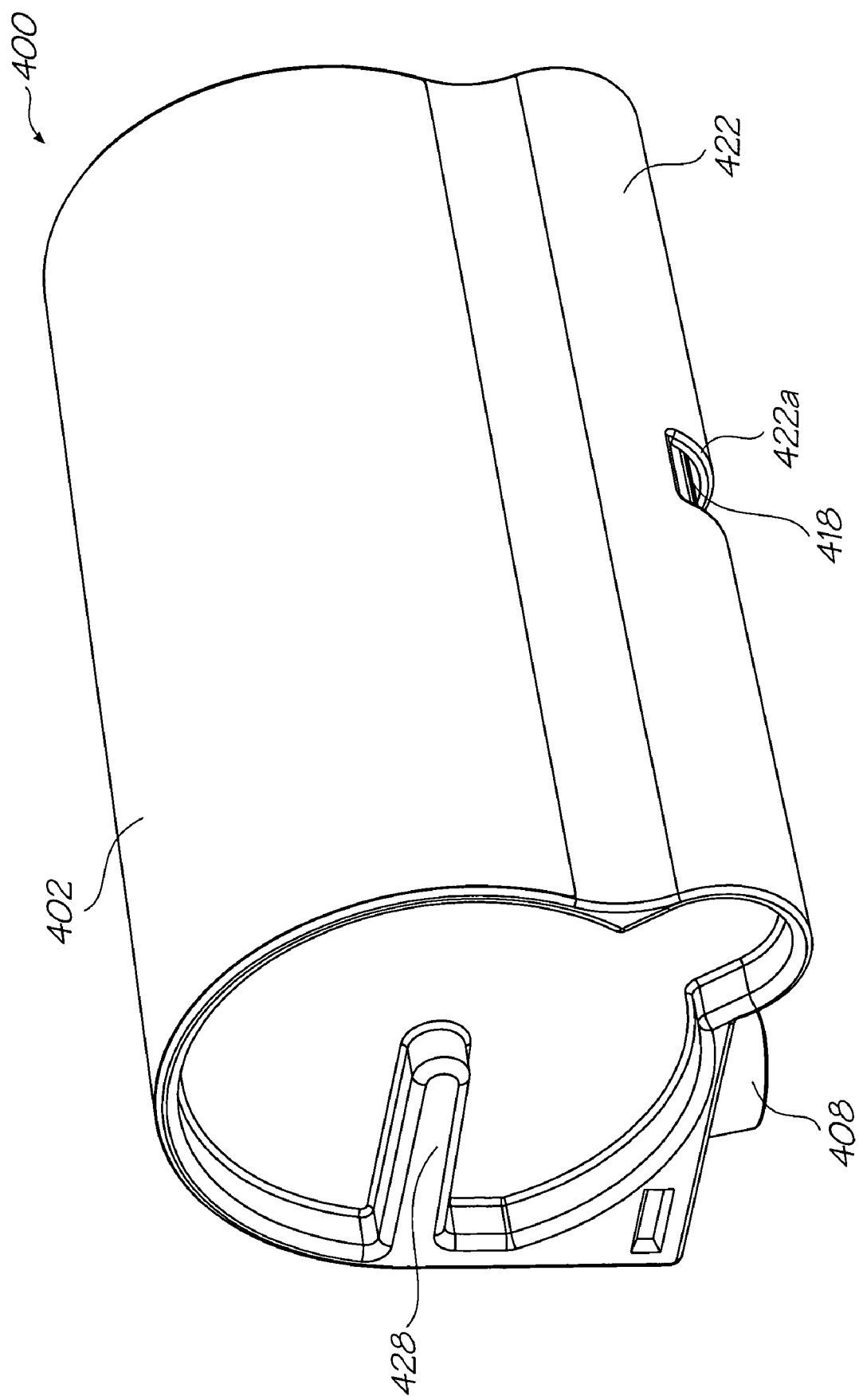
FIG. 101 shows an opposite perspective view of the ink refill unit of FIG. 100.

The rod 274 has a pawl 278 at its upper end which is engageable with a series of teeth of a ratchet 280 provided in a circular arrangement at one end of a feed member 282 (best illustrated in FIG. 98). The swinging of the rod 274 enables the pawl to engage and disengage with the ratchet. An actuator spring 284 is provided between a boss 274b, which projects from the lower end of the rod 274, and an internal surface of the base assembly to bias the pawl into the ratchet.

The feed member 282 is in the form of a cylindrical wheel and is mounted at either end to the posts 272 via pins 272a which project into axial holes (not shown) in the ends of the feed member 282. In this way, the feed member 282 is able to rotate about its longitudinal axis. The feed member 282 further comprises a grooved thread 286 about its circumference at the end opposite the ratchet 280. The grooved thread 286 is used to train a rope 288 about the feed member 282. One end of the rope is attached to the end of the grooved thread and the other end of the rope attached to, or through, the plunger body 232a.

Prior to shipment of the refill unit 200, the combination of the rope 288 and grooved thread 286 and the ratchet and pawl arrangement is used to initially retract the plunger 232 from the tank 226 so as to provide a space in which to store the ink. In this regard, the feed member 282 is provided with a gear 290 which is able to mesh with an external motor gear or the like. Action of the motor gear rotates the feed member (in a clockwise direction in the arrangement shown in FIG. 97) whilst the pawl is not engaged with the ratchet which causes the rope to be wound about the grooved thread, thus retracting the plunger from the tank 226 against the action of the spring 270.

Sufficient rotational force is required to compress the spring 270 and sufficient strength is required in the rope to hold the plunger in place whilst the spring is compressed. Once the plunger has been pulled out of the tank in which position the spring is substantially fully compressed, the pawl is engaged with the nearest tooth of the ratchet. This engagement provides sufficient resistance against the plunging of the plunger 232 into the interior of the tank 226 through action of the compression spring 270. The tank 226 can then be primed with ink for shipment.

Thus, upon first use of the refill unit 200, the pawl 278 is engaged with the tooth of the ratchet 280 which provides maximum ink storage capacity within the tank 226. As ink is required to be ejected from the tank 226 through the ejection port 228 during a refilling operation, the rod 274 is swung to disengage the pawl with the tooth of the ratchet. This causes the plunger 232 to advance into the tank 226 a set distance thereby ejecting a measured portion of the stored ink through the ejection port 228. Ejection stops when the pawl 278 engages with the next tooth of the ratchet 280, which occurs through action of the actuator spring 284 swinging the rod 274 into engagement with the ratchet.

Additional measured portions of ink can be ejected from the tank 226 by repeated swinging of the rod 274 thereby causing engagement/disengagement of the pawl with the ratchet. This continues until the rope 288 and the compression spring 270 are fully extended at which point the ink within the tank 226 is depleted and the refill unit 200 is spent.

Similar to the previous embodiment, the swinging of the rod 274 to disengage the pawl 278 can be controlled by way of a slider element provided on the underside of the cover assembly 11 contacting the lower surface of the rod opposite the boss 274b. As discussed in relation to the previous embodiment, the lid assembly can be configured such that an end of the slider element projects into the docking port 157 and through a hole 202c formed in one of the side walls of the base assembly 202 when the refill unit is docked wit the cartridge unit 10. The other end of the slider element may be connected to a refill solenoid assembly which is attached to the cradle unit as described previously.

In this way, when the refill unit 200 is docked with the cartridge unit 10 and is in a refill position, the slider element can be operated to push the rod 274 so as to disengage the pawl 278 with the ratchet 280. Then, once the pawl re-engages through action of the actuator spring 284, the lower end of the rod 274 is repositioned for subsequent contact by the slider element.

More ink is refilled from the refill unit 200 through repeated sliding of the slider element. Equally, multiple refill operations using the one refill unit 200 can be performed if any one refill operation does not deplete the ink contained therein. As such, the refill unit is provided with the ability to perform multiple refilling operations.

The clip arrangement 210 and the arrangement of the syringe needle 252 in the working outlet 208 and the QA chip 250 is the same for the refill cartridge incorporating this alternative syringe assembly 268 as that of the previous embodiment.

With this alternative embodiment of the syringe assembly 268 a larger volume of ink can be stored within the tank 226 of the refill unit 200 (e.g., about 50 ml) whilst retaining a similarly size to that in the previous embodiment. This is because, the space occupied by the pawl and ratchet arrangement is minimised whilst retaining a sufficient number of steps for controlled ejection of ink for refilling.

FIGS. 100 to 106 illustrate yet another embodiment of an ink refill unit 400 suitable for use with the print engine of the present invention.

The ink refill unit 400 generally comprises a body assembly 402, for housing the various internal components necessary for storing and delivering the refill ink, and an end cap assembly 404 which fits onto and caps an end of the body assembly 402. The body and cap assemblies may be moulded from a plastics material.

As in the embodiments described above, the refill unit 400 contains ink and is intended to be used as a means for refilling ink storage compartments 24 provided within the cartridge unit 10. In this regard, the refill unit 400 is configured to dock with the uppermost surface 60 of the cartridge unit 10 to transfer the ink contained therein into one or more of the ink storage compartments 24 of the cartridge unit 10 in the manner as discussed previously.

In this regard, the refill unit 400 is also arranged with at least one working outlet 408 (see FIG. 102) for distributing a particular colour or type of ink contained in the refill unit to the corresponding ink refill port 61 associated with the desired ink storage compartment 24 of the cartridge unit 10. That is, if the refill unit 400 contains cyan ink, the working outlet 408 is positioned so as to correspond to the ink refill port 61 associated with the cyan ink stoage compartment of the cartridge unit 10 when the refill unit is in its refilling position.

Although not shown in the drawings, a clip arrangement similar to that of the earlier described embodiment may be provided on the body assembly 402 and within the rim portion 158 of the docking port 157, to ensure reliable and efficient transfer of ink from the refill unit 400 to the cartridge unit 10.

The body assembly 402 of the ink refill unit 400 has capacity to store a sufficient amount of ink required to refill the ink storage compartments 24 of the cartridge unit 10. The internal components of the body assembly 402 are most clearly seen in FIGS. 103 to 106.

A compressible bellows tank 410 is provided in the body assembly 402 for storing the ink. In this regard, the bellows tank is sealed at one end and is provided with an ejection port 412 at the other end (being the end adjacent the end wall of the body assembly) through which the ink is ejected for distribution. The sealed end of the bellows tank 410 abuts a plunger 414 which is arranged to compress the bellows tank against the end wall of the body assembly to expel the stored ink out of the ejection port 412.

The plunger 414 compresses the bellows tank 410 through action of a gear and thread arrangement. The gear and thread arrangement comprises a helical geared thread 416 provided about the circumference of the substantially circular plunger 414 which mates with an elongate drive gear 418 which is mounted within the body assembly 402 and extends along the length thereof, and an internal lead screw thread 420 provided in the substantially cylindrical internal wall of the body assembly (see FIG. 106). The lead screw thread 420 is provided with a gap along the length of the body assembly 402 in which the drive gear 418 sits and is able to come into contact with the gear teeth in the gear thread 416 of the plunger 414. An elongate protruded region 422 of the body assembly 402 is provided to accommodate the drive gear 418 in this position.

In this gear and thread arrangement, the plunger 414 is able to rotate so as to move along the lead screw thread 420. This movement provides the plunging operation of the plunger against the bellows tank. The rotation of the plunger is provided by rotation of the drive gear 418 being imparted to the geared thread 416 of the plunger. The drive gear 418 is held within the protruded region 422 by a pin 418a provided on one end of the drive gear which slides into a depression or hole within the internal end wall of the body assembly 402 and a pin 404a provided in a corresponding position on the internal surface of the end cap assembly 404 which slides into a corresponding depression 418b provided on the other end of the drive gear. Other arrangements are possible however, so long as the drive gear is free to rotate about its long axis.

The rotation of the drive gear 418 is driven by a motor gear 124 which meshes with the teeth of the drive gear. The motor gear 124 is driven by a motor which may be mounted to the underside of the cover assembly 11 of the cradle unit 12. In this arrangement, similar to those described in the above alternative embodiments, the motor gear 124 is arranged to project from the surface of the cover assembly to engage with the drive gear 418 through a slot 422a in the protruded region 422. Those of ordinary skill in the art will understand that the motorisation of the gear and thread arrangement may also be provided within the refill unit 400 itself instead of in the cover assembly 11.

Control of the plunging operation is provided by the controlling the operation of the motor responsible for rotating the motor gear 124, and a suitable gearing ratio may be provided for reasonably fine control of the plunger movement. As will be appreciated, the plunging operation provides controlled release of the ink from the bellows tank 410 through its ejection port 412.

Upon first use of the refill unit 400, plunger 414 is fully retracted so as to provide full extension of the bellows tank and hence maximum ink storage capacity in the refill unit 400. Of course, suitably sized bellows tanks can be provided within the same sized refill units 400 for provided different storage amounts, e.g., 30 ml as opposed to 50 ml, depending on application, the colour of the ink, etc. Then, as ink is required to be ejected from the bellows tank 410 during a refilling operation, the motor may be controlled to rotate the motor gear 124 and the drive gear 418 thereby causing the plunger 414 to compress the bellows tank to eject some of the stored ink through the ejection port 412. The amount of ink ejected per rotation of the motor gear 124 can be readily ascertained to provide metered release of ink into the cartridge unit 10 as necessary.

The plunging is continued until the required amount of ink has been ejected into the ink storage compartments of the cartridge unit 10. For example, in a single-use refill operation, the entire contents of the refill unit 400 would be ejected, however in a multiple-use refill operation, only part of the refill unit's capacity of ink may be required at one time. In such a multiple-use regime, more ink can be ejected from the bellows tank by repeated plunging operations until the ink within the bellows tank has been depleted. The ink may be dispensed in a series of preselected amounts, e.g., by a series of preselected numbers of turns of the plunger 414, until the necessary amount of ink has been dispensed, or the plunger 414 may be simply turned until it is determined that the ink chamber has been replenished.

In order to ensure that the ink does not leak from the ejection port 412 after a refilling operation has been performed and ink remains in the bellows tank for subsequent refills, suitable fluid pressure is retained within the bellows tank 410 at all times. This is achieved by backing-up the plunger 414 by a suitable amount once the refilling operation is complete. This is done by rotating the plunger in the opposite direction so as to allow slight re-expansion of the bellows tank 410. In this regard, the sealed end of the bellows tank is preferably attached to the plunger and the motor provided in the cover assembly 11 is preferably a bi-directional motor.

Like the previous embodiments, the status of the amount of the ink stored within the refill unit 400 is monitored by a QA control chip 424 provided in the body assembly 402. The QA chip 424 is provided in an exposed position on the surface of the end cap assembly 404, or alternatively on the end surface of the body assembly 402, so as to align and connect with a QA chip reader 160 provided in the docking port 157 of the cover assembly 11. The QA chip reader is in turn connected to the SoPEC devices 126 of the cradle unit 12 to enable control of the overall refill operation. In the present embodiment, the QA chip 424 is used to provide information on the amount of ink (and colour, etc) stored in the refill unit 400 at any instant to the SoPEC devices 126, so that the SoPEC devices can control the motor to rotate the motor gear 124 the appropriate number of times to refill the corresponding ink storage compartment 24.

In this regard, a sensor or other means may be connected to the QA chip 424 to sense either the position of the plunger 414 or the number of times the plunger 414 has been rotated by the drive gear 418 which informs the QA chip 424 of the remaining capacity/number of refills of the refill unit 400.

Figure 102:
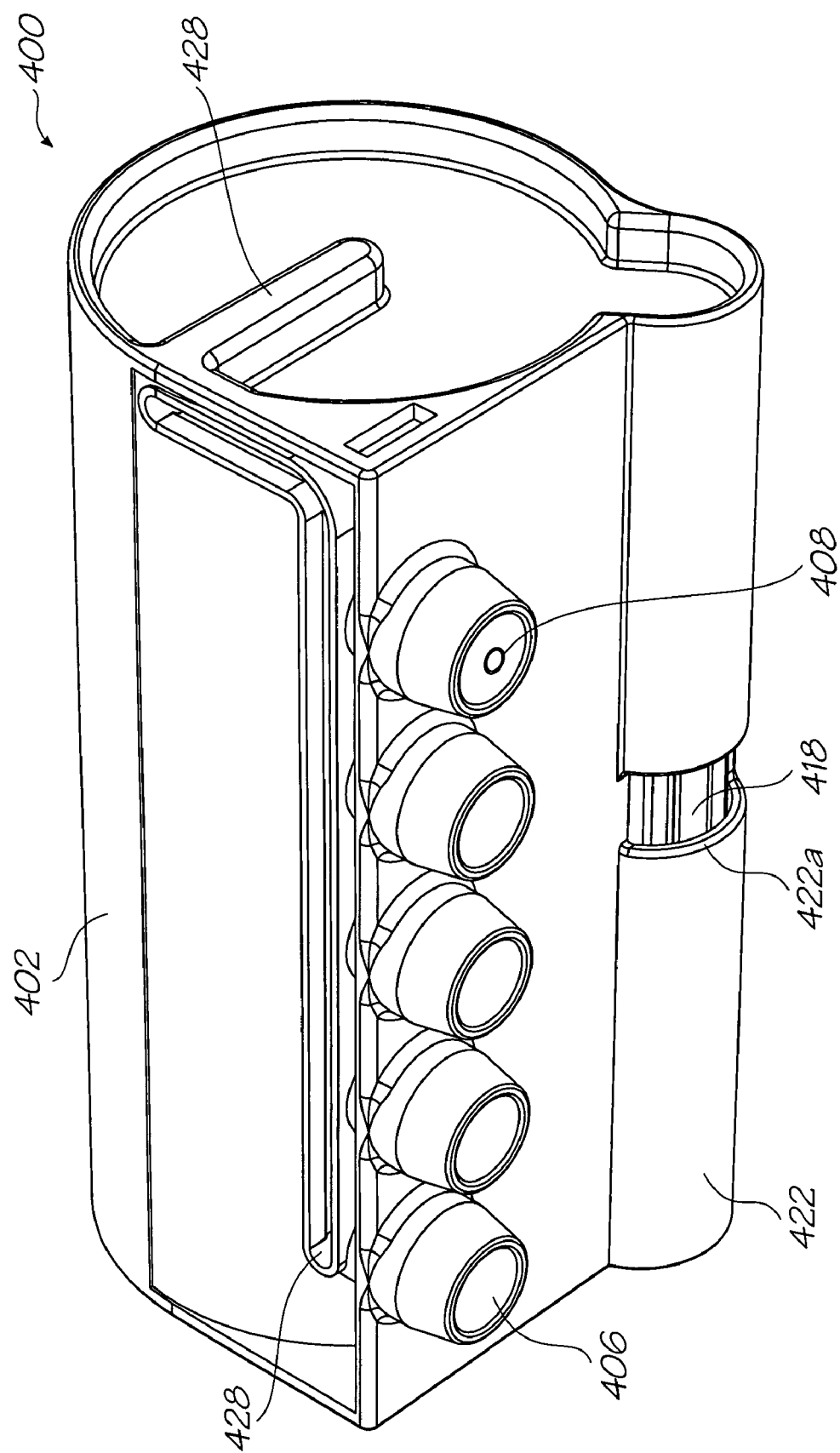
FIG. 102 shows an underside view of the ink refill unit of FIG. 100.
Figure 103:
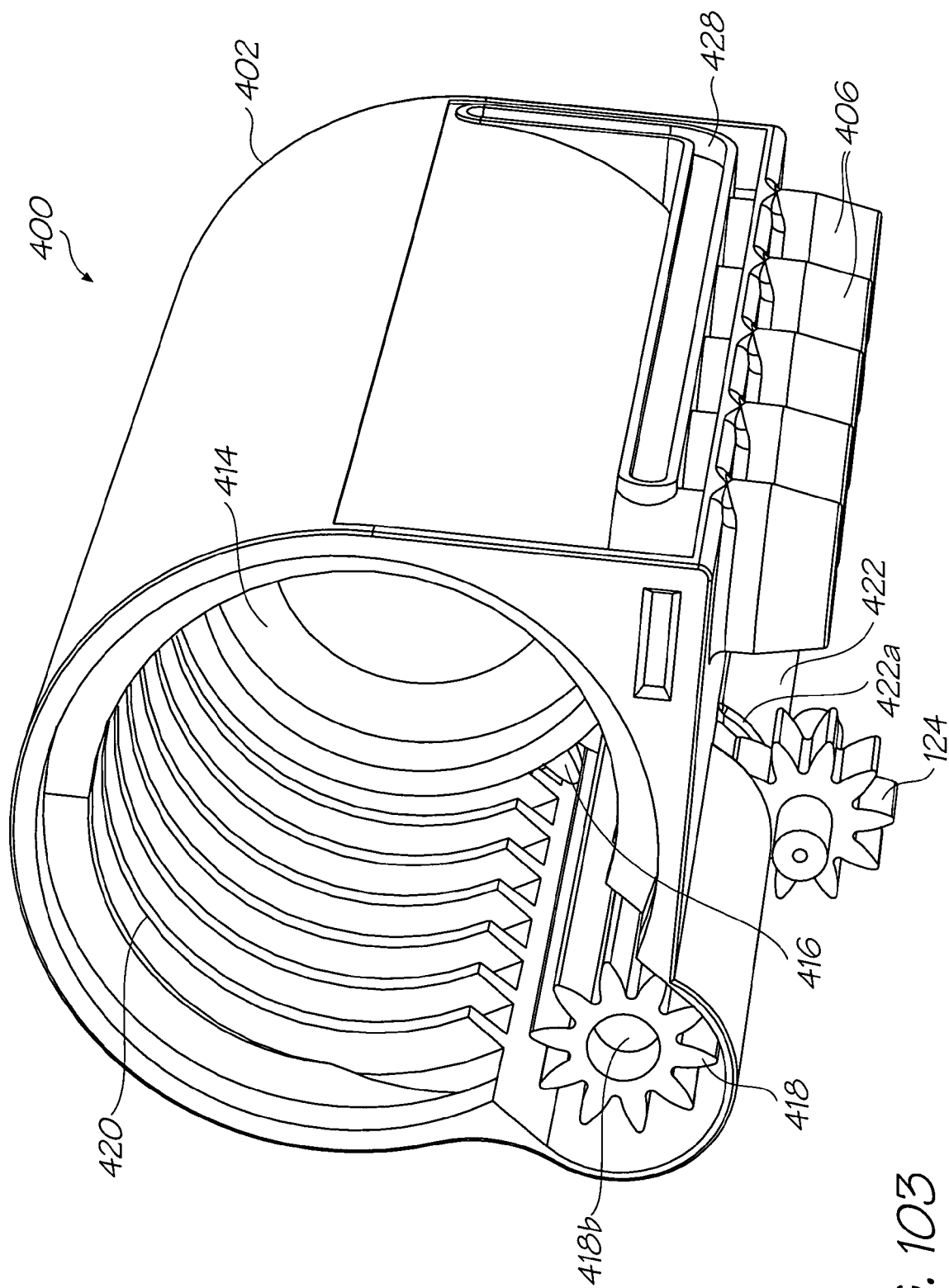
FIG. 103 shows the ink refill unit of FIG. 100 with its end cap removed.
Figure 104:
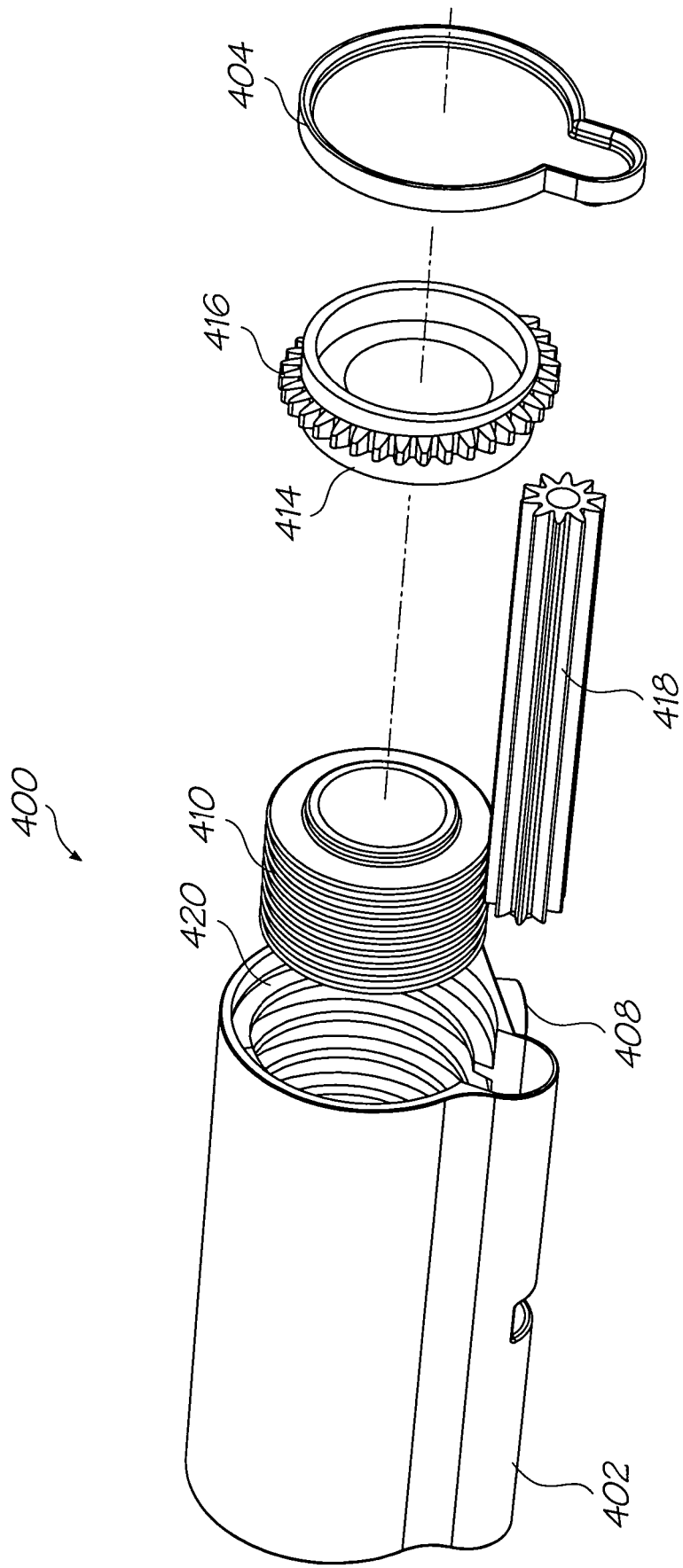
FIG. 104 shows an exploded view of the various components of the ink refill unit of FIG. 100.
Figure 105:
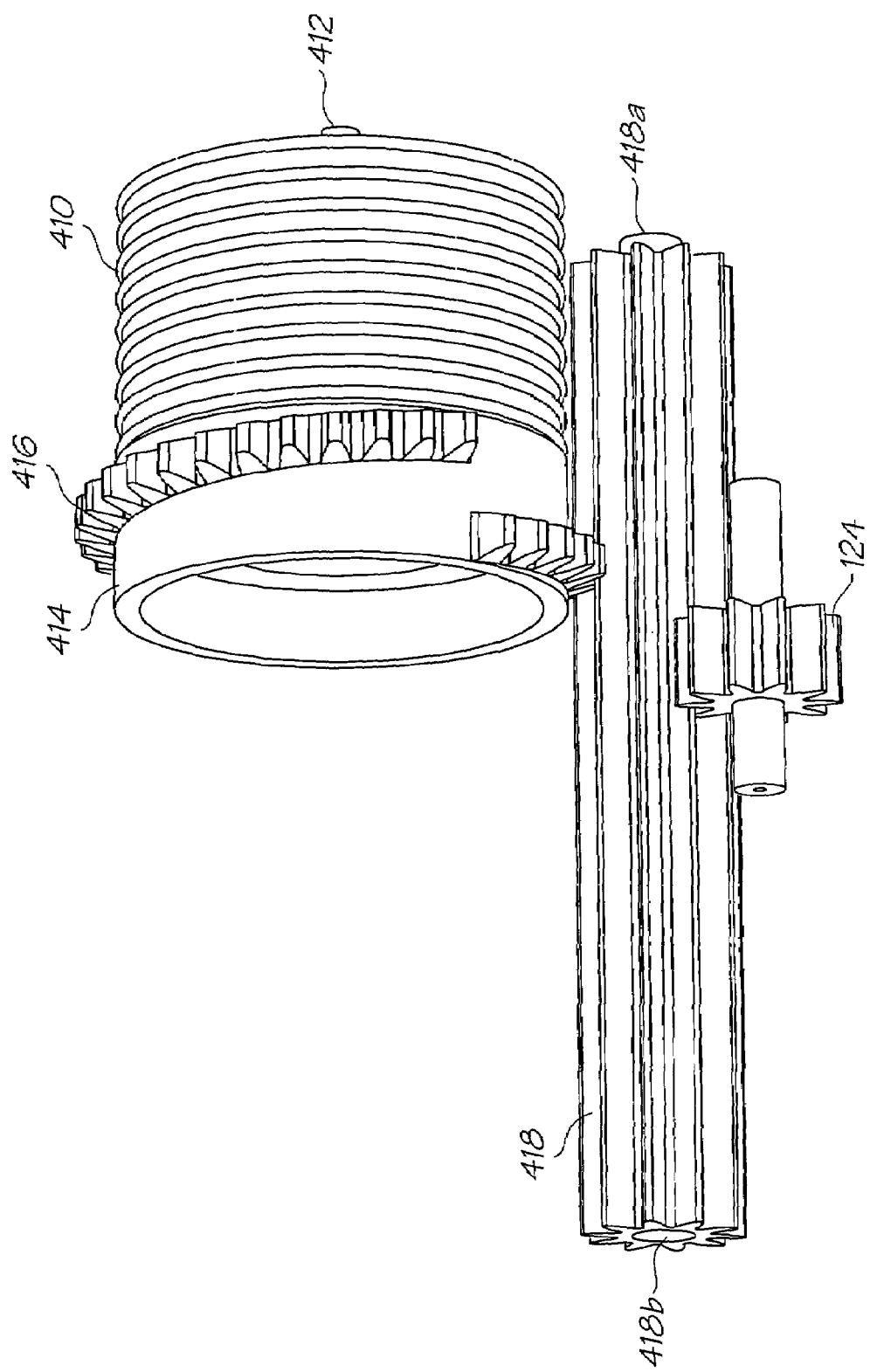
FIG. 105 shows the working relationship between the internal components of the ink refill unit as shown in FIGS. 100 and 104.
Figure 106:
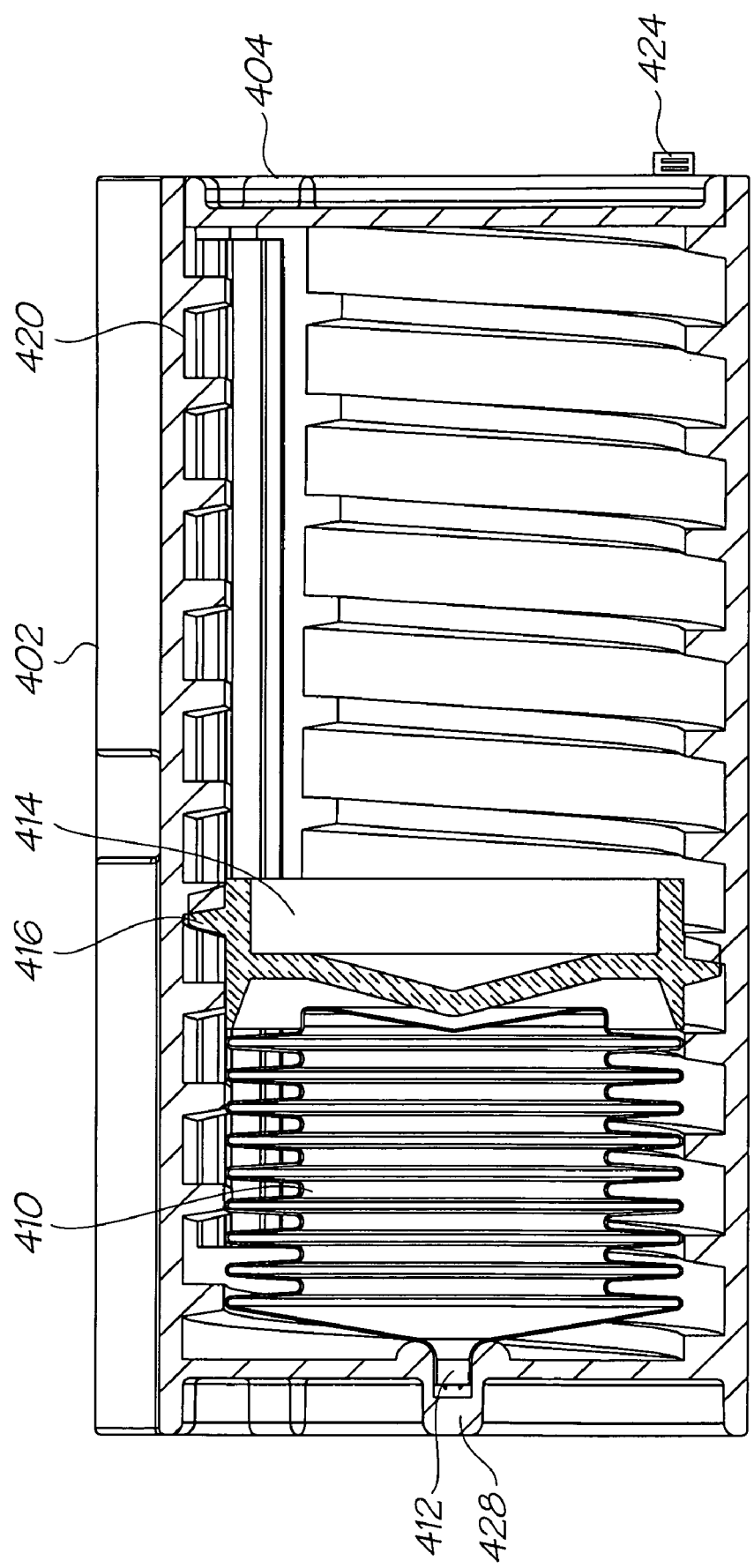
FIG. 106 shows a side sectional view of the ink refill unit of FIG. 100.

As with the first embodiment, the working outlet 408 of the refill unit 400 comprises a syringe needle 426 which is connected to the ejection port 412 of the bellows tank 410 through a fluid channel 428 provided on the outer sides of the body assembly 402 (see FIG. 102). Sealing between the ejection port 412 and the fluid channel 428 is provided by an O-ring 430. The syringe needle 426 is arranged to penetrate the valve fittings 62 provided within the ink refill ports 61 of the cartridge unit 10 so as to allow the flow of ink into the ink storage compartments 24. The arrangement and operation of the syringe needle 426 is otherwise the same as in the first embodiment.

An indicator light (not shown) may be provided on the body assembly 402 of the refill unit 400 connected to the QA chip 424 so as to indicate the status of the amount of ink in the refill unit to a user. Power for the indicator light and the QA chip may be provided via the connection to the contact 130 of the print cradle 100. Alternatively, a battery may be provided within the refill unit 400 having a power capacity sufficient for operating the unit until the ink is depleted.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

What is claimed is:

1. A cradle unit for an inkjet printer comprising:
   a body complementary to a removable inkjet cartridge of a type having a pagewidth printhead and a refillable ink supply; and
   a controller for controlling the operation of the printhead to facilitate printing;
   wherein, said body includes a cover assembly for enclosing the removable inkjet cartridge within the body, said cover assembly having at least one port formed therein through which a refill unit is received for refilling the ink supply of the cartridge,
   wherein the port includes a receiver unit arranged therein for engaging with an integrated circuit on the refill unit when the refill unit is received by said port.

2. A cradle unit according to claim 1, wherein the body defines a recess to receive the removable inkjet cartridge and said cover assembly secures the removable inkjet cartridge within said recess.

3. A cradle unit according to claim 2, wherein the port is shaped to receive at least a portion of the refill unit.

4. A cradle unit according to claim 3, wherein the port includes a retaining means for engaging with the refill unit to secure the refill unit in position for refilling the ink supply of the cartridge.

5. A cradle unit according to claim 4, wherein the retaining means includes a clip member which engages with a recess provided in the refill unit to secure the refill unit in position.

6. A cradle unit according to claim 1, wherein the integrated circuit is a quality assurance chip which stores information relating to the type and/or amount of printing fluid contained in said refill unit, the receiver unit transmitting said information to the controller to control the refilling process.

7. A cradle unit according to claim 6, wherein the cover assembly includes an actuator member arranged therein which operates said refill unit to facilitate refilling of the ink supply of the cartridge.

8. A cradle unit according to claim 7, wherein the actuator member is a push rod which extends into said port to engage with the refill unit to release ink from the refill unit into said ink supply of the cartridge.

9. A cradle unit according to claim 8, wherein said push rod is activated by a solenoid actuator which is mounted to the body.

10. A cradle unit according to claim 7, wherein the actuator member is a gear mechanism which meshes with a corresponding gear mechanism provided on the refill unit to facilitate release of ink from the refill unit into said ink supply of the cartridge.

11. A cradle unit according to claim 10, wherein the gear mechanism is activated by a motor which is mounted to the body.

* * * * *